US010761716B2

(12) United States Patent
Kocienda et al.

(10) Patent No.: US 10,761,716 B2
(45) Date of Patent: *Sep. 1, 2020

(54) METHODS AND GRAPHICAL USER INTERFACES FOR EDITING ON A MULTIFUNCTION DEVICE WITH A TOUCH SCREEN DISPLAY

(71) Applicant: Apple Inc., Cupertino, CA (US)

(72) Inventors: Kenneth L. Kocienda, San Jose, CA (US); Richard J. Williamson, Los Gatos, CA (US)

(73) Assignee: Apple, Inc., Cupertino, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 15/851,320

(22) Filed: Dec. 21, 2017

(65) Prior Publication Data

US 2018/0181276 A1 Jun. 28, 2018

Related U.S. Application Data

(63) Continuation of application No. 12/565,755, filed on Sep. 24, 2009, now Pat. No. 9,875,013.
(Continued)

(51) Int. Cl.
G06F 3/00 (2006.01)
G06F 9/00 (2006.01)
(Continued)

(52) U.S. Cl.
CPC .......... G06F 3/0488 (2013.01); G06F 1/1626 (2013.01); G06F 3/04883 (2013.01);
(Continued)

(58) Field of Classification Search
CPC ............... G06F 3/0488; G06F 3/04883; G06F 3/04886; G06F 1/1626; G06F 3/04812;
(Continued)

(56) References Cited

U.S. PATENT DOCUMENTS 4,332,464 A  6/1982 Bartulis et al.
4,680,429 A  7/1987 Murdock et al.
(Continued)

FOREIGN PATENT DOCUMENTS

CA  2310945 A1  12/2001
CN  1129889 A  8/1996
(Continued)

OTHER PUBLICATIONS

Decision on Request for Rehearing received for U.S. Appl. No. 12/565,757, mailed on Feb. 21, 2018, 10 pages.
(Continued)

Primary Examiner — Kieu D Vu
Assistant Examiner — Anita D. Chaudhuri
(74) Attorney, Agent, or Firm — Dentons US LLP

(57) ABSTRACT

In some embodiments, a device displays content on a touch screen display and detects input by finger gestures. In response to the finger gestures, the device selects content, visually distinguishes the selected content, and/or updates the selected content based on detected input. In some embodiments, the device displays a command display area that includes one or more command icons; detects activation of a command icon in the command display area; and, in response to detecting activation of the command icon in the command display area, performs a corresponding action with respect to the selected content. Exemplary actions include cutting, copying, and pasting content.

45 Claims, 157 Drawing Sheets

Related U.S. Application Data

(60) Provisional application No. 61/160,698, filed on Mar. 16, 2009.

(51) Int. Cl.
  G06F 17/00 (2019.01)
  G06F 3/0488 (2013.01)
  G06F 1/16 (2006.01)
  H04M 1/725 (2006.01)
  G06F 3/01 (2006.01)
  G06F 3/0484 (2013.01)

(52) U.S. Cl.
  CPC .... G06F 3/04886 (2013.01); H04M 1/72552 (2013.01); *G06F 3/016* (2013.01); *G06F 3/017* (2013.01); *G06F 3/04842* (2013.01); *G06F 2203/04805* (2013.01); *G06F 2203/04806* (2013.01); *H04M 1/72561* (2013.01); *H04M 2250/22* (2013.01); *H04M 2250/70* (2013.01)

(58) Field of Classification Search
  CPC ........ G06F 9/4443; G06F 8/34; G06F 3/0486; G06F 8/38; G06F 3/0481; G06F 3/0482; G06F 3/04847; G06Q 10/10; H04M 1/72552; H04M 2250/22; H04M 2250/70; H04N 1/00183; H04N 1/00185; H04N 1/00389; H04N 1/00411
  See application file for complete search history.

(56) References Cited

U.S. PATENT DOCUMENTS

| | | |
|---|---|---|
| 4,698,625 A | 10/1987 | McCaskill et al. |
| 4,755,811 A | 7/1988 | Slavin et al. |
| 4,790,028 A | 12/1988 | Ramage |
| 5,016,002 A | 5/1991 | Levanto |
| 5,027,110 A | 6/1991 | Chang et al. |
| 5,053,758 A | 10/1991 | Cornett et al. |
| 5,079,723 A | 1/1992 | Herceg et al. |
| 5,119,079 A | 6/1992 | Hube et al. |
| 5,201,034 A | 4/1993 | Matsuura et al. |
| 5,260,697 A | 11/1993 | Barrett et al. |
| 5,266,931 A | 11/1993 | Tanaka |
| 5,266,949 A | 11/1993 | Rossi |
| 5,319,386 A | 6/1994 | Gunn et al. |
| 5,326,270 A | 7/1994 | Ostby et al. |
| 5,335,276 A | 8/1994 | Thompson et al. |
| 5,341,293 A | 8/1994 | Vertelney et al. |
| 5,341,466 A | 8/1994 | Perlin et al. |
| 5,347,295 A | 9/1994 | Agulnick et al. |
| 5,367,453 A | 11/1994 | Capps et al. |
| 5,408,060 A | 4/1995 | Muurinen |
| 5,422,656 A | 6/1995 | Allard et al. |
| 5,459,488 A | 10/1995 | Geiser |
| 5,463,725 A | 10/1995 | Henckel et al. |
| 5,465,401 A | 11/1995 | Thompson |
| 5,471,578 A | 11/1995 | Moran et al. |
| 5,483,261 A | 1/1996 | Yasutake |
| 5,488,204 A | 1/1996 | Mead et al. |
| 5,495,566 A | 2/1996 | Kwatinetz |
| 5,511,148 A | 4/1996 | Wellner |
| 5,523,775 A | 6/1996 | Capps |
| 5,543,588 A | 8/1996 | Bisset et al. |
| 5,543,897 A | 8/1996 | Altrieth |
| 5,553,225 A | 9/1996 | Perry |
| 5,565,888 A | 10/1996 | Selker |
| 5,568,536 A | 10/1996 | Tiller et al. |
| 5,579,037 A | 11/1996 | Tahara et al. |
| 5,589,856 A | 12/1996 | Stein et al. |
| 5,615,384 A | 3/1997 | Allard et al. |
| 5,625,710 A | 4/1997 | Katsuyama et al. |
| 5,638,523 A | 6/1997 | Mullet et al. |
| 5,640,580 A | 6/1997 | Slayden et al. |
| 5,651,107 A | 7/1997 | Frank et al. |
| 5,673,338 A | 9/1997 | Denenberg et al. |
| 5,689,287 A | 11/1997 | Mackinlay et al. |
| 5,710,831 A | 1/1998 | Beernink et al. |
| 5,721,939 A | 2/1998 | Kaplan |
| 5,732,227 A | 3/1998 | Kuzunuki et al. |
| 5,736,974 A | 4/1998 | Selker |
| 5,754,873 A | 5/1998 | Nolan |
| 5,757,358 A | 5/1998 | Osga |
| 5,760,773 A | 6/1998 | Berman et al. |
| 5,778,404 A | 7/1998 | Capps et al. |
| 5,815,142 A | 9/1998 | Allard et al. |
| 5,825,352 A | 10/1998 | Bisset et al. |
| 5,835,079 A | 11/1998 | Shieh |
| 5,874,965 A | 2/1999 | Takai et al. |
| 5,877,751 A | 3/1999 | Kanemitsu et al. |
| 5,880,411 A | 3/1999 | Gillespie et al. |
| 5,880,743 A | 3/1999 | Moran et al. |
| 5,910,800 A | 6/1999 | Shields et al. |
| 5,910,801 A | 6/1999 | Rosenburg et al. |
| 5,926,769 A | 7/1999 | Valimaa et al. |
| 5,943,043 A | 8/1999 | Furuhata et al. |
| 5,956,021 A | 9/1999 | Kubota et al. |
| 5,967,996 A | 10/1999 | Kadota et al. |
| 5,977,950 A | 11/1999 | Rhyne |
| 5,982,352 A | 11/1999 | Pryor |
| 6,020,881 A | 2/2000 | Naughton et al. |
| 6,037,939 A | 3/2000 | Kashiwagi et al. |
| 6,049,326 A | 4/2000 | Beyda et al. |
| 6,054,990 A | 4/2000 | Tran |
| 6,073,036 A | 6/2000 | Heikkinen et al. |
| 6,121,960 A | 9/2000 | Carroll et al. |
| 6,157,935 A | 12/2000 | Tran et al. |
| 6,173,194 B1 | 1/2001 | Vanttila |
| 6,188,391 B1 | 2/2001 | Seely et al. |
| 6,262,735 B1 | 7/2001 | Eteläperä |
| 6,295,390 B1 | 9/2001 | Kobayashi et al. |
| 6,310,610 B1 | 10/2001 | Beaton et al. |
| 6,323,846 B1 | 11/2001 | Westerman et al. |
| 6,411,283 B1 | 6/2002 | Murphy |
| 6,433,801 B1 | 8/2002 | Moon et al. |
| 6,525,749 B1 | 2/2003 | Moran et al. |
| 6,563,913 B1 | 5/2003 | Kaghazian |
| 6,570,557 B1 | 5/2003 | Westerman et al. |
| 6,643,824 B1 | 11/2003 | Bates et al. |
| 6,664,989 B1 | 12/2003 | Snyder et al. |
| 6,664,991 B1 | 12/2003 | Chew et al. |
| 6,677,932 B1 | 1/2004 | Westerman |
| 6,690,387 B2 | 2/2004 | Zimmerman et al. |
| 6,731,315 B1 | 5/2004 | Ma et al. |
| 6,822,635 B2 | 11/2004 | Shahoian et al. |
| 6,850,220 B2 | 2/2005 | Sakaguchi |
| 6,888,536 B2 | 5/2005 | Westerman et al. |
| 6,891,551 B2 | 5/2005 | Keely et al. |
| 6,938,222 B2 | 8/2005 | Hullender et al. |
| 6,971,068 B2 | 11/2005 | Bates et al. |
| 7,015,894 B2 | 3/2006 | Morohoshi |
| 7,030,861 B1 | 4/2006 | Westerman et al. |
| 7,047,503 B1 | 5/2006 | Parrish et al. |
| 7,075,512 B1 | 7/2006 | Fabre et al. |
| 7,084,859 B1 | 8/2006 | Pryor |
| 7,088,344 B2 | 8/2006 | Maezawa et al. |
| 7,103,852 B2 | 9/2006 | Kairis, Jr. |
| 7,123,243 B2 | 10/2006 | Kawasaki et al. |
| 7,148,499 B2 | 12/2006 | Lapstun et al. |
| 7,184,064 B2 | 2/2007 | Zimmerman et al. |
| 7,213,214 B2 | 5/2007 | Baar et al. |
| 7,218,226 B2 | 5/2007 | Wehrenberg |
| 7,268,772 B2 | 9/2007 | Kawai et al. |
| 7,305,630 B2 | 12/2007 | Hullender et al. |
| 7,319,457 B2 | 1/2008 | Lin et al. |
| 7,408,538 B2 | 8/2008 | Hinckley et al. |
| 7,469,381 B2 | 12/2008 | Ording |
| 7,479,949 B2 | 1/2009 | Jobs et al. |
| 7,480,870 B2 | 1/2009 | Anzures et al. |
| 7,509,588 B2 | 3/2009 | Van Os et al. |
| 7,536,656 B2 | 5/2009 | Hullender et al. |
| 7,565,613 B2 | 7/2009 | Forney |
| 7,614,008 B2 | 11/2009 | Ording |
| 7,633,076 B2 | 12/2009 | Huppi et al. |

(56) References Cited

U.S. PATENT DOCUMENTS

| | | |
|---|---|---|
| 7,650,137 B2 | 1/2010 | Jobs et al. |
| 7,653,883 B2 | 1/2010 | Hotelling |
| 7,657,849 B2 | 2/2010 | Chaudhri et al. |
| 7,663,607 B2 | 2/2010 | Hotelling et al. |
| 7,665,028 B2 | 2/2010 | Cummins et al. |
| 7,683,888 B1 | 3/2010 | Kennedy |
| 7,683,889 B2 | 3/2010 | Rimas Ribikauskas et al. |
| 7,692,637 B2 | 4/2010 | Davis |
| 7,694,231 B2 | 4/2010 | Kocienda et al. |
| 7,705,830 B2 | 4/2010 | Westerman et al. |
| 7,743,348 B2 | 6/2010 | Robbins et al. |
| 7,760,187 B2 | 7/2010 | Kennedy |
| 7,760,925 B2 | 7/2010 | Sakurai et al. |
| 7,768,536 B2 | 8/2010 | Hyatt |
| 7,801,721 B2 | 9/2010 | Rosart et al. |
| 7,808,479 B1 | 10/2010 | Hotelling et al. |
| 7,812,826 B2 | 10/2010 | Ording et al. |
| 7,818,691 B2 | 10/2010 | Irvine |
| 7,856,605 B2 | 12/2010 | Ording et al. |
| 7,864,163 B2 | 1/2011 | Ording et al. |
| 7,889,212 B2 | 2/2011 | Schulz et al. |
| 7,900,145 B2 | 3/2011 | Blinnikka |
| 7,957,762 B2 | 6/2011 | Herz et al. |
| 7,957,955 B2 | 6/2011 | Christie et al. |
| 8,006,002 B2 | 8/2011 | Kalayjian et al. |
| 8,042,042 B2 | 10/2011 | Kim et al. |
| 8,074,172 B2 | 12/2011 | Kocienda et al. |
| 8,077,153 B2 | 12/2011 | Benko et al. |
| 8,130,205 B2 | 3/2012 | Forstall et al. |
| 8,201,109 B2 | 6/2012 | Van Os et al. |
| 8,223,134 B1 | 7/2012 | Forstall et al. |
| 8,239,784 B2 | 8/2012 | Hotelling et al. |
| 8,255,798 B2 | 8/2012 | Ording |
| 8,255,830 B2 | 8/2012 | Ording et al. |
| 8,352,877 B2 | 1/2013 | Beatty et al. |
| 8,368,665 B2 | 2/2013 | Forstall et al. |
| 8,370,736 B2 | 2/2013 | Ording et al. |
| 8,381,135 B2 | 2/2013 | Hotelling et al. |
| 8,400,417 B2 | 3/2013 | Kocienda et al. |
| 8,407,603 B2 | 3/2013 | Christie et al. |
| 8,416,205 B2 | 4/2013 | Rapp et al. |
| 8,427,445 B2 | 4/2013 | Kennedy et al. |
| 8,510,665 B2 | 8/2013 | Ording et al. |
| 8,564,544 B2 | 10/2013 | Jobs et al. |
| 8,584,050 B2 | 11/2013 | Ording et al. |
| 8,650,507 B2 | 2/2014 | Westerman et al. |
| 8,661,339 B2 | 2/2014 | Weeldreyer et al. |
| 8,661,362 B2 | 2/2014 | Kocienda et al. |
| 8,677,232 B2 | 3/2014 | Weeldreyer et al. |
| 8,689,132 B2 | 4/2014 | Lamiraux et al. |
| 8,719,695 B2 | 5/2014 | Smyth et al. |
| 8,756,534 B2 | 6/2014 | Ording et al. |
| 8,773,358 B2 | 7/2014 | Rubanovich et al. |
| 9,092,130 B2 | 7/2015 | Weeldreyer et al. |
| 9,207,855 B2 | 12/2015 | Kocienda et al. |
| 2001/0040587 A1 | 11/2001 | Scheck |
| 2002/0003469 A1 | 1/2002 | Gupta |
| 2002/0011993 A1 | 1/2002 | Lui et al. |
| 2002/0015024 A1 | 2/2002 | Westerman et al. |
| 2002/0030665 A1 | 3/2002 | Ano |
| 2002/0030699 A1 | 3/2002 | Van Ee |
| 2002/0036623 A1 | 3/2002 | Kano et al. |
| 2002/0039108 A1 | 4/2002 | Roy et al. |
| 2002/0059350 A1 | 5/2002 | Iwema et al. |
| 2002/0067346 A1 | 6/2002 | Mouton |
| 2002/0069220 A1 | 6/2002 | Tran |
| 2002/0080123 A1 | 6/2002 | Kennedy et al. |
| 2002/0080151 A1 | 6/2002 | Venolia |
| 2002/0097270 A1 | 7/2002 | Keely et al. |
| 2002/0111990 A1 | 8/2002 | Wood et al. |
| 2002/0112180 A1 | 8/2002 | Land et al. |
| 2002/0175955 A1 | 11/2002 | Gourdol et al. |
| 2002/0180763 A1 | 12/2002 | Kung |
| 2003/0014382 A1 | 1/2003 | Iwamoto et al. |
| 2003/0043113 A1 | 3/2003 | Itoh |
| 2003/0063073 A1 | 4/2003 | Geaghan et al. |
| 2003/0137522 A1 | 7/2003 | Kaasila et al. |
| 2003/0154207 A1 | 8/2003 | Naito |
| 2004/0021676 A1 | 2/2004 | Chen et al. |
| 2004/0039934 A1 | 2/2004 | Land et al. |
| 2004/0075695 A1 | 4/2004 | Chew et al. |
| 2004/0130575 A1 | 7/2004 | Tai et al. |
| 2004/0135818 A1 | 7/2004 | Thomson et al. |
| 2004/0155888 A1 | 8/2004 | Padgitt et al. |
| 2004/0160419 A1 | 8/2004 | Padgitt |
| 2004/0174399 A1 | 9/2004 | Wu et al. |
| 2004/0183817 A1 | 9/2004 | Kaasila |
| 2004/0196267 A1 | 10/2004 | Kawai et al. |
| 2004/0196310 A1 | 10/2004 | Aamodt et al. |
| 2004/0203674 A1 | 10/2004 | Shi et al. |
| 2004/0237053 A1 | 11/2004 | Impas et al. |
| 2005/0005241 A1 | 1/2005 | Hunleth et al. |
| 2005/0012723 A1 | 1/2005 | Pallakoff |
| 2005/0024341 A1 | 2/2005 | Gillespie et al. |
| 2005/0052427 A1 | 3/2005 | Wu et al. |
| 2005/0052547 A1 | 3/2005 | Minakuti et al. |
| 2005/0068342 A1 | 3/2005 | Ouchi et al. |
| 2005/0076300 A1 | 4/2005 | Martinez |
| 2005/0093826 A1 | 5/2005 | Huh |
| 2005/0111736 A1 | 5/2005 | Hullender et al. |
| 2005/0135053 A1 | 6/2005 | Carroll |
| 2005/0140660 A1 | 6/2005 | Valikangas |
| 2005/0145807 A1 | 7/2005 | Lapstun et al. |
| 2005/0190059 A1 | 9/2005 | Wehrenberg |
| 2005/0190147 A1 | 9/2005 | Kim |
| 2005/0190970 A1 | 9/2005 | Griffin |
| 2005/0192924 A1 | 9/2005 | Drucker et al. |
| 2005/0198588 A1 | 9/2005 | Lin et al. |
| 2005/0229117 A1 | 10/2005 | Hullender et al. |
| 2005/0243373 A1 | 11/2005 | Silverbrook et al. |
| 2006/0001654 A1 | 1/2006 | Smits |
| 2006/0005151 A1 | 1/2006 | Altman |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033721 A1 | 2/2006 | Woolley et al. |
| 2006/0033724 A1 | 2/2006 | Chaudhri et al. |
| 2006/0038796 A1 | 2/2006 | Hinckley et al. |
| 2006/0041589 A1 | 2/2006 | Helfman et al. |
| 2006/0053387 A1 | 3/2006 | Ording |
| 2006/0066588 A1 | 3/2006 | Lyon et al. |
| 2006/0085757 A1 | 4/2006 | Andre et al. |
| 2006/0097991 A1 | 5/2006 | Hotelling et al. |
| 2006/0101354 A1 | 5/2006 | Hashimoto et al. |
| 2006/0125803 A1 | 6/2006 | Westerman et al. |
| 2006/0132456 A1 | 6/2006 | Anson |
| 2006/0132460 A1 | 6/2006 | Kolmykov-Zotov et al. |
| 2006/0161870 A1 | 7/2006 | Hotelling et al. |
| 2006/0161871 A1 | 7/2006 | Hotelling et al. |
| 2006/0190833 A1 | 8/2006 | SanGiovanni et al. |
| 2006/0197753 A1 | 9/2006 | Hotelling |
| 2006/0238519 A1 | 10/2006 | Westerman et al. |
| 2006/0242607 A1 | 10/2006 | Hudson |
| 2006/0244735 A1 | 11/2006 | Wilson |
| 2006/0265648 A1 | 11/2006 | Rainisto et al. |
| 2006/0265653 A1 | 11/2006 | Paasonen et al. |
| 2006/0274051 A1 | 12/2006 | Longe et al. |
| 2006/0277481 A1 | 12/2006 | Forstall et al. |
| 2006/0284858 A1 | 12/2006 | Rekimoto |
| 2006/0290678 A1 | 12/2006 | Lii |
| 2007/0015785 A1 | 1/2007 | Bender et al. |
| 2007/0033544 A1 | 2/2007 | Fleisher et al. |
| 2007/0055945 A1 | 3/2007 | Weber et al. |
| 2007/0109275 A1 | 5/2007 | Chuang |
| 2007/0109281 A1 | 5/2007 | Simmons et al. |
| 2007/0115264 A1 | 5/2007 | Yu et al. |
| 2007/0139374 A1 | 6/2007 | Harley |
| 2007/0150829 A1 | 6/2007 | Eschbach et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |

(56) References Cited

U.S. PATENT DOCUMENTS

| | | |
|---|---|---|
| 2007/0152984 A1 | 7/2007 | Ording et al. |
| 2007/0157085 A1 | 7/2007 | Peters |
| 2007/0186158 A1 | 8/2007 | Kim et al. |
| 2007/0198950 A1 | 8/2007 | Dodge et al. |
| 2007/0234235 A1 | 10/2007 | Scott |
| 2007/0238489 A1 | 10/2007 | Scott |
| 2007/0247435 A1 | 10/2007 | Benko et al. |
| 2007/0250793 A1 | 10/2007 | Miura et al. |
| 2007/0252821 A1 | 11/2007 | Hollemans et al. |
| 2007/0257890 A1 | 11/2007 | Hotelling et al. |
| 2007/0260981 A1 | 11/2007 | Kim et al. |
| 2007/0268317 A1 | 11/2007 | Banay |
| 2008/0002888 A1 | 1/2008 | Yuan |
| 2008/0036743 A1 | 2/2008 | Westerman et al. |
| 2008/0042984 A1 | 2/2008 | Lim et al. |
| 2008/0055269 A1 | 3/2008 | Lemay et al. |
| 2008/0055273 A1 | 3/2008 | Forstall |
| 2008/0062202 A1 | 3/2008 | Schulz et al. |
| 2008/0077880 A1 | 3/2008 | Oygard |
| 2008/0082317 A1 | 4/2008 | Rosart et al. |
| 2008/0094368 A1 | 4/2008 | Ording et al. |
| 2008/0098331 A1 | 4/2008 | Novick et al. |
| 2008/0122796 A1 | 5/2008 | Jobs et al. |
| 2008/0126387 A1 | 5/2008 | Blinnikka |
| 2008/0165141 A1 | 7/2008 | Christie |
| 2008/0165142 A1 | 7/2008 | Kocienda et al. |
| 2008/0165143 A1 | 7/2008 | Tolmasky et al. |
| 2008/0165148 A1 | 7/2008 | Williamson et al. |
| 2008/0165160 A1 | 7/2008 | Kocienda et al. |
| 2008/0167834 A1 | 7/2008 | Herz et al. |
| 2008/0168349 A1 | 7/2008 | Lamiraux et al. |
| 2008/0168388 A1 | 7/2008 | Decker |
| 2008/0174570 A1 | 7/2008 | Jobs et al. |
| 2008/0180408 A1 | 7/2008 | Forstall et al. |
| 2008/0184138 A1 | 7/2008 | Krzanowski et al. |
| 2008/0201452 A1 | 8/2008 | Athas et al. |
| 2008/0252662 A1 | 10/2008 | Hyatt |
| 2008/0259040 A1 | 10/2008 | Ording et al. |
| 2008/0270891 A1 | 10/2008 | Friedman et al. |
| 2008/0294974 A1 | 11/2008 | Nurmi et al. |
| 2008/0316183 A1 | 12/2008 | Westerman et al. |
| 2008/0316212 A1 | 12/2008 | Kushler |
| 2008/0320391 A1 | 12/2008 | Lemay et al. |
| 2009/0002326 A1 | 1/2009 | Pihlaja |
| 2009/0005011 A1 | 1/2009 | Christie et al. |
| 2009/0006991 A1 | 1/2009 | Lindberg et al. |
| 2009/0015596 A1 | 1/2009 | Fuchs et al. |
| 2009/0044124 A1 | 2/2009 | Pihlaja |
| 2009/0048000 A1 | 2/2009 | Ade-Hall |
| 2009/0070704 A1 | 3/2009 | Ording |
| 2009/0073194 A1 | 3/2009 | Ording |
| 2009/0077488 A1 | 3/2009 | Ording |
| 2009/0089707 A1 | 4/2009 | Knowles |
| 2009/0093276 A1 | 4/2009 | Kim et al. |
| 2009/0109182 A1 | 4/2009 | Fyke et al. |
| 2009/0125848 A1 | 5/2009 | Keohane et al. |
| 2009/0138810 A1 | 5/2009 | Howard et al. |
| 2009/0153492 A1 | 6/2009 | Popp |
| 2009/0167700 A1 | 7/2009 | Westerman et al. |
| 2009/0177981 A1 | 7/2009 | Christie et al. |
| 2009/0178008 A1 | 7/2009 | Herz et al. |
| 2009/0225100 A1 | 9/2009 | Lee et al. |
| 2009/0228792 A1 | 9/2009 | Van Os et al. |
| 2009/0228828 A1 | 9/2009 | Beatty et al. |
| 2009/0228841 A1 | 9/2009 | Hildreth |
| 2009/0228842 A1 | 9/2009 | Westerman et al. |
| 2009/0235186 A1 | 9/2009 | Howard et al. |
| 2009/0292989 A1 | 11/2009 | Matthews et al. |
| 2009/0319888 A1 | 12/2009 | Oygard |
| 2010/0011310 A1 | 1/2010 | Rainisto et al. |
| 2010/0042933 A1 | 2/2010 | Ragusa |
| 2010/0123737 A1 | 5/2010 | Williamson et al. |
| 2010/0169766 A1 | 7/2010 | Duarte et al. |
| 2010/0174732 A1 | 7/2010 | Levy et al. |
| 2010/0174979 A1 | 7/2010 | Mansfield et al. |
| 2010/0174980 A1 | 7/2010 | Mansfield et al. |
| 2010/0174985 A1 | 7/2010 | Levy et al. |
| 2010/0185975 A1 | 7/2010 | Anwar |
| 2010/0202010 A1 | 8/2010 | Xiao |
| 2010/0231529 A1 | 9/2010 | Tikka |
| 2010/0235726 A1 | 9/2010 | Ording et al. |
| 2010/0235734 A1 | 9/2010 | Ording et al. |
| 2010/0235778 A1 | 9/2010 | Kocienda et al. |
| 2010/0235783 A1 | 9/2010 | Ording et al. |
| 2010/0235784 A1 | 9/2010 | Ording et al. |
| 2010/0235793 A1 | 9/2010 | Ording et al. |
| 2010/0274674 A1 | 10/2010 | Roberts et al. |
| 2010/0283743 A1 | 11/2010 | Coddington |
| 2011/0007094 A1 | 1/2011 | Nash et al. |
| 2011/0074698 A1 | 3/2011 | Rapp et al. |
| 2011/0074699 A1 | 3/2011 | Marr et al. |
| 2011/0078597 A1 | 3/2011 | Rapp et al. |
| 2011/0258537 A1 | 10/2011 | Rives et al. |
| 2011/0258563 A1 | 10/2011 | Lincke |
| 2011/0267355 A1 | 11/2011 | Coombes et al. |
| 2011/0292084 A1 | 12/2011 | Thomas |
| 2012/0162119 A1 | 6/2012 | Forstall et al. |
| 2012/0216139 A1 | 8/2012 | Ording et al. |
| 2012/0254795 A1 | 10/2012 | Van Os et al. |
| 2012/0274597 A1 | 11/2012 | Forstall et al. |
| 2013/0055150 A1 | 2/2013 | Galor |
| 2013/0145310 A1 | 6/2013 | Forstall et al. |
| 2013/0152013 A1 | 6/2013 | Forstall et al. |
| 2013/0174081 A1 | 7/2013 | Yoon et al. |
| 2013/0241827 A1 | 9/2013 | Ronkainen et al. |
| 2014/0125609 A1 | 5/2014 | Kocienda et al. |
| 2014/0139431 A1 | 5/2014 | Tseng et al. |
| 2014/0317549 A1 | 10/2014 | Hwang et al. |
| 2014/0327629 A1 | 11/2014 | Jobs et al. |
| 2015/0149955 A1 | 5/2015 | Kocienda |
| 2016/0132224 A1 | 5/2016 | Weeldreyer et al. |

FOREIGN PATENT DOCUMENTS

| | | |
|---|---|---|
| CN | 1293807 A | 5/2001 |
| CN | 1328280 A | 12/2001 |
| CN | 101063920 A | 10/2007 |
| CN | 101068411 A | 11/2007 |
| CN | 101419526 A | 4/2009 |
| DE | 10127356 A1 | 12/2001 |
| EP | 283995 A2 | 9/1988 |
| EP | 476972 A2 | 3/1992 |
| EP | 575146 A2 | 12/1993 |
| EP | 609030 A1 | 8/1994 |
| EP | 651543 A2 | 5/1995 |
| EP | 667567 A2 | 8/1995 |
| EP | 795811 A1 | 9/1997 |
| EP | 917038 A2 | 5/1999 |
| EP | 1067507 A1 | 1/2001 |
| EP | 1025489 B1 | 6/2004 |
| EP | 1674976 A2 | 6/2006 |
| EP | 1850217 A2 | 10/2007 |
| EP | 1855185 A2 | 11/2007 |
| EP | 1918802 A1 | 5/2008 |
| EP | 2053497 A1 | 4/2009 |
| EP | 2138929 A2 | 12/2009 |
| EP | 2144149 A2 | 1/2010 |
| FR | 2898197 A1 | 9/2007 |
| GB | 2351639 A | 1/2001 |
| GB | 2433402 A | 6/2007 |
| JP | 5741731 A | 3/1982 |
| JP | 5957336 A | 4/1984 |
| JP | 2153415 A | 6/1990 |
| JP | 3113578 A | 5/1991 |
| JP | 4-47358 A | 2/1992 |
| JP | 5-165459 A | 7/1993 |
| JP | 5-189149 A | 7/1993 |
| JP | 6-274586 A | 9/1994 |
| JP | 6-282400 A | 10/1994 |
| JP | 6-332617 A | 12/1994 |
| JP | 7-320051 A | 12/1995 |
| JP | 7-320079 A | 12/1995 |
| JP | 8-185265 A | 7/1996 |
| JP | 8-227341 A | 9/1996 |

(56) References Cited

FOREIGN PATENT DOCUMENTS

| | | | |
|---|---|---|---|
| JP | 9-152955 | A | 6/1997 |
| JP | 10-91382 | A | 4/1998 |
| JP | 10-340075 | A | 12/1998 |
| JP | 11-53116 | A | 2/1999 |
| JP | 2000-163031 | A | 6/2000 |
| JP | 2000-200277 | A | 7/2000 |
| JP | 2001-350587 | A | 12/2001 |
| JP | 2002-508543 | A | 3/2002 |
| JP | 2002-171328 | A | 6/2002 |
| JP | 2002-342033 | A | 11/2002 |
| JP | 2003-241879 | A | 8/2003 |
| JP | 2004-152217 | A | 5/2004 |
| JP | 2005-507102 | A | 3/2005 |
| JP | 2005-257819 | A | 9/2005 |
| JP | 2007-072233 | A | 3/2007 |
| JP | 2007-299394 | A | 11/2007 |
| JP | 2007-300379 | A | 11/2007 |
| JP | 2007-324694 | A | 12/2007 |
| JP | 2008-243221 | A | 10/2008 |
| JP | 2009-169452 | A | 7/2009 |
| JP | 2010-146279 | A | 7/2010 |
| JP | 2010-530109 | A | 9/2010 |
| KR | 10-2006-0118811 | A | 11/2006 |
| KR | 10-0754731 | B1 | 9/2007 |
| KR | 10-2007-0107462 | A | 11/2007 |
| KR | 10-2010-0001017 | A | 1/2010 |
| KR | 10-2010-0039253 | A | 4/2010 |
| WO | 94/29788 | A1 | 12/1994 |
| WO | 98/09270 | A1 | 3/1998 |
| WO | 98/52118 | A1 | 11/1998 |
| WO | 99/21084 | A1 | 4/1999 |
| WO | 99/49383 | A1 | 9/1999 |
| WO | 99/54807 | A1 | 10/1999 |
| WO | 00/75766 | A1 | 12/2000 |
| WO | 01/46790 | A2 | 6/2001 |
| WO | 02/088979 | A1 | 11/2002 |
| WO | 02/101567 | A2 | 12/2002 |
| WO | 03/023593 | A1 | 3/2003 |
| WO | 2004/031933 | A1 | 4/2004 |
| WO | 2004/051392 | A2 | 6/2004 |
| WO | 2004/051430 | A2 | 6/2004 |
| WO | 2004/070604 | A2 | 8/2004 |
| WO | 2006/003591 | A2 | 1/2006 |
| WO | 2006/020304 | A2 | 2/2006 |
| WO | 2006/020305 | A2 | 2/2006 |
| WO | 2006/036607 | A1 | 4/2006 |
| WO | 2006/126055 | A2 | 11/2006 |
| WO | 2007/037806 | A1 | 4/2007 |
| WO | 2008/013658 | A2 | 1/2008 |
| WO | 2008/030879 | A2 | 3/2008 |
| WO | 2008/030976 | A2 | 3/2008 |
| WO | 2008/052100 | A2 | 5/2008 |
| WO | 2009/022243 | A1 | 2/2009 |
| WO | 2009/085779 | A1 | 7/2009 |
| WO | 2009/111249 | A2 | 9/2009 |

OTHER PUBLICATIONS

Final Office Action received for U.S. Appl. No. 12/565,757 dated Jun. 7, 2018, 17 pages.
Notice of Allowance received for Korean Patent Application No. 10-2017-7011291, dated Jun. 1, 2018, 4 pages (1 page of English Translation and 3 pages of Official copy).
Office Action received for Canadian Patent Application No. 2,927,608, dated Feb. 22, 2018, 5 pages.
Office Action received for Korean Patent Application No. 10-2017-7011291, dated Feb. 20, 2018, 8 pages (3 pages of English Translation and 5 pages of Official Copy).
Decision to Refuse received for European Patent Application No. 10712823.3, dated Aug. 13, 2019, 30 pages.
Notice of Allowance received for Korean Patent Application No. 10-2018-7025545, dated Aug. 20, 2019, 5 pages (2 pages of English Translation and 3 pages of Official Copy).
Notice of Allowance received for Japanese Patent Application No. 2016-217409, dated Apr. 13, 2018, 4 pages (1 page of English Translation and 3 pages of Official copy).
Office Action received for Korean Patent Application No. 10-2018-7025545, dated Jul. 11, 2019, 6 pages (3 pages of English Translation and 3 pages of Official Copy).
Decision to Grant received for European Patent Application No. 12154861.4, dated Jun. 14, 2019, 2 pages.
Summons to Attend Oral Proceedings received for European Patent Application No. 10712823.3, mailed on Jun. 7, 2019, 11 pages.
Ahlberg, et al., "The Alphaslider: A Compact and Rapid Selector", CHI '94 Proceedings of the SIGCHI Conference on Human Factors in Computing Systems, Apr. 24-28, 1994, pp. 365-371.
Ahlberg, et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlstrom, et al., "Overcoming Touchscreen User Fatigue by Workplace Design", CHI '92 Posters and Short Talks of the 1992 SIGCHI Conference on Human Factors in Computing Systems, 1992, pp. 101-102.
Anonymous, "Ai Squared Products—ZoomText Magnifier", Available online at <http://www.aisquared.com/Products/zoomtextmag/index.cfm>, Oct. 26, 2005, 4 pages.
Anonymous, "Ai Squared Products", Available online at <http://www.aisquared.com/Products/index.cfm>, Oct. 25, 2005, 2 pages.
Anonymous, "Lunar Screen Magnifier and Lunar Plus Enhanced Screen Magnifier", Available online at <http://www.dolphincomputeraccess.com/products/lunar.htm>, Oct. 25, 2005, 6 pages.
Anonymous, "Visual Disabilities", available online at <http://depts.stcc.edu/ods/ACCESS/bpvisual.htm>, Oct. 25, 2005, 3 pages.
*Apple Inc.* vs. *Samsung Electronics Co. Ltd.*, "Judgment in Interlocutory proceeding, Case No. 396957/KG ZA 11-730, civil law sector", Aug. 24, 2011, pp. 1-65.
*Apple Inc.* vs. *Samsung Electronics Co. Ltd.*, "Samsung's Motion to Supplement Invalidity Contentions, Case No. 11-cv-01846-LHK, filed Jan. 27, 2012 together with Exhibit 6", Jan. 27, 2012; 47 pages.
*Apple Inc.* vs. *Samsung Electronics Co. Ltd.*, "Samsung's Patent Local Rule 3-3 and 3-4 Disclosures, Case No. 11-cv-01846-LHK, dated Oct. 7, 2011, together with Exhibits G-1 through G-7 and Exhibit H", Oct. 7, 2011, 287 pages.
apple.com, "Keyboards", Catamount Software, http://www.apple.com/webapps/utilities/keyboards.html, Oct. 23, 2007, 1 page.
apple.com, "Quasi Clipboard", Apple Web Apps, Available at: http://www.apple.com/webapps/utilities/quasiclipboard.html, Jan. 7, 2008, 1 page.
Baeza-Yates, Ricardo, "Visualization of Large Answers in Text Databases", AVI '96 Proceedings of the Workshop on Advanced Visual Interfaces, 1996, pp. 101-107.
Barthel, B., "Information Access for Visually Impaired Persons: Do We Still Keep a "Document" in "Documentation"?", Professional Communication Conference, Sep. 1995, pp. 62-66.
Bederson, et al., "Pad++: A Zooming Graphical Interface for Exploring Alternate Interface Physics", UIST' 94 Proceedings of the 7th Annual ACM symposium on User Interface Software and Technology, Nov. 2-4, 1994, pp. 17-26.
Bederson, et al., "The Craft of Information Visualization", Elsevier Science, Inc., 2003, 435 pages.
Benel, et al., "Optimal Size and Spacing of Touchscreen Input Areas", Human-Computer Interaction—Interact, 1987, pp. 581-585.
Beringer, et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei, et al., "Graphical I/O Devices for Medical Users", 14th Annual International Conference of the IEEE on Engineering in Medicine and Biology Society, vol. 3, 1992, pp. 834-836.

(56) References Cited

OTHER PUBLICATIONS

Bier, et al., "Toolglass and Magic Lenses: The See-Through Interface", Computer Graphics (SIGGRAPH '93 Proceedings), vol. 27, Aug. 1993, pp. 73-80.
Bitstream®, "ThunderHawk Pocket PC Edition for End Users", Available at <http://www.bitstream.com/wireless/products/pocketpc/faq_using.html>, retrieved on Jun. 12, 2006, 2006, 4 pages.
Brighthand, "Thread: Cut, Copy & Paste", Available online at <http://forum.brighthand.com/showthread.php?t=82701>, Jan. 13, 2005, 2 pages.
Brighthand, "Thread: How do I cut & paste, & copy on a PDA", Brighthand.com, Available at: http://forum.brighthand.com/showthread.php?s=2d32c96c9aaedaa45e3d05962503046&t=77588, Sep. 19, 2004, 2 pages.
Brown, et al., "Browsing Graphs Using a Fisheye View", CHI '93 Proceedings of the Interact '93 and CHI '93 Conference on Human Factors in Computing Systems, 1993, p. 516.
Burger, D., "Improved Access to Computers for the Visually Handicapped: New Prospects and Principles", IEEE Transactions on Rehabilitation Engineering, vol. 2, No. 3, Sep. 1994, pp. 111-118.
Card, et al., "Readings in Information Visualization Using Vision to Think", Interactive Technologies, Morgan Kaufman Publishers, Inc., 1999, 712 pages.
Carpendale, et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale, et al., "Extending Distortion Viewing from 2D to 3D", IEEE Computer Graphics and Applications, Simon Fraser University, Jul./Aug. 1997, pp. 42-51.
Carpendale, et al., "Making Distortions Comprehensible", IEEE Proceedings of Symposium on Visual Languages, 1997, 10 pages.
Certificate of Grant received for Hong Kong Patent Application No. 11103495.1, dated Jun. 8, 2012, 2 pages.
Chen, et al., "Detecting Web Pages Structure for Adaptive Viewing on Small Form Factor Devices", Proceedings of the 12th international conference on World Wide Web, 2003, 9 pages.
Chris, Fleck, "iPhone Cut & Paste with(in) Citrix XenApp", 1:31 minute video available at <http://www.youtube.com/watch?v=NJDnQ4DAY3s>, uploaded on Jan. 6, 2009, 1 page.
Corrected Notice of Allowance received for U.S. Appl. No. 12/565,755, dated Nov. 15, 2017, 2 pages.
Decision to Grant received for Chinese Patent Application No. 200780046864.5, dated May 15, 2012, 4 pages.
Decision to Grant received for Chinese Patent Application No. 200880129021.6, dated Apr. 12, 2013, 4 pages.
Decision to Grant received for Chinese Patent Application No. 200910118597.9, dated Jun. 5, 2012, 1 page.
Decision to Grant received for European Patent Application No. 08873123.7, dated Dec. 30, 2011, 2 pages.
Decision to Grant received for European Patent Application No. 08873123.7, dated Sep. 13, 2011, 5 pages.
Decision to Grant received for European Patent Application No. 11192108.6, dated May 27, 2016, 2 pages.
Decision to Refuse received for European Patent Application No. 09154312.4, dated Dec. 6, 2016, 13 pages.
Degani, et al., "'Soft' Controls for Hard Displays: Still a Challenge", Proceedings of the 36th Annual Meeting of the Human Factors Society, 1992, pp. 52-56.
Eslambolchilar, et al., "Making Sense of Fisheye Views", Second Dynamics and Interaction Workshop at University of Glasgow, Aug. 2005, 6 pages.
Extended European Search Report received for European Patent Application No. 11192108.6, dated May 9, 2012, 6 pages.
Extended European Search Report (includes Partial European Search Report and European Search Opinion) received for European Patent Application No. 09154312.4, dated Aug. 20, 2009, 10 pages.
Extended European Search Report (includes Partial European Search Report and European Search Opinion) received for European Patent Application No. 11186455.9, dated Mar. 6, 2012, 6 pages.
Extended European Search Report (includes Partial European Search Report and European Search Opinion) received for European Patent Application No. 12154861.4, dated Jun. 2, 2015, 10 pages.
Extended European Search Report received for European Patent Application No. 16170727.8, dated Sep. 7, 2016, 14 pages.
Final Office Action received for U.S. Appl. No. 12/565,754, dated May 22, 2014, 9 pages.
Final Office Action received for U.S. Appl. No. 10/927,925, dated Dec. 20, 2007, 26 pages.
Final Office Action received for U.S. Appl. No. 10/927,925, dated Nov. 10, 2008, 22 pages.
Final Office Action received for U.S. Appl. No. 10/927,925, dated Nov. 17, 2009, 19 pages.
Final Office Action received for U.S. Appl. No. 11/923,453, dated Oct. 31, 2011, 12 pages.
Final Office Action received for U.S. Appl. No. 12/042,313, dated Apr. 18, 2013, 8 pages.
Final Office Action received for U.S. Appl. No. 12/042,313, dated Aug. 31, 2011, 10 pages.
Final Office Action received for U.S. Appl. No. 12/242,852, dated Sep. 21, 2011, 6 pages.
Final Office Action received for U.S. Appl. No. 12/565,750, dated Mar. 26, 2012, 12 pages.
Final Office Action received for U.S. Appl. No. 12/565,751, dated Jun. 22, 2012, 18 pages.
Final Office Action received for U.S. Appl. No. 12/565,753, dated Aug. 15, 2012, 11 pages.
Final Office Action received for U.S. Appl. No. 12/565,754, dated Dec. 20, 2012, 19 pages.
Final Office Action received for U.S. Appl. No. 12/565,755, dated Jan. 3, 2013, 13 pages.
Final Office Action received for U.S. Appl. No. 12/565,757, dated Aug. 15, 2012, 10 pages.
Final Office Action received for U.S. Appl. No. 12/565,757, dated Apr. 18, 2014, 11 pages.
Final Office Action received for U.S. Appl. No. 12/565,757, dated Mar. 26, 2015, 12 pages.
Final Office Action received for U.S. Appl. No. 12/820,974, dated Sep. 1, 2011, Sep. 1, 2011, 25 pages.
Final Office Action received for U.S. Appl. No. 12/964,679, dated Aug. 20, 2015, 8 pages.
Final Office Action received for U.S. Appl. No. 13/243,202, dated Jul. 17, 2013, 13 pages.
Final Office Action received for U.S. Appl. No. 13/243,582, dated Jul. 5, 2013, 12 pages.
Final Office Action received for U.S. Appl. No. 13/493,955, dated Aug. 20, 2015, 27 pages.
Final Office Action received for U.S. Appl. No. 14/056,263, dated Sep. 30, 2014, 11 pages.
Final Office Action received for U.S. Appl. No. 11/553,436, dated Jun. 28, 2010, 10 pages.
Final Office Action received for U.S. Appl. No. 11/553,436, dated May 13, 2009, 17 pages.
Furnas, et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, Apr. 1986, pp. 16-23.
Furnas, George W., "The Fisheye Calendar System", Bellcore Technical Memorandum, Nov. 19, 1991, pp. 1-9.
Greenberg, Saul, "A Fisheye Text Editor for Relaxed-WYSIWIS Groupware", CHI '96 Companion, Vancouver, Canada, Apr. 13-18, 1996, 2 pages.
Hartson, et al., "Advances in Human-Computer Interaction", Chapters 1, 5, and 6, vol. 3, 1992, 121 pages.
Hinckley, et al., "A Survey of Design Issues in Spatial Input", UIST '94 Proceedings of the 7th Annual ACM Symposium on User Interface Software and Technology, 1994, 10 pages.

(56) References Cited

OTHER PUBLICATIONS

Holman, et al., "PaperWindows:Interaction Techniques for Digital Paper", Papers: Physical Interaction, CHI-2005, Apr. 2-7, 2005, 9 pages.
HTC Europe Co. Ltd and Apple Inc. invalidity Claim dated Jul. 29, 2011, together with amended Particulars of Claim and amended Grounds of invalidity, Jul. 29, 2011, 22 pages.
HTC Europe Co. Ltd and Apple Inc. Invalidity Claim No. HC 12 C 01465, together with annexes, dated Apr. 5, 2012, Apr. 5, 2012, 12 pages.
IBM Corporation, "Simon Says Here's How", User's Manual, 1994, 3 pages.
Intention to Grant received for European Patent Application No. 11186455.9, dated Nov. 25, 2016, 14 pages.
Intention to Grant received for European Patent Application No. 11192108.6, dated Jan. 5, 2016, 6 pages.
International Preliminary Report on Patentability received for PCT Patent Application No. PCT/US2007/082486, dated Apr. 28, 2009, 7 pages.
International Preliminary Report on Patentability received for PCT Patent Application No. PCT/US2008/086542, dated Sep. 7, 2010, 9 pages.
International Preliminary Report on Patentability received for PCT Patent Application No. PCT/US2009/035177, dated Sep. 7, 2010, 11 pages.
International Preliminary Report on Patentability received for PCT Patent Application No. PCT/US2010/026947, dated Sep. 29, 2011, 11 pages.
International Preliminary Report on Patentability received for PCT Patent Application No. PCT/US2012/040291, dated Dec. 12, 2013, 19 pages.
International Search Report and Written Opinion received for PCT Patent Application No. PCT/US08/087045, dated Feb. 27, 2009, 13 pages.
International Search Report and Written Opinion received for PCT Patent Application No. PCT/US2007/077645, dated Jan. 10, 2008, 7 pages.
International Search Report and Written Opinion received for PCT Patent Application No. PCT/US2007/082486, dated Jul. 18, 2008, 8 pages.
International Search Report and Written Opinion received for PCT Patent Application No. PCT/US2008/086542, dated Nov. 12, 2009, 11 pages.
International Search Report and Written Opinion received for PCT Patent Application No. PCT/US2009/035177, dated Sep. 10, 2009, 16 pages.
International Search Report and Written Opinion received for PCT Patent Application No. PCT/US2010/026947, dated Jun. 22, 2011, 15 pages.
International Search Report and Written Opinion received for PCT Patent Application No. PCT/US2010/060113, dated May 2, 2011, 13 pages.
International Search Report and Written Opinion received for PCT Patent Application No. PCT/US2012/040291, dated Jan. 17, 2013, 27 pages.
Invitation to Pay Additional Fees received for PCT Patent Application No. PCT/US2012/040291, dated Aug. 30, 2012, 7 pages.
Invitation to Pay Additional Fees received for PCT Patent Application No. PCT/US2009/035177, dated Jun. 9, 2009, 6 pages.
IPhone Hacks, "iCopy Brings Copy & Paste Feature to the iPhone", Available at: http://www.iphonehacks.com/2008/03/iphone-icopy.html, 2008, 3 pages.
Phone Hacks, "iPhone App—MagicPad's Copy & Paste Feature", Available at: http://www.iphonehacks.com/2008/07/iphonecopypaste.html, 2008, 2 pages.
Johnson, Jeff A., "A Comparison of User Interfaces for Panning on a Touch-Controlled Display", CHI '95 Proceedings, Mosaic of Creativity, May 7-11, 1995, pp. 218-225.

Jordan, M., "Quick look in Leopard", Mac Tips, Available online at: <http://www.mactips.info/2007/11/quick-look-in-leopard>, retrieved on Nov. 7, 2007, 6 pages.
Kamba, et al., "Using Small Screen Space More Efficiently", CHI '96 Proceedings of the SIGCHI Conference on Human Factors in Computing Systems, Apr. 13-18, 1996, pp. 383-390.
Keahey, et al., "Non-Linear Image Magnification", Technical Report TR460, Apr. 24, 1996, pp. 1-11.
Keahey, et al., "Nonlinear Magnification Fields", Proceedings of the 1997 IEEE Symposium on Information Visualization, 1997, pp. 1-12.
Keahey, et al., "Techniques for Non-Linear Magnification Transformations", IEEE Proceedings of Symposium on Information Visualization, Oct. 1996, pp. 38-45.
Keahey, et al., "Viewing Text With Non-Linear Magnification: An Experimental Study", Department of Computer Science, Indiana University, Apr. 24, 1996, pp. 1-9.
Kline, et al., "Improving GUI Accessibility for People with Low Vision", CHI '95 Proceedings of the SIGCHI Conference on Human Factors in Computing Systems, May 7-11, 1995, pp. 114-121.
Kline, et al., "UnWindows 1.0: X Windows Tools for Low Vision Users", ACM SIGCAPH Computers and the Physically Handicapped, No. 49, Mar. 1994, pp. 1-5.
Kottke, et al., "New iPhone Features", available at <http://web.archive.org/web/20070705203857/http://www.kottke.org/07/07/new-iphone-features>, Jul. 1, 2007, 19 pages.
Lamping, et al., "Laying Out and Visualizing Large Trees Using a Hyperbolic Space", Proceedings of the ACM Symposium on User Interface Software and Technology, Nov. 1994, pp. 13-14.
Lazzaro, Joseph J., "Adapting Desktop Computers to Meet the Needs of Disabled Workers is Easier Than You Might Think", Computers for the Disabled, Byte Magazine, Jun. 1993, pp. 1-4.
Leahy, et al., "Effect of Touch Screen Target Location on User Accuracy", Proceedings of the Human Factors Society 34th Annual Meeting, 1990, pp. 370-374.
Lee, et al., "A Multi-Touch Three Dimensional Touch-Sensitive Tablet", CHI '85 Proceedings of the SIGCHI Conference on Human Factors in Computing Systems, Apr. 1985, pp. 21-25.
Leganchuk, et al., "Manual and Cognitive Benefits of Two-Handed Input: An Experimental Study", Transactions on Human-Computer Interaction, vol. 5, No. 4, Dec. 1998, 45 pages.
Lemmons, et al., "Hewlett-Packard Makes Some Magic", Product Review, Byte Publications Inc., Oct. 1983, 15 pages.
Leung, et al., "A Review and Taxonomy of Distortion-Oriented Presentation Techniques", ACM Transactions on Computer-Human Interaction (TOCHI), vol. 1, No. 2, Jun. 1994, pp. 126-160.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 15-16.
Lonelysandwich, "iPhone Copy and Paste", Available at <http://www.vimeo.com/266383>, Retrieved on Sep. 8, 2017, pp. 1-6.
Lonelysandwich, "iPhone Copy/Paste Proof of Concept Video", Available at: http://babygotmac.com/a/iphone-copypaste-proof-of-concept-video/, Jan. 28, 2008, 1 page.
MacKenzie, et al., "Alphanumeric Entry on Pen-Based Computers", International Journal of Human-Computer Studies, vol. 41, 1994, pp. 775-792.
MacKenzie, I. S., "Input Devices and Interaction Techniques for Advanced Computing", W. Barfield, & T.A. Furness III (Eds.), Virtual environments and advanced interface design, Oxford University Press, 1995, 24 pages.
MacKinlay, et al., "The Perspective Wall: Detail and Context Smoothly Integrated", ACM, 1991, pp. 173-179.
Macrumors Forums, "How Would You Like Selection/Copy/Paste to Work?", available at <http://forums.macrumors.com/showthread.php?p=3932833#post3932833>, Jul. 17, 2007, 13 pages.
Mad Max, "Copy/Cut and Paste for iPhone", available at <http://www.youtube.com/watch?v=3-3ZmJL5BCg>, 3:19 minute video uploaded on Aug. 20, 2008, 1 page.

(56) References Cited

OTHER PUBLICATIONS

Microsoft, "Touch", available at <http://msdn.microsoft.com/en-us/library/windows/desktop/dn742468.aspx>, retrieved on Aug. 22, 2014, 11 pages.
Miller, Dana, "PersonalJava Application Environment", available at <http://java.sun.com/products/personaljava/touchable/>, Jun. 8, 1999, 12 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-362.
Mitchell, Robert, "GUI Gets a Makeover", Available at: http://www.computerworld.com/action/article.do?command=printArticleBasic&articleId=263695, Sep. 25, 2006, 7 pages.
Mobileinfocenter, "Copy and Paste on a Palm Pre", available at <http://www.youtube.com/watch?v=luMEMEBiL_g>, 1:13 minute video uploaded on Jan. 9, 2009, 2 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
NCIP Staff, "Magnification Technology", available at <http://www2.edc.org/ncip/library/vi/magnifi.htm>, 1994, 6 pages.
NIKKEI PC 21, "Feature 2, Troublesome Work One Shot Execution! Ready-to-Use One Line Text Macro: Re-Use a Text of Web Site", NIKKEI Business Publication, Inc., vol. 13, No. 3, Feb. 1, 2008, pp. 66-67.
Noik, Emanuel G., "Layout-Independent Fisheye Views of Nested Graphs", IEEE Proceedings of Symposium on Visual Languages, 1993, 6 pages.
Non-Final Office Action received for U.S. Appl. No. 12/565,754, dated Dec. 27, 2013, 21 pages.
Non-Final Office Action received for U.S. Appl. No. 12/964,679, dated Jul. 3, 2014, 15 pages.
Non-Final Office Action received for U.S. Appl. No. 13/243,202, dated May 1, 2014, 11 pages.
Non-Final Office Action received for U.S. Appl. No. 14/613,031, dated Dec. 27, 2016, 14 pages.
Non-Final Office Action received for U.S. Appl. No. 10/927,925, dated Apr. 16, 2009, 14 pages.
Non-Final Office Action received for U.S. Appl. No. 10/927,925, dated May 5, 2008, 23 pages.
Non-Final Office Action received for U.S. Appl. No. 11/553,436, dated Oct. 30, 2008, 16 pages.
Non-Final Office Action received for U.S. Appl. No. 11/553,436, dated Oct. 30, 2009, 12 pages.
Non-Final Office Action received for U.S. Appl. No. 11/923,453, dated Feb. 9, 2011, 11 pages.
Non-Final Office Action received for U.S. Appl. No. 12/042,313, dated Sep. 27, 2012, 11 pages.
Non-Final Office Action received for U.S. Appl. No. 12/565,751, dated Mar. 1, 2012, 18 pages.
Non-Final Office Action received for U.S. Appl. No. 12/565,752, dated Jan. 27, 2012, 15 pages.
Non-Final Office Action received for U.S. Appl. No. 12/565,753, dated Mar. 13, 2012, 13 pages.
Non-Final Office Action received for U.S. Appl. No. 12/565,753, dated Aug. 5, 2013, 7 pages.
Non-Final Office Action received for U.S. Appl. No. 12/565,754, dated Jun. 12, 2012, 23 pages.
Non-Final Office Action received for U.S. Appl. No. 12/565,755, dated Jul. 26, 2012, 13 pages.
Non-Final Office Action received for U.S. Appl. No. 12/565,756, dated Feb. 2, 2012, 13 pages.
Non-Final Office Action received for U.S. Appl. No. 12/565,757, dated Mar. 2, 2012, 13 pages.
Non-Final Office Action received for U.S. Appl. No. 12/565,757, dated Dec. 20, 2013, 9 pages.
Non-Final Office Action received for U.S. Appl. No. 12/565,759, dated Aug. 2, 2012, 10 pages.
Non-Final Office Action received for U.S. Appl. No. 12/565,760, dated Jan. 27, 2012, 21 pages.
Non-Final Office Action received for U.S. Appl. No. 12/820,974, dated Dec. 29, 2011, 26 pages.
Non-Final Office Action received for U.S. Appl. No. 12/820,974, dated Mar. 14, 2011, 29 pages.
Non-Final Office Action received for U.S. Appl. No. 10/927,925, dated Jul. 24, 2007, 21 pages.
Non-Final Office Action received for U.S. Appl. No. 12/042,313, dated Dec. 7, 2010, 10 pages.
Non-Final Office Action received for U.S. Appl. No. 12/242,852, dated Mar. 18, 2011, 13 pages.
Non-Final Office Action received for U.S. Appl. No. 12/565,750, dated Sep. 26, 2011, 11 pages.
Non-Final Office Action received for U.S. Appl. No. 12/565,757, dated Sep. 3, 2014, 9 pages.
Non-Final Office Action received for U.S. Appl. No. 12/964,679, dated Mar. 2, 2015, 8 pages.
Non-Final Office Action received for U.S. Appl. No. 13/243,202, dated Nov. 9, 2012, 16 pages.
Non-Final Office Action received for U.S. Appl. No. 13/243,423, dated May 24, 2013, 11 pages.
Non-Final Office Action received for U.S. Appl. No. 13/243,506, dated May 24, 2013, 16 pages.
Non-Final Office Action received for U.S. Appl. No. 13/243,582, dated Jan. 29, 2015, 15 pages.
Non-Final Office Action received for U.S. Appl. No. 13/243,582, dated Mar. 28, 2014, 17 pages.
Non-Final Office Action received for U.S. Appl. No. 13/243,582, dated Oct. 25, 2012, 13 pages.
Non-Final Office Action received for U.S. Appl. No. 13/243,637, dated Nov. 8, 2012, 8 pages.
Non-Final Office Action received for U.S. Appl. No. 13/493,955, dated Oct. 24, 2014, 28 pages.
Non-Final Office Action received for U.S. Appl. No. 14/056,263, dated Mar. 12, 2014, 5 pages.
Non-Final Office Action received for U.S. Appl. No. 13/493,955, dated Jan. 11, 2016, 18 pages.
Notice of Acceptance received for Australian Patent Application No. 2012262127, dated Jan. 18, 2016, 3 pages.
Notice of Allowance received for Canadian Patent Application No. 2,755,796, dated Oct. 14, 2015, 1 page.
Notice of Allowance received for Chinese Patent Application No. 2012102959790, dated Jun. 14, 2016, 3 pages.
Notice of Allowance received for Japanese Patent Application No. 2014-000636, dated Feb. 13, 2015, 6 pages.
Notice of Allowance received for Japanese Patent Application No. 2014-513715, dated Jul. 8, 2016, 3 pages.
Notice of Allowance received for Japanese Patent Application No. 2015-051254, dated Oct. 7, 2016, 3 pages.
Notice of Allowance received for Japanese Patent Application No. 2015-140027, dated Mar. 31, 2017, 3 pages.
Notice of Allowance received for Korean Patent Application No. 10-2013-7028483, dated Aug. 19, 2014, 3 pages.
Notice of Allowance received for Korean Patent Application No. 10-2013-7032396, dated Jul. 29, 2016, 3 pages.
Notice of Allowance received for Korean Patent Application No. 10-2013-7034234, dated Feb. 9, 2017, 5 pages.
Notice of Allowance received for U.S. Appl. No. 11/553,436, dated Sep. 29, 2010, 7 pages.
Notice of Allowance received for U.S. Appl. No. 12/565,753, dated Jan. 31, 2014, 8 pages.
Notice of Allowance received for U.S. Appl. No. 12/964,679, dated Jan. 26, 2016, 8 pages.
Notice of Allowance received for U.S. Appl. No. 10/927,925, dated Mar. 15, 2010, 8 pages.
Notice of Allowance received for U.S. Appl. No. 11/923,453, dated Jun. 12, 2013, 9 pages.
Notice of Allowance received for U.S. Appl. No. 12/042,313, dated Oct. 2, 2013, 8 pages.
Notice of Allowance received for U.S. Appl. No. 12/242,852, dated Apr. 27, 2012, 8 pages.

(56) References Cited

OTHER PUBLICATIONS

Notice of Allowance received for U.S. Appl. No. 12/242,852, dated Jan. 9, 2012, 4 pages.
Notice of Allowance received for U.S. Appl. No. 12/565,750, dated Jul. 3, 2012, Jul. 3, 2012, 15 pages.
Notice of Allowance received for U.S. Appl. No. 12/565,750, dated Apr. 4, 2011, 5 pages.
Notice of Allowance received for U.S. Appl. No. 12/565,750, dated Jan. 27, 2011, 7 pages.
Notice of Allowance received for U.S. Appl. No. 12/565,752, dated Jun. 5, 2012, 7 pages.
Notice of Allowance received for U.S. Appl. No. 12/565,752, dated Jul. 11, 2013, 10 pages.
Notice of Allowance received for U.S. Appl. No. 12/565,755, dated Sep. 12, 2017, 6 pages.
Notice of Allowance received for U.S. Appl. No. 12/565,756, dated May 31, 2012, 5 pages.
Notice of Allowance received for U.S. Appl. No. 12/565,756, dated Oct. 15, 2013, 7 pages.
Notice of Allowance received for U.S. Appl. No. 12/565,759, dated Apr. 8, 2013, 9 pages.
Notice of Allowance received for U.S. Appl. No. 12/565,760, dated Jun. 11, 2012, 11 pages.
Notice of Allowance received for U.S. Appl. No. 12/565,760, dated Oct. 2, 2012, 9 pages.
Notice of Allowance received for U.S. Appl. No. 12/820,974, dated Aug. 3, 2012, 8 pages.
Notice of Allowance received for U.S. Appl. No. 12/820,974, dated Dec. 18, 2012, 6 pages.
Notice of Allowance received for U.S. Appl. No. 13/243,202, dated Dec. 5, 2014, 5 pages.
Notice of Allowance received for U.S. Appl. No. 13/243,202, dated Mar. 17, 2015, 5 pages.
Notice of Allowance received for U.S. Appl. No. 13/243,423, dated Jan. 8, 2014, 9 pages.
Notice of Allowance received for U.S. Appl. No. 13/243,423, dated Sep. 16, 2013, 9 pages.
Notice of Allowance received for U.S. Appl. No. 13/243,506, dated Feb. 6, 2014, 8 pages.
Notice of Allowance received for U.S. Appl. No. 13/243,506, dated Oct. 18, 2013, 10 pages.
Notice of Allowance received for U.S. Appl. No. 13/243,582, dated Oct. 8, 2015, 5 pages.
Notice of Allowance received for U.S. Appl. No. 13/243,637, dated Dec. 31, 2013, 8 pages.
Notice of Allowance received for U.S. Appl. No. 13/243,637, dated Jul. 3, 2013, 12 pages.
Notice of Allowance received for U.S. Appl. No. 13/493,955, dated Nov. 8, 2016, 8 pages.
Notice of Allowance received for U.S. Appl. No. 14/056,263, dated Dec. 15, 2014, 6 pages.
Notice of Allowance received for U.S. Appl. No. 14/056,263, dated Jul. 29, 2015, 9 pages.
Notice of Allowance received for U.S. Appl. No. 14/056,263, dated Oct. 24, 2014, 8 pages.
Notice of Allowance received for U.S. Appl. No. 14/613,031, dated Feb. 15, 2017, 8 pages.
Office Action received for Australian Patent Application No. 2012262127, dated Jan. 27, 2015, 3 pages.
Office Action received for Australian Patent Application No. 2016202724, dated Feb. 21, 2017, 2 pages.
Office Action received for Canadian Patent Application No. 2,755,796, dated Oct. 22, 2014, 4 pages.
Office Action received for Canadian Patent Application No. 2,927,608, dated Mar. 9, 2017, 5 pages.
Office Action received for Chinese Patent Application No. 200780046864.5, dated Aug. 10, 2011, 10 pages.
Office Action received for Chinese Patent Application No. 200880129021.6, dated Jun. 4, 2012, 7 pages.
Office Action received for Chinese Patent Application No. 200910118597.9, dated Aug. 24, 2011, 6 pages.
Office Action received for Chinese Patent Application No. 200910118597.9, dated Dec. 31, 2010, 17 pages.
Office Action received for Chinese Patent Application No. 201210295979.0, dated Mar. 23, 2015, 13 pages.
Office Action received for Chinese Patent Application No. 201210295979.0, dated May 5, 2014, 12 pages.
Office Action received for Chinese Patent Application No. 201210295979.0, dated Nov. 30, 2015, 9 pages.
Office Action received for Chinese Patent Application No. 201280026796.7, dated Nov. 23, 2016, 6 pages.
Office Action received for Chinese Patent Application No. 201280026796.7, dated Apr. 12, 2017, 17 pages.
Office Action received for Chinese Patent Application No. 201280026796.7, dated Dec. 29, 2015, 20 pages.
Office Action received for European Patent Application No. 09154312.4, dated Feb. 5, 2010, 1 page.
Office Action received for European Patent Application No. 07854411.1, dated Apr. 18, 2012, 5 pages.
Office Action received for European Patent Application No. 07854411.1, dated Oct. 15, 2009, 5 pages.
Office Action received for European Patent Application No. 07854411.1, dated Oct. 27, 2016, 7 pages.
Office Action received for European Patent Application No. 07854411.1, dated Mar. 11, 2016, 7 pages.
Office Action received for European Patent Application No. 08873123.7, dated Feb. 14, 2011, 2 pages.
Office Action received for European Patent Application No. 09154312.4, dated Oct. 8, 2013, 4 pages.
Office Action received for European Patent Application No. 10712823.3, dated Nov. 20, 2012, 6 pages.
Office Action received for European Patent Application No. 10712823.3, dated Oct. 28, 2015, 6 pages.
Office Action received for European Patent Application No. 11186455.9, dated Jul. 25, 2013, 6 pages.
Office Action received for European Patent Application No. 11186455.9, dated May 24, 2017, 4 pages.
Office Action received for European Patent Application No. 12727003.1, dated Jan. 25, 2016, 7 pages.
Office Action received for Japanese Patent Application No. 2012-500841, dated Jun. 3, 2013, 2 pages.
Office Action received for Japanese Patent Application No. 2014-513715, dated Jan. 16, 2015, 8 pages.
Office Action received for Japanese Patent Application No. 2015-051254, dated Mar. 18, 2016, 12 pages.
Office Action received for Japanese Patent Application No. 2015-140027, dated Jun. 6, 2016, 6 pages.
Office Action received for Japanese Patent Application No. 2016-217409, dated Sep. 19, 2017, 6 pages.
Office Action received for Japanese Patent Application No. 2014-513715, dated Jan. 5, 2016, 4 pages.
Office Action received for Korean Patent Application No. 10-2011-7024282, dated Apr. 26, 2013, 2 pages.
Office Action received for Korean Patent Application No. 10-2013-7032396, dated Aug. 31, 2015, 5 pages.
Office Action received for Korean Patent Application No. 10-2013-7032396, dated Jan. 21, 2015, 3 pages.
Office Action received for Korean Patent Application No. 10-2013-7034234, dated Dec. 10, 2015, 7 pages.
Office Action received for Korean Patent Application No. 10-2013-7034234, dated Oct. 26, 2016, 8 pages.
Office Action received for Korean Patent Application No. 10-2015-7010326, dated Jan. 19, 2017, 7 pages.
Office Action received for Korean Patent Application No. 10-2017-7011291, dated Jul. 14, 2017, 10 pages.
Partial European Search Report received for European Patent Application No. 09154312.4, dated Jun. 3, 2009, 4 pages.
Perez, B., "Palm Reader", LexisNexis, South China Morning Post, Nov. 1, 2005, 1 page.

(56) References Cited

OTHER PUBLICATIONS

Phillipps, Ben, "Touchscreens are Changing the Face of Computers—Today's Users Have Five Tupes of Touchscreens to Choose from, Each with its Own Unique Characteristics", Electronic Products, Nov. 1994, pp. 63-70.
Pickering, J. A., "Touch-Sensitive Screens: The Technologies and Their Application", International Journal of Man-Machine Studies, vol. 25, No. 3, Sep. 1986, pp. 249-269.
Plaisant, et al., "Touchscreen Interfaces for Alphanumeric Data Entry", Proceedings of the Human Factors and Ergonomics Society 36th Annual Meeting, 1992, pp. 293-297.
Plaisant, et al., "Touchscreen Toggle Design", CHI'92, May 3-7, 1992, pp. 667-668.
"Pleading notes Mr B.J. Berghuis van Woortman, in matter of *Apple Inc.* vs *Samsung Electronics*", Case No. KG ZA 11-730 and KG ZA 11-731, Aug. 10-11, 2010, pp. 1-16.
"Pleading notes Mr Kleemans, Mr Blomme and Mr Van Oorschot, in matter of *Apple Inc.* vs *Samsung Electronics*", Case No. KG ZA 11-730 and KG ZA 11-731, Aug. 10, 2011, 35 pages.
Potter, et al., "An Experimental Evaluation of Three Touch Screen Strategies within a Hypertext Database", International Journal of Human-Computer Interaction, vol. 1, No. 1, 1989, pp. 41-52.
Potter, et al., "Improving the Accuracy of Touch Screens: An Experimental Evaluation of Three Strategies", CHI '88 ACM, 1988, pp. 27-32.
Quine42, "eMind Basic Gestures: Cutting, Copying and Pasting Text", available at <http://www.youtube.com/watch?v=4QIOYiCcChc>, 1:10 minute video uploaded on Nov. 22, 2008, 1 page.
Rao, et al., "Exploring Large Tables with the Table Lens", CHI'95 Mosaic of Creativity, ACM, May 7-11, 1995, pp. 403-404.
Rao, et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raskin, A., "Firefox Mobile Concept Video", available at <http://www.azarask.in/blog/post/firefox-mobile-concept-vido/>, 50 pages.
Rekimoto, et al., "Pre-Sense: Interaction Techniques for Finger Sensing Input Devices", CHI Letters, vol. 5, No. 2, 2003, pp. 203-212.
Ren, et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren, et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren, et al., "The Best among Six Strategies for Selecting a Minute Target and the Determination of the Minute Maximum Size of the Targets on a Pen-Based Computer", Human-Computer Interaction Interact, 1997, pp. 85-92.
Riecken, R D., "Adaptive Direct Manipulation", IEEE Xplore, 1991, pp. 1115-1120.
Ritchie, Rene, "App Review + Q&A: MagicPad Brings Rich Text and Cut and Paste to the iPhone", available at <http://www.imore.com/app-review-qa-magicpad-brings-rich-text-and-cut-and-paste-to-the-iphone>, Aug. 5, 2008, 6 pages.
Robertson, et al., "Information Visualization Using 3D Interactive Animation", Communications of the ACM, vol. 36, No. 4, Apr. 1993, pp. 57-71.
Robertson, et al., "The Document Lens", UIST '93, Nov. 3-5, 1993, pp. 101-108.
Rosner, et al., "In Touch: A Graphical User Interface Development Tool", IEEE Colloquium on Software Tools for Interface Design, Nov. 8, 1990, pp. 12/1-12/7.
Rubine, Dean H., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Rubine, Dean, "Combining Gestures and Direct Manipulation", CHI '92, May 3-7, 1992, pp. 659-660.
*Samsung Electronics GMBH* vs *Apple Inc.*, "List scrolling and document translation, scaling and rotation on a touch-screen display, Opposition", Jan. 30, 2012, 27 pages.
*Samsung Electronics* vs *Apple Inc.*, "Statement of Defense Also Counterclaim, Case No. KG ZA 2011-730", Jul. 20, 2011, 44 pages.
*Samsung Electronics* vs *Apple Inc.*, "Statement of Defense Also Counterclaim, Case No. KG ZA 2011-731", Jul. 20, 2011, 48 pages.
Sarkar, et al., "Graphical Fisheye Views of Graphs", CHI '92 Proceedings of the SIGCHI Conference on Human Factors in Computing Systems, May 3-7, 1992, pp. 83-91.
Sarkar, et al., "Graphical Fisheye Views of Graphs", Systems Research Center, Digital Equipment Corporation, Mar. 17, 1992, pp. 1-24.
Sarkar, et al., "Graphical Fisheye Views", Communications of the ACM, vol. 37, No. 12, Dec. 1994, pp. 73-83.
Sarkar, et al., "Stretching the Rubber Sheet: A Metaphor for Viewing Large Layouts on Small Screens", UIST'93, ACM, Nov. 3-5, 1993, pp. 81-91.
Schaffer, et al., "Navigating Hierarchically Clustered Networks through Fisheye and Full-Zoom Methods", ACM Transactions on Computer-Human Interaction, vol. 3, No. 2, Jun. 1996, pp. 162-188.
Scott, et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Sears, et al., "High Precision Touchscreens: Design Strategies and Comparisons with a Mouse", International Journal of Man-Machine Studies, vol. 34, No. 4, 1991, pp. 593-613.
Sears, et al., "Investigating Touchscreen Typing: The Effect of Keyboard Size on Typing Speed", Behavior & Information Technology, vol. 12, No. 1, 1993, pp. 17-22.
Shen, et al., "Informing the Design of Direct-Touch Tabletops", IEEE Sep./Oct. 2006, Sep./Oct. 2006, pp. 36-46.
Shneiderman, Ben, "Designing the User Interface: Strategies for Effective Human-Computer Interaction", Second Edition, Addison-Wesley Publishing Company, Inc, 1992, 598 pages.
Shneiderman, Ben, "Designing the User Interface: Strategies for Effective Human-Computer Interaction", Third Edition, Addison-Wesley Publishing Company Inc., 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", Ablex Publishing Corporation, New Jersey, USA, (Table of Contents, Title Page, Ch. 4, Ch. 6 and List of References), 1993, 133 pages.
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Interface: Tools.Technigues and Concepts to 0Qtimize User Interfaces, Mar. 1991, pp. 93-94.
Simkovitz, Daniel, "LP-DOS Magnifies the PC Screen", IEEE, Proceedings of the John Hogkins National Search for Comguting Agglications to Assist Persons with Disabilities, 1992, pp. 203-204.
Smith, et al., "Relating Distortion to Performance in Distortion Oriented Displays", Proceedings of Sixth Australian Conference on Computer-Human Interaction, Nov. 1996, pp. 6-11.
Starrett, C., "iPhone Gems: Top Photography and Image Manipulation Apps", iLounge, available at <http://www.ilounge.com/index.php/articles/comments/iphone-gems-top-photography-and-image-manipulation-apps/>, Oct. 8, 2008, 14 pages.
Stone, et al., "The Movable Filter as a User Interface Tool", CHI '94 Human Factors in Computing Systems, 1994, pp. 306-312.
Su, et al., "A Review of Supernova Screen Magnification Program for Windows", Journal of Visual Impairment & Blindness, Feb. 1999, pp. 108-110.

(56) References Cited

OTHER PUBLICATIONS

Su, et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, vol. 92, No. 10, Oct. 1998, pp. 705, 707-710.
Summons to Attend Oral Proceedings received for European Patent Application No. 09154312.4, mailed on Apr. 13, 2016, 5 pages.
Summons to Attend Oral proceedings received for European Patent Application No. 11186455.9, mailed on Apr. 15, 2016, 12 pages.
Tamura, Mark, "CutPaste5 v3.1", Freewarepalm.com, available at <http://www.freewarepalm.com/utilities/cutpaste5.shtml>, Apr. 5, 2004, 2 pages.
treocentral.com, "FAQ: How can I Copy and Paste Text on My Treo?", available at <http://www.treocentral.com/content/FAQ/110.html>, retrieved on Sep. 4, 2012, 1 page.
Uslan, et al., "A Review of Henter-Joyce's MAGic for Windows NT", Journal of Visual Impairment and Blindness, Dec. 1999, pp. 666-668.
Uslan, et al., "A Review of Two Screen Magnification Programs for Windows 95: Magnum 95 and LP-Windows", Journal of Visual Impairment & Blindness, Oct. 1997, pp. 9-13.
Vogel, et al., "Shift: A Technique for Operating Pen-Based Interfaces Using Touch", CHI '07 Proceedings, Mobile Interaction Techniques I, Apr. 28-May 3, 2007, pp. 657-666.
W3C, "Cascading Style Sheets, Level 2 Revision 1: CSS 2.1 Specification", available at <http://www.w3.org/TR/2005/WD-CSS21-20050613>, Jun. 13, 2005, 14 pages.
Westerman, Wayne, "Hand Tracking, Finger Identification and Chordic Manipulation on a Multi-Touch Surface", Doctoral Dissertation, 1999, 363 pages.
Yatani, et al., "Escape: A target Selection Technique Using Visually-cued Gestures", CHI-2008, Apr. 5-10, 2008, 10 pages.
Youtube, "iPhone Copy and Paste video", Available online at <http://www.youtube.com/watch?v=UXgsQhiGeag>, 2007, 1 page.
Advisory Action received for U.S. Appl. No. 14/996,841, dated Feb. 21, 2019, 4 pages.
Notice of Allowance received for Canadian Patent Application No. 2,927,608, dated Jan. 22, 2019, 1 page.
Corrected Notice of Allowance received for U.S. Appl. No. 12/565,754, dated Nov. 14, 2017, 2 pages.
Notice of Allowance received for U.S. Appl. No. 12/565,754, dated Aug. 11, 2017, 5 pages.
Intention to Grant received for European Patent Application No. 07854411.1, dated Jan. 25, 2019, 13 pages.
Intention to Grant received for European Patent Application No. 12154861.4, dated Jan. 29, 2019, 8 pages.
Summons to Attend Oral Proceedings received for European Patent Application No. 10712823.3, mailed on Dec. 4, 2018, 6 pages.
Office Action received for Korean Patent Application No. 10-2018-7025545, dated Sep. 28, 2018, 10 pages (4 pages of English Translation and 6 pages of Official Copy).
Office Action received for European Patent Application No. 16170727.8, dated May 16, 2019, 6 pages.
Summons to Attend Oral Proceedings received for European Patent Application No. 10712823.3, dated May 14, 2019, 5 pages.
Final Office Action received for U.S. Appl. No. 14/996,841, dated Oct. 5, 2018, 16 pages.
Office Action received for European Patent Application No. 12154861.4, dated Aug. 28, 2018, 8 pages.
Extended European Search Report Received for European Patent Application No. 19202840.5, dated Mar. 30, 2020, 8 pages.

Ⓐ
↓

┌─────────────────────────────────────────────────────────────────────┐
| ┌─────────────────────────────────────────────────────────────────┐ |─ 1322
| | The gesture is a predefined number of successive taps by a single finger | |
| | on a sentence in the content; and, | |
| | in response to recognizing the predefined number of successive taps by | |
| | the single finger on the sentence in the content: | |
| | select the sentence; and | |
| | display a start-point object and an end-point object at respective ends of | |
| | the sentence | |
| | ┌─────────────────────────────────────────────────────────────┐ |
| | | Display a command display area adjacent to the sentence, wherein | |─ 1324
| | | the command display area includes an icon for copying selected | |
| | | content | |
| | └─────────────────────────────────────────────────────────────┘ |
| └─────────────────────────────────────────────────────────────────┘ |
|                                                                     |
| ┌─────────────────────────────────────────────────────────────────┐ |─ 1326
| | The gesture is a predefined number of successive taps by a single finger | |
| | on a paragraph in the content; and, | |
| | in response to recognizing the predefined number of successive taps by | |
| | the single finger on the paragraph in the content: | |
| | select the paragraph; and | |
| | display a start-point object and an end-point object at respective ends of | |
| | the paragraph. | |
| | ┌─────────────────────────────────────────────────────────────┐ |
| | | Display a command display area adjacent to the paragraph, wherein | |
| | | the command display area includes an icon for copying selected | |─ 1328
| | | content | |
| | └─────────────────────────────────────────────────────────────┘ |
| └─────────────────────────────────────────────────────────────────┘ |
|                                                                     |
| ┌─────────────────────────────────────────────────────────────────┐ |─ 1330
| | The gesture is a stationary pressing gesture by a single finger at a first | |
| | location in the content, wherein the content is displayed at a first | |
| | magnification; and, | |
| | in response to recognizing the stationary pressing gesture by the single | |
| | finger at a first location in the content: | |
| | expand a portion of the content proximate the first location on the touch | |
| | screen display to a second magnification that is greater than the first | |
| | magnification while continuing to display at least some of the content at | |
| | the first magnification; and | |
| | display a content magnifier that displays | |
| | the expanded portion of the content, and | |
| | an insertion marker at a location within the expanded portion of the | |
| | content that corresponds to the first location | |
| | ┌─────────────────────────────────────────────────────────────┐ |
| | | Detect movement of the single finger across the touch screen | |─ 1332
| | | display; | |
| | | move the content magnifier and changing the expanded portion of | |
| | | the content in accordance with the detected movement of the single | |
| | | finger; and | |
| | | move the insertion marker to a second location within the expanded | |
| | | portion of the content in accordance with the detected movement of | |
| | | the single finger | |
| | └─────────────────────────────────────────────────────────────┘ |
| └─────────────────────────────────────────────────────────────────┘ |
└─────────────────────────────────────────────────────────────────────┘

↓
Ⓑ  Figure 13B

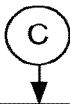

| | |
|---|---|
| The command display area includes an icon for initiating an email message using an email address in selected content; and, in response to detecting activation of the icon for initiating an email message using an email address in selected content, initiate an email message using an email address in the selected content | 1432 |
| The command display area includes an icon for initiating a slide show using images in selected content; and, in response to detecting activation of the icon for initiating a slide show using images in selected content, initiate a slide show using images in the selected content | 1434 |
| The command display area includes an icon for displaying a webpage using a web address in selected content; and, in response to detecting activation of the icon for displaying a webpage using a web address in selected content, display a webpage using a web address in the selected content | 1436 |
| The command display area includes an icon for initiating a search using information in selected content; detect activation of the icon for initiating a search using information in selected content; and, in response to detecting activation of the icon for initiating a search using information in selected content, initiate a search using information in the selected content | 1438 |
| The command display area includes an icon for adding information to a contacts application; detect activation of the icon for adding information to a contacts application; and, in response to detecting activation of the icon for adding information to a contacts application, add information in the selected content to a contacts application | 1440 |
| The command display area moves on the touch screen display as the selected content moves | 1442 |
| Icons in the command display area include at least one command that is user configurable | 1444 |
| Icons in the command display area include at least one command that is context sensitive | 1446 |
| The content is displayed within a first application, and icons in the command display area include at least one command to invoke a second application coupled to the first application via a predefined application programming interface | 1448 |
| In response to detecting activation of the command icon in the command display area, cease to display the command display area | 1456 |

Figure 14D

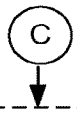

┌──────────────────────────────────────────────────────────────────────┐ 1654
│ Detect lift off of the finger contact from the touch screen display; and, in response │
│ to detecting lift off of the finger contact from the touch screen display, terminate │
│ display of the content magnifier │
└──────────────────────────────────────────────────────────────────────┘

┌──────────────────────────────────────────────────────────────────────┐ 1656
│ Detect lift off of the finger contact from the touch screen display when a location │
│ of the finger contact corresponds to a current position within a current word; and, │
│ in response to detecting lift off of the finger contact from the touch screen display │
│ when the location of the finger contact corresponds to the current position within │
│ the current word: terminate display of the content magnifier; and place the │
│ respective end of the selected content at the current position within the current │
│ word │
└──────────────────────────────────────────────────────────────────────┘

┌──────────────────────────────────────────────────────────────────────┐ 1658
│ Detect lift off of the finger contact from the touch screen display when a location │
│ of the finger contact corresponds to a current position within a current word; and, │
│ in response to detecting lift off of the finger contact from the touch screen display │
│ when the location of the finger contact corresponds to the current position within │
│ the current word: terminate display of the content magnifier; and place the │
│ respective end of the selected content at a respective end of the current word │
│                                                                      │
│ ┌──────────────────────────────────────────────────────────────┐ 1660 │
│ │ In response to detecting lift off of the finger contact from the touch screen │ │
│ │ display, display an animation of the content magnifier moving to a position │ │
│ │ that corresponds to the respective end of the current word prior to │ │
│ │ terminating display of the content magnifier │ │
│ └──────────────────────────────────────────────────────────────┘ │
└──────────────────────────────────────────────────────────────────────┘

Figure 16D

Detect lift off of the finger contact from the touch screen display when a location of the finger contact corresponds to a current position within a current word; and, in response to detecting lift off of the finger contact from the touch screen display when the location of the finger contact corresponds to the current position within the current word: terminate display of the content magnifier; place the respective end of the selected content at the current position within the current word when the movement of the finger contact is less than a predefined value in a predefined time interval; and place the respective end of the selected content at a respective end of the current word when the movement of the finger contact is greater than the predefined value in the predefined time interval ⎯ 1662

In response to detecting lift off of the finger contact from the touch screen display, display an animation of the content magnifier move to a position that corresponds to the respective end of the current word prior to terminating display of the content magnifier when the movement of the finger contact is greater than the predefined value in the predefined time interval ⎯ 1664

1702 — Display at least a portion of a structured electronic document on the touch screen display, wherein the structured electronic document comprises a plurality of boxes of content

- 1704 — The structured electronic document is a web page
- 1706 — The structured electronic document is an HTML or XML document

1708 — Detect a finger gesture on a first box of content in the plurality of boxes of content

- 1710 — The finger gesture is a press and hold gesture
- 1712 — The finger gesture is a tap-and-a-half gesture

1714 — In response to detecting the finger gesture on the first box of content in the plurality of boxes of content: select the first box of content; and visually distinguish the selected first box of content from content on the touch screen display that is not selected

- 1716 — Display the first box of content with a different background shading from content on the touch screen display that is not selected
- 1718 — Display the first box of content with a different background color from content on the touch screen display that is not selected
- 1720 — Display a border around the first box of content
- 1722 — Display one or more selection handles for the first box of content
- 1724 — In response to detecting the finger gesture on the first box of content in the plurality of boxes of content, display a command display area for selected content (A)

```
┌─────────────────────────────────────────────────────────────────┐ ─1902
│ Display at least a portion of a structured electronic document on the touch │
│ screen display, wherein the structured electronic document comprises a      │
│                      plurality of boxes of content                           │
└─────────────────────────────────────────────────────────────────┘
                                   ▼
┌─────────────────────────────────────────────────────────────────┐ ─1904
│ Determine whether the structured electronic document meets one or more      │
│              predefined document complexity criteria                         │
│  ┌───────────────────────────────────────────────────────────┐ ─1906
│  │ The one or more predefined document complexity criteria comprise a │
│  │ requirement that the structured electronic document includes a     │
│  │        plurality of columns that contain boxes of content           │
│  └───────────────────────────────────────────────────────────┘
│  ┌───────────────────────────────────────────────────────────┐ ─1908
│  │ The one or more predefined document complexity criteria comprise a │
│  │ requirement that the structured electronic document includes at least │
│  │                    one non-inline image                              │
│  └───────────────────────────────────────────────────────────┘
│  ┌───────────────────────────────────────────────────────────┐ ─1910
│  │ The one or more predefined document complexity criteria comprise a │
│  │ requirement that the structured electronic document includes at least a │
│  │         predefined number of levels of nested elements              │
│  └───────────────────────────────────────────────────────────┘
│  ┌───────────────────────────────────────────────────────────┐ ─1912
│  │ The one or more predefined document complexity criteria comprise a │
│  │ requirement that the structured electronic document uses cascading │
│  │                         style sheets                                 │
│  └───────────────────────────────────────────────────────────┘
│  ┌───────────────────────────────────────────────────────────┐ ─1914
│  │ The one or more predefined document complexity criteria comprise a │
│  │ requirement that the structured electronic document includes a floated │
│  │                            object                                    │
│  └───────────────────────────────────────────────────────────┘
│  ┌───────────────────────────────────────────────────────────┐ ─1916
│  │ The one or more predefined document complexity criteria comprise a │
│  │ requirement that the structured electronic document includes text │
│  │                    floated around an object                          │
│  └───────────────────────────────────────────────────────────┘
└─────────────────────────────────────────────────────────────────┘
                                   ▼
┌─────────────────────────────────────────────────────────────────┐ ─1918
│ Select one or more entire boxes of content in response to one or more       │
│ finger gestures when the structured electronic document meets at least one  │
│                  predefined document complexity criteria                     │
└─────────────────────────────────────────────────────────────────┘
                                   ▼
┌─────────────────────────────────────────────────────────────────┐ ─1920
│ Select a gesture-specified portion of at least one box of content when the  │
│   structured electronic document does not meet at least one predefined       │
│                      document complexity criteria                            │
└─────────────────────────────────────────────────────────────────┘
```

Figure 19

METHODS AND GRAPHICAL USER INTERFACES FOR EDITING ON A MULTIFUNCTION DEVICE WITH A TOUCH SCREEN DISPLAY

RELATED APPLICATIONS

This application is a continuation of U.S. patent application Ser. No. 12/565,755, "Methods and Graphical User Interfaces for Editing on a Multifunction Device with a Touch Screen Display, filed Sep. 24, 2009, which claims priority to U.S. Provisional Patent Application No. 61/160, 698, "Methods and Graphical User Interfaces for Editing on a Multifunction Device with a Touch Screen Display," filed Mar. 16, 2009, which is incorporated by reference herein in its entirety.

This application is related to the following applications: (1) U.S. patent application Ser. No. 12/565,750, "Methods and Graphical User Interfaces for Editing on a Multifunction Device with a Touch Screen Display," filed Sep. 24, 2009; (2) U.S. patent application Ser. No. 12/565,751, "Methods and Graphical User Interfaces for Editing on a Multifunction Device with a Touch Screen Display," filed Sep. 24, 2009; (3) U.S. patent application Ser. No. 12/565,752, "Methods and Graphical User Interfaces for Editing on a Multifunction Device with a Touch Screen Display," filed Sep. 24, 2009; (4) U.S. patent application Ser. No. 12/565,753, "Methods and Graphical User Interfaces for Editing on a Multifunction Device with a Touch Screen Display," filed Sep. 24, 2009; (5) U.S. patent application Ser. No. 12/565,754, "Methods and Graphical User Interfaces for Editing on a Multifunction Device with a Touch Screen Display," filed Sep. 24, 2009; (6) U.S. patent application Ser. No. 12/565,756, "Methods and Graphical User Interfaces for Editing on a Multifunction Device with a Touch Screen Display," filed Sep. 24, 2009; (7) U.S. patent application Ser. No. 12/565,757, "Methods and Graphical User Interfaces for Editing on a Multifunction Device with a Touch Screen Display," filed Sep. 24, 2009; (8) U.S. patent application Ser. No. 12/565,759, "Methods and Graphical User Interfaces for Editing on a Multifunction Device with a Touch Screen Display," filed Sep. 24, 2009; and (9) U.S. patent application Ser. No. 12/565,760, "Methods and Graphical User Interfaces for Editing on a Multifunction Device with a Touch Screen Display," filed Sep. 24, 2009, which are incorporated by reference herein in their entirety.

TECHNICAL FIELD

The disclosed embodiments relate generally to multifunction devices with touch screen displays, and more particularly, to conducting edits (e.g., cutting, copying, or pasting user-selected content) on such devices.

BACKGROUND

As electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions.

Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Conventional user interfaces on multifunction devices with touch screen displays do not provide a simple and intuitive way to edit text and graphics. Editing functions such as cut, copy, and paste (if they even exist) are often difficult to find and use, thereby creating a significant cognitive burden on a user. In addition, conventional editing methods take longer than necessary, thereby wasting energy. This latter consideration is particularly important in battery-operated devices.

Accordingly, there is a need for multifunction devices with touch screen displays with faster, more efficient methods and interfaces for editing content. Such methods and interfaces reduce the cognitive burden on a user and produce a more efficient human-machine interface. For battery-operated multi function devices, such methods and interfaces conserve power and increase the time between battery charges.

SUMMARY

The above deficiencies and other problems associated with user interfaces for multifunction devices with touch screen displays are reduced or eliminated by the disclosed devices. In some embodiments, the device is a desktop computer with a touch screen display. In some embodiments, the device is portable (e.g., a notebook computer or handheld device). In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch screen display. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at a multifunction device with a touch screen display. The computer-implemented method includes: displaying editable content on the touch screen display at a first magnification; detecting a finger gesture on the editable content; in response to detecting the finger gesture on the editable content: expanding a portion of the editable content on the touch screen display to a second magnification that is greater than the first magnification while continuing to display at least some of the editable content at the first magnification; and displaying a content magnifier that displays the expanded portion of the editable content and an insertion marker at a first location within the expanded portion of the editable content; detecting movement of a finger contact across the touch screen display; moving the content magnifier and changing the expanded portion of the editable content in accordance with the detected movement of the finger contact; moving the insertion marker from the first location to a second location within the expanded portion of the editable content in accordance with the detected movement of the finger contact; detecting lift off of the finger contact while the insertion marker is located at the second location within the expanded portion of the editable content; and, in response to detecting lift off of the finger contact: ceasing to display the content magnifier and the expanded portion of the editable content; displaying the insertion marker at a current location in the editable content at the first magnification, wherein the current location corresponds to the second location within the expanded portion of the editable content; and displaying a first command display area adjacent to the insertion marker, wherein the first command display area includes an icon for selecting content associated with the current location of the insertion marker.

In accordance with some embodiments, a graphical user interface on a multifunction device with a touch screen display, a memory, and one or more processors to execute one or more programs stored in the memory includes: editable content at a first magnification, a content magnifier, an insertion marker, and a command display area; wherein: in response to detecting a finger gesture on the editable content: a portion of the editable content on the touch screen display is expanded to a second magnification that is greater than the first magnification while continuing to display at least some of the editable content at the first magnification; and the content magnifier is displayed, wherein the content magnifier displays the expanded portion of the editable content and the insertion marker at a first location within the expanded portion of the editable content; the content magnifier is moved and the expanded portion of the editable content is changed in accordance with detected movement of a finger contact across the touch screen display; the insertion marker is moved from the first location to a second location within the expanded portion of the editable content in accordance with the detected movement of the finger contact; and, in response to detecting lift off of the finger contact while the insertion marker is located at the second location within the expanded portion of the editable content: display of the content magnifier and the expanded portion of the editable content are ceased; the insertion marker is displayed at a current location in the editable content at the first magnification, wherein the current location corresponds to the second location within the expanded portion of the editable content; and the command display area is displayed adjacent to the insertion marker, wherein the command display area includes an icon for selecting content associated with the current location of the insertion marker.

In accordance with some embodiments, a multifunction device includes a touch screen display, one or more processors, memory, and one or more programs. The one or more programs are stored in the memory and configured to be executed by the one or more processors. The one or more programs include instructions for displaying editable content on the touch screen display at a first magnification; detecting a finger gesture on the editable content; in response to detecting the finger gesture on the editable content: expanding a portion of the editable content on the touch screen display to a second magnification that is greater than the first magnification while continuing to display at least some of the editable content at the first magnification; and displaying a content magnifier that displays the expanded portion of the editable content and an insertion marker at a first location within the expanded portion of the editable content; detecting movement of a finger contact across the touch screen display; moving the content magnifier and changing the expanded portion of the editable content in accordance with the detected movement of the finger contact; moving the insertion marker from the first location to a second location within the expanded portion of the editable content in accordance with the detected movement of the finger contact; detecting lift off of the finger contact while the insertion marker is located at the second location within the expanded portion of the editable content; and, in response to detecting lift off of the finger contact: ceasing to display the content magnifier and the expanded portion of the editable content; displaying the insertion marker at a current location in the editable content at the first magnification, wherein the current location corresponds to the second location within the expanded portion of the editable content; and displaying a first command display area adjacent to the insertion marker, wherein the first command display area includes an icon for selecting content associated with the current location of the insertion marker.

In accordance with some embodiments, a computer readable storage medium has stored therein instructions which when executed by a multifunction device with a touch screen display, cause the device to: display editable content on the touch screen display at a first magnification; detect a finger gesture on the editable content; in response to detecting the finger gesture on the editable content: expand a portion of the editable content on the touch screen display to a second magnification that is greater than the first magnification while continuing to display at least some of the editable content at the first magnification; and display a content magnifier that displays the expanded portion of the editable content and an insertion marker at a first location within the expanded portion of the editable content; detect movement of a finger contact across the touch screen display; move the content magnifier and changing the expanded portion of the editable content in accordance with the detected movement of the finger contact; move the insertion marker from the first location to a second location within the expanded portion of the editable content in accordance with the detected movement of the finger contact; detect lift off of the finger contact while the insertion marker is located at the second location within the expanded portion of the editable content; and, in response to detecting lift off of the finger contact: cease to display the content magnifier and the expanded portion of the editable content; display the insertion marker at a current location in the editable content at the first magnification, wherein the current location corresponds to the second location within the expanded portion of the editable content; and display a first command display area adjacent to the insertion marker, wherein the first command display area includes an icon for selecting content associated with the current location of the insertion marker.

In accordance with some embodiments, a multifunction device includes: a touch screen display; means for displaying editable content on the touch screen display at a first magnification; means for detecting a finger gesture on the editable content; in response to detecting the finger gesture on the editable content: means for expanding a portion of the editable content on the touch screen display to a second magnification that is greater than the first magnification while continuing to display at least some of the editable content at the first magnification; and means for displaying a content magnifier that displays the expanded portion of the editable content and an insertion marker at a first location within the expanded portion of the editable content; means for detecting movement of a finger contact across the touch screen display; means for moving the content magnifier and changing the expanded portion of the editable content in accordance with the detected movement of the finger contact; means for moving the insertion marker from the first location to a second location within the expanded portion of the editable content in accordance with the detected movement of the finger contact; means for detecting lift off of the finger contact while the insertion marker is located at the second location within the expanded portion of the editable content; and, in response to detecting lift off of the finger contact: means for ceasing to display the content magnifier and the expanded portion of the editable content; means for displaying the insertion marker at a current location in the editable content at the first magnification, wherein the current location corresponds to the second location within the expanded portion of the editable content; and means for displaying a first command display area adjacent to the insertion marker, wherein the first command display area includes an icon for selecting content associated with the current location of the insertion marker.

In accordance with some embodiments, a computer-implemented method is performed at a multifunction device with a touch screen display. The computer-implemented method includes: displaying read-only content on the touch screen display at a first magnification; detecting a finger gesture on the read-only content; in response to detecting the finger gesture on the read-only content: expanding a portion of the read-only content on the touch screen display to a second magnification that is greater than the first magnification while continuing to display at least some of the read-only content at the first magnification; and displaying a content magnifier that displays the expanded portion of the read-only content and a position marker at a first location within the expanded portion of the read-only content; detecting movement of a finger contact across the touch screen display; moving the content magnifier and changing the expanded portion of the read-only content in accordance with the detected movement of the finger contact; moving the position marker from the first location to a second location within the expanded portion of the read-only content in accordance with the detected movement of the finger contact; detecting lift off of the finger contact while the position marker is located at the second location within the expanded portion of the read-only content; and, in response to detecting lift off of the finger contact: ceasing to display the content magnifier, the expanded portion of the read-only content, and the position marker; and displaying a first command display area adjacent to a current location in the read-only content at the first magnification, wherein the current location corresponds to the second location within the expanded portion of the read-only content, wherein the first command display area includes an icon for selecting content associated with the current location.

In accordance with some embodiments, a graphical user interface on a multifunction device with a touch screen display, a memory, and one or more processors to execute one or more programs stored in the memory includes: read-only content at a first magnification, a content magnifier, an position marker, and a command display area; wherein: in response to detecting a finger gesture on the read-only content: a portion of the read-only content on the touch screen display is expanded to a second magnification that is greater than the first magnification while continuing to display at least some of the read-only content at the first magnification; and the content magnifier is displayed, wherein the content magnifier displays the expanded portion of the read-only content and a position marker at a first location within the expanded portion of the read-only content; the content magnifier is moved and the expanded portion of the read-only content is changed in accordance with detected movement of a finger contact; the position marker is moved from the first location to a second location within the expanded portion of the read-only content in accordance with the detected movement of the finger contact; and, in response to detecting lift off of the finger contact while the position marker is located at the second location within the expanded portion of the read-only content: display of the content magnifier, the expanded portion of the read-only content, and the position marker are ceased; and the command display area is displayed adjacent to a current location in the read-only content at the first magnification, wherein the current location corresponds to the second location within the expanded portion of the read-only content, wherein the command display area includes an icon for selecting content associated with the current location.

In accordance with some embodiments, a multifunction device includes a touch screen display, one or more processors, memory, and one or more programs. The one or more programs are stored in the memory and configured to be executed by the one or more processors. The one or more programs include instructions for displaying read-only content on the touch screen display at a first magnification; detecting a finger gesture on the read-only content; in response to detecting the finger gesture on the read-only content: expanding a portion of the read-only content on the touch screen display to a second magnification that is greater than the first magnification while continuing to display at least some of the read-only content at the first magnification; and displaying a content magnifier that displays the expanded portion of the read-only content and a position marker at a first location within the expanded portion of the read-only content; detecting movement of a finger contact across the touch screen display; moving the content magnifier and changing the expanded portion of the read-only content in accordance with the detected movement of the finger contact; moving the position marker from the first location to a second location within the expanded portion of the read-only content in accordance with the detected movement of the finger contact; detecting lift off of the finger contact while the position marker is located at the second location within the expanded portion of the read-only content; and, in response to detecting lift off of the finger contact: ceasing to display the content magnifier, the expanded portion of the read-only content, and the position marker; and displaying a first command display area adjacent to a current location in the read-only content at the first magnification, wherein the current location corresponds to the second location within the expanded portion of the read-only content, wherein the first command display area includes an icon for selecting content associated with the current location.

In accordance with some embodiments, a computer readable storage medium has stored therein instructions which when executed by a multifunction device with a touch screen display, cause the device to: display read-only content on the touch screen display at a first magnification; detect a finger gesture on the read-only content; in response to detecting the finger gesture on the read-only content: expand a portion of the read-only content on the touch screen display to a second magnification that is greater than the first magnification while continuing to display at least some of the read-only content at the first magnification; and display a content magnifier that displays the expanded portion of the read-only content and a position marker at a first location within the expanded portion of the read-only content; detect movement of a finger contact across the touch screen display; move the content magnifier and changing the expanded portion of the read-only content in accordance with the detected movement of the finger contact; move the position marker from the first location to a second location within the expanded portion of the read-only content in accordance with the detected movement of the finger contact; detect lift off of the finger contact while the position marker is located at the second location within the expanded portion of the read-only content; and, in response to detecting lift off of the finger contact: cease to display the content magnifier, the expanded portion of the read-only content, and the position marker; and display a first command display area adjacent to a current location in the read-only content at the first magnification, wherein the current location corresponds to the second location within the expanded portion of the read-only content, wherein the first command display area includes an icon for selecting content associated with the current location.

In accordance with some embodiments, a multifunction device includes: a touch screen display; means for displaying read-only content on the touch screen display at a first magnification; means for detecting a finger gesture on the read-only content; in response to detecting the finger gesture on the read-only content: means for expanding a portion of the read-only content on the touch screen display to a second magnification that is greater than the first magnification while continuing to display at least some of the read-only content at the first magnification; and means for displaying a content magnifier that displays the expanded portion of the read-only content and a position marker at a first location within the expanded portion of the read-only content; means for detecting movement of a finger contact across the touch screen display; means for moving the content magnifier and changing the expanded portion of the read-only content in accordance with the detected movement of the finger contact; means for moving the position marker from the first location to a second location within the expanded portion of the read-only content in accordance with the detected movement of the finger contact; means for detecting lift off of the finger contact while the position marker is located at the second location within the expanded portion of the read-only content; and, in response to detecting lift off of the finger contact: means for ceasing to display the content magnifier, the expanded portion of the read-only content, and the position marker; and means for displaying a first command display area adjacent to a current location in the read-only content at the first magnification, wherein the current location corresponds to the second location within the expanded portion of the read-only content, wherein the first command display area includes an icon for selecting content associated with the current location.

In accordance with some embodiments, a computer-implemented method is performed at a multifunction device with a touch screen display. The computer-implemented method includes: displaying content on the touch screen display at a first magnification; detecting a finger gesture on the content; in response to detecting the finger gesture on the content: expanding a portion of the content on the touch screen display to a second magnification that is greater than the first magnification while continuing to display at least some of the content at the first magnification; and displaying a content magnifier that displays the expanded portion of the content and an insertion marker at a first location within the expanded portion of the content; detecting movement of a finger contact across the touch screen display; moving the content magnifier and changing the expanded portion of the content in accordance with the detected movement of the finger contact; moving the insertion marker from the first location to a second location within the expanded portion of the content in accordance with the detected movement of the finger contact; detecting lift off of the finger contact while the insertion marker is located at the second location within the expanded portion of the content; and, in response to detecting lift off of the finger contact: ceasing to display the content magnifier, the expanded portion of the content, and the insertion marker; and selecting content associated with the second location of the insertion marker.

In accordance with some embodiments, a graphical user interface on a multifunction device with a touch screen display, a memory, and one or more processors to execute one or more programs stored in the memory includes: content at a first magnification, a content magnifier, an insertion marker, and a command display area; wherein: in response to detecting a finger gesture on the content: a portion of the content on the touch screen display is expanded to a second magnification that is greater than the first magnification while continuing to display at least some of the content at the first magnification; and the content magnifier is displayed, wherein the content magnifier displays the expanded portion of the content and the insertion marker at a first location within the expanded portion of the content; the content magnifier is moved and the expanded portion of the content is changed in accordance with detected movement of a finger contact; the insertion marker is moved from the first location to a second location within the expanded portion of the content in accordance with the detected movement of the finger contact; and, in response to detecting lift off of the finger contact while the insertion marker is located at the second location within the expanded portion of the content: display of the content magnifier, the expanded portion of the content, and the insertion marker are ceased; and content associated with the second location of the insertion marker is selected.

In accordance with some embodiments, a multifunction device includes a touch screen display, one or more processors, memory, and one or more programs. The one or more programs are stored in the memory and configured to be executed by the one or more processors. The one or more programs include instructions for displaying content on the touch screen display at a first magnification; detecting a finger gesture on the content; in response to detecting the finger gesture on the content: expanding a portion of the content on the touch screen display to a second magnification that is greater than the first magnification while continuing to display at least some of the content at the first magnification; and displaying a content magnifier that displays the expanded portion of the content and an insertion marker at a first location within the expanded portion of the content; detecting movement of a finger contact across the touch screen display; moving the content magnifier and changing the expanded portion of the content in accordance with the detected movement of the finger contact; moving the insertion marker from the first location to a second location within the expanded portion of the content in accordance with the detected movement of the finger contact; detecting lift off of the finger contact while the insertion marker is located at the second location within the expanded portion of the content; and, in response to detecting lift off of the finger contact: ceasing to display the content magnifier, the expanded portion of the content, and the insertion marker; and selecting content associated with the second location of the insertion marker.

In accordance with some embodiments, a computer readable storage medium has stored therein instructions which when executed by a multifunction device with a touch screen display, cause the device to: display content on the touch screen display at a first magnification; detect a finger gesture on the content; in response to detecting the finger gesture on the content: expand a portion of the content on the touch screen display to a second magnification that is greater than the first magnification while continuing to display at least some of the content at the first magnification; and display a content magnifier that displays the expanded portion of the content and an insertion marker at a first location within the expanded portion of the content; detect movement of a finger contact across the touch screen display; move the content magnifier and changing the expanded portion of the content in accordance with the detected movement of the finger contact; move the insertion marker from the first location to a second location within the expanded portion of the content in accordance with the detected movement of the finger contact; detect lift off of the finger contact while the insertion marker is located at the second location within the expanded portion of the content; and, in response to detecting lift off of the finger contact: cease to display the content magnifier, the expanded portion of the content, and the insertion marker; and select content associated with the second location of the insertion marker.

In accordance with some embodiments, a multifunction device includes: a touch screen display; means for displaying content on the touch screen display at a first magnification; means for detecting a finger gesture on the content; in response to detecting the finger gesture on the content: means for expanding a portion of the content on the touch screen display to a second magnification that is greater than the first magnification while continuing to display at least some of the content at the first magnification; and means for displaying a content magnifier that displays the expanded portion of the content and an insertion marker at a first location within the expanded portion of the content; means for detecting movement of a finger contact across the touch screen display; means for moving the content magnifier and changing the expanded portion of the content in accordance with the detected movement of the finger contact; means for moving the insertion marker from the first location to a second location within the expanded portion of the content in accordance with the detected movement of the finger contact; means for detecting lift off of the finger contact while the insertion marker is located at the second location within the expanded portion of the content; and, in response to detecting lift off of the finger contact: means for ceasing to display the content magnifier, the expanded portion of the content, and the insertion marker; and means for selecting content associated with the second location of the insertion marker.

In accordance with some embodiments, a computer-implemented method is performed at a multifunction device with a touch screen display. The computer-implemented method includes: displaying content on the touch screen display; detecting a double-tap gesture by a single finger on a word in the content; and, in response to detecting the double-tap gesture by the single finger on the word in the content: selecting the word; and displaying a start-point object and an end-point object at respective ends of the word.

In accordance with some embodiments, a graphical user interface on a multifunction device with a touch screen display, a memory, and one or more processors to execute one or more programs stored in the memory includes: content, a word in the content, a start-point object; and an end-point object; wherein: in response to detecting a double-tap gesture by a single finger on the word in the content: the word is selected; and the start-point object and the end-point object are displayed at respective ends of the word.

In accordance with some embodiments, a multifunction device includes a touch screen display, one or more processors, memory, and one or more programs. The one or more programs are stored in the memory and configured to be executed by the one or more processors. The one or more programs include instructions for displaying content on the touch screen display; detecting a double-tap gesture by a single finger on a word in the content; and, in response to detecting the double-tap gesture by the single finger on the word in the content: selecting the word; and displaying a start-point object and an end-point object at respective ends of the word.

In accordance with some embodiments, a computer readable storage medium has stored therein instructions which when executed by a multifunction device with a touch screen display, cause the device to: display content on the touch screen display; detect a double-tap gesture by a single finger on a word in the content; and, in response to detecting the double-tap gesture by the single finger on the word in the content: select the word; and display a start-point object and an end-point object at respective ends of the word.

In accordance with some embodiments, a multifunction device includes: a touch screen display; means for displaying content on the touch screen display; means for detecting a double-tap gesture by a single finger on a word in the content; and, in response to detecting the double-tap gesture by the single finger on the word in the content: means for selecting the word; and means for displaying a start-point object and an end-point object at respective ends of the word.

In accordance with some embodiments, a computer-implemented method is performed at a multifunction device with a touch screen display. The computer-implemented method includes: displaying content on the touch screen display; detecting one or more fingers on the touch screen display; recognizing a gesture made by the one or more fingers on the touch screen display, wherein the gesture is one gesture in a plurality of predefined gestures operable to select or assist in selecting a portion of the content; and performing an action with respect to the content in response to recognizing the gesture.

In accordance with some embodiments, a multifunction device includes a touch screen display, one or more processors, memory, and one or more programs. The one or more programs are stored in the memory and configured to be executed by the one or more processors. The one or more programs include instructions for displaying content on the touch screen display; detecting one or more fingers on the touch screen display; recognizing a gesture made by the one or more fingers on the touch screen display, wherein the gesture is one gesture in a plurality of predefined gestures operable to select or assist in selecting a portion of the content; and performing an action with respect to the content in response to recognizing the gesture.

In accordance with some embodiments, a computer readable storage medium has stored therein instructions which when executed by a multifunction device with a touch screen display, cause the device to: display content on the touch screen display; detect one or more fingers on the touch screen display; recognize a gesture made by the one or more fingers on the touch screen display, wherein the gesture is one gesture in a plurality of predefined gestures operable to select or assist in selecting a portion of the content; and perform an action with respect to the content in response to recognizing the gesture.

In accordance with some embodiments, a multifunction device includes: a touch screen display; means for displaying content on the touch screen display; means for detecting one or more fingers on the touch screen display; means for recognizing a gesture made by the one or more fingers on the touch screen display, wherein the gesture is one gesture in a plurality of predefined gestures operable to select or assist in selecting a portion of the content; and means for performing an action with respect to the content in response to recognizing the gesture.

In accordance with some embodiments, a computer-implemented method is performed at a multifunction device with a touch screen display. The computer-implemented method includes: displaying content on the touch screen display, wherein the displayed content includes selected content; visually distinguishing the selected content from displayed content that is not selected; displaying a command display area adjacent to the selected content on the touch screen display, wherein the command display area includes one or more command icons; detecting activation of a command icon in the command display area; and, in response to detecting activation of the command icon in the command display area, performing a corresponding action with respect to the selected content.

In accordance with some embodiments, a graphical user interface on a multifunction device with a touch screen display, a memory, and one or more processors to execute one or more programs stored in the memory includes content, including selected content that is visually distinguished from displayed content that is not selected, and a command display area that includes one or more command icons; wherein: the command display area is displayed adjacent to the selected content on the touch screen display; and, in response to detecting activation of a command icon in the command display area, a corresponding action is performed with respect to the selected content.

In accordance with some embodiments, a multifunction device includes a touch screen display, one or more processors, memory, and one or more programs. The one or more programs are stored in the memory and configured to be executed by the one or more processors. The one or more programs include instructions for displaying content on the touch screen display, wherein the displayed content includes selected content; visually distinguishing the selected content from displayed content that is not selected; displaying a command display area adjacent to the selected content on the touch screen display, wherein the command display area includes one or more command icons; detecting activation of a command icon in the command display area; and, in response to detecting activation of the command icon in the command display area, performing a corresponding action with respect to the selected content.

In accordance with some embodiments, a computer readable storage medium has stored therein instructions which when executed by a multifunction device with a touch screen display, cause the device to: display content on the touch screen display, wherein the displayed content includes selected content; visually distinguish the selected content from displayed content that is not selected; display a command display area adjacent to the selected content on the touch screen display, wherein the command display area includes one or more command icons; detect activation of a command icon in the command display area; and, in response to detecting activation of the command icon in the command display area, perform a corresponding action with respect to the selected content.

In accordance with some embodiments, a multifunction device includes: a touch screen display; means for displaying content on the touch screen display, wherein the displayed content includes selected content; means for visually distinguishing the selected content from displayed content that is not selected; means for displaying a command display area adjacent to the selected content on the touch screen display, wherein the command display area includes one or more command icons; means for detecting activation of a command icon in the command display area; and, in response to detecting activation of the command icon in the command display area, means for performing a corresponding action with respect to the selected content.

In accordance with some embodiments, a computer-implemented method is performed at a multifunction device with a touch screen display. The computer-implemented method includes: displaying a user interface element that contains content, wherein the content includes selected content; visually distinguishing the selected content from displayed content that is not selected; displaying a command display area element that includes one or more command icons, wherein: the command display area element is displayed in front of other elements in the user interface, including the user interface element displaying content; and activation of a command icon initiates performance of a corresponding action with respect to the selected content; and displaying one or more predefined priority elements in front of which the command display area element cannot be displayed.

In accordance with some embodiments, a graphical user interface on a multifunction device with a touch screen display, a memory, and one or more processors to execute one or more programs stored in the memory includes a user interface element that contains content, wherein the content includes selected content, a command display area element that includes one or more command icons, and one or more predefined priority elements in front of which the command display area element cannot be displayed; wherein: the selected content is visually distinguished from displayed content that is not selected; the command display area element is displayed in front of other elements in the user interface, including the user interface element displaying content; and activation of a command icon initiates performance of a corresponding action with respect to the selected content.

In accordance with some embodiments, a multifunction device includes a touch screen display, one or more processors, memory, and one or more programs. The one or more programs are stored in the memory and configured to be executed by the one or more processors. The one or more programs include instructions for displaying a user interface element that contains content, wherein the content includes selected content; visually distinguishing the selected content from displayed content that is not selected; displaying a command display area element that includes one or more command icons, wherein: the command display area element is displayed in front of other elements in the user interface, including the user interface element displaying content; and activation of a command icon initiates performance of a corresponding action with respect to the selected content; and displaying one or more predefined priority elements in front of which the command display area element cannot be displayed.

In accordance with some embodiments, a computer readable storage medium has stored therein instructions which when executed by a multifunction device with a touch screen display, cause the device to: display a user interface element that contains content, wherein the content includes selected content; visually distinguish the selected content from displayed content that is not selected; display a command display area element that includes one or more command icons, wherein: the command display area element is displayed in front of other elements in the user interface, including the user interface element displaying content; and activation of a command icon initiates performance of a corresponding action with respect to the selected content; and display one or more predefined priority elements in front of which the command display area element cannot be displayed.

In accordance with some embodiments, a multifunction device includes: a touch screen display; means for displaying a user interface element that contains content, wherein the content includes selected content; means for visually distinguishing the selected content from displayed content that is not selected; means for displaying a command display area element that includes one or more command icons, wherein: the command display area element is displayed in front of other elements in the user interface, including the user interface element displaying content; and activation of a command icon initiates performance of a corresponding action with respect to the selected content; and means for displaying one or more predefined priority elements in front of which the command display area element cannot be displayed.

In accordance with some embodiments, a computer-implemented method is performed at a multifunction device with a touch screen display. The computer-implemented method includes: displaying content on the touch screen display at a first magnification, wherein the content includes selected content; detecting a finger contact on a respective end of the selected content; displaying a content magnifier adjacent to the respective end of the selected content, wherein the content magnifier displays: an expanded portion of the content proximate to the respective end of the selected content at a second magnification that is greater than the first magnification, and a boundary marker that denotes a current position of the respective end of the selected content; detecting movement of the finger contact across the touch screen display; updating the respective end of the selected content and the displayed expanded portion of the content proximate to the respective end at the second magnification in accordance with the movement of the finger contact; and moving the content magnifier and the boundary marker in accordance with the movement of the finger contact.

In accordance with some embodiments, a graphical user interface on a multifunction device with a touch screen display, a memory, and one or more processors to execute one or more programs stored in the memory includes content at a first magnification, the content including selected content, and a content magnifier; wherein: a finger contact is detected on a respective end of the selected content; the content magnifier is displayed adjacent to the respective end of the selected content; the content magnifier displays: an expanded portion of the content proximate to the respective end of the selected content at a second magnification that is greater than the first magnification, and a boundary marker that denotes a current position of the respective end of the selected content; the respective end of the selected content and the displayed expanded portion of the content proximate to the respective end at the second magnification are updated in accordance with movement of the finger contact across the touch screen display; and the content magnifier and the boundary marker are moved in accordance with the movement of the finger contact.

In accordance with some embodiments, a multifunction device includes a touch screen display, one or more processors, memory, and one or more programs. The one or more programs are stored in the memory and configured to be executed by the one or more processors. The one or more programs include instructions for displaying content on the touch screen display at a first magnification, wherein the content includes selected content; detecting a finger contact on a respective end of the selected content; displaying a content magnifier adjacent to the respective end of the selected content, wherein the content magnifier displays: an expanded portion of the content proximate to the respective end of the selected content at a second magnification that is greater than the first magnification, and a boundary marker that denotes a current position of the respective end of the selected content; detecting movement of the finger contact across the touch screen display; updating the respective end of the selected content and the displayed expanded portion of the content proximate to the respective end at the second magnification in accordance with the movement of the finger contact; and moving the content magnifier and the boundary marker in accordance with the movement of the finger contact.

In accordance with some embodiments, a computer readable storage medium has stored therein instructions which when executed by a multifunction device with a touch screen display, cause the device to: display content on the touch screen display at a first magnification, wherein the content includes selected content; detect a finger contact on a respective end of the selected content; display a content magnifier adjacent to the respective end of the selected content, wherein the content magnifier displays: an expanded portion of the content proximate to the respective end of the selected content at a second magnification that is greater than the first magnification, and a boundary marker that denotes a current position of the respective end of the selected content; detect movement of the finger contact across the touch screen display; update the respective end of the selected content and the displayed expanded portion of the content proximate to the respective end at the second magnification in accordance with the movement of the finger contact; and move the content magnifier and the boundary marker in accordance with the movement of the finger contact.

In accordance with some embodiments, a multifunction device includes: a touch screen display; means for displaying content on the touch screen display at a first magnification, wherein the content includes selected content; means for detecting a finger contact on a respective end of the selected content; means for displaying a content magnifier adjacent to the respective end of the selected content, wherein the content magnifier displays: an expanded portion of the content proximate to the respective end of the selected content at a second magnification that is greater than the first magnification, and a boundary marker that denotes a current position of the respective end of the selected content; means for detecting movement of the finger contact across the touch screen display; means for updating the respective end of the selected content and the displayed expanded portion of the content proximate to the respective end at the second magnification in accordance with the movement of the finger contact; and means for moving the content magnifier and the boundary marker in accordance with the movement of the finger contact.

In accordance with some embodiments, a computer-implemented method is performed at a multifunction device with a touch screen display. The computer-implemented method includes: displaying at least a portion of a structured electronic document on the touch screen display, wherein the structured electronic document comprises a plurality of boxes of content; detecting a finger gesture on a first box of content in the plurality of boxes of content; in response to detecting the finger gesture on the first box of content in the plurality of boxes of content: selecting the first box of content; and visually distinguishing the selected first box of content from content on the touch screen display that is not selected; detecting a finger contact on the selected first box of content; detecting movement of the finger contact to a location outside the selected first box of content; detecting lift off of the finger contact at the location outside the selected first box of content; and selecting one or more additional boxes of content in the plurality of boxes of content in accordance with the location of the finger contact outside the first box of content.

In accordance with some embodiments, a graphical user interface on a multifunction device with a touch screen display, a memory, and one or more processors to execute one or more programs stored in the memory includes at least a portion of a structured electronic document, the structured electronic document including a plurality of boxes of content; wherein: in response to detecting a finger gesture on a first box of content in the plurality of boxes of content: the first box of content is selected; and the selected first box of content is visually distinguished from content on the touch screen display that is not selected; a finger contact is detected on the selected first box of content; movement of the finger contact to a location outside the selected first box of content is detected; lift off of the finger contact at the location outside the selected first box of content is detected; and one or more additional boxes of content in the plurality of boxes of content are selected in accordance with the location of the finger contact outside the first box of content.

In accordance with some embodiments, a multifunction device includes a touch screen display, one or more processors, memory, and one or more programs. The one or more programs are stored in the memory and configured to be executed by the one or more processors. The one or more programs include instructions for displaying at least a portion of a structured electronic document on the touch screen display, wherein the structured electronic document comprises a plurality of boxes of content; detecting a finger gesture on a first box of content in the plurality of boxes of content; in response to detecting the finger gesture on the first box of content in the plurality of boxes of content: selecting the first box of content; and visually distinguishing the selected first box of content from content on the touch screen display that is not selected; detecting a finger contact on the selected first box of content; detecting movement of the finger contact to a location outside the selected first box of content; detecting lift off of the finger contact at the location outside the selected first box of content; and selecting one or more additional boxes of content in the plurality of boxes of content in accordance with the location of the finger contact outside the first box of content.

In accordance with some embodiments, a computer readable storage medium has stored therein instructions which when executed by a multifunction device with a touch screen display, cause the device to: display at least a portion of a structured electronic document on the touch screen display, wherein the structured electronic document comprises a plurality of boxes of content; detect a finger gesture on a first box of content in the plurality of boxes of content; in response to detecting the finger gesture on the first box of content in the plurality of boxes of content: select the first box of content; and visually distinguish the selected first box of content from content on the touch screen display that is not selected; detect a finger contact on the selected first box of content; detect movement of the finger contact to a location outside the selected first box of content; detect lift off of the finger contact at the location outside the selected first box of content; and select one or more additional boxes of content in the plurality of boxes of content in accordance with the location of the finger contact outside the first box of content.

In accordance with some embodiments, a multifunction device includes: a touch screen display; means for displaying at least a portion of a structured electronic document on the touch screen display, wherein the structured electronic document comprises a plurality of boxes of content; means for detecting a finger gesture on a first box of content in the plurality of boxes of content; in response to detecting the finger gesture on the first box of content in the plurality of boxes of content: means for selecting the first box of content; and means for visually distinguishing the selected first box of content from content on the touch screen display that is not selected; means for detecting a finger contact on the selected first box of content; means for detecting movement of the finger contact to a location outside the selected first box of content; means for detecting lift off of the finger contact at the location outside the selected first box of content; and means for selecting one or more additional boxes of content in the plurality of boxes of content in accordance with the location of the finger contact outside the first box of content.

In accordance with some embodiments, a computer-implemented method is performed at a multifunction device with a touch screen display. The computer-implemented method includes: displaying at least a portion of a structured electronic document on the touch screen display at a first magnification, wherein the structured electronic document comprises a plurality of boxes of content; detecting a first finger gesture on a first box of content in the plurality of boxes of content; in response to detecting the first finger gesture on the first box of content in the plurality of boxes of content: selecting the first box of content; and visually distinguishing the selected first box of content from content on the touch screen display that is not selected; detecting a finger contact on a respective end of the selected first box of content; displaying a content magnifier adjacent to the respective end of the selected first box of content, wherein the content magnifier displays: an expanded portion of the content proximate to the respective end of the selected first box of content at a second magnification that is greater than the first magnification, and a boundary marker that denotes a current position of the respective end of the selected first box of content; detecting movement of the finger contact across the touch screen display within the selected first box of content; updating the respective end of the selected first box of content and the displayed expanded portion of the content proximate to the respective end at the second magnification in accordance with the movement of the finger contact; and moving the content magnifier and the boundary marker in accordance with the movement of the finger contact.

In accordance with some embodiments, a graphical user interface on a multifunction device with a touch screen display, a memory, and one or more processors to execute one or more programs stored in the memory includes at least a portion of a structured electronic document at a first magnification, the structured electronic document comprising a plurality of boxes of content, and a content magnifier; wherein: in response to detecting a first finger gesture on a first box of content in the plurality of boxes of content: the first box of content is selected; and the selected first box of content is visually distinguished from content on the touch screen display that is not selected; a finger contact is detected on a respective end of the selected first box of content; the content magnifier is displayed adjacent to the respective end of the selected first box of content; the content magnifier displays: an expanded portion of the content proximate to the respective end of the selected first box of content at a second magnification that is greater than the first magnification, and a boundary marker that denotes a current position of the respective end of the selected first box of content; movement of the finger contact across the touch screen display within the selected first box of content is detected; the respective end of the selected first box of content and the displayed expanded portion of the content proximate to the respective end at the second magnification are updated in accordance with the movement of the finger contact; and the content magnifier and the boundary marker are moved in accordance with the movement of the finger contact.

In accordance with some embodiments, a multifunction device includes a touch screen display, one or more processors, memory, and one or more programs. The one or more programs are stored in the memory and configured to be executed by the one or more processors. The one or more programs include instructions for displaying at least a portion of a structured electronic document on the touch screen display at a first magnification, wherein the structured electronic document comprises a plurality of boxes of content; detecting a first finger gesture on a first box of content in the plurality of boxes of content; in response to detecting the first finger gesture on the first box of content in the plurality of boxes of content: selecting the first box of content; and visually distinguishing the selected first box of content from content on the touch screen display that is not selected; detecting a finger contact on a respective end of the selected first box of content; displaying a content magnifier adjacent to the respective end of the selected first box of content, wherein the content magnifier displays: an expanded portion of the content proximate to the respective end of the selected first box of content at a second magnification that is greater than the first magnification, and a boundary marker that denotes a current position of the respective end of the selected first box of content; detecting movement of the finger contact across the touch screen display within the selected first box of content; updating the respective end of the selected first box of content and the displayed expanded portion of the content proximate to the respective end at the second magnification in accordance with the movement of the finger contact; and moving the content magnifier and the boundary marker in accordance with the movement of the finger contact.

In accordance with some embodiments, a computer readable storage medium has stored therein instructions which when executed by a multifunction device with a touch screen display, cause the device to: display at least a portion of a structured electronic document on the touch screen display at a first magnification, wherein the structured electronic document comprises a plurality of boxes of content; detect a first finger gesture on a first box of content in the plurality of boxes of content; in response to detecting the first finger gesture on the first box of content in the plurality of boxes of content: select the first box of content; and visually distinguish the selected first box of content from content on the touch screen display that is not selected; detect a finger contact on a respective end of the selected first box of content; display a content magnifier adjacent to the respective end of the selected first box of content, wherein the content magnifier displays: an expanded portion of the content proximate to the respective end of the selected first box of content at a second magnification that is greater than the first magnification, and a boundary marker that denotes a current position of the respective end of the selected first box of content; detect movement of the finger contact across the touch screen display within the selected first box of content; update the respective end of the selected first box of content and the displayed expanded portion of the content proximate to the respective end at the second magnification in accordance with the movement of the finger contact; and move the content magnifier and the boundary marker in accordance with the movement of the finger contact.

In accordance with some embodiments, a multifunction device includes: a touch screen display; means for displaying at least a portion of a structured electronic document on the touch screen display at a first magnification, wherein the structured electronic document comprises a plurality of boxes of content; means for detecting a first finger gesture on a first box of content in the plurality of boxes of content; in response to detecting the first finger gesture on the first box of content in the plurality of boxes of content: means for selecting the first box of content; and means for visually distinguishing the selected first box of content from content on the touch screen display that is not selected; means for detecting a finger contact on a respective end of the selected first box of content; means for displaying a content magnifier adjacent to the respective end of the selected first box of content, wherein the content magnifier displays: an expanded portion of the content proximate to the respective end of the selected first box of content at a second magnification that is greater than the first magnification, and a boundary marker that denotes a current position of the respective end of the selected first box of content; means for detecting movement of the finger contact across the touch screen display within the selected first box of content; means for updating the respective end of the selected first box of content and the displayed expanded portion of the content proximate to the respective end at the second magnification in accordance with the movement of the finger contact; and means for moving the content magnifier and the boundary marker in accordance with the movement of the finger contact.

In accordance with some embodiments, a computer-implemented method is performed at a multifunction device with a touch screen display. The computer-implemented method includes: displaying at least a portion of a structured electronic document on the touch screen display, wherein the structured electronic document comprises a plurality of boxes of content; determining whether the structured electronic document meets one or more predefined document complexity criteria; selecting one or more entire boxes of content in response to one or more finger gestures when the structured electronic document meets at least one predefined document complexity criteria; and selecting a gesture-specified portion of at least one box of content when the structured electronic document does not meet at least one predefined document complexity criteria.

In accordance with some embodiments, a graphical user interface on a multifunction device with a touch screen display, a memory, and one or more processors to execute one or more programs stored in the memory includes at least a portion of a structured electronic document, the structured electronic document comprising a plurality of boxes of content; wherein: whether the structured electronic document meets one or more predefined document complexity criteria is determined; one or more entire boxes of content are selected in response to one or more finger gestures when the structured electronic document meets at least one predefined document complexity criteria; and a gesture-specified portion of at least one box of content is selected when the structured electronic document does not meet at least one predefined document complexity criteria.

In accordance with some embodiments, a multifunction device includes a touch screen display, one or more processors, memory, and one or more programs. The one or more programs are stored in the memory and configured to be executed by the one or more processors. The one or more programs include instructions for displaying at least a portion of a structured electronic document on the touch screen display, wherein the structured electronic document comprises a plurality of boxes of content; determining whether the structured electronic document meets one or more predefined document complexity criteria; selecting one or more entire boxes of content in response to one or more finger gestures when the structured electronic document meets at least one predefined document complexity criteria; and selecting a gesture-specified portion of at least one box of content when the structured electronic document does not meet at least one predefined document complexity criteria.

In accordance with some embodiments, a computer readable storage medium has stored therein instructions which when executed by a multifunction device with a touch screen display, cause the device to: display at least a portion of a structured electronic document on the touch screen display, wherein the structured electronic document comprises a plurality of boxes of content; determine whether the structured electronic document meets one or more predefined document complexity criteria; select one or more entire boxes of content in response to one or more finger gestures when the structured electronic document meets at least one predefined document complexity criteria; and select a gesture-specified portion of at least one box of content when the structured electronic document does not meet at least one predefined document complexity criteria.

In accordance with some embodiments, a multifunction device includes: a touch screen display; means for displaying at least a portion of a structured electronic document on the touch screen display, wherein the structured electronic document comprises a plurality of boxes of content; means for determining whether the structured electronic document meets one or more predefined document complexity criteria; means for selecting one or more entire boxes of content in response to one or more finger gestures when the structured electronic document meets at least one predefined document complexity criteria; and means for selecting a gesture-specified portion of at least one box of content when the structured electronic document does not meet at least one predefined document complexity criteria.

Thus, multifunction devices with touch screen displays are provided with faster, more efficient methods and interfaces for editing content, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 13A-13G are flow diagrams illustrating a method of selecting content with finger gestures in accordance with some embodiments.

FIGS. 14A-14D are flow diagrams illustrating a method of using a command display area for selected content in accordance with some embodiments.

FIGS. 16A-16E are flow diagrams illustrating a method of updating a respective end of selected content with a content magnifier in accordance with some embodiments.

FIGS. 17A-17B are flow diagrams illustrating a method of selecting content in structured electronic documents in accordance with some embodiments.

FIG. 19 is a flow diagram illustrating a method of selecting content in structured electronic documents based on document complexity criteria in accordance with some embodiments.

DESCRIPTION OF EMBODIMENTS

Figure 1A:
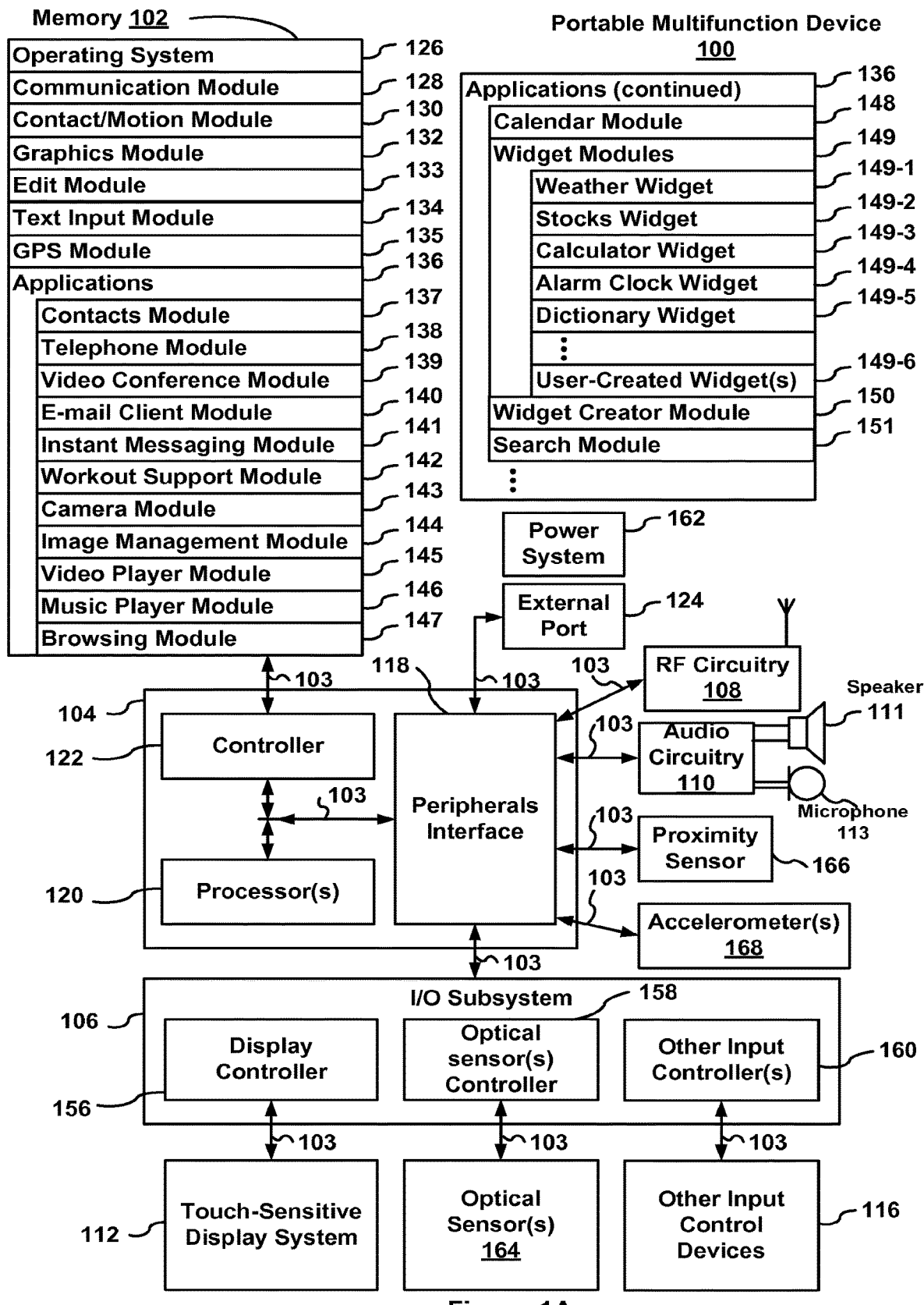
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
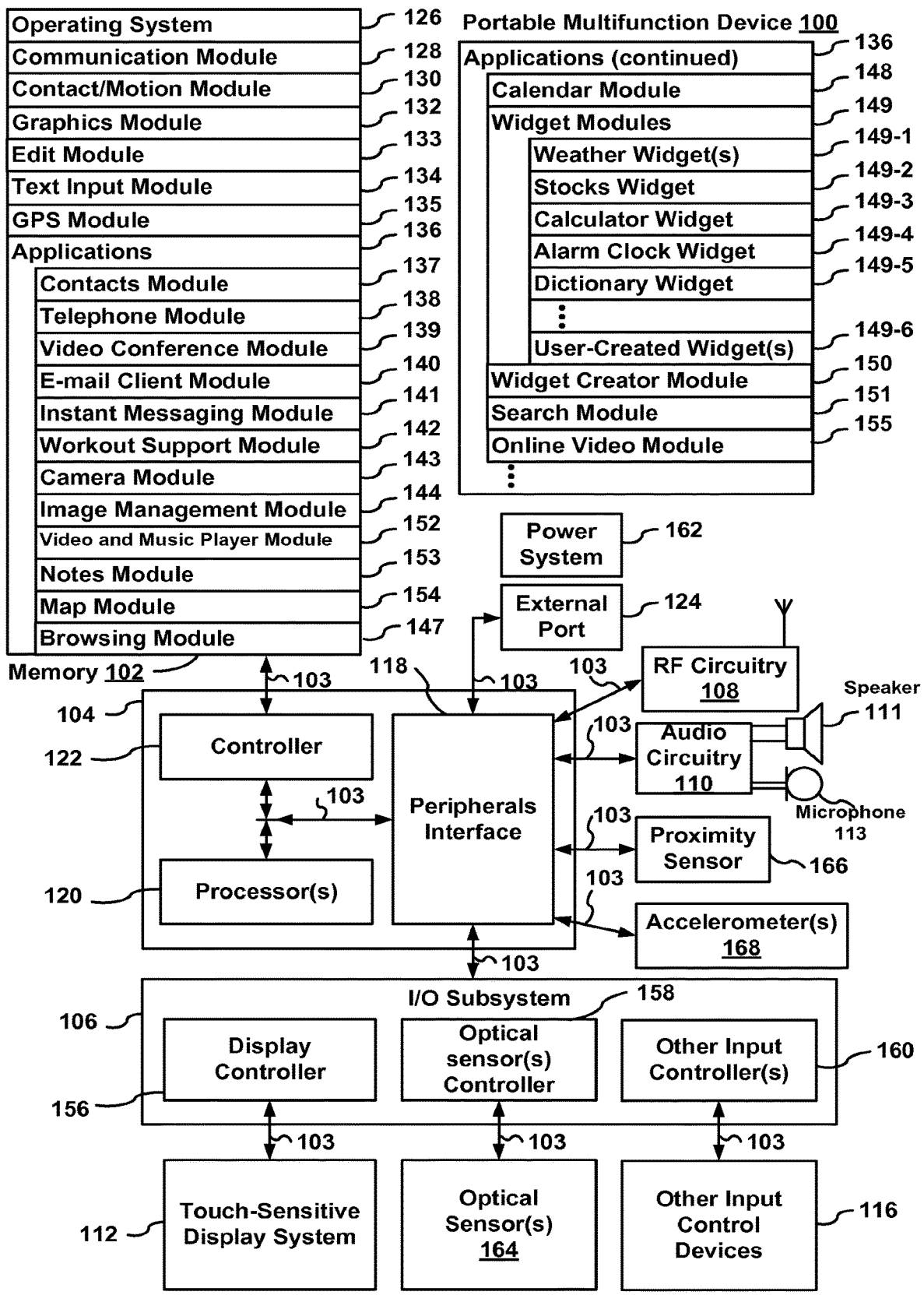

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No.

11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods and Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, an edit module (or set of instructions) 133, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The edit module 133, which may be a component of text input module 134, provides for cut, copy, paste, and other functions related to user-selected content in various applications (e.g., contacts 137, e-mail 140, IM 141, browser 147, calendar 148, search module 151, and any other application that needs to select and edit content).

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;

a video conferencing module 139;
an e-mail client module 140;
an instant messaging (IM) module 141;
a workout support module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, edit module 133, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, edit module 133, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, edit module 133, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, edit module 133, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, edit module 133, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, edit module 133, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, edit module 133, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, edit module 133, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, edit module 133, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, edit module 133, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, edit module 133, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, edit module 133, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, edit module 133, and text input module 134, the notes module 153 may be used to create and manage notes, to do lists, and the like.

In conjunction with RF circuitry 108, touch screen 112, display system controller 156, contact module 130, graphics module 132, edit module 133, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, edit module 133, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
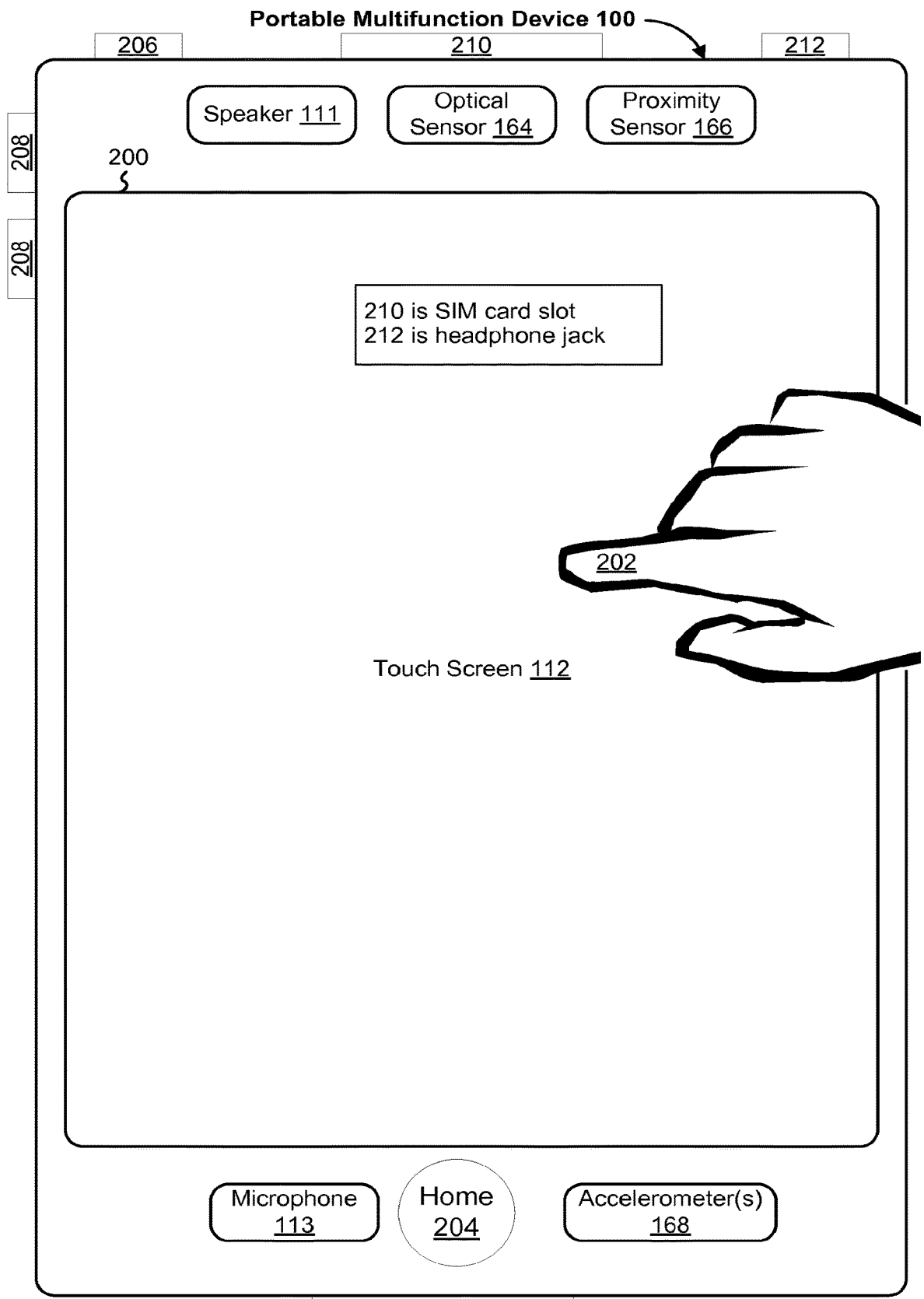
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/ charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
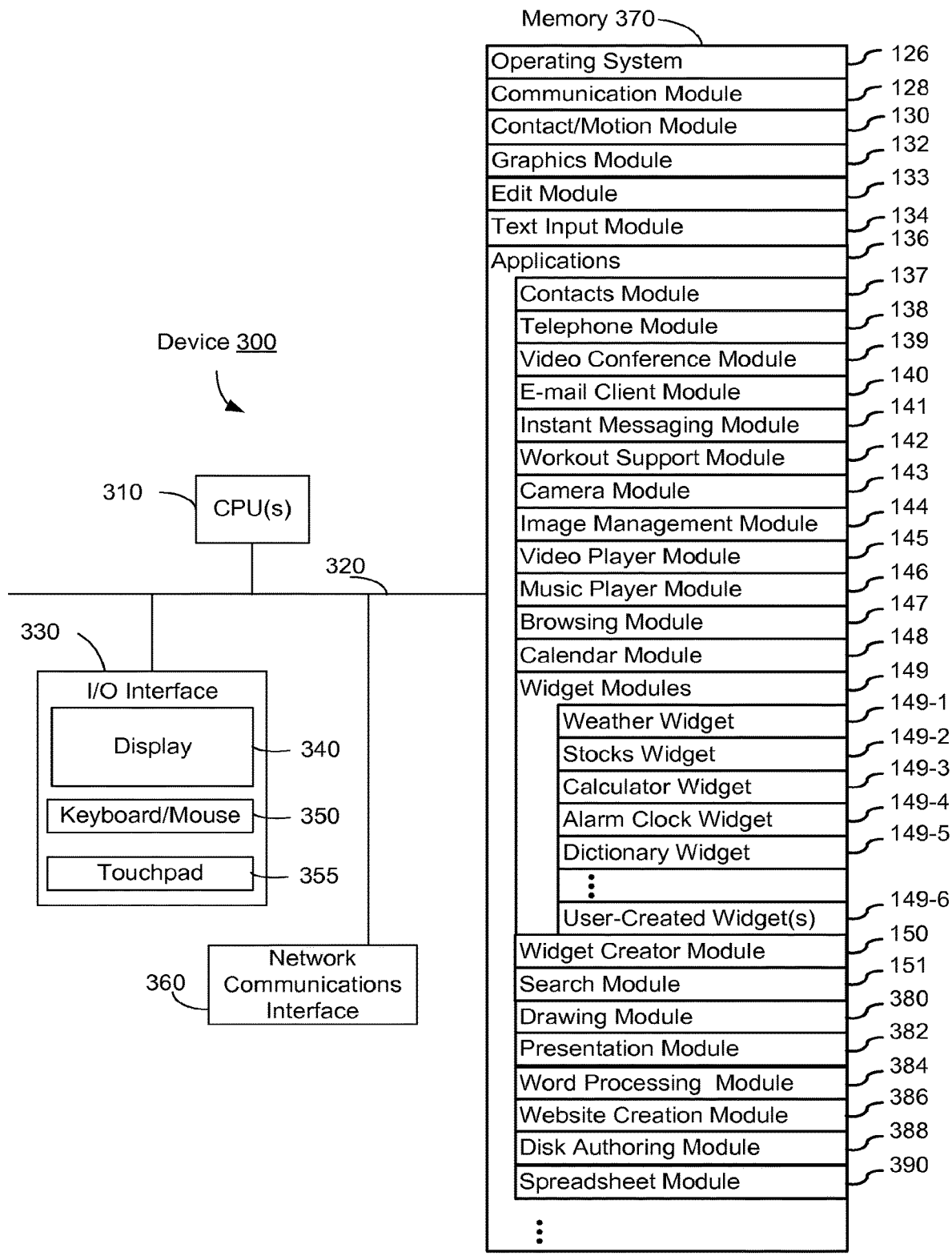
FIG. 3 is a block diagram of an exemplary multifunction device in accordance with some embodiments.

FIG. 3 is a block diagram of an exemplary multifunction device in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
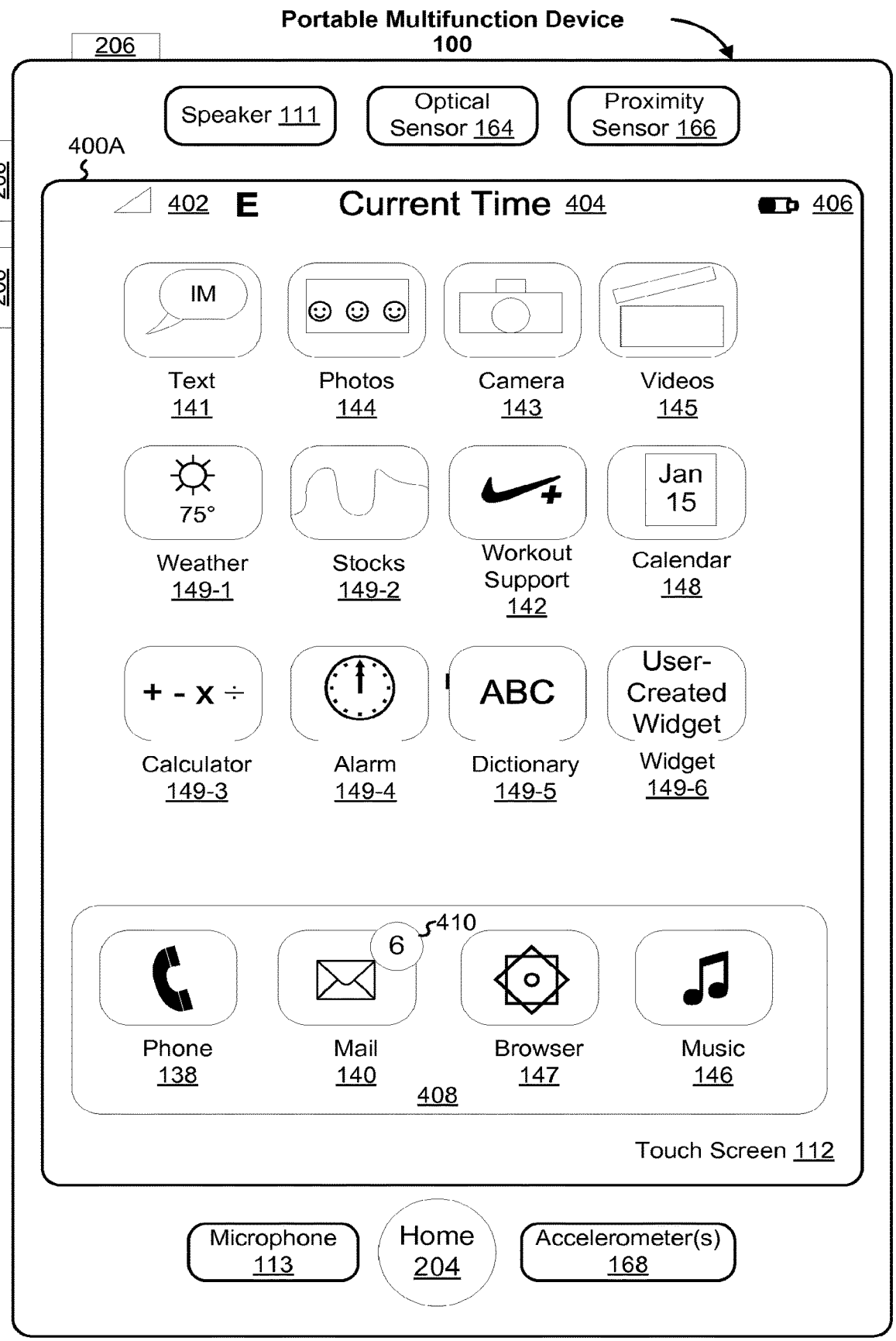
FIGS. 4A and 4B illustrate exemplary user interfaces for a menu of applications on a portable multifunction device in accordance with some embodiments.
Figure 4B:
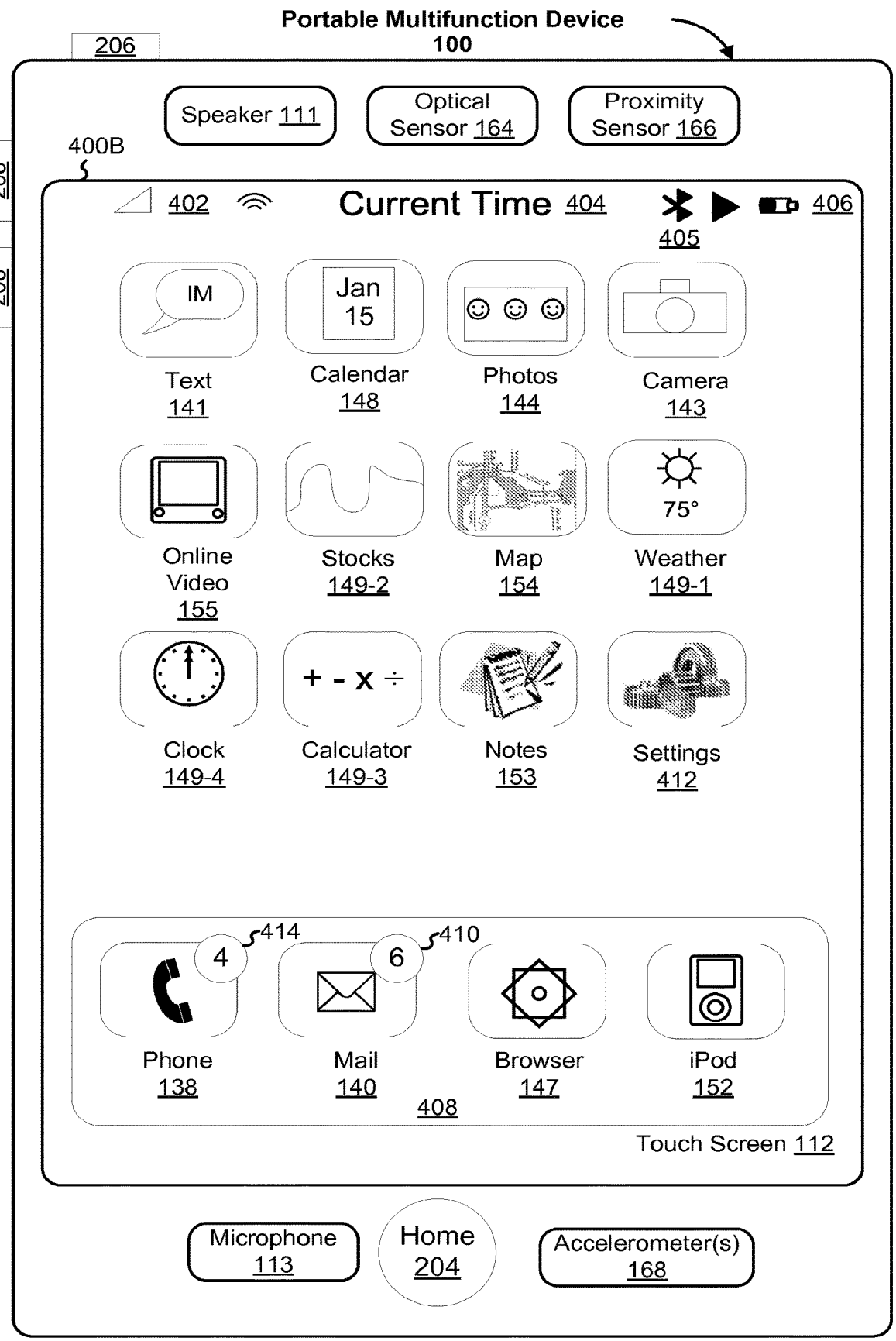

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
    Time 404;
    Bluetooth indicator 405;
    Battery status indicator 406;
    Tray 408 with icons for frequently used applications, such as:
        Phone 138, which may include an indicator 414 of the number of missed calls or voicemail messages;
        E-mail client 140, which may include an indicator 410 of the number of unread e-mails;
        Browser 147;
        Music player 146; and
    Icons for other applications, such as:
        IM 141;
        Image management 144;
        Camera 143;
        Video player 145;
        Weather 149-1;
        Stocks 149-2;
        Workout support 142;
        Calendar 148;
        Calculator 149-3;
        Alarm clock 149-4;
        Dictionary 149-5; and
        User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
    Map 154;
    Notes 153;
    Settings 412, which provides access to settings for the device 100 and its various applications 136, as described further below;
    Video and music player module 152, also referred to as iPod (trademark of Apple Computer, Inc.) module 152; and
    Online video module 155, also referred to as YouTube (trademark of Google, Inc.) module 155.

Attention is now directed towards embodiments of user interfaces ("UI") and associated processes that may be implemented on a multifunction device with a touch screen display, such as device 300 or portable multifunction device 100.

Figure 5A:
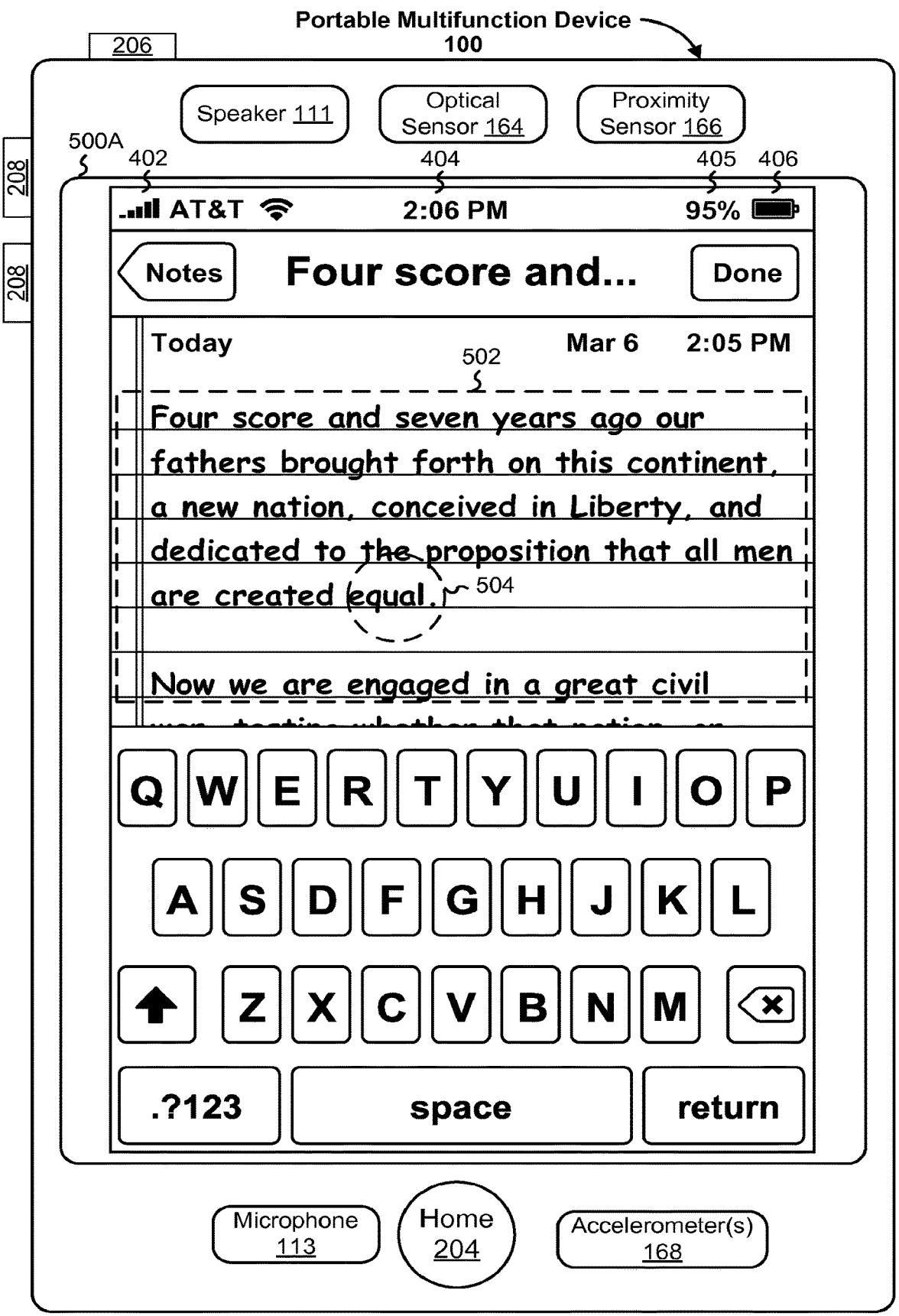
FIGS. 5A-5QQ illustrate exemplary user interfaces for selecting content on a multifunction device with a touch screen display in accordance with some embodiments.
Figure 5B:
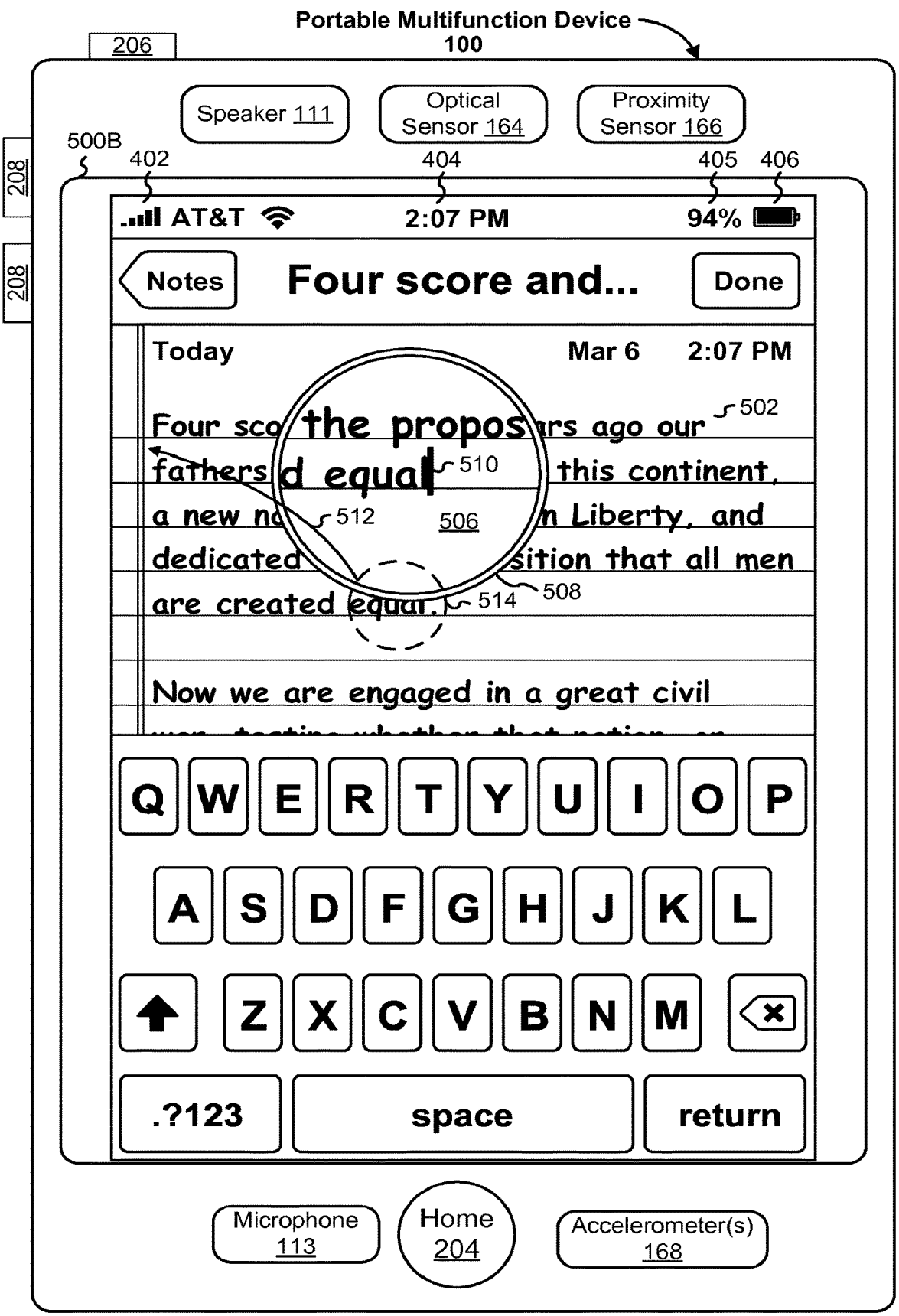
Figure 5C:
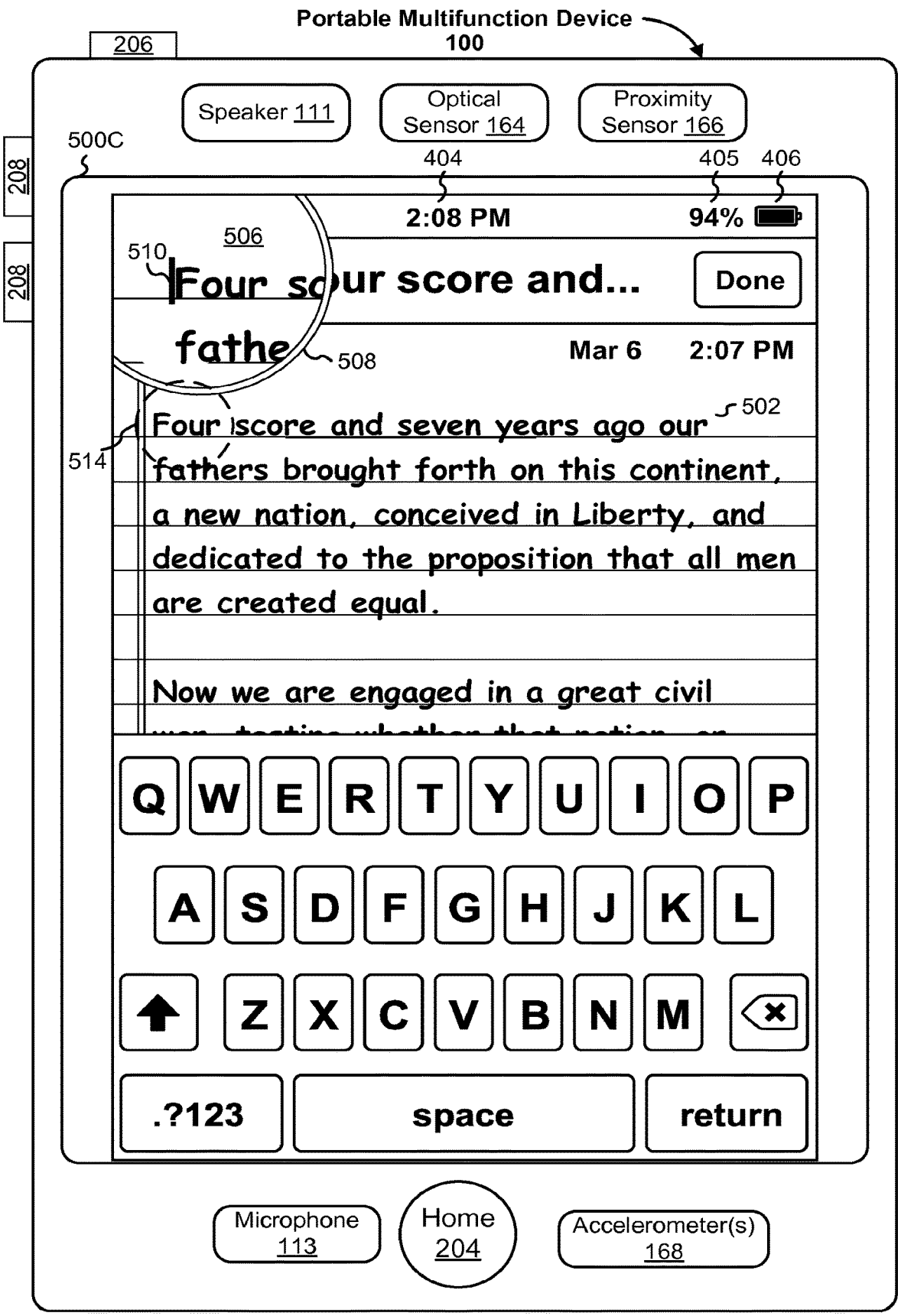
Figure 5D:
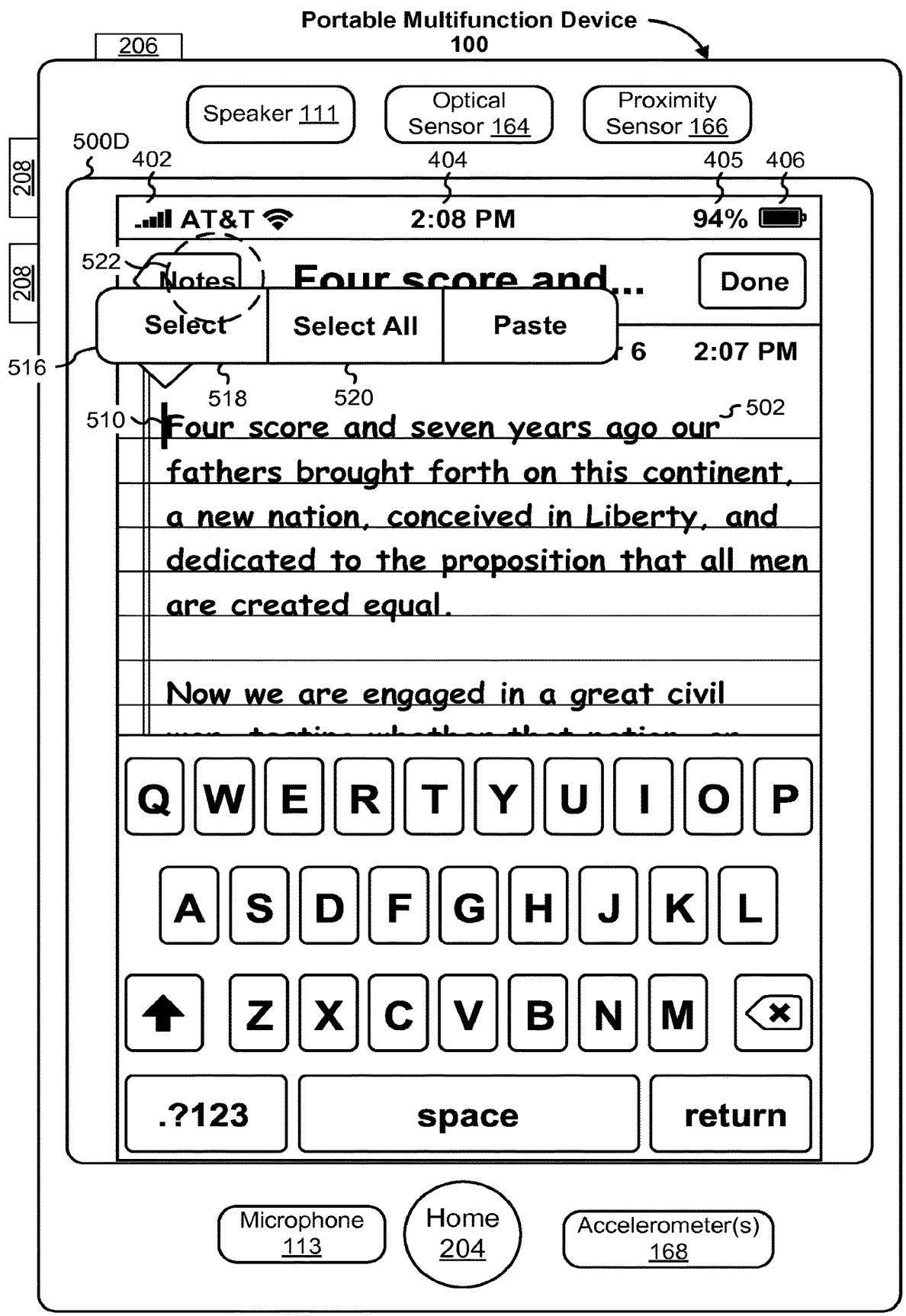
Figure 5E:
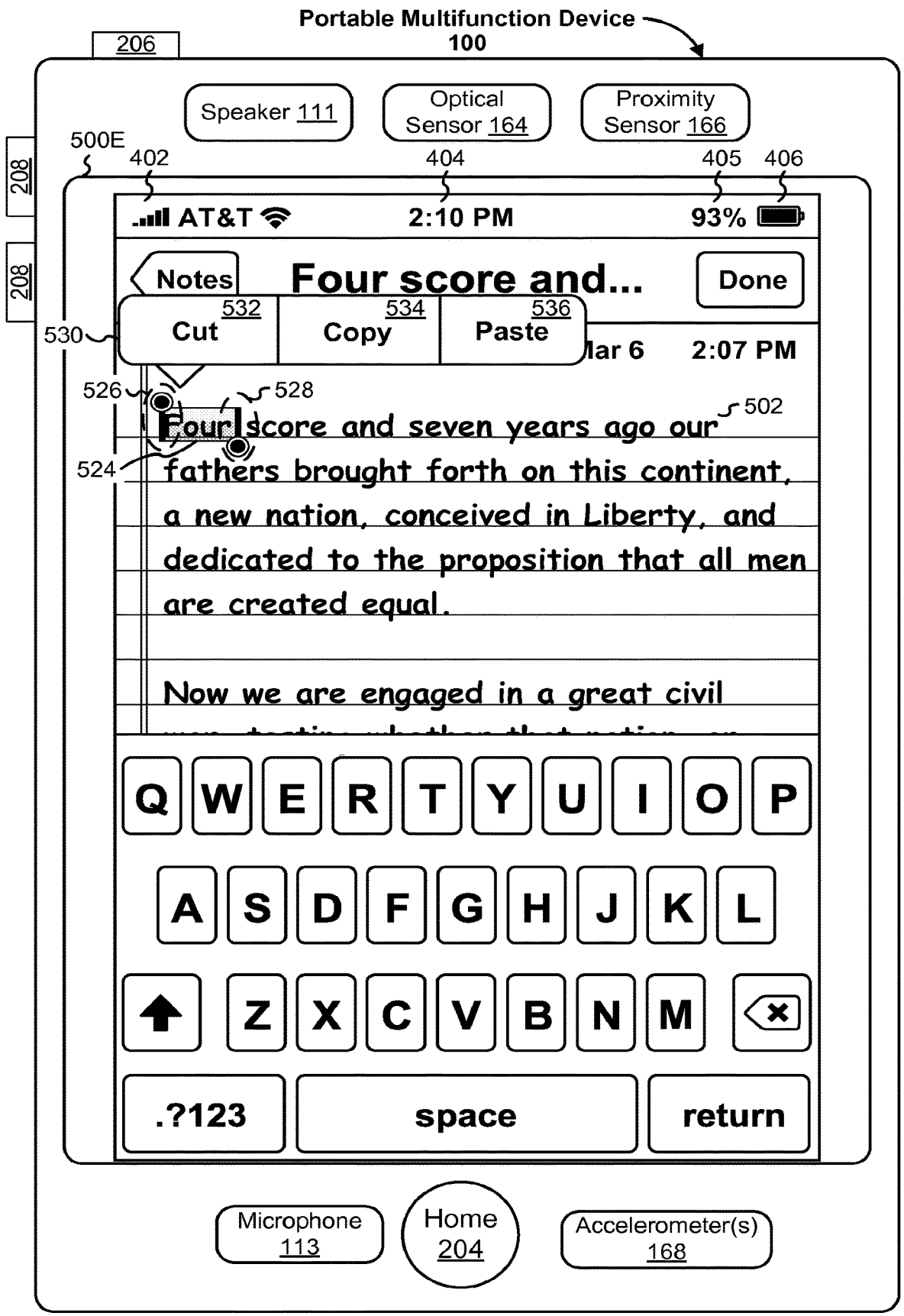
Figure 5F:
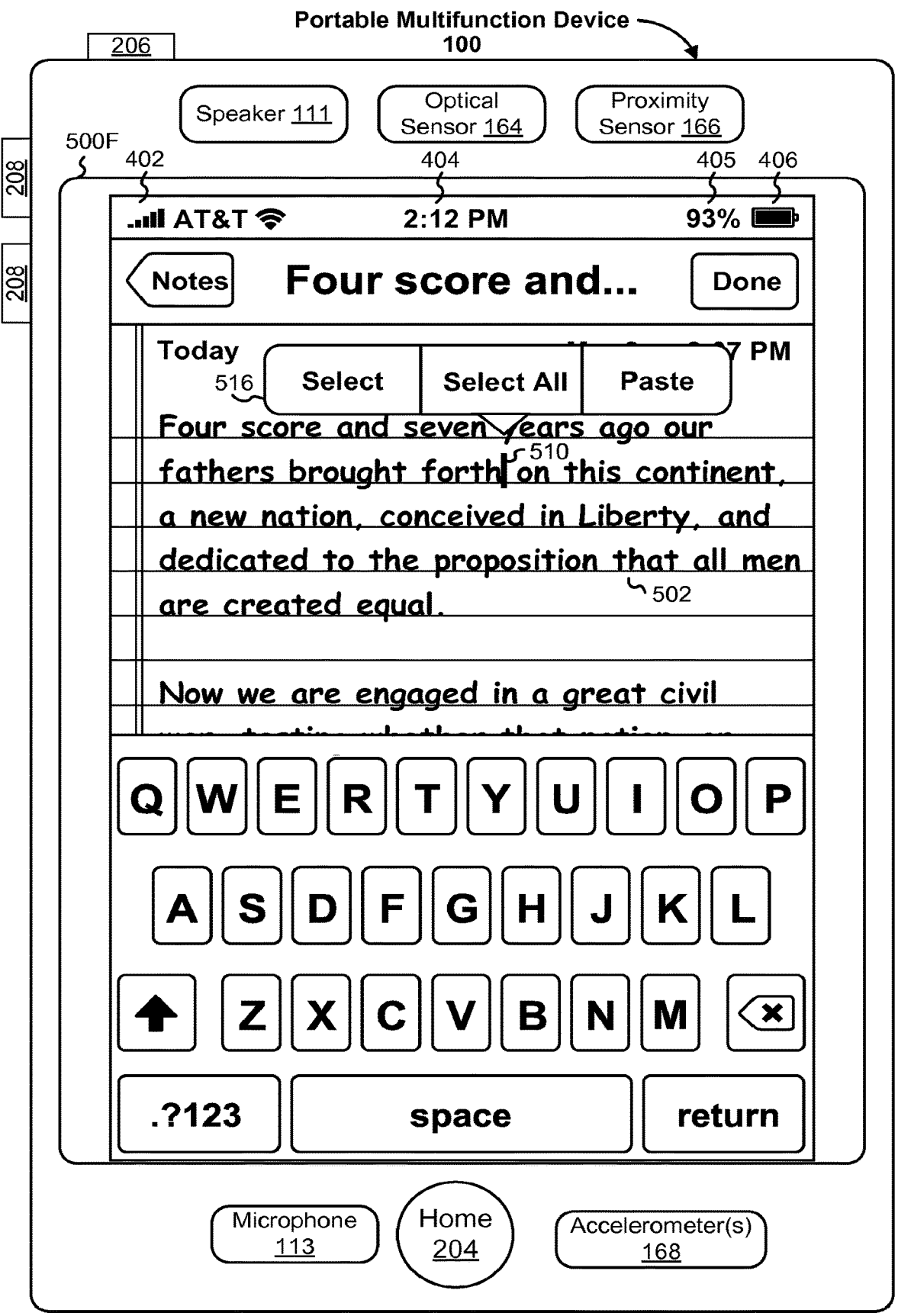
Figure 5G:
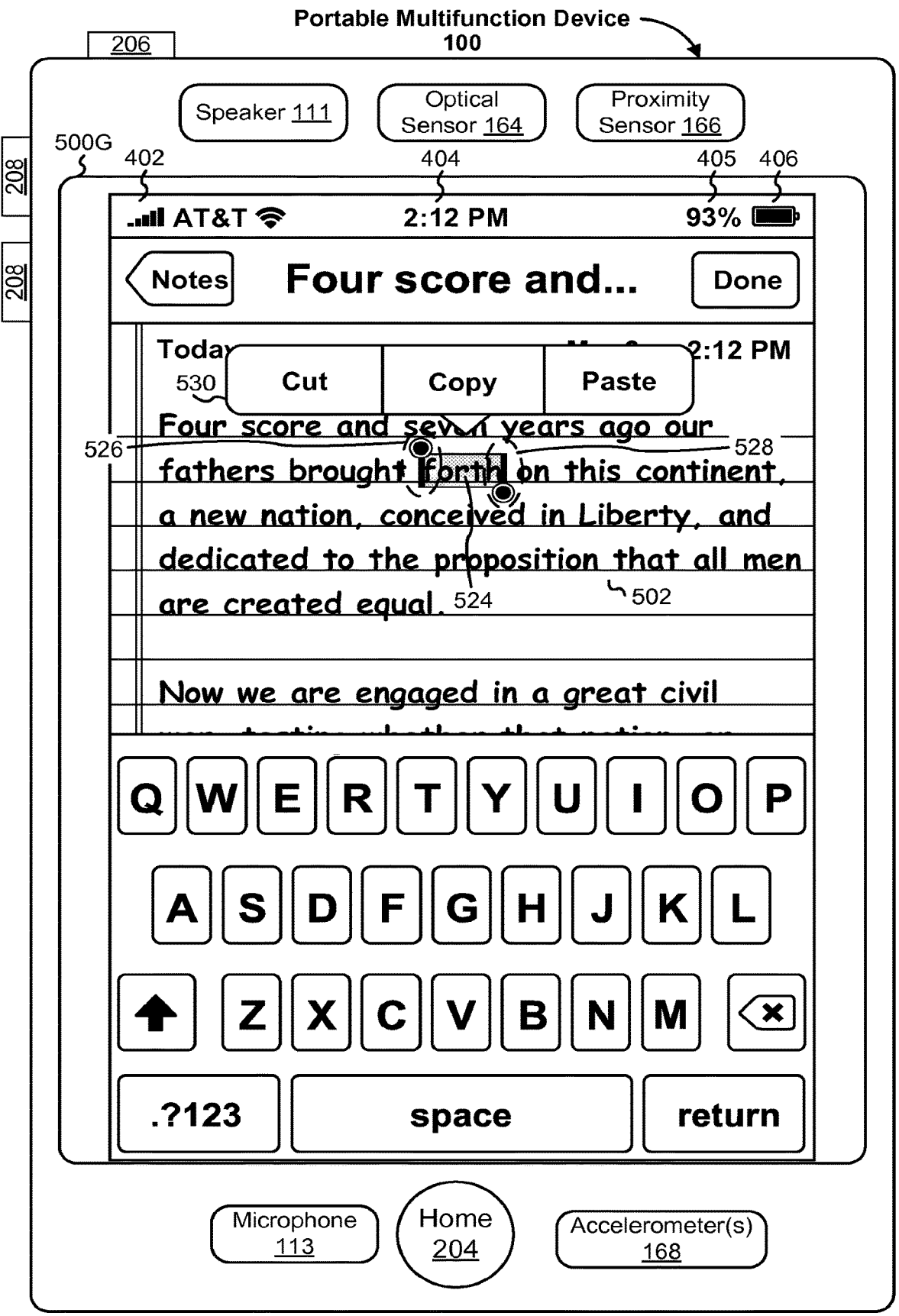
Figure 5H:
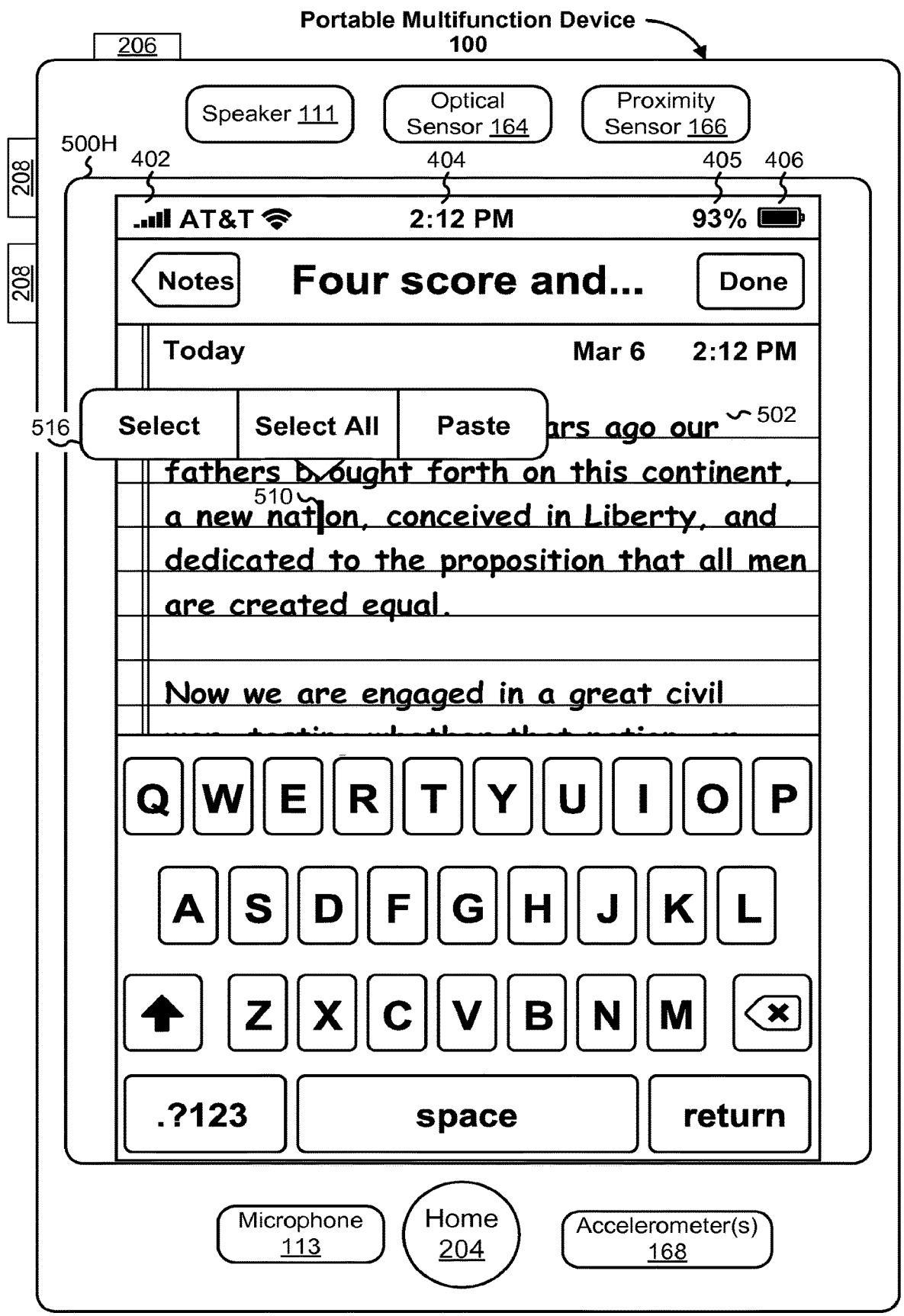
Figure 5I:
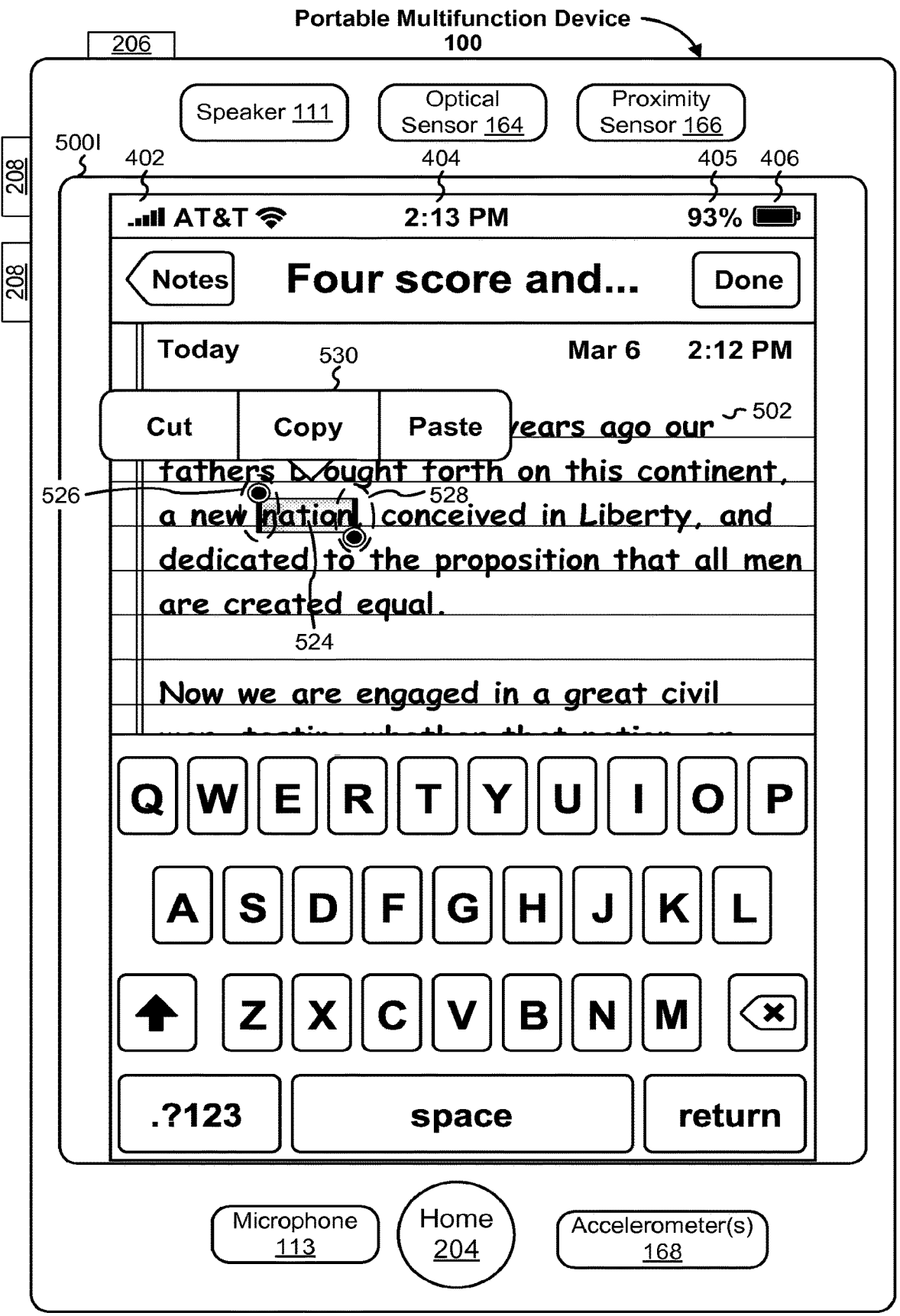
Figure 5J:
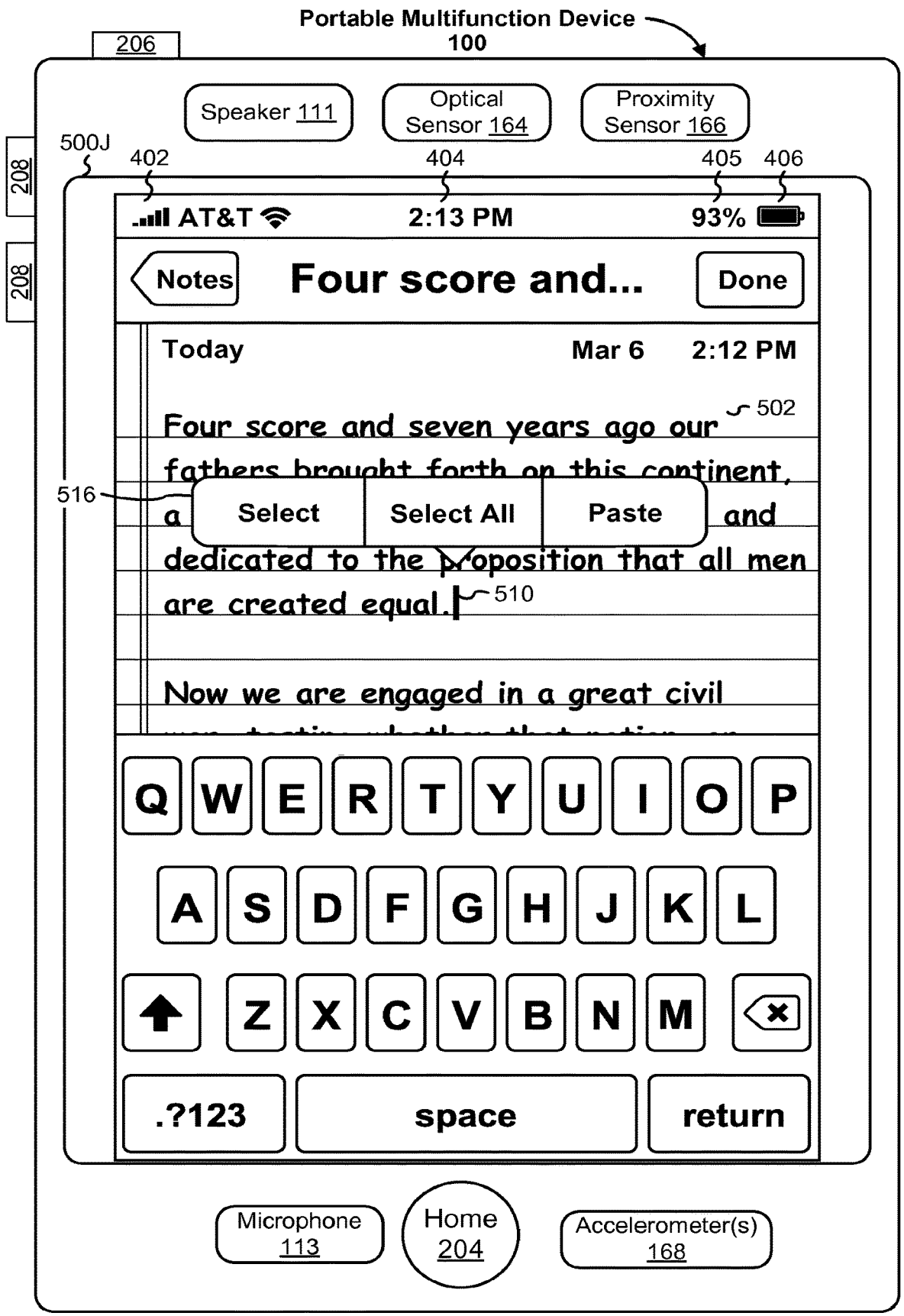
Figure 5K:
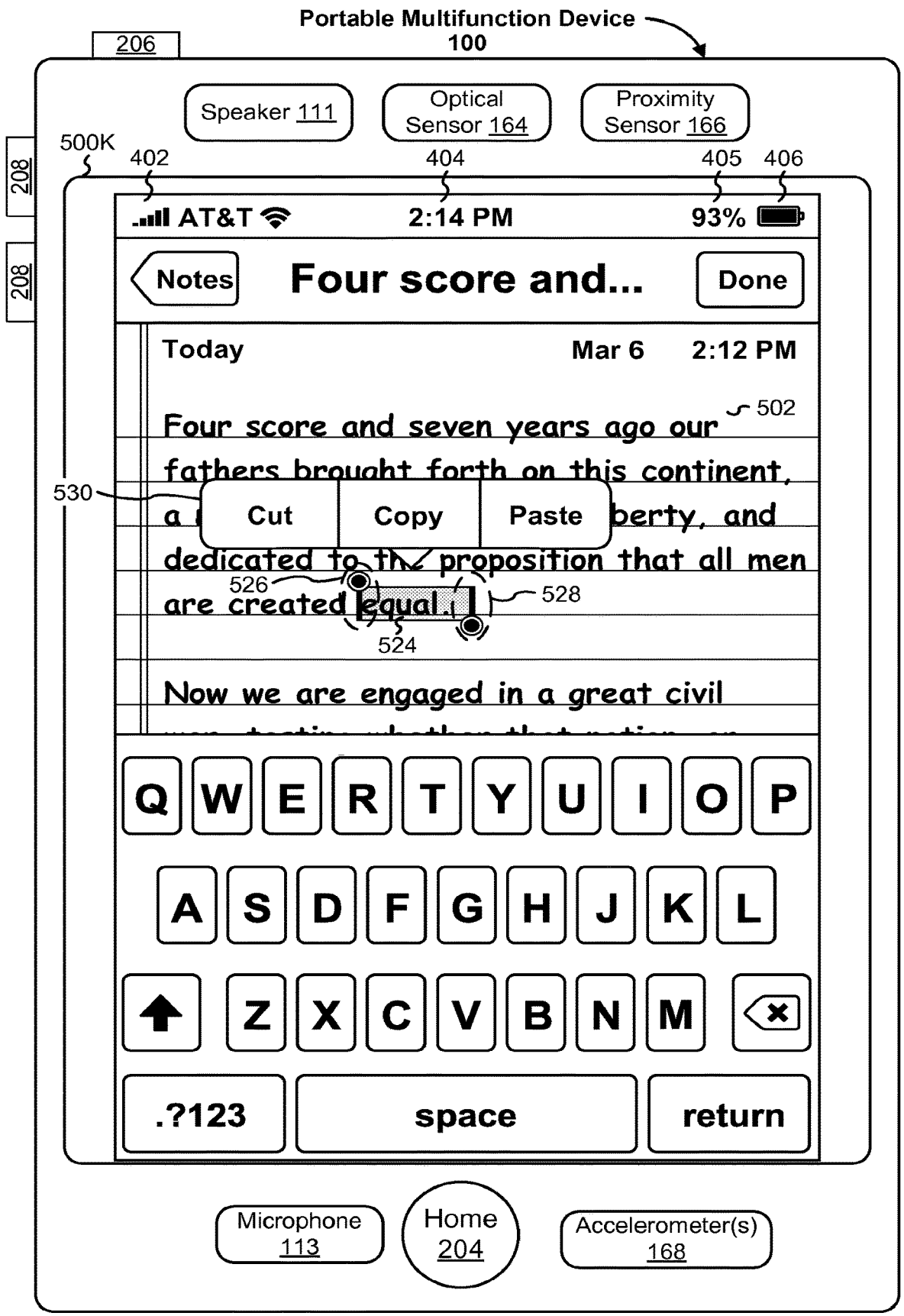
Figure 5L:
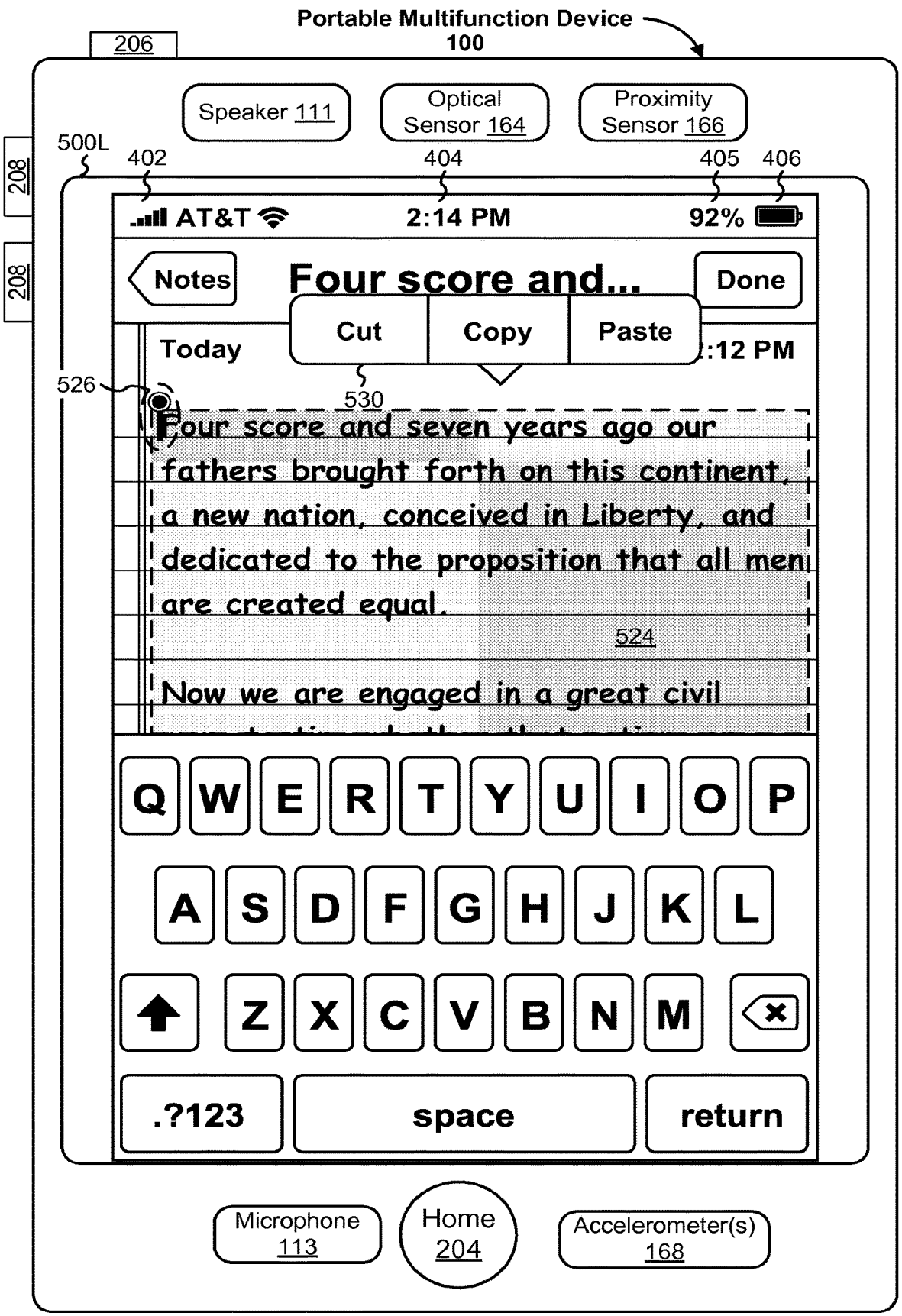
Figure 5M:
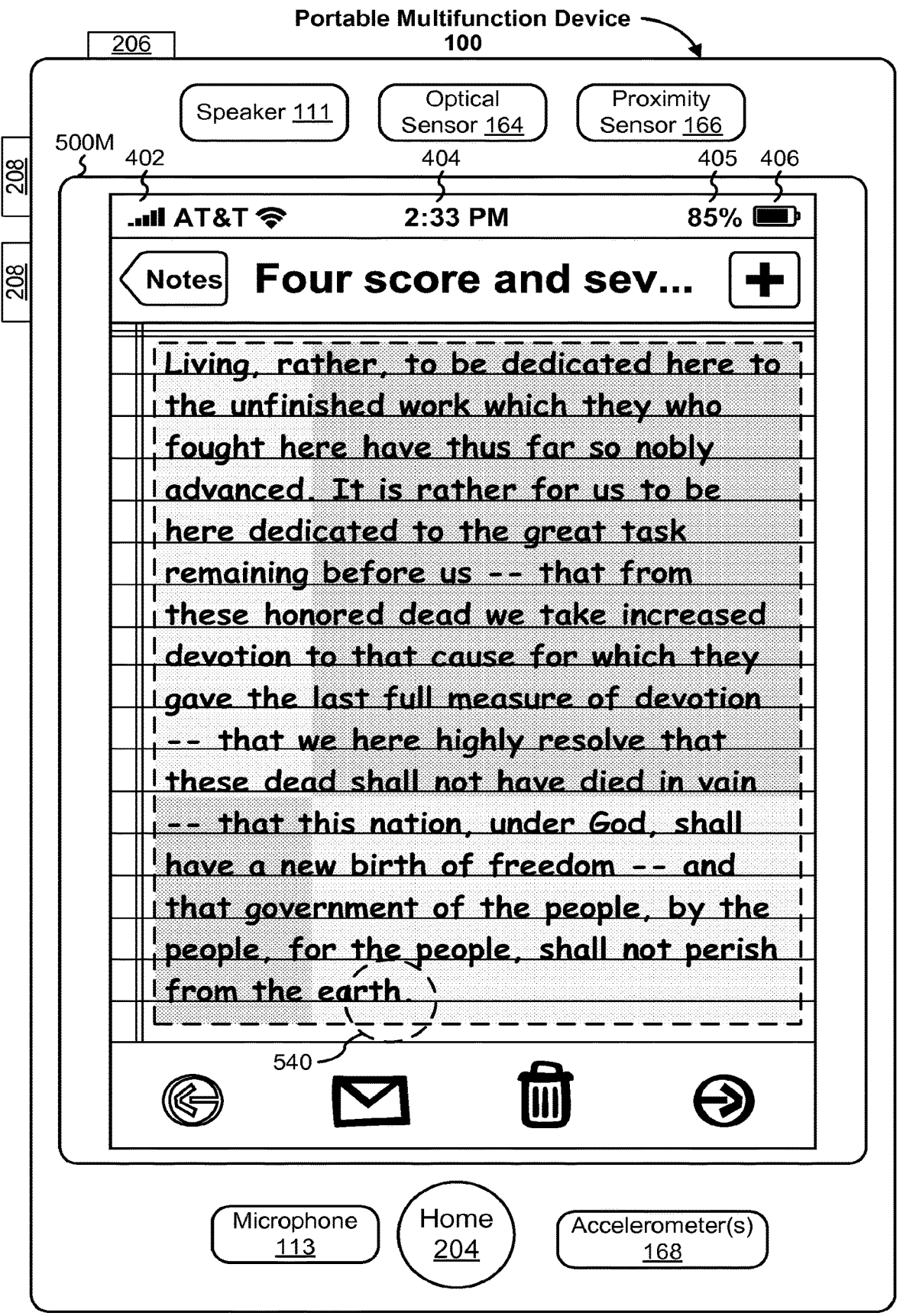
Figure 5N:
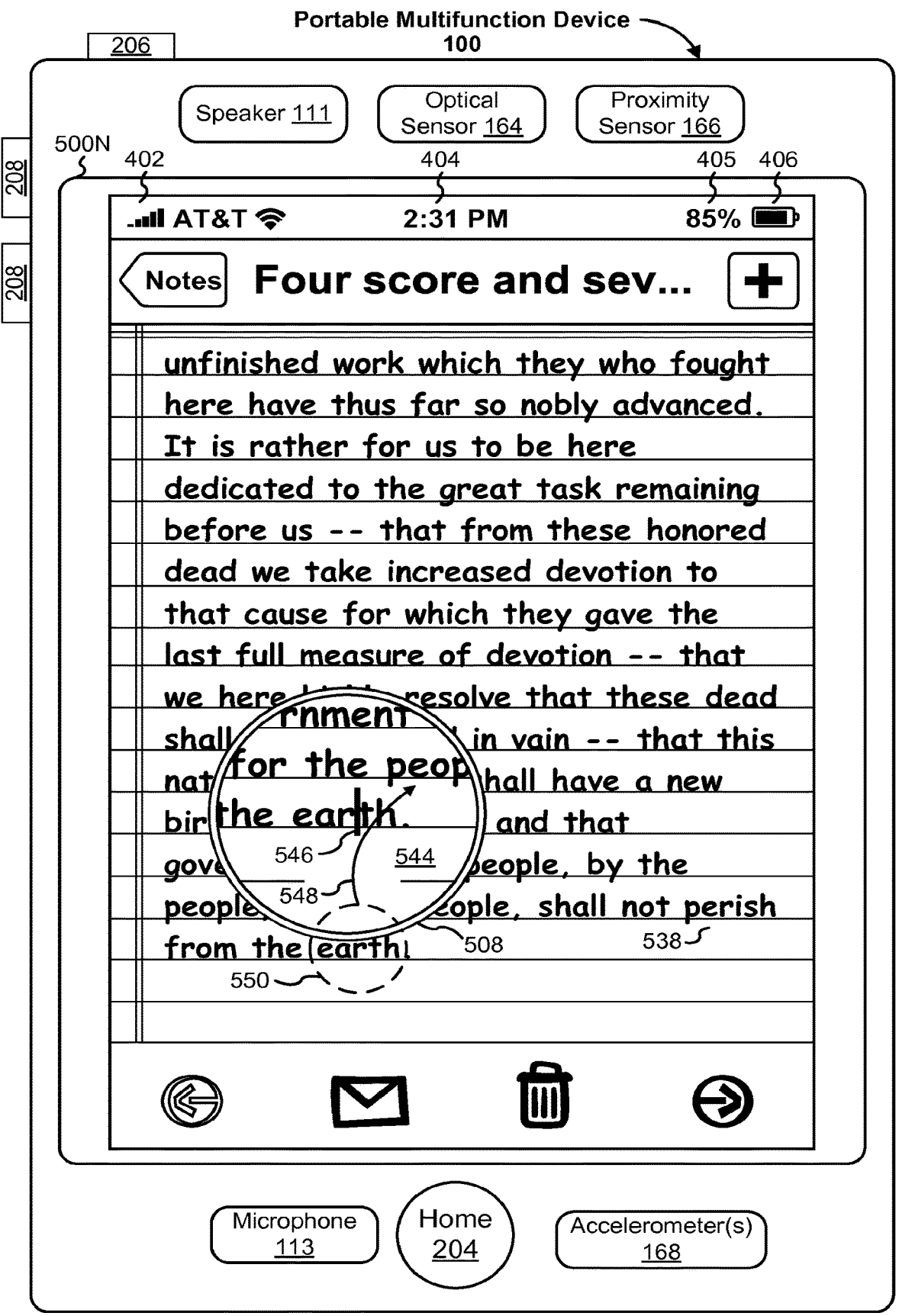
Figure 5O:
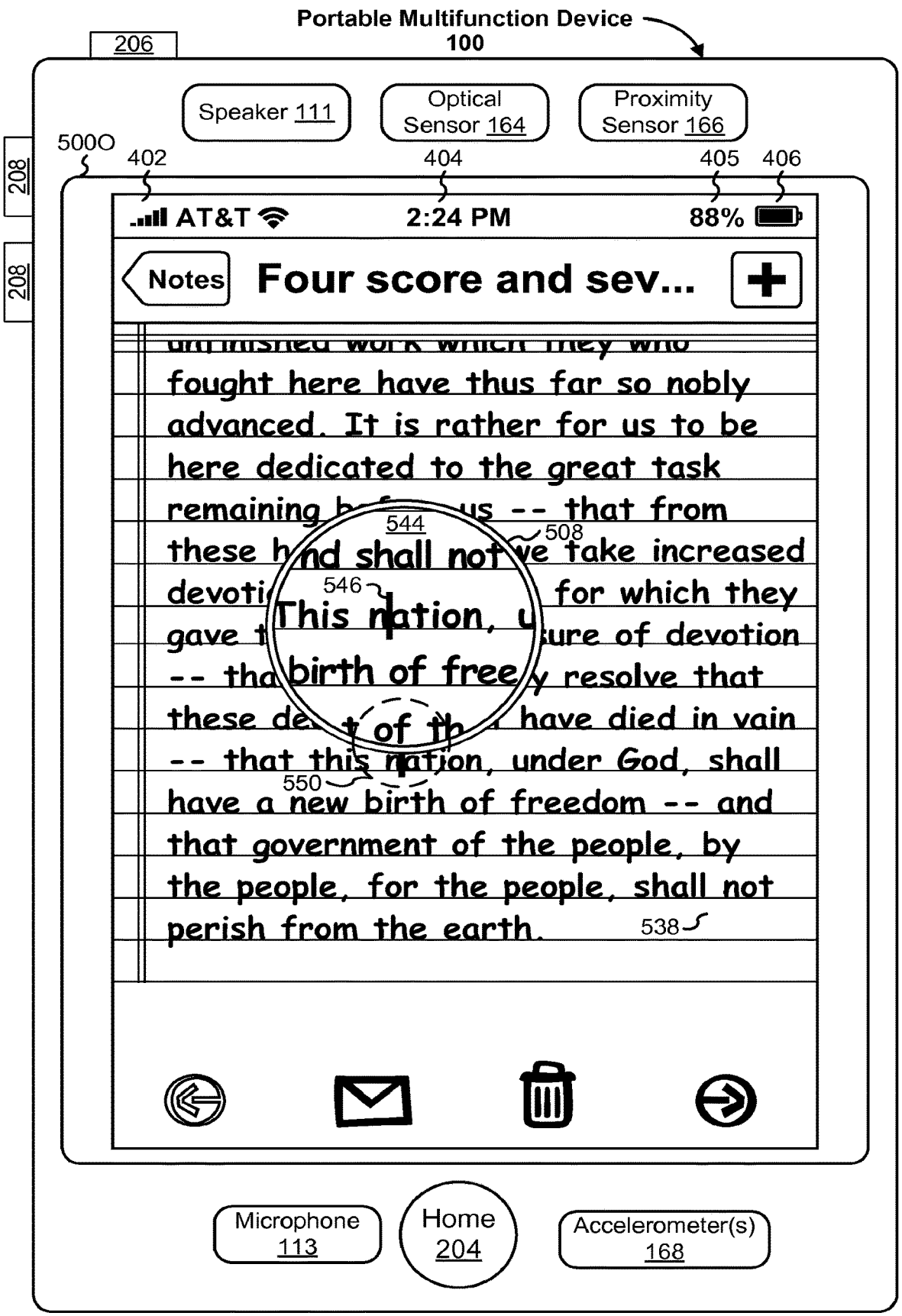
Figure 5P:
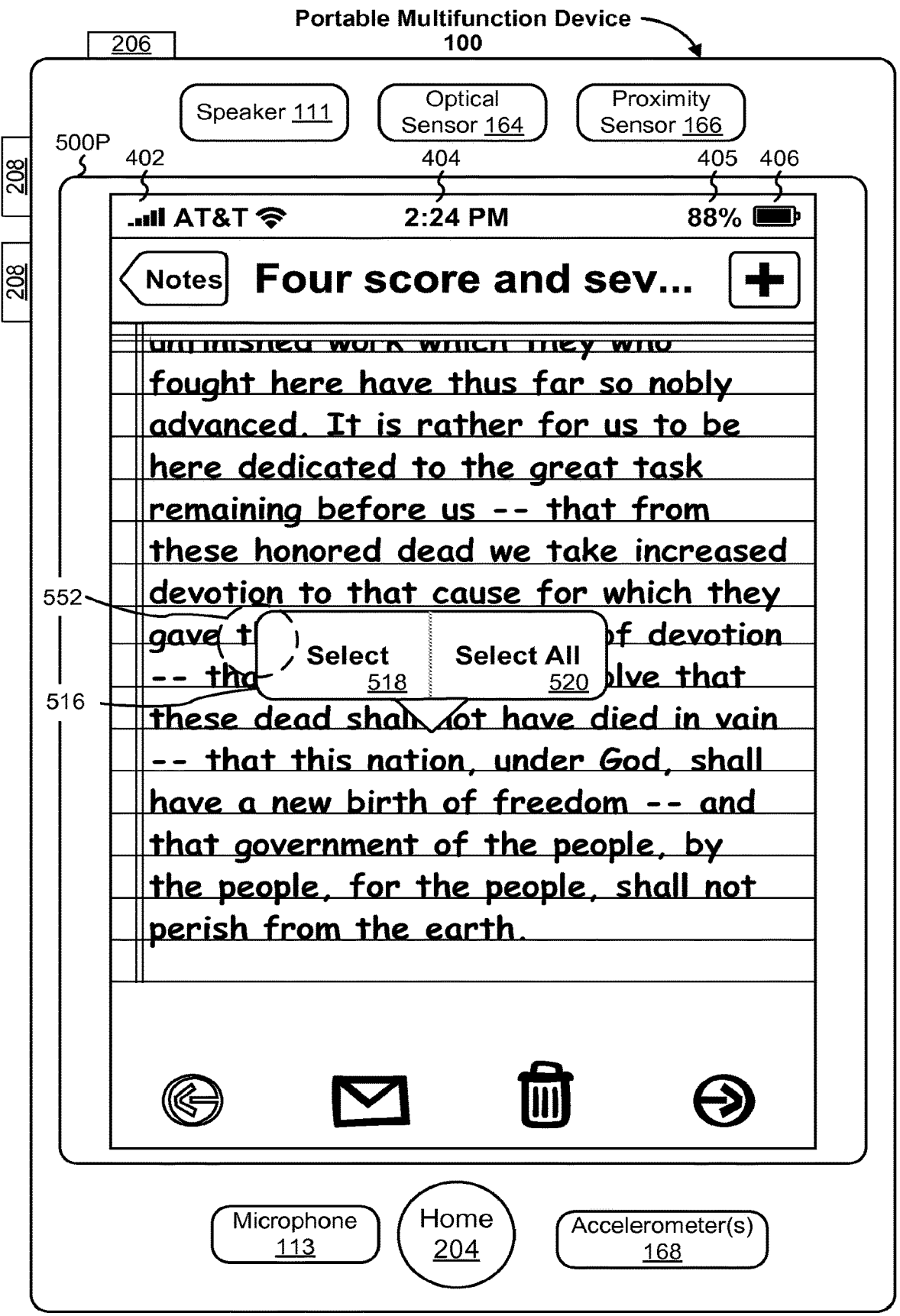
Figure 5Q:
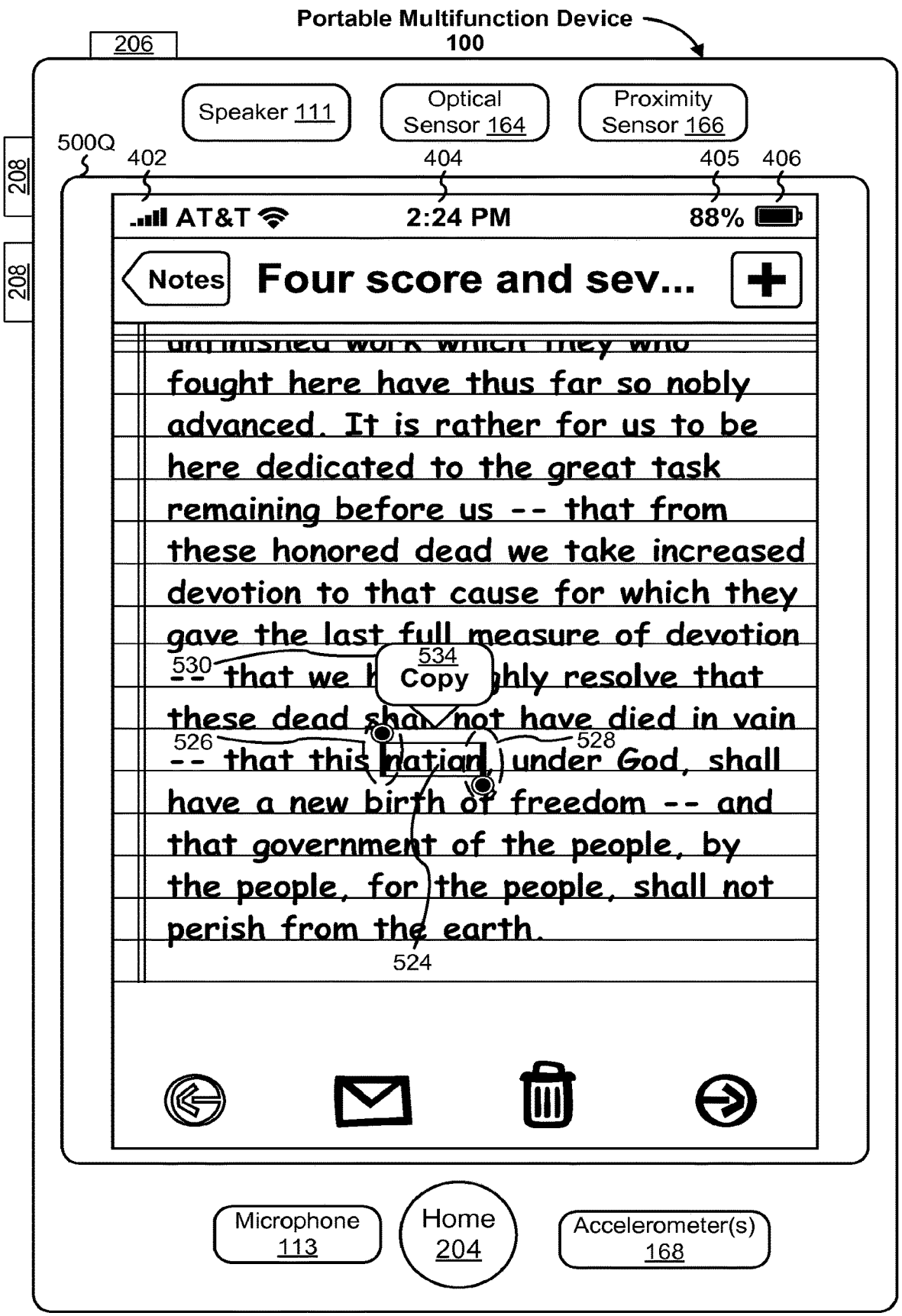

FIGS. 5A-5QQ illustrate exemplary user interfaces for selecting content on a multifunction device with a touch screen display in accordance with some embodiments. The user interfaces in these figures are used to illustrate the processes described below with respect to FIGS. 9A-9D, 10A-10D, 11A-11C, 12, and 13A-13G.

FIGS. 5A-5D illustrate using a content magnifier 508 to position in insertion marker 510 in editable content. The content magnifier moves in accordance with the movement of a finger contact 514.

FIGS. 5D-5K illustrate selecting editable content associated with the current location of the insertion marker in response to detecting a finger gesture on a "select" command icon 518. In some embodiments, a word is selected if the insertion marker is within the word (e.g., the word "nation" in FIGS. 5H-5I), adjacent to the first letter of the word (e.g., the word "Four" in FIGS. 5D-5E), or adjacent to the last letter of the word (e.g., the word "forth" in FIGS. 5F-5G).

In some embodiments, the closest word and any punctuation and/or spaces are selected if the insertion marker is currently located after a sentence and not within a word or adjacent to the first or last letter of a word (e.g., "equal." in FIGS. 5J-5K).

FIGS. 5D and 5L illustrate selecting all of the editable content in response to detecting a finger gesture on a "select all" command icon.

FIGS. 5M-5O illustrate using a content magnifier 508 to position a position marker 546 in read-only content 538. The content magnifier 508 moves in accordance with the movement of a finger contact 550.

FIGS. 5P-5Q illustrate selecting read-only content in response to detecting a finger gesture on a "select" command icon. In some embodiments, the selections are analogous to the selections in editable content, but the insertion marker 510 is not displayed in the unmagnified content.

Figure 5R:
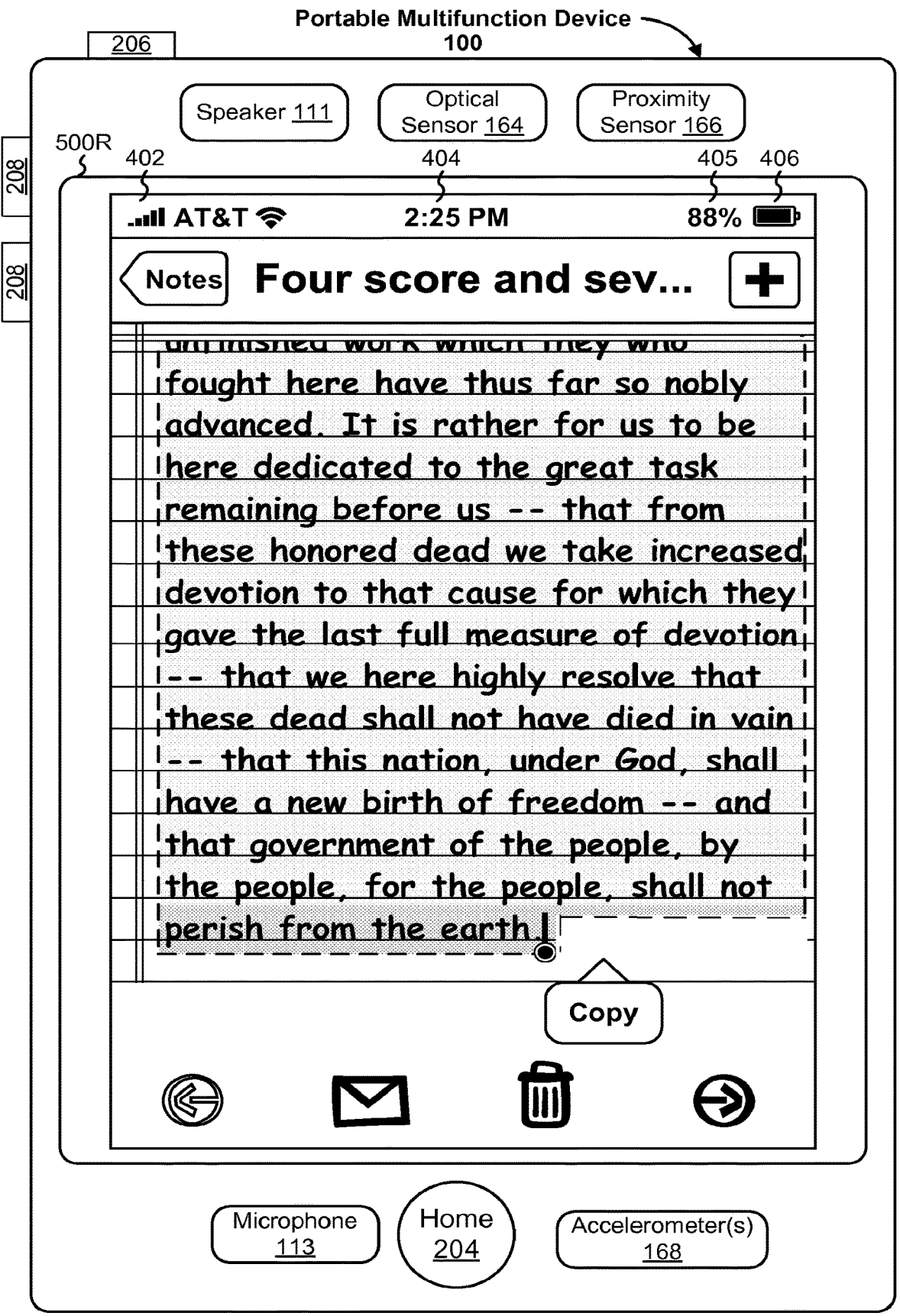
Figure 5S:
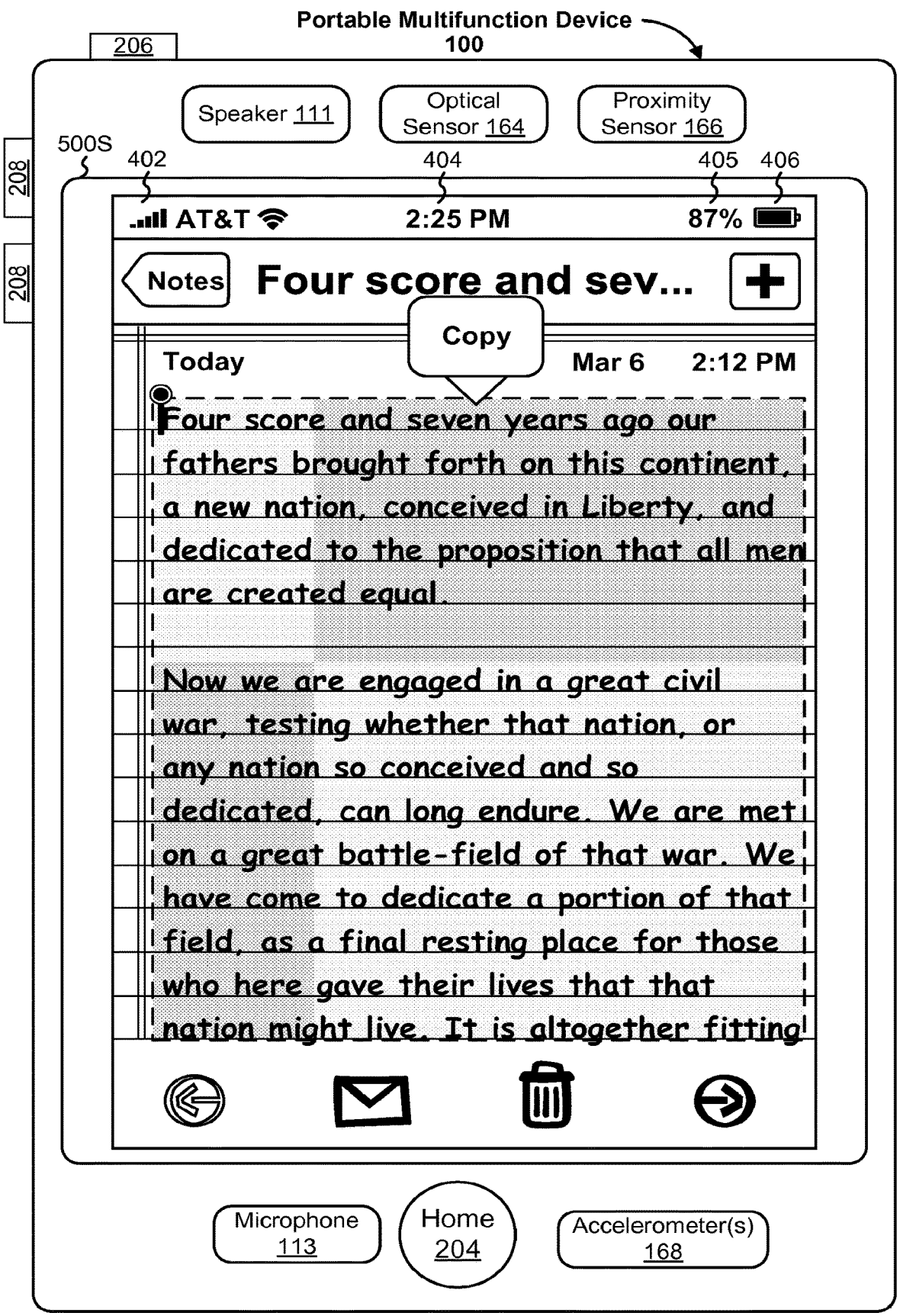

FIGS. 5P, 5R, and 5S illustrate selecting all of the read-only content 538 in response to detecting a finger gesture on a "Select All" command icon 520.

Figure 5T:
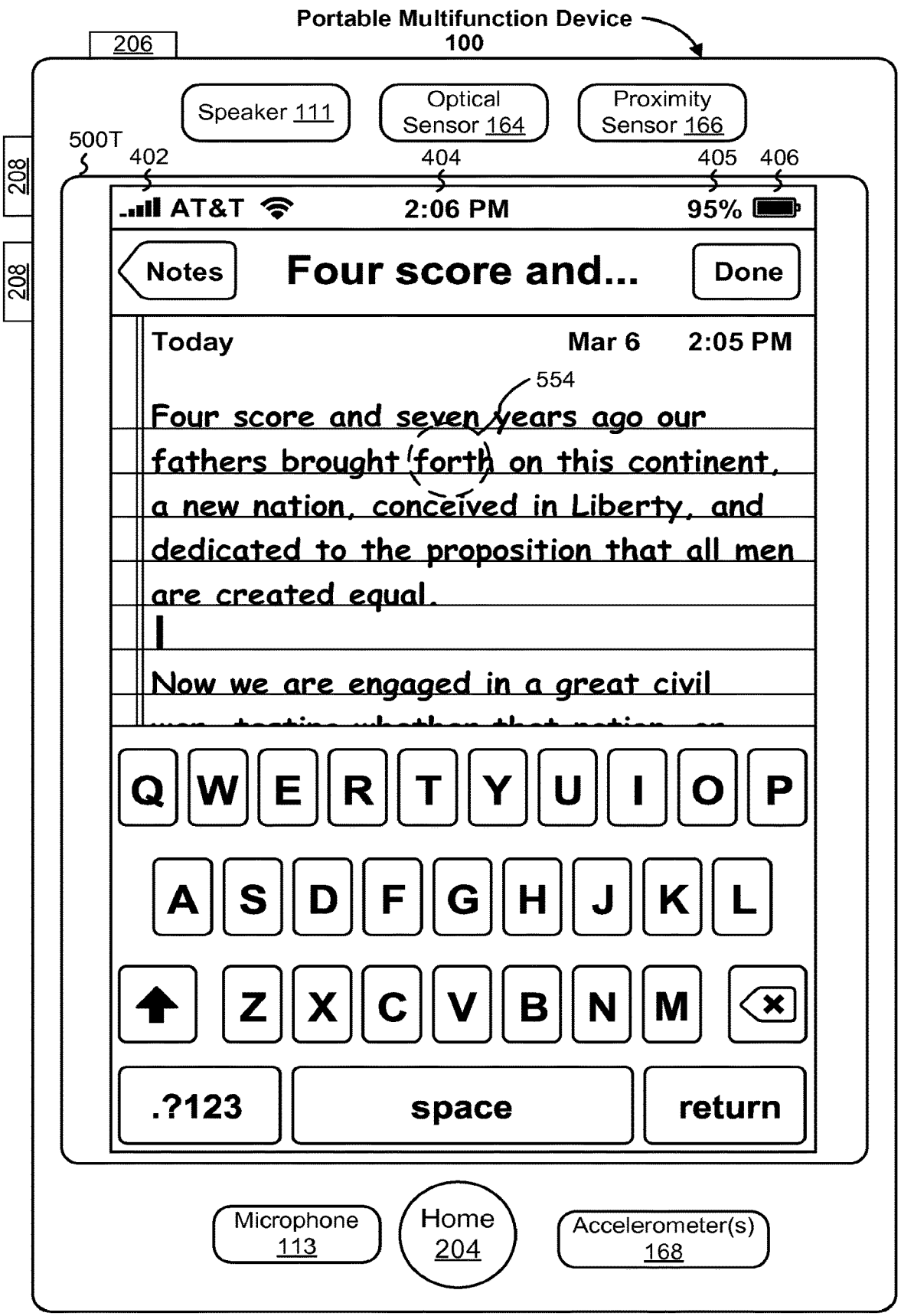
Figure 5U:
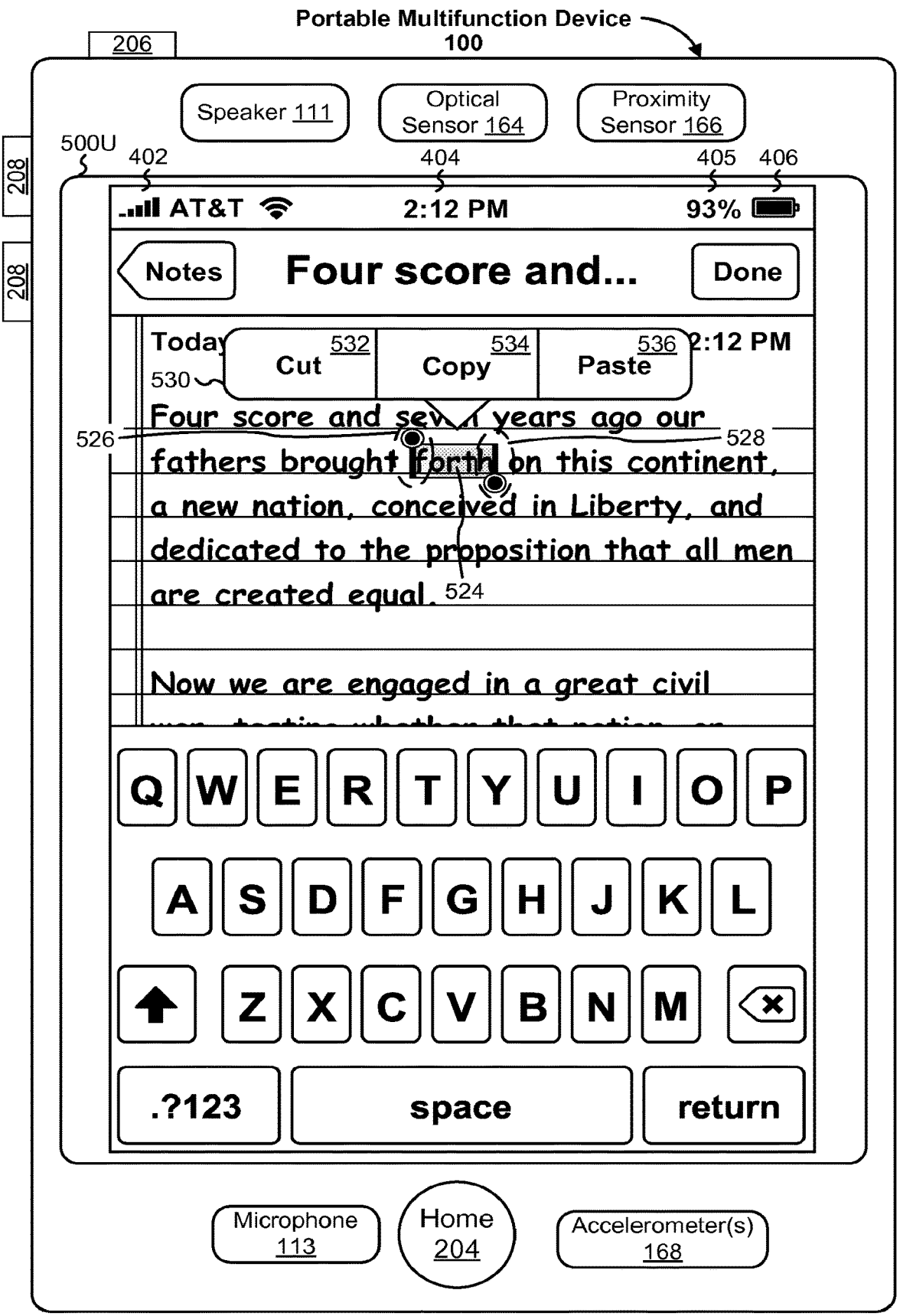
Figure 5V:
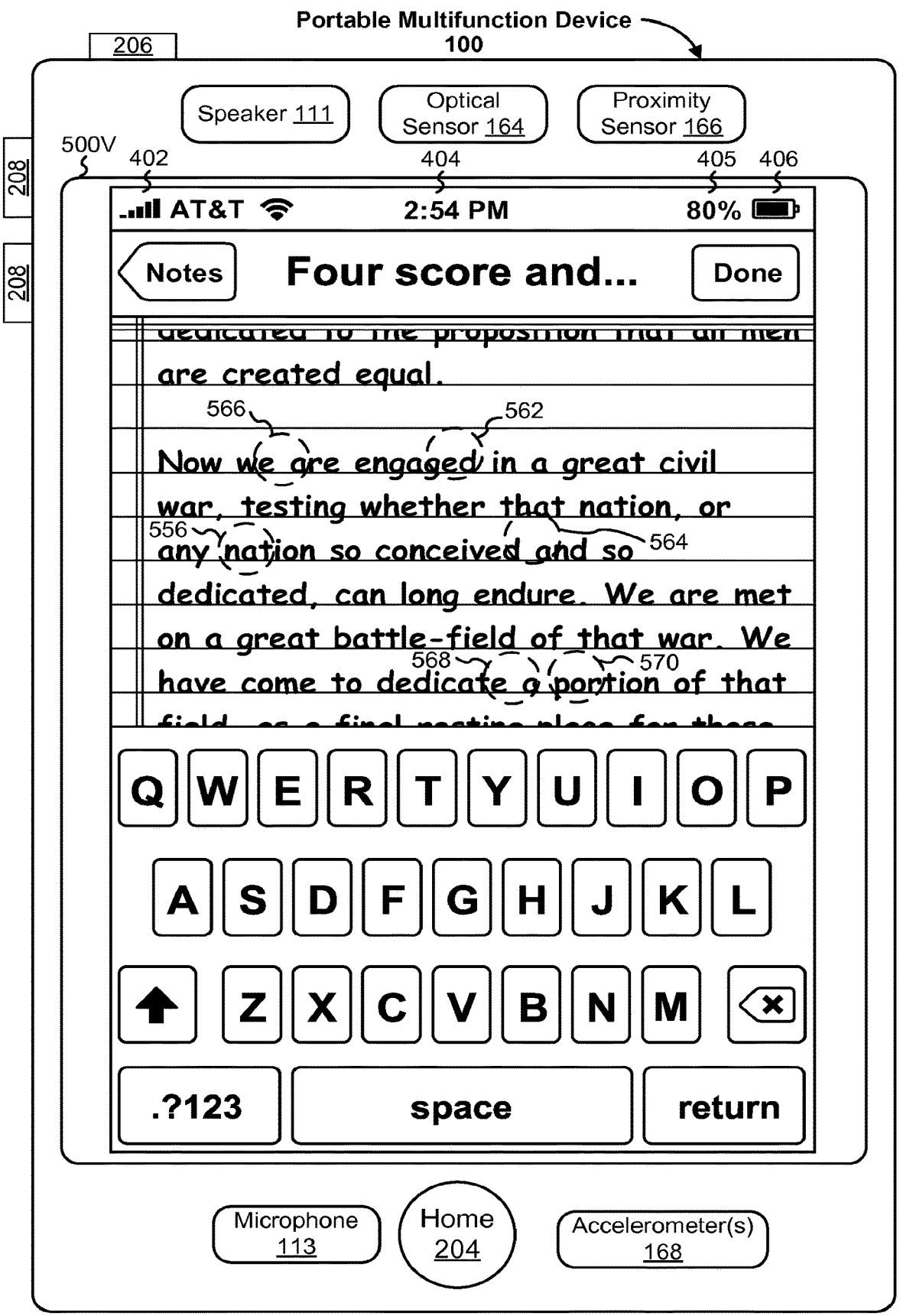

FIGS. 5T and 5U illustrate selecting a word with a double-tap, single finger gesture on a word.

FIGS. 5V-5Z illustrate gestures to select a word, line of text, sentence, or paragraph.

FIGS. 5AA-5CC illustrate a tap-and-a-half gesture by a single finger.

FIGS. 5DD-5KK illustrate two-finger gestures for selecting content and increasing the selected content.

FIGS. 5LL-5NN illustrate a margin-initiated selection gesture by a single finger. FIGS. 5OO-5QQ illustrate a swipe-initiated selection gesture by a single finger.

Figure 6A:
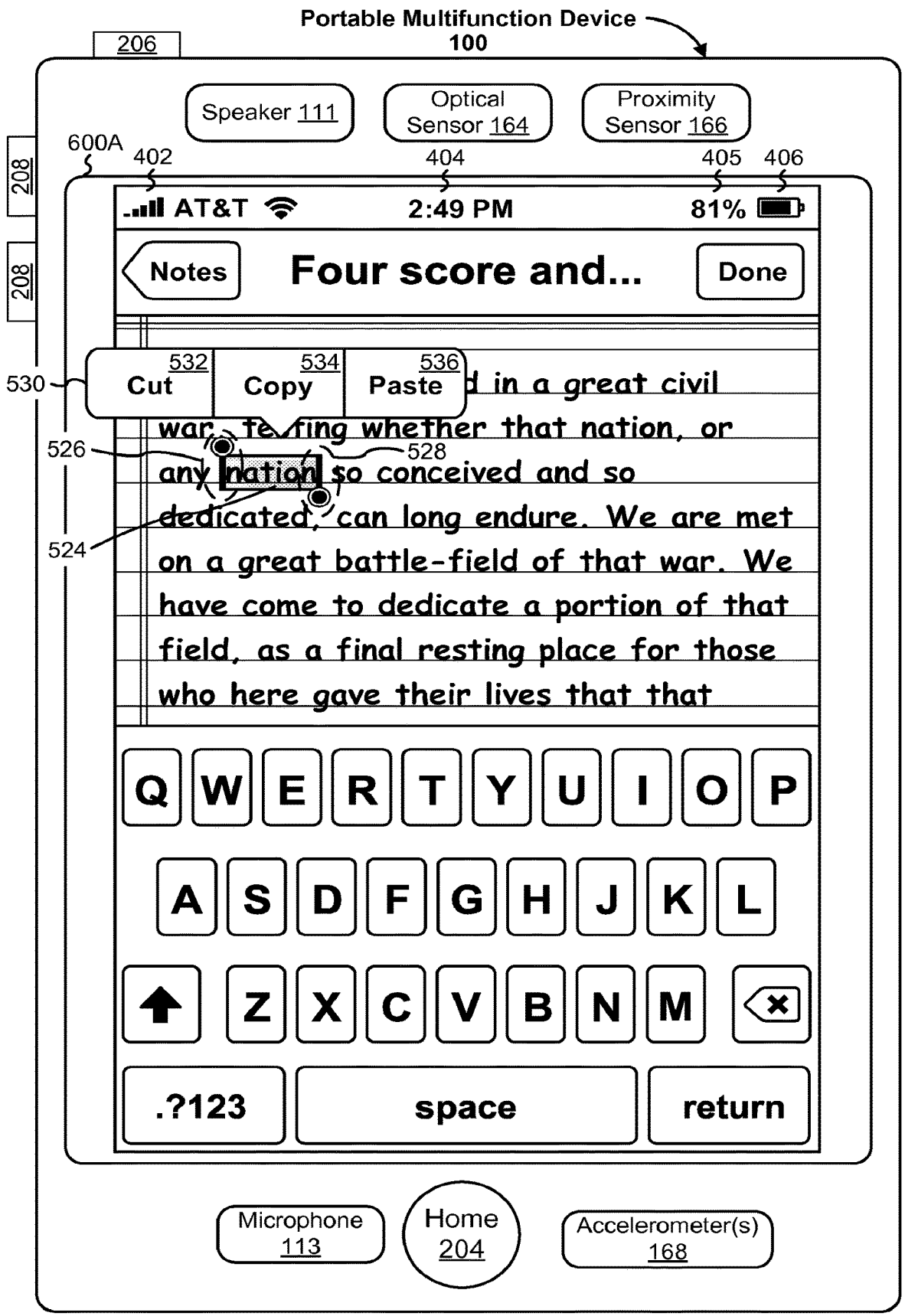
FIGS. 6A-6UU illustrate exemplary user interfaces for a command display area for selected content in accordance with some embodiments.
Figure 6B:
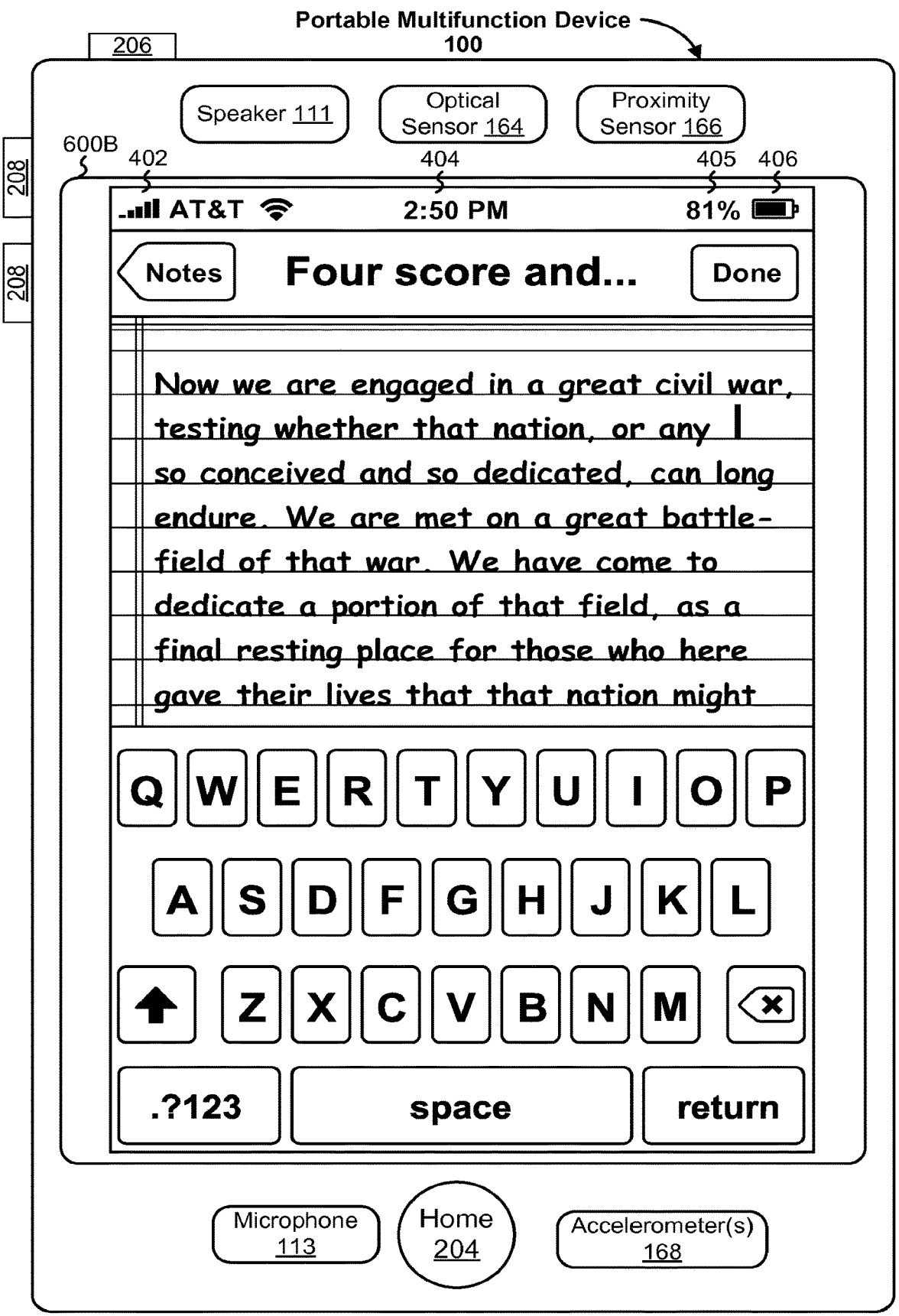
Figure 6C:
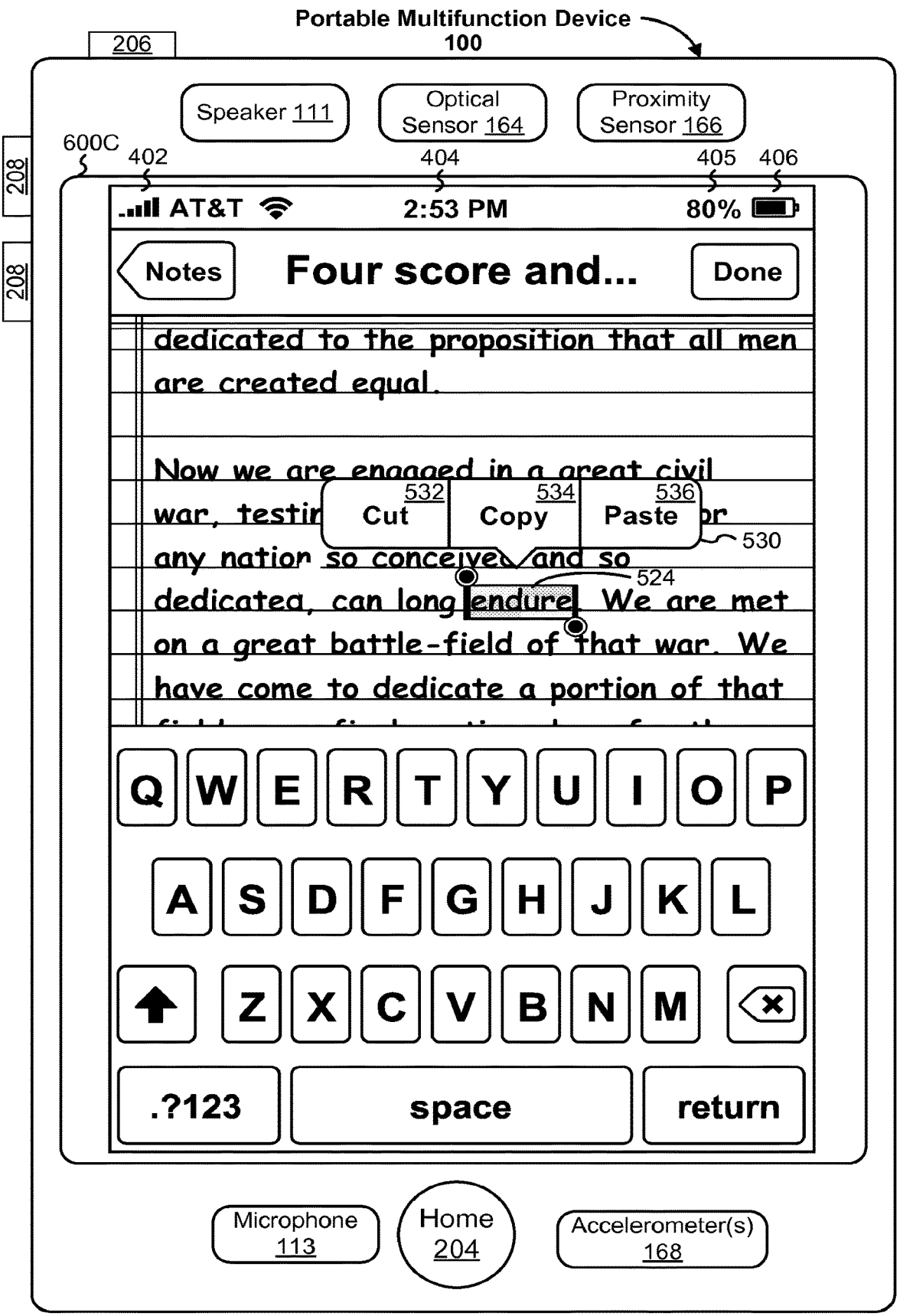
Figure 6D:
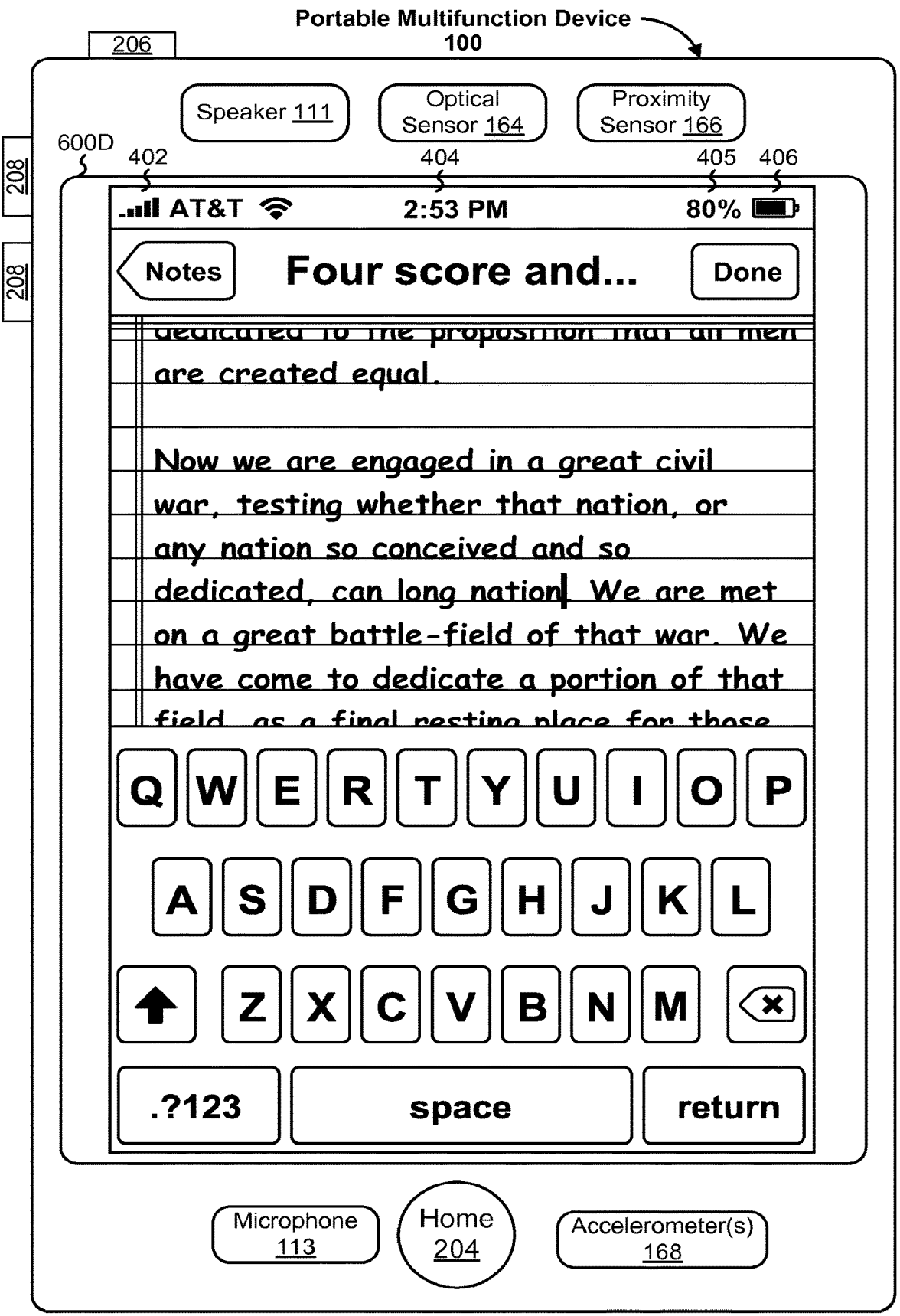
Figure 6E:
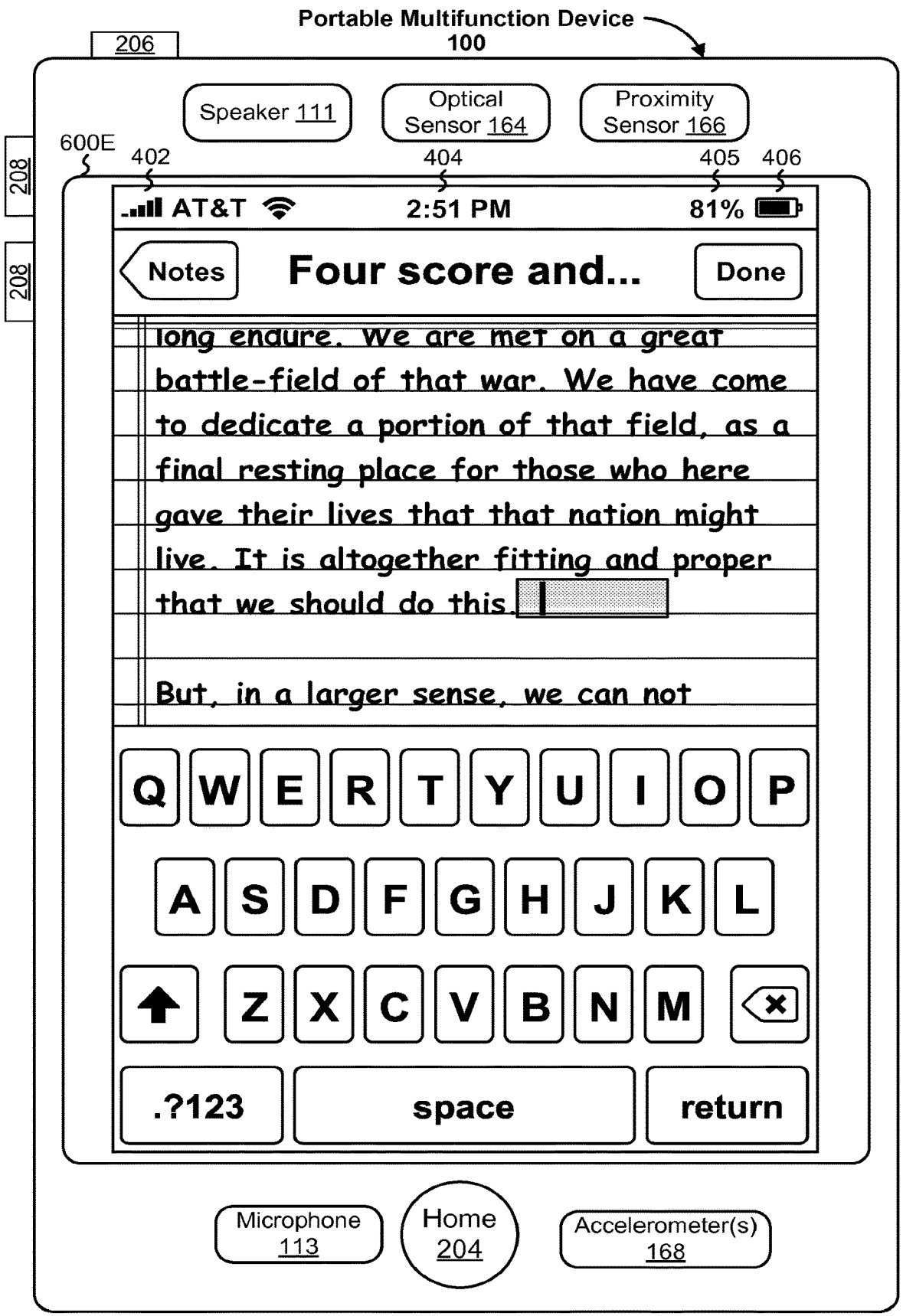
Figure 6F:
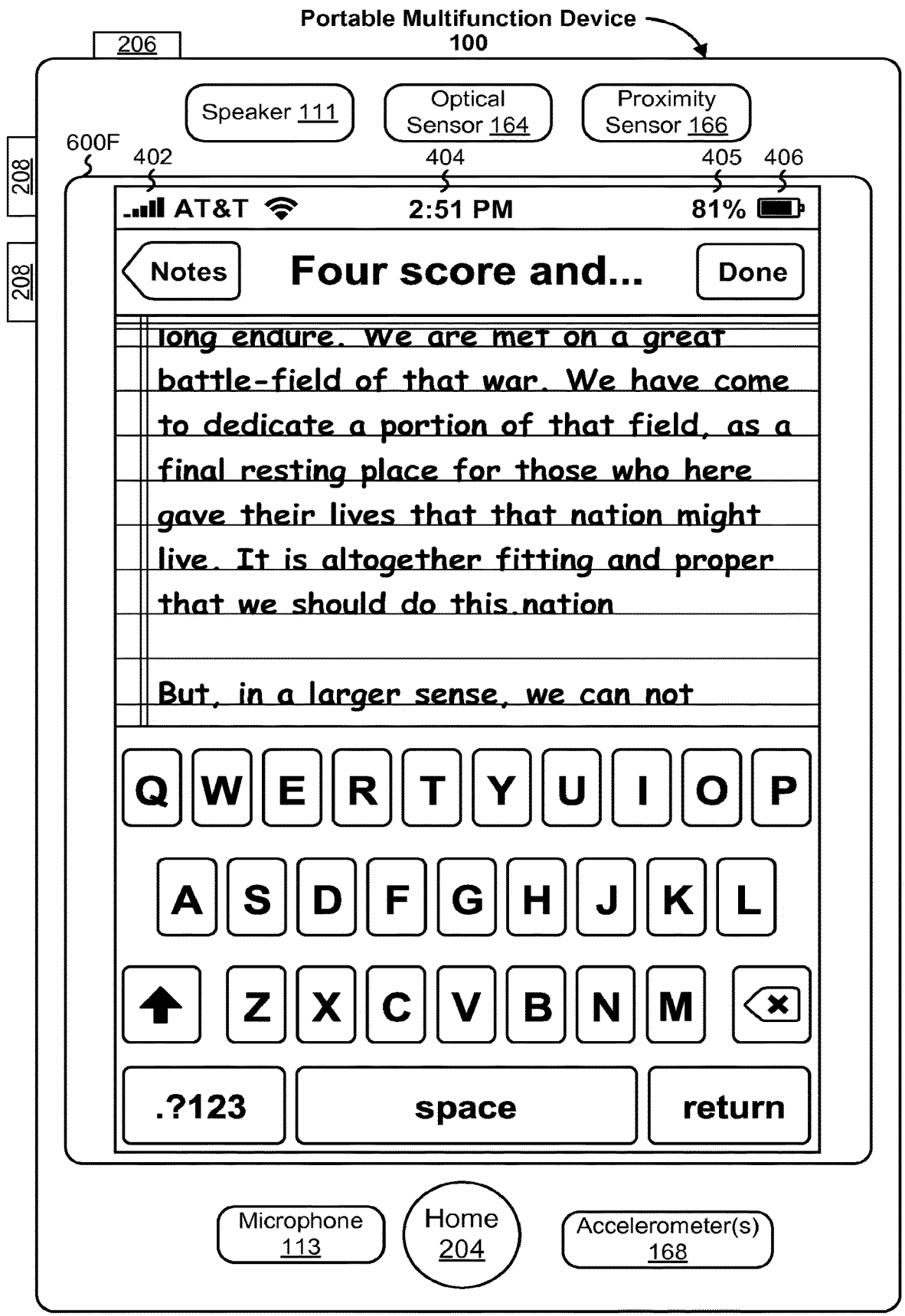
Figure 6G:
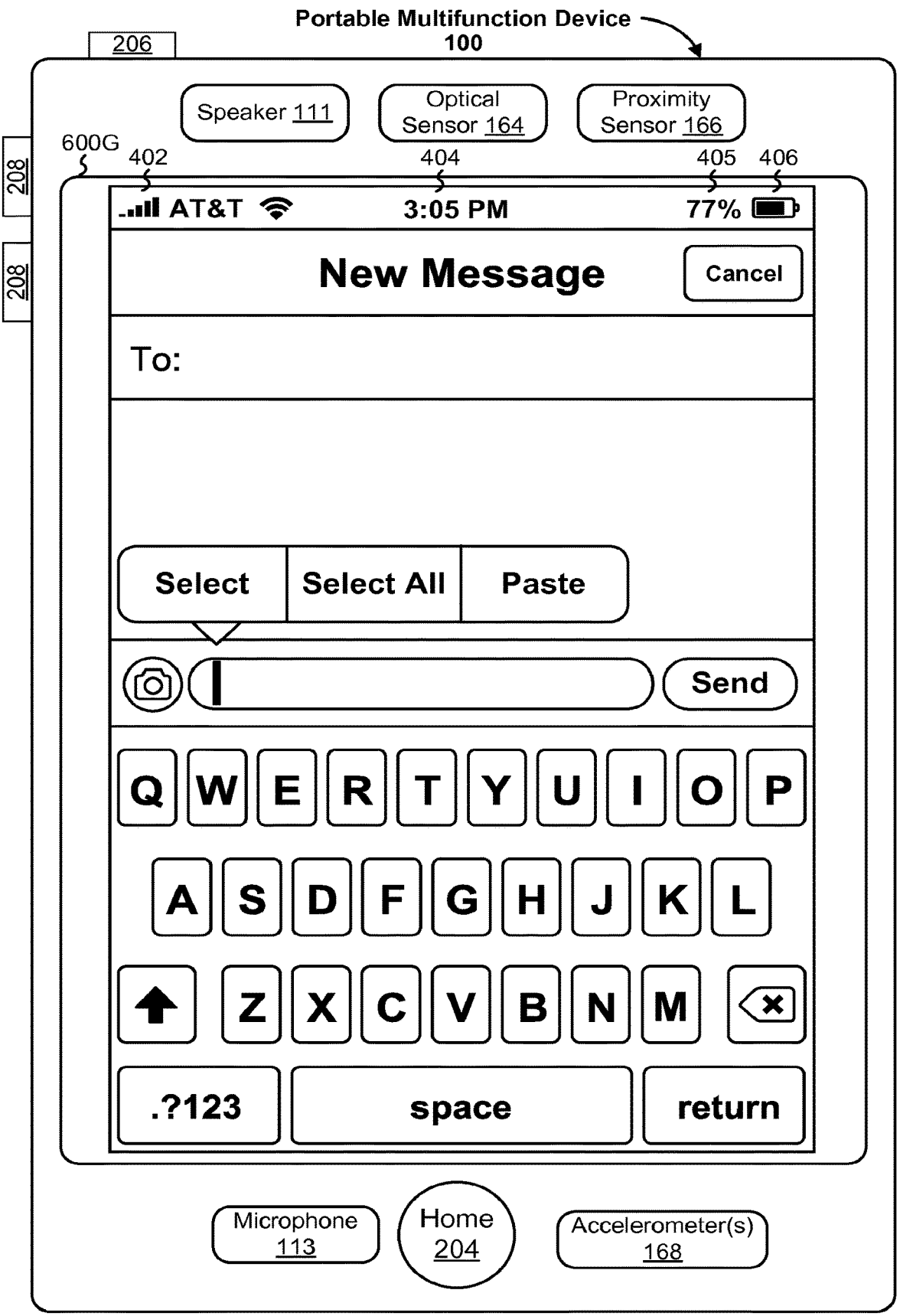
Figure 6H:
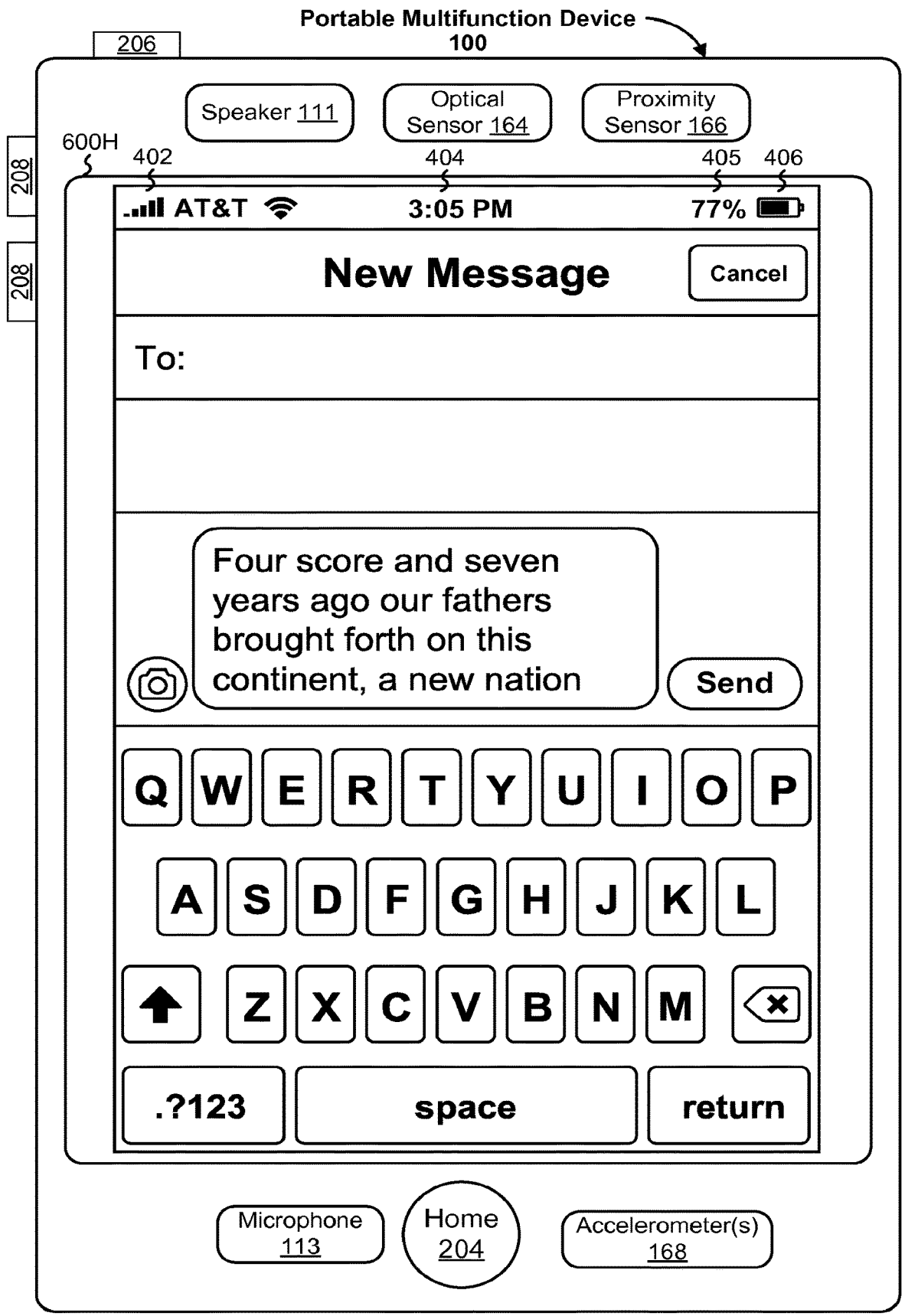
Figure 6I:
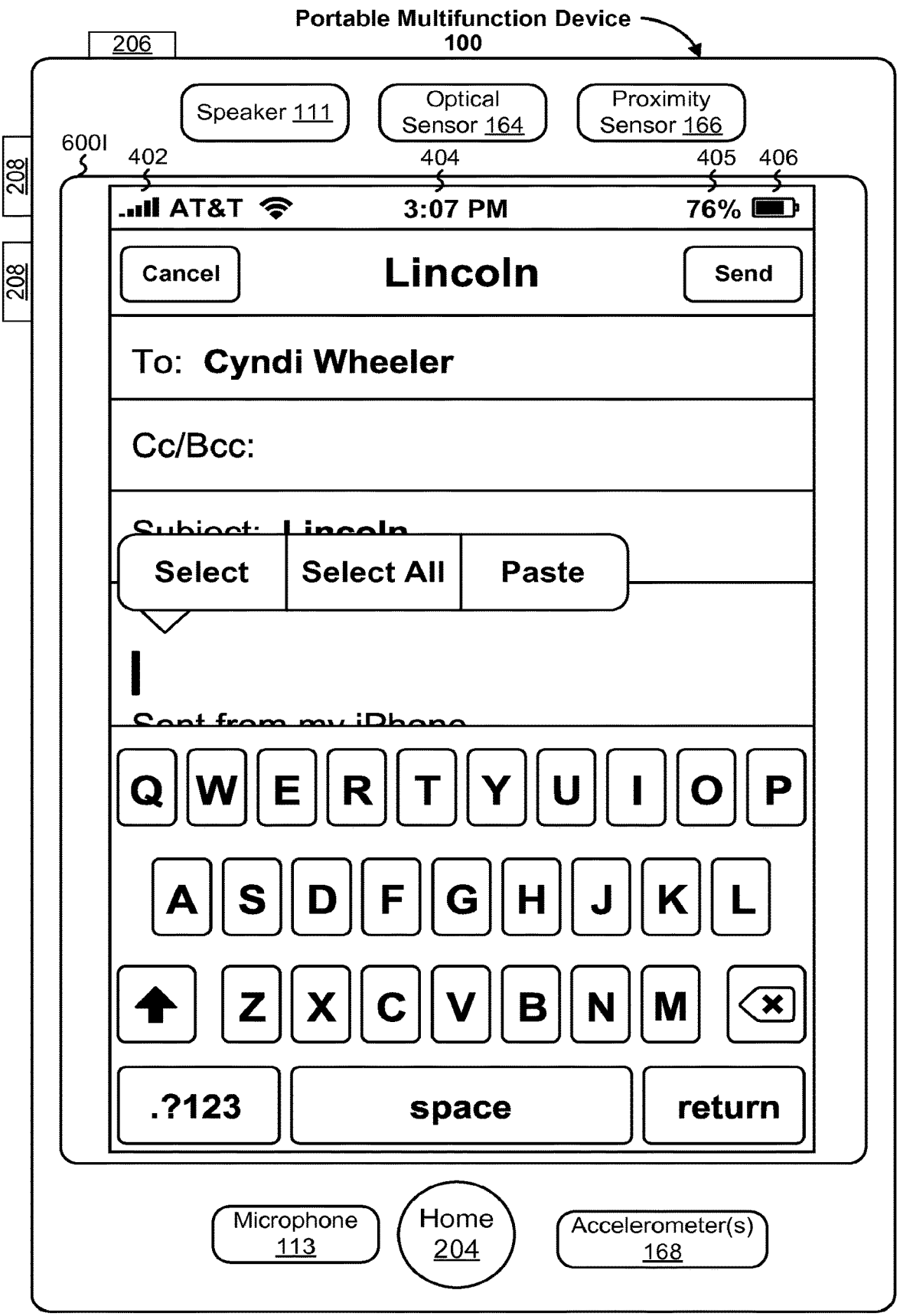
Figure 6J:
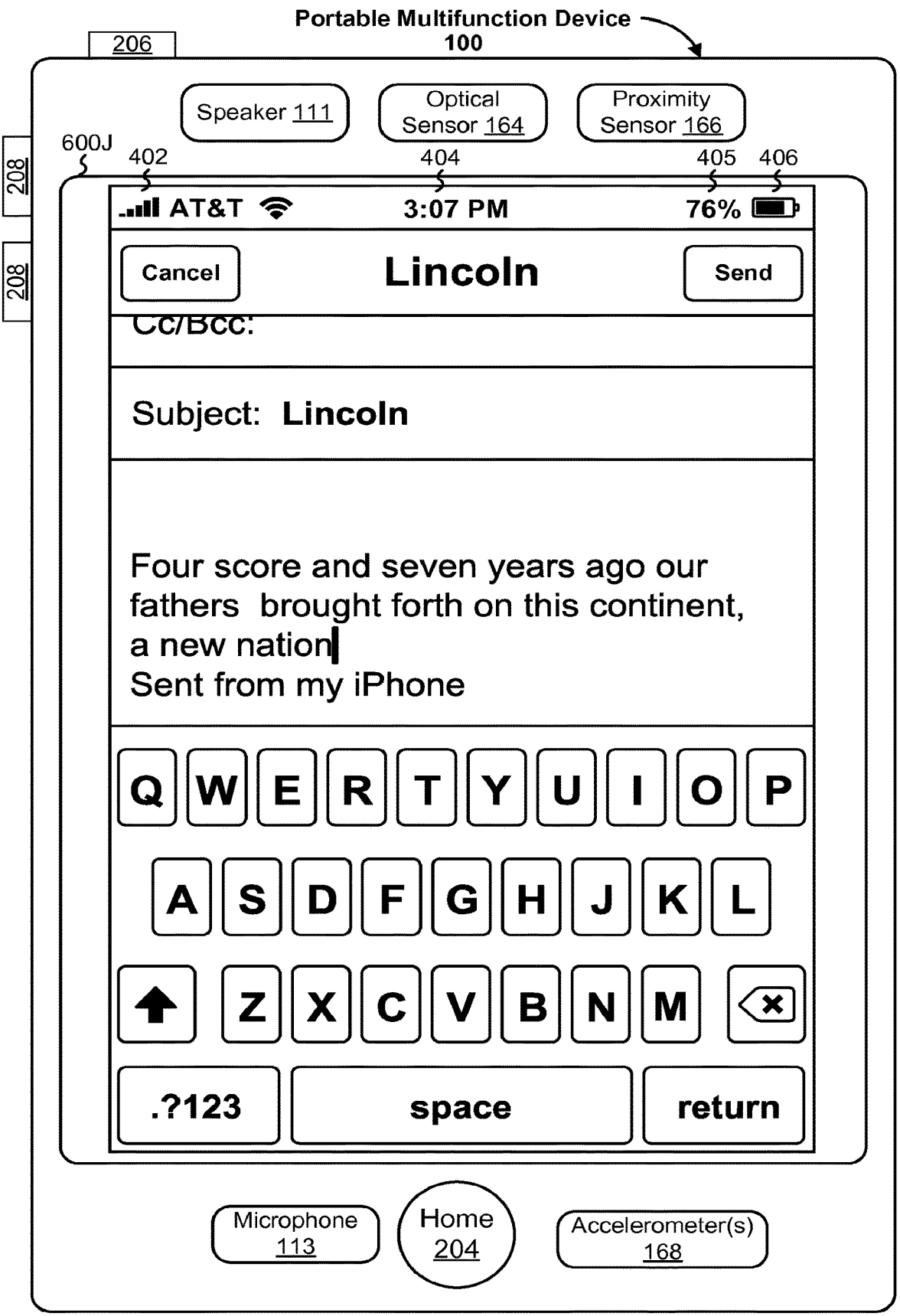
Figure 6K:
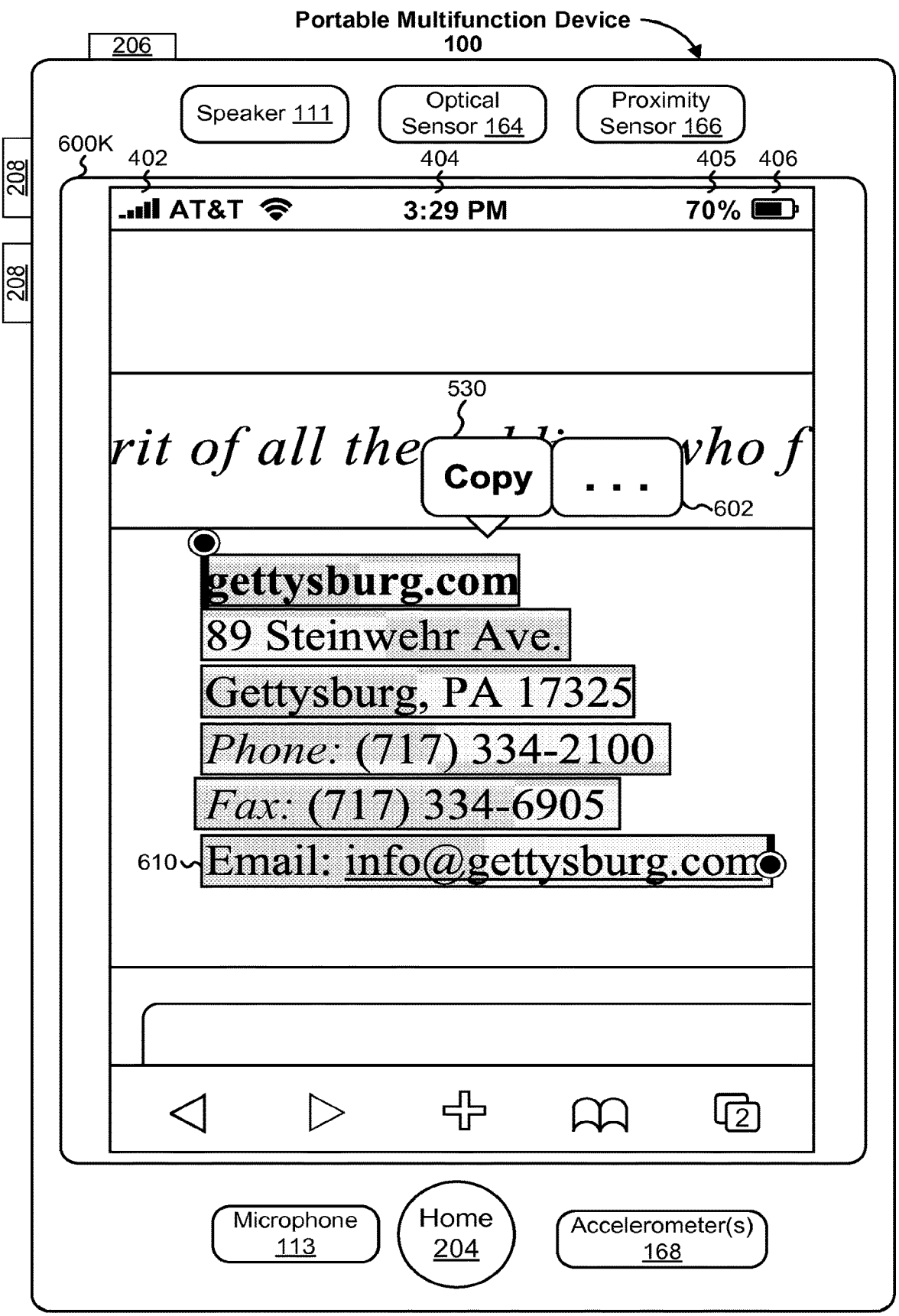
Figure 6L:
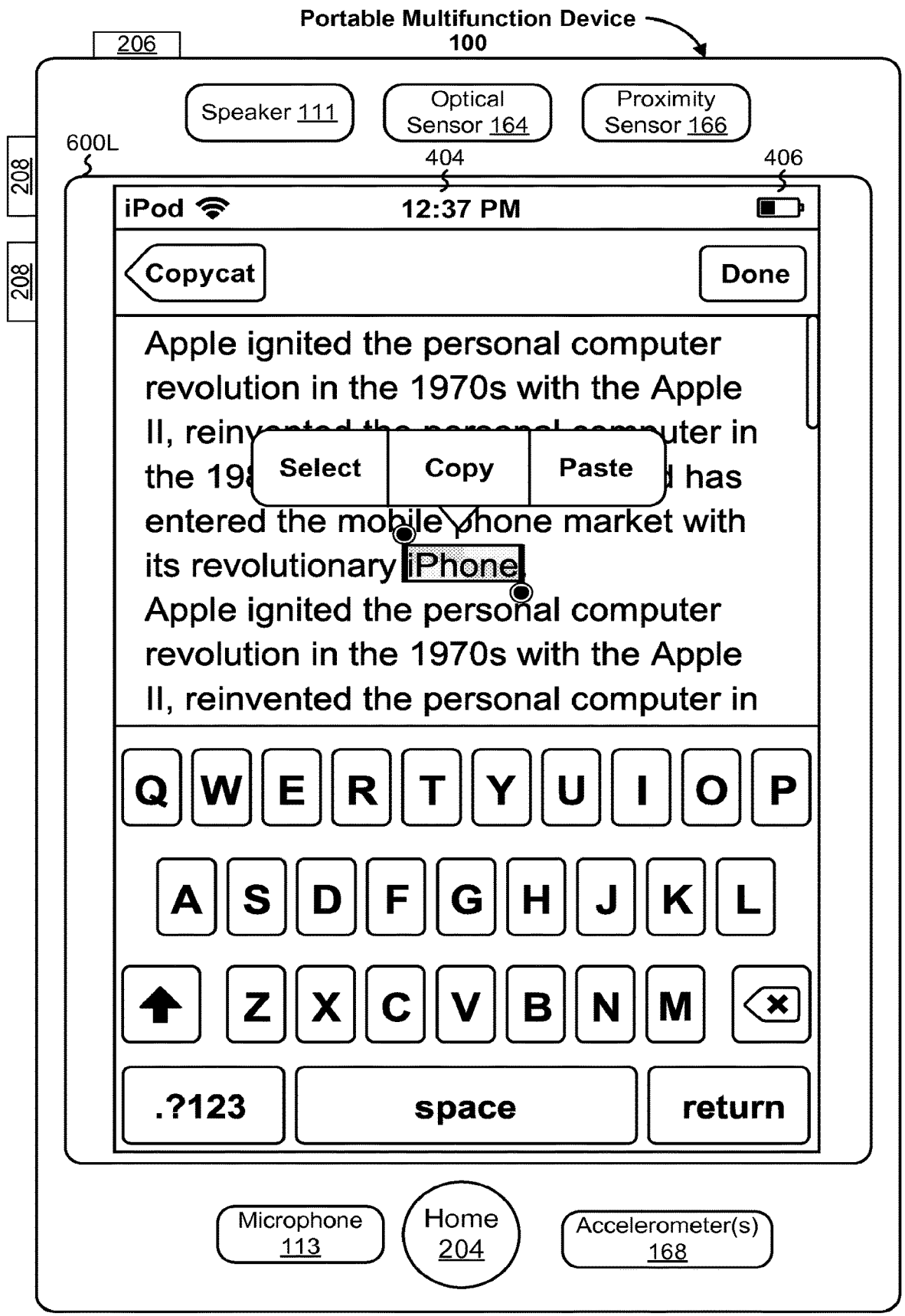
Figure 6M:
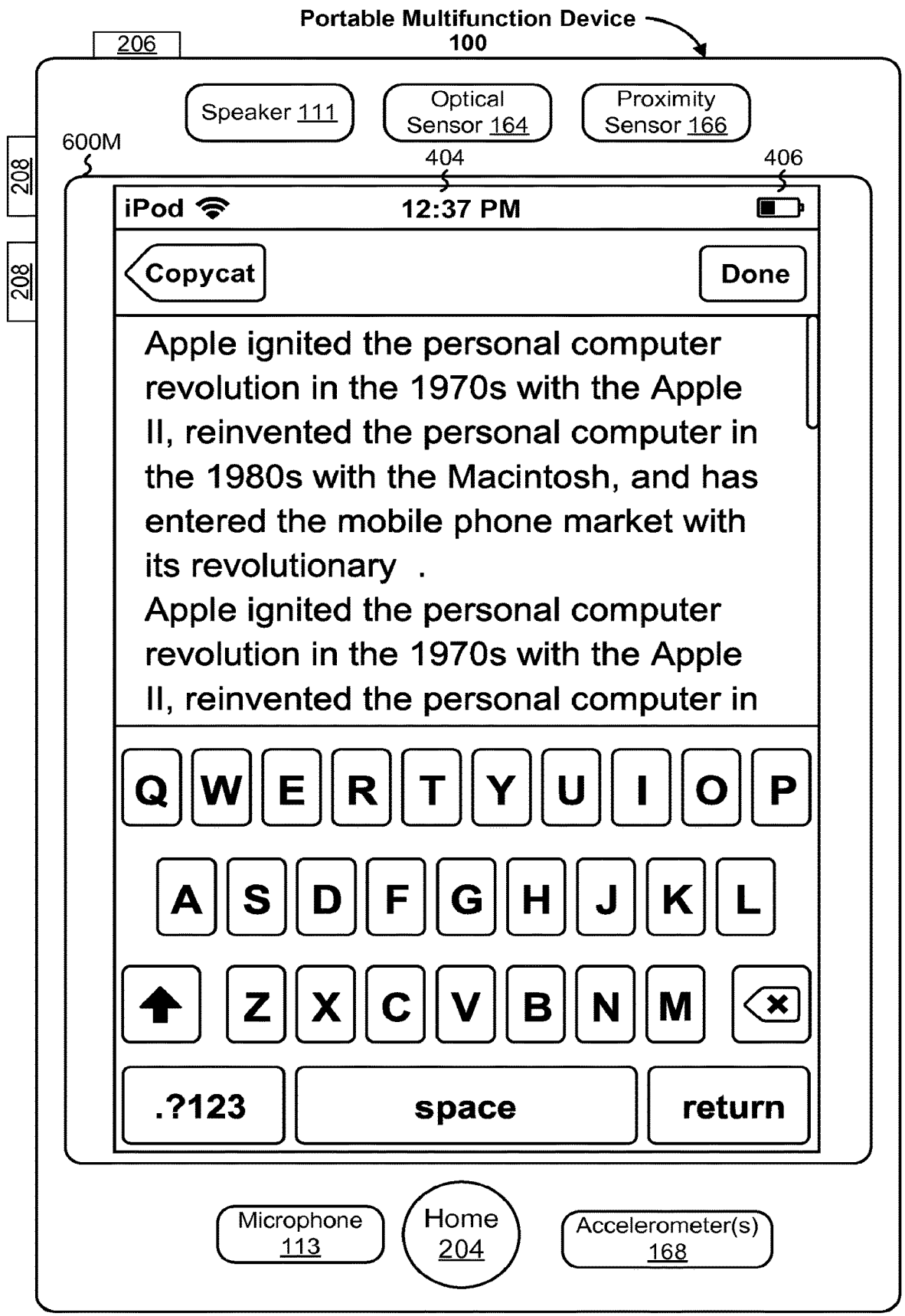
Figure 6N:
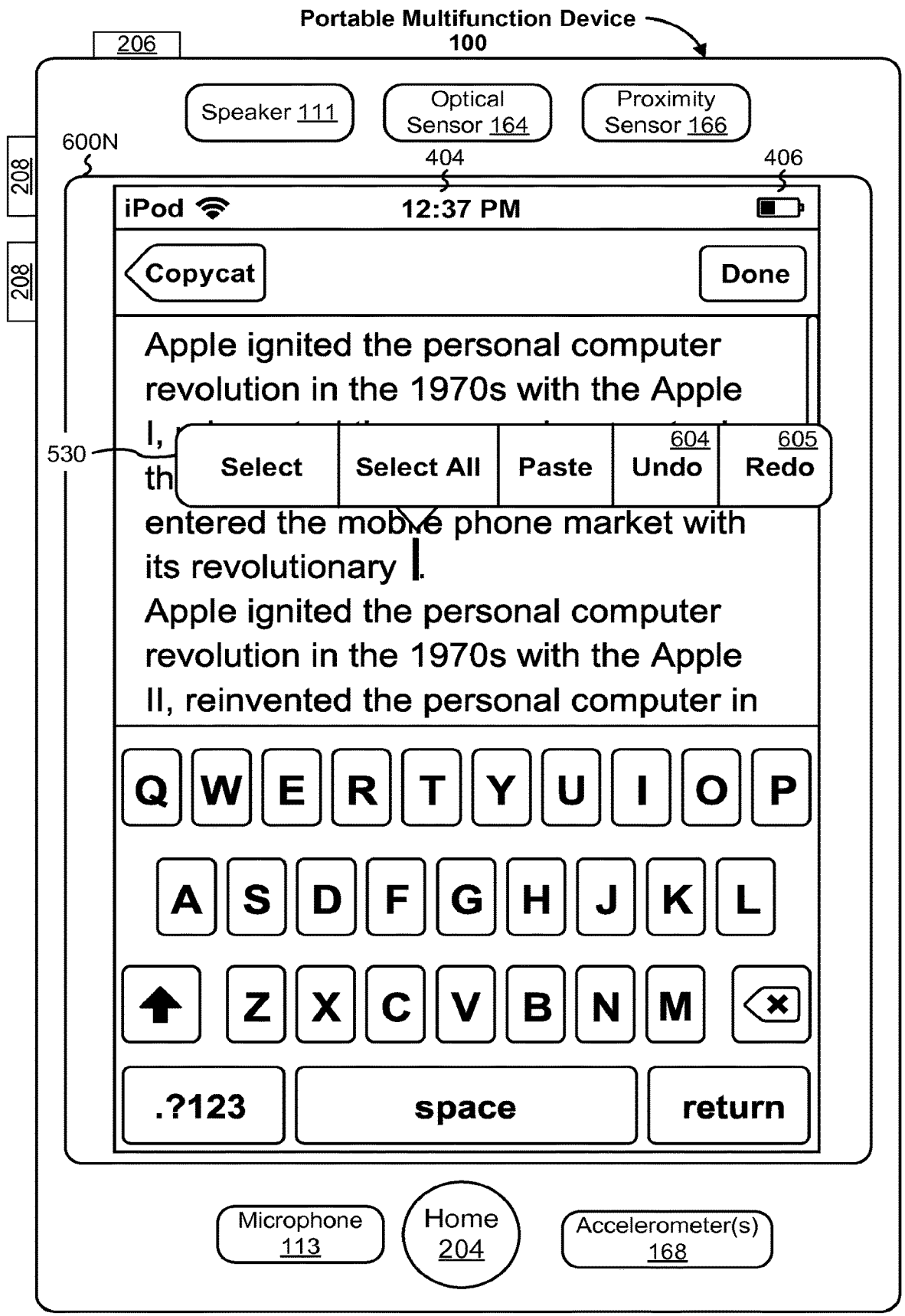
Figure 6O:
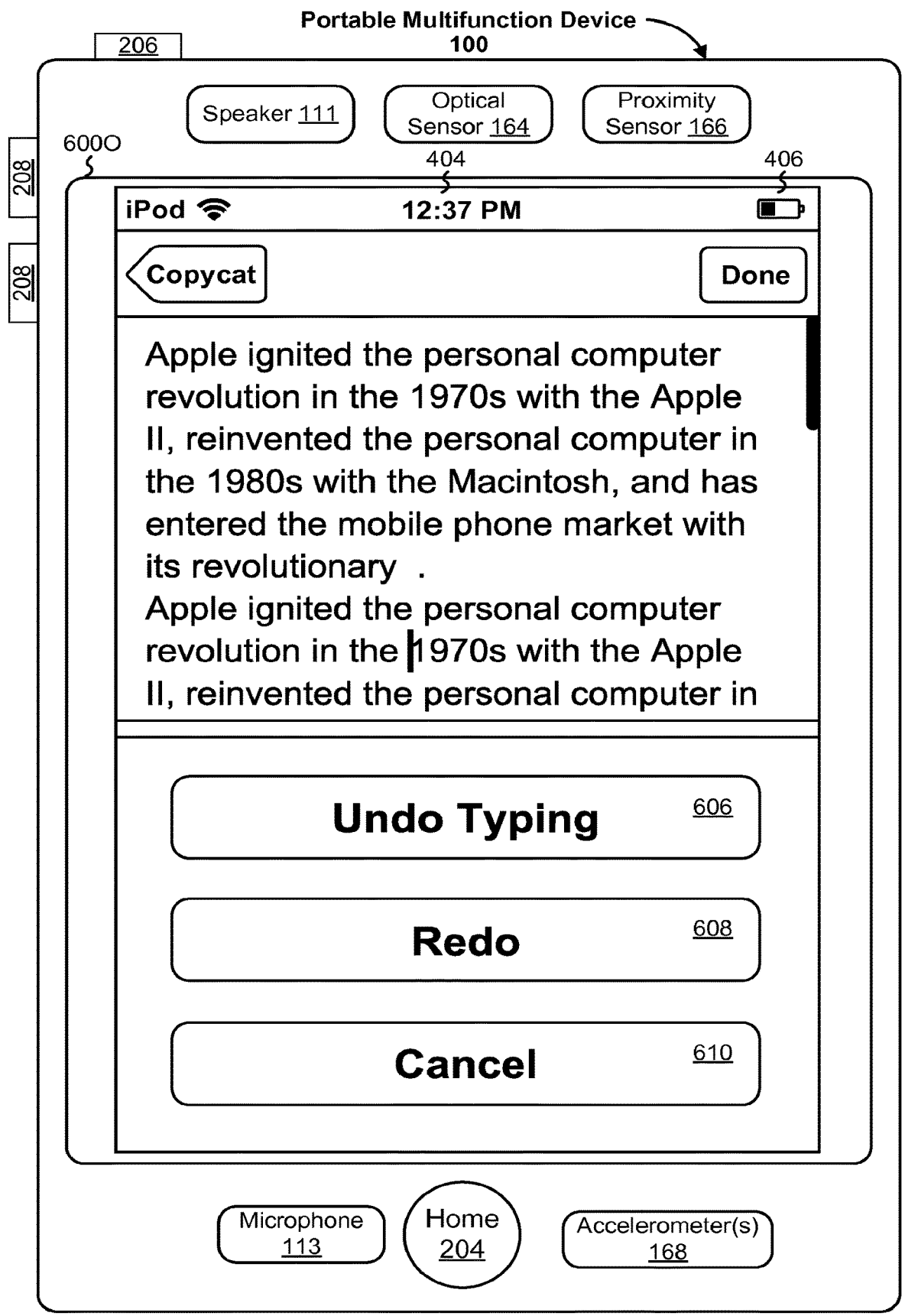
Figure 6P:
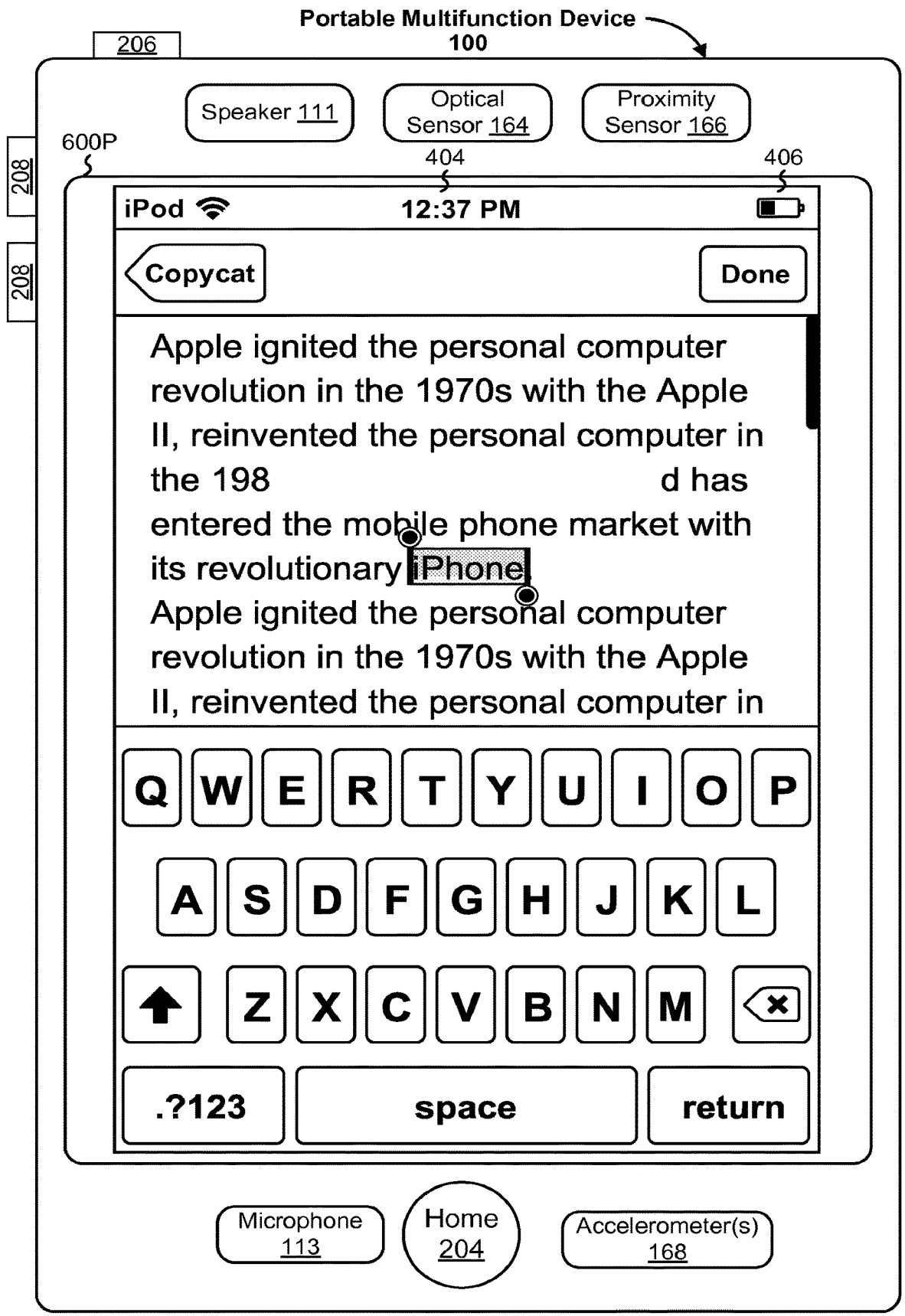
Figure 6Q:
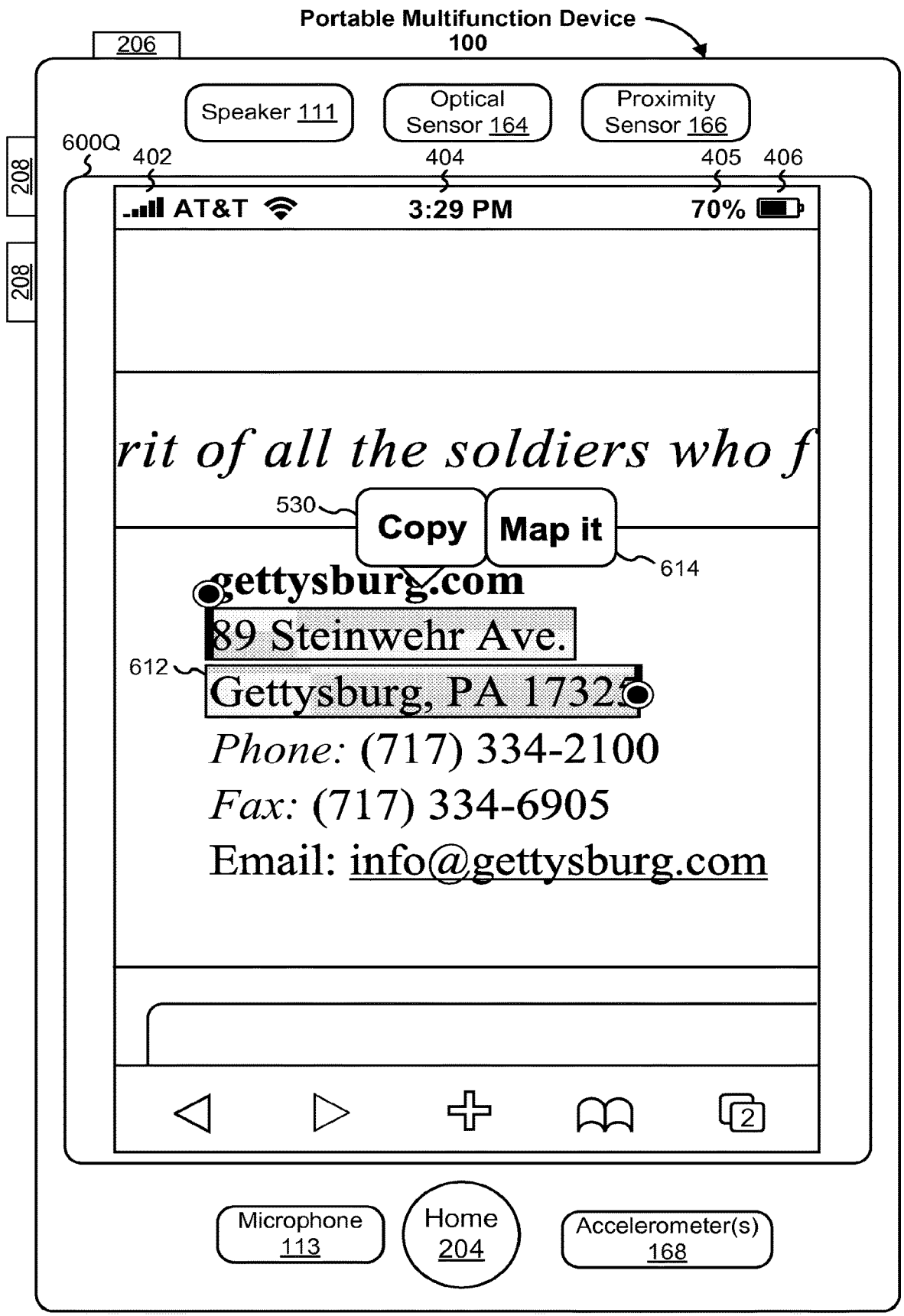
Figure 6R:
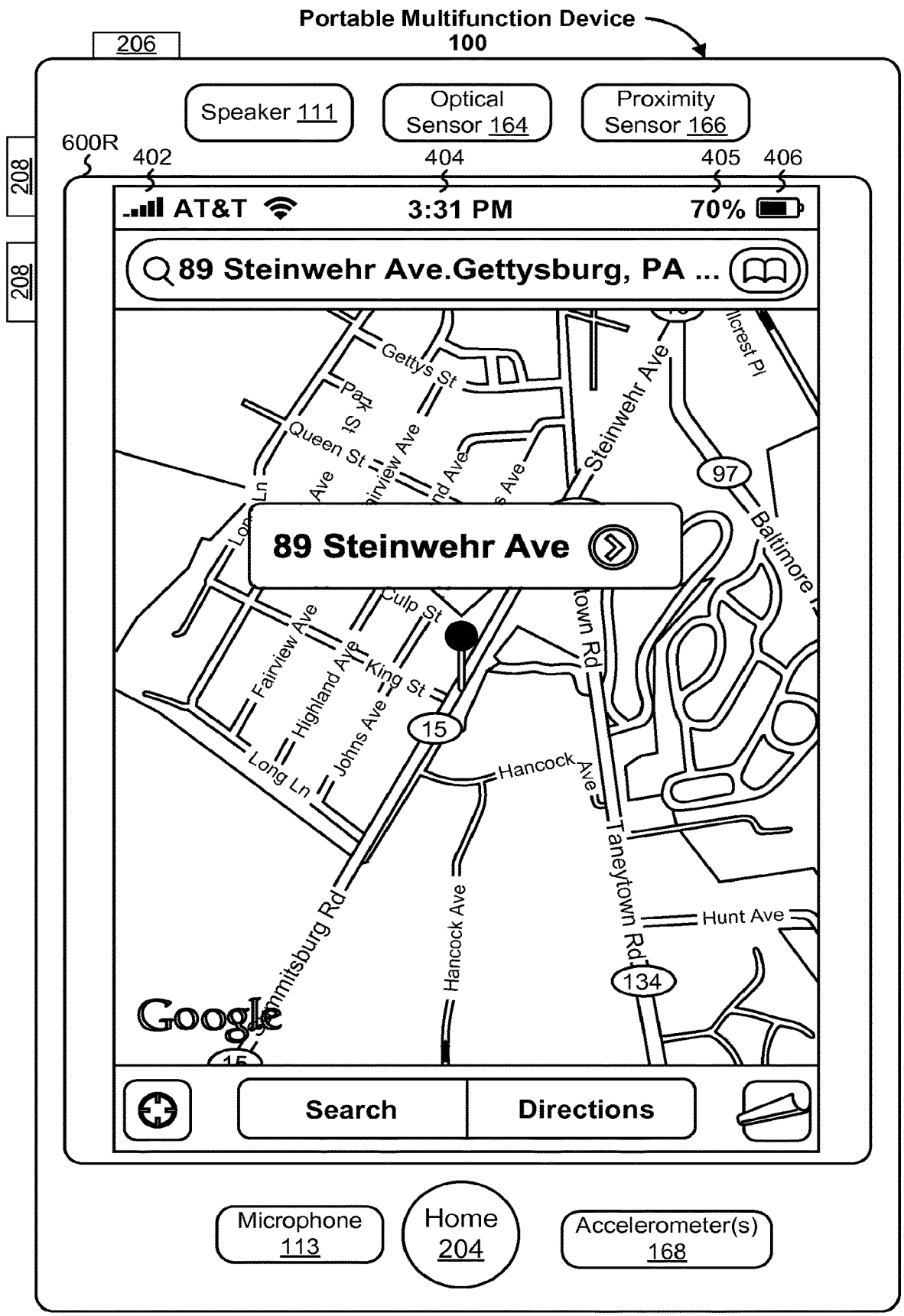
Figure 6S:
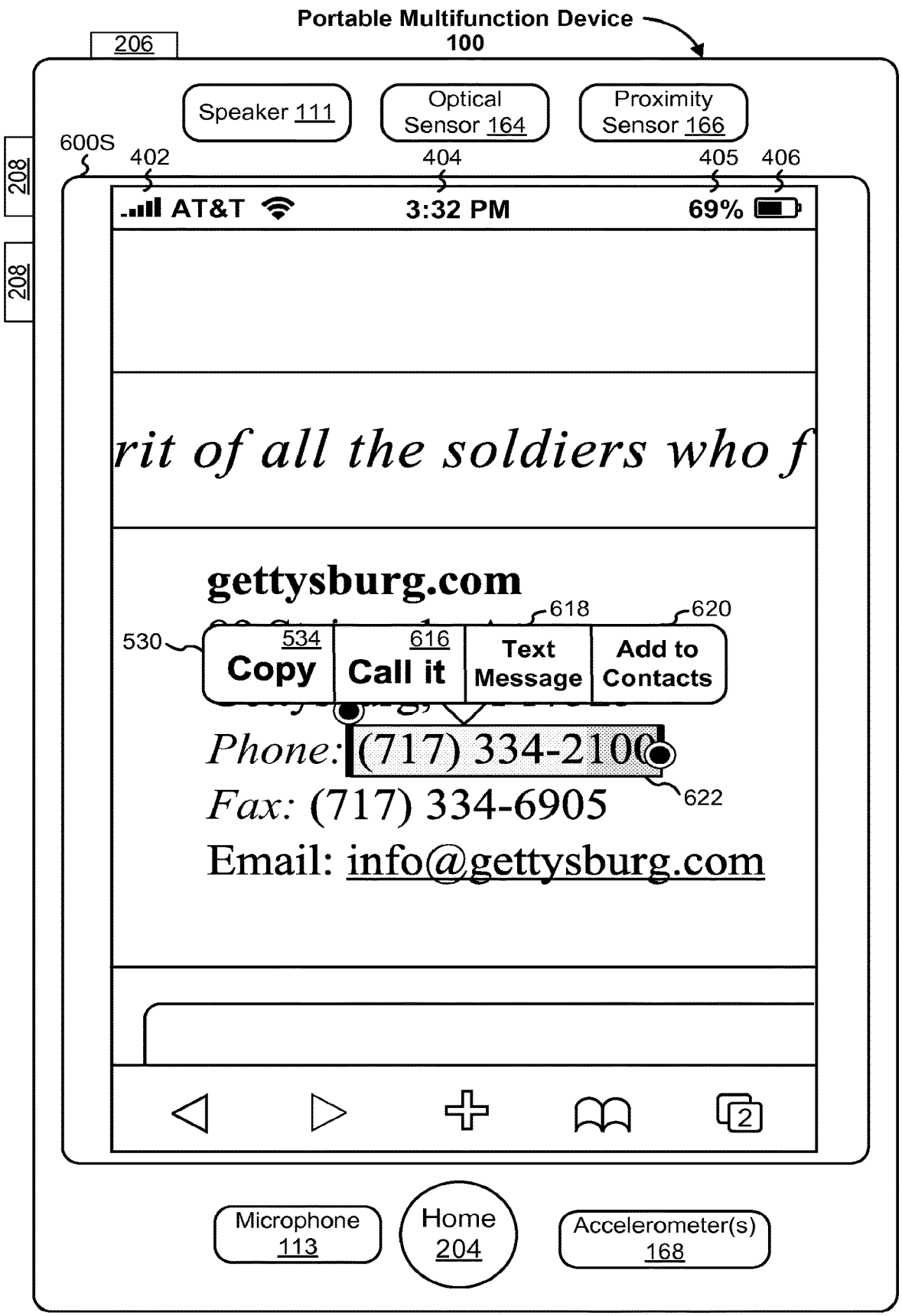
Figure 6T:
Figure 6U:
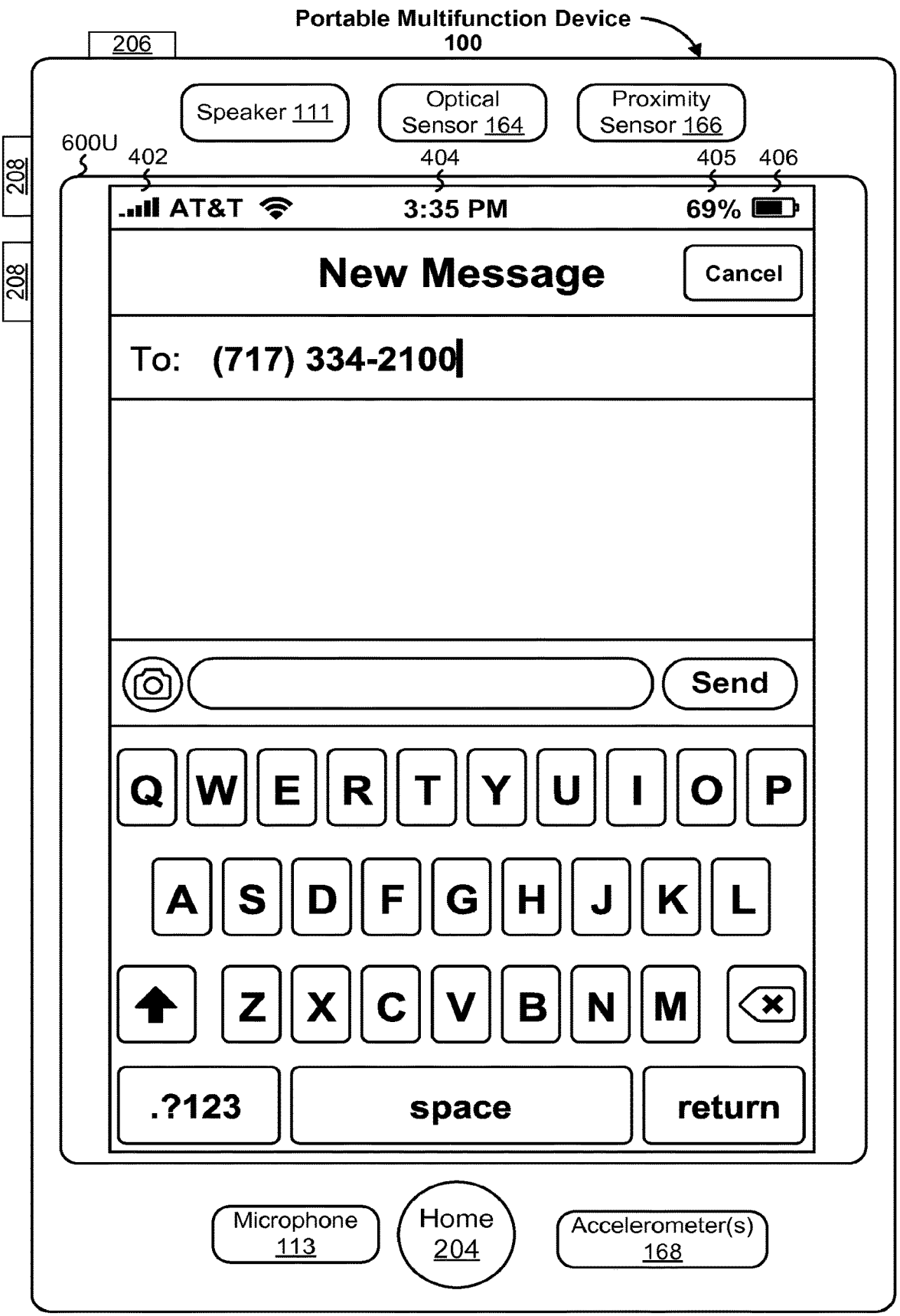

FIGS. 6A-6UU illustrate exemplary user interfaces for a command display area for selected content in accordance with some embodiments. The user interfaces in these figures are used to illustrate the processes described below with respect to FIGS. 14A-14D and 15A-15C.

FIGS. 6A-6B illustrate cutting selected content. FIGS. 6C-6J illustrate pasting previously cut or copied content.

FIG. 6K illustrates a command display area with an icon for displaying additional command options.

FIGS. 6L-6P illustrate methods for undoing an action.

FIGS. 6Q-6R illustrate providing information about a physical location in selected content.

FIGS. 6S-6V illustrate interfaces for performing actions based on a phone number in the selected content.

Figure 6V:
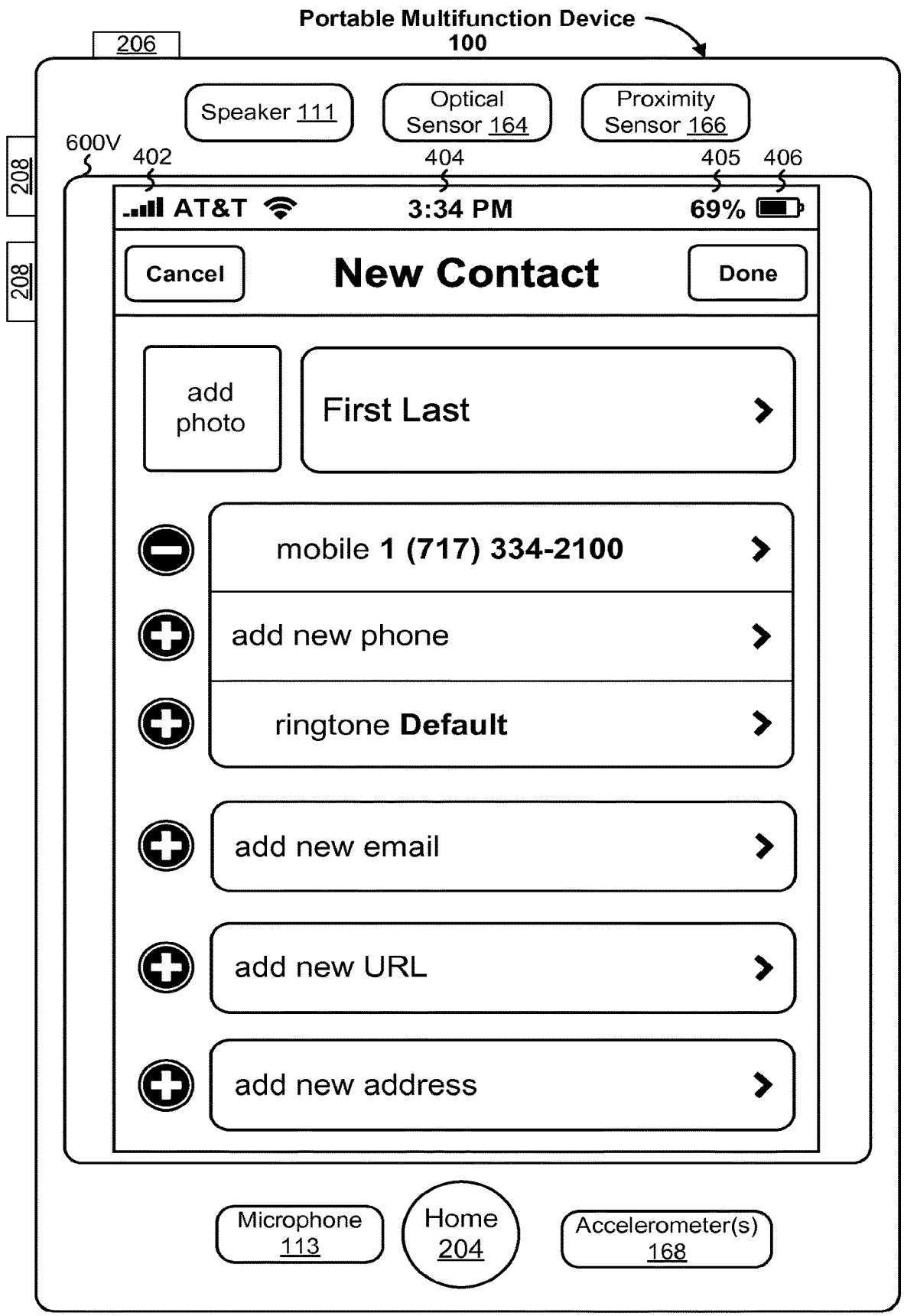
Figure 6W:
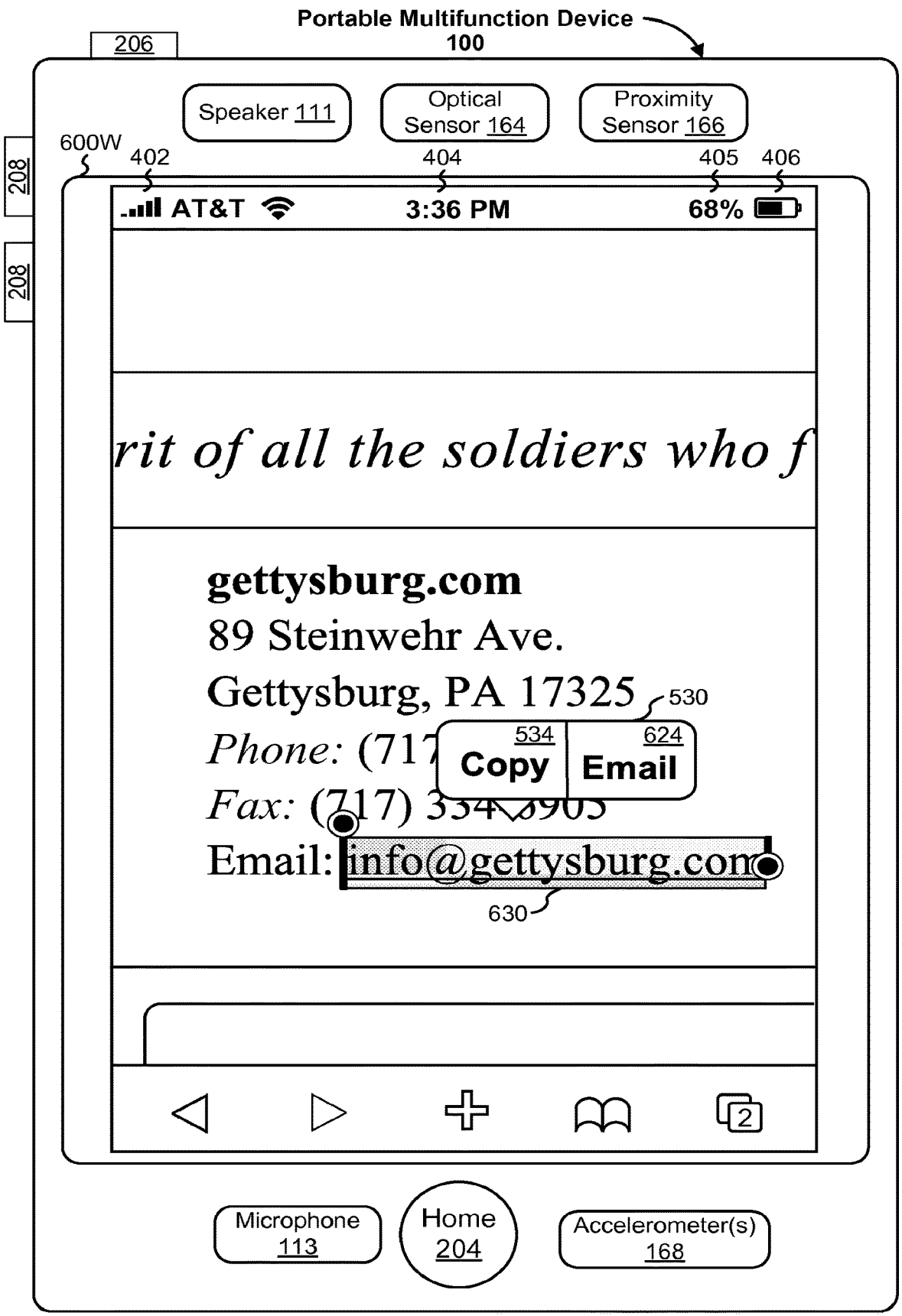
Figure 6X:
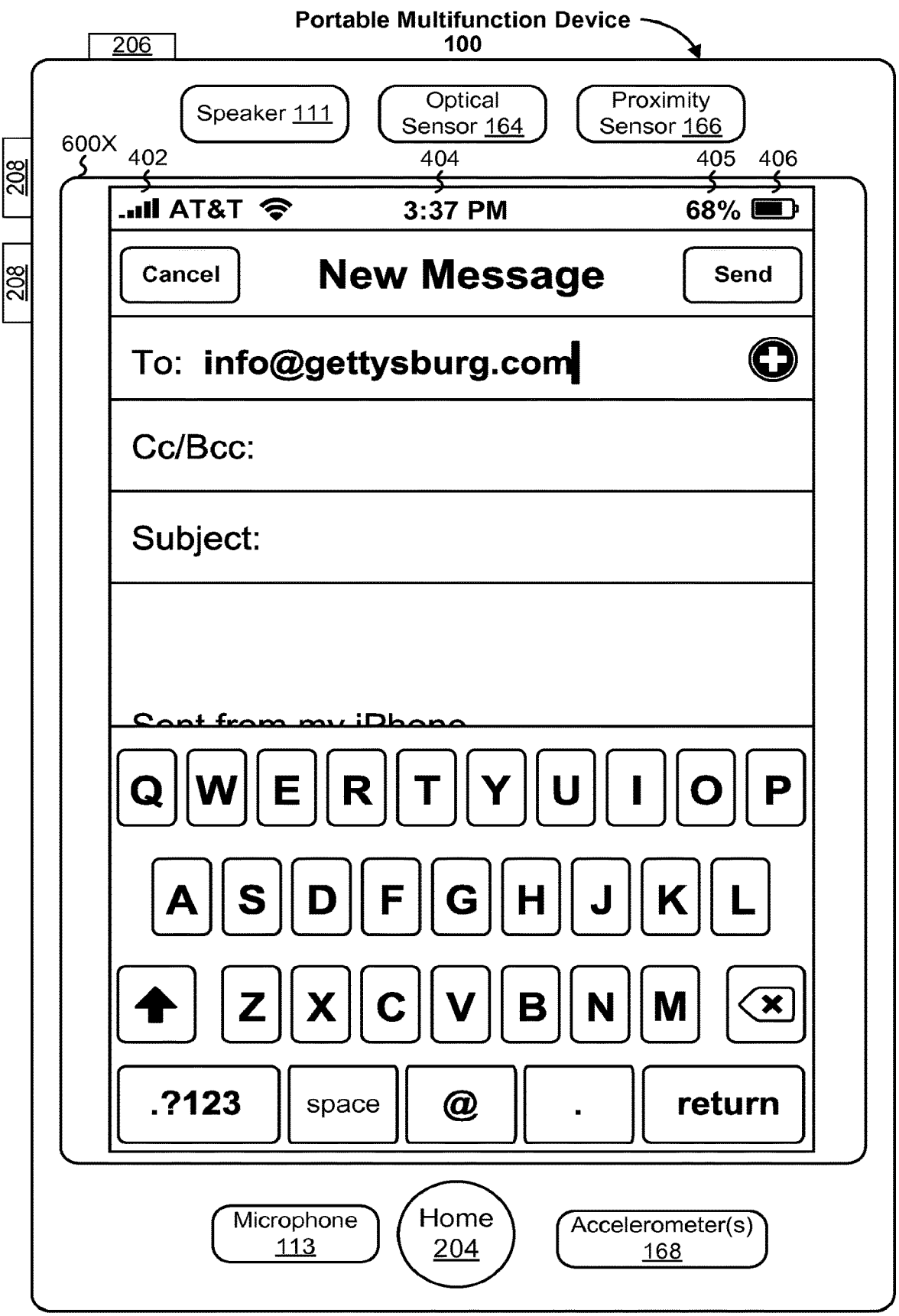

FIGS. 6W-6X illustrate initiating an email based on an email address in the selected content.

Figure 6Y:
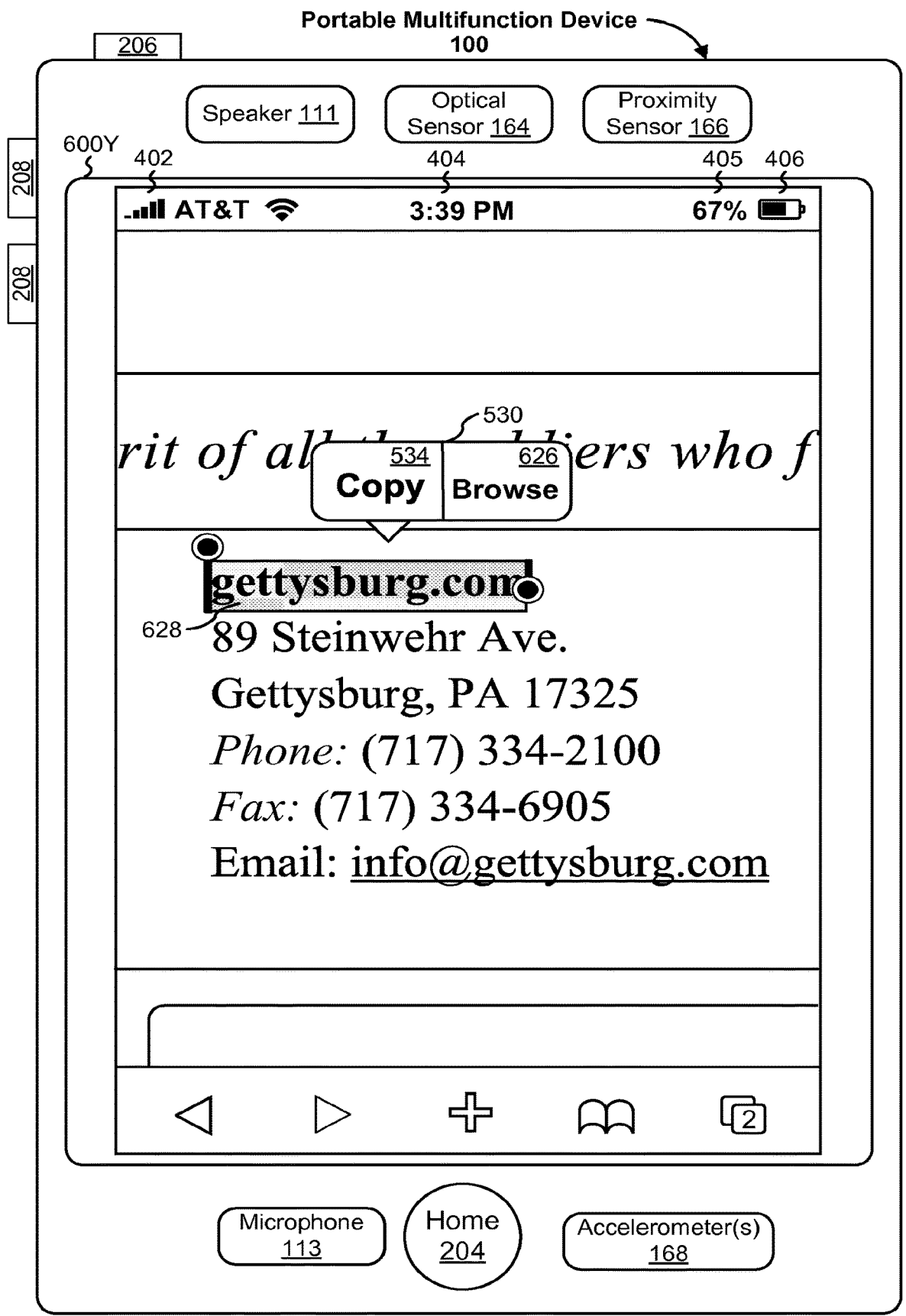
Figure 6Z:
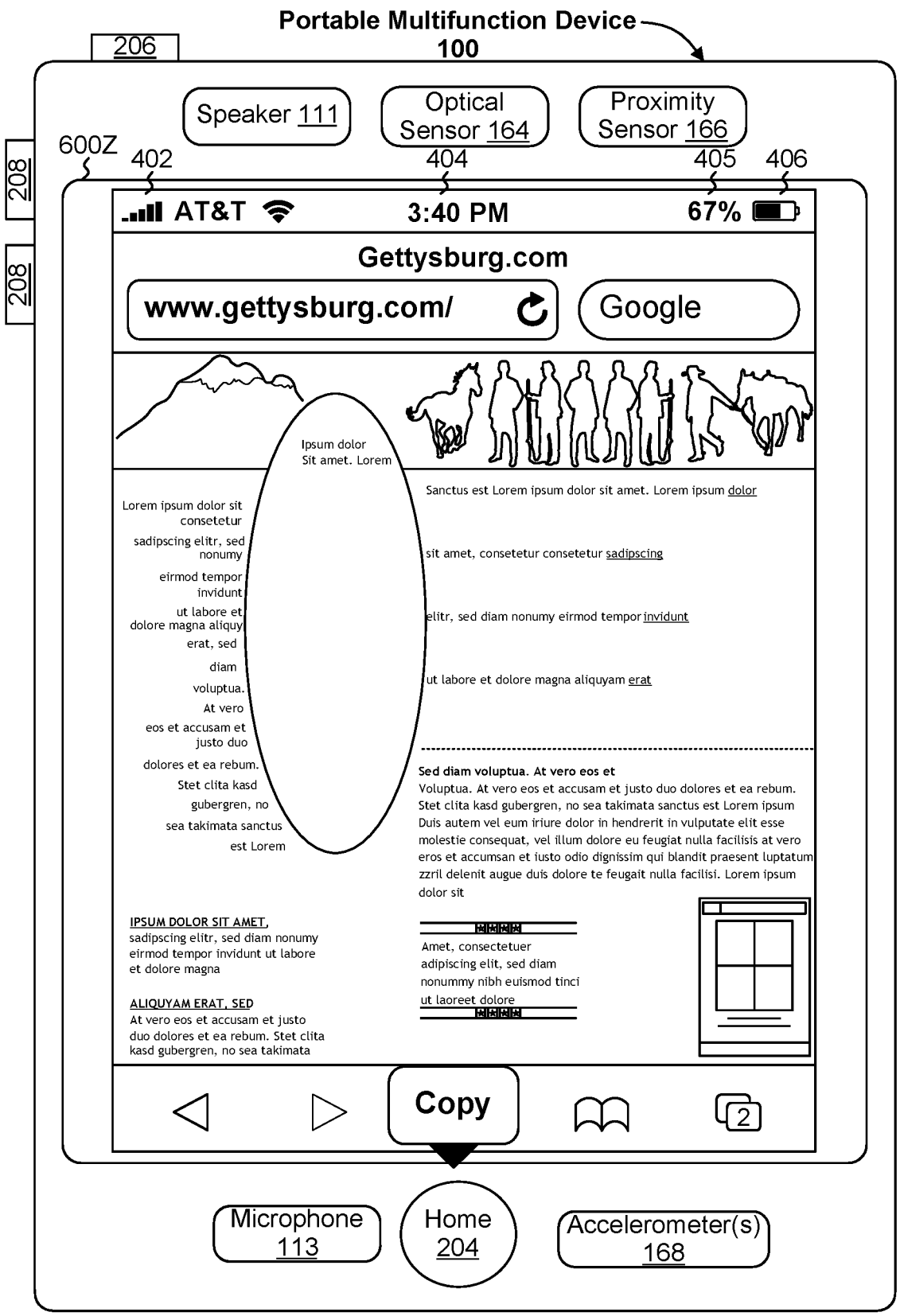
Figure 6A:
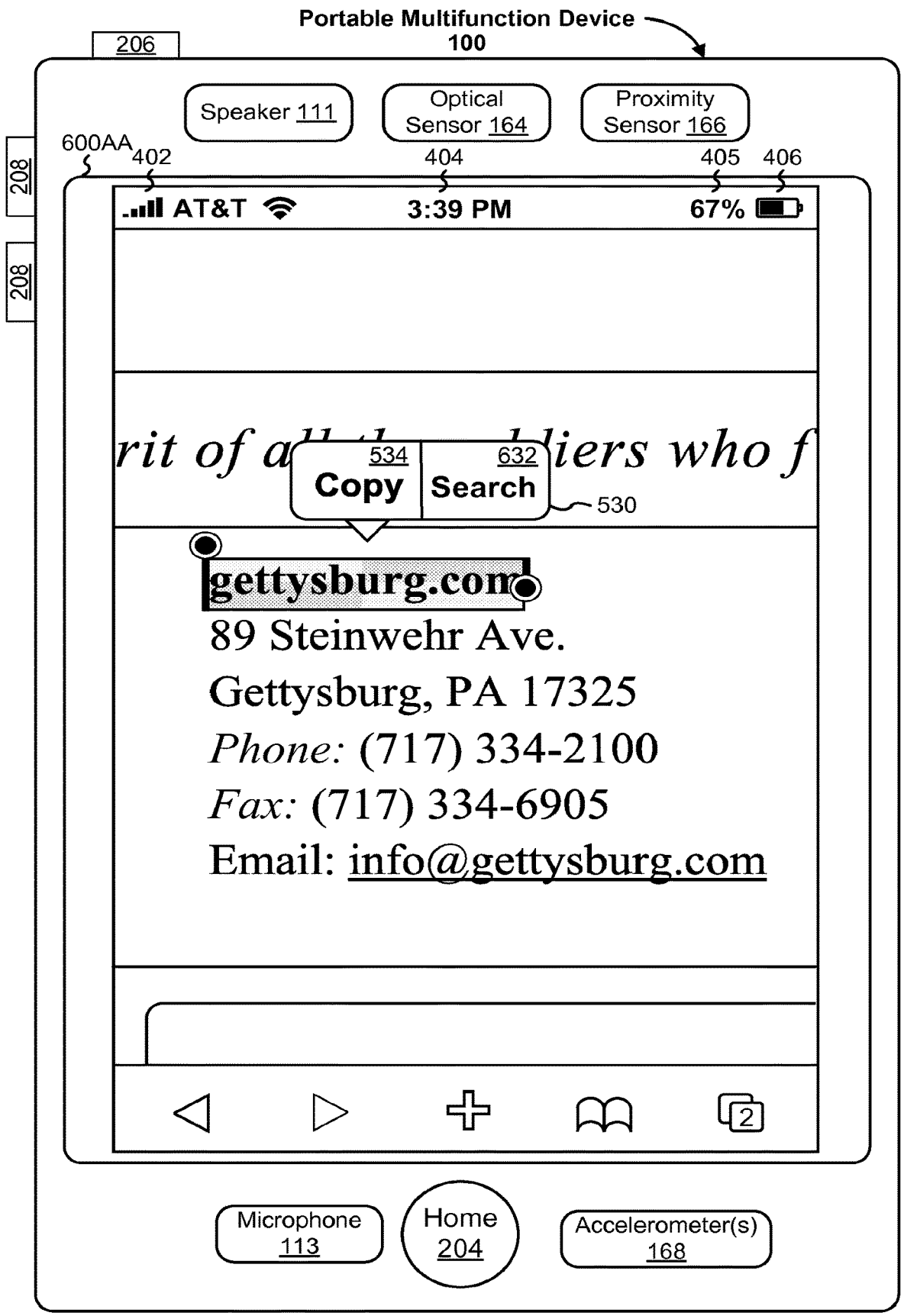
Figure 6B:
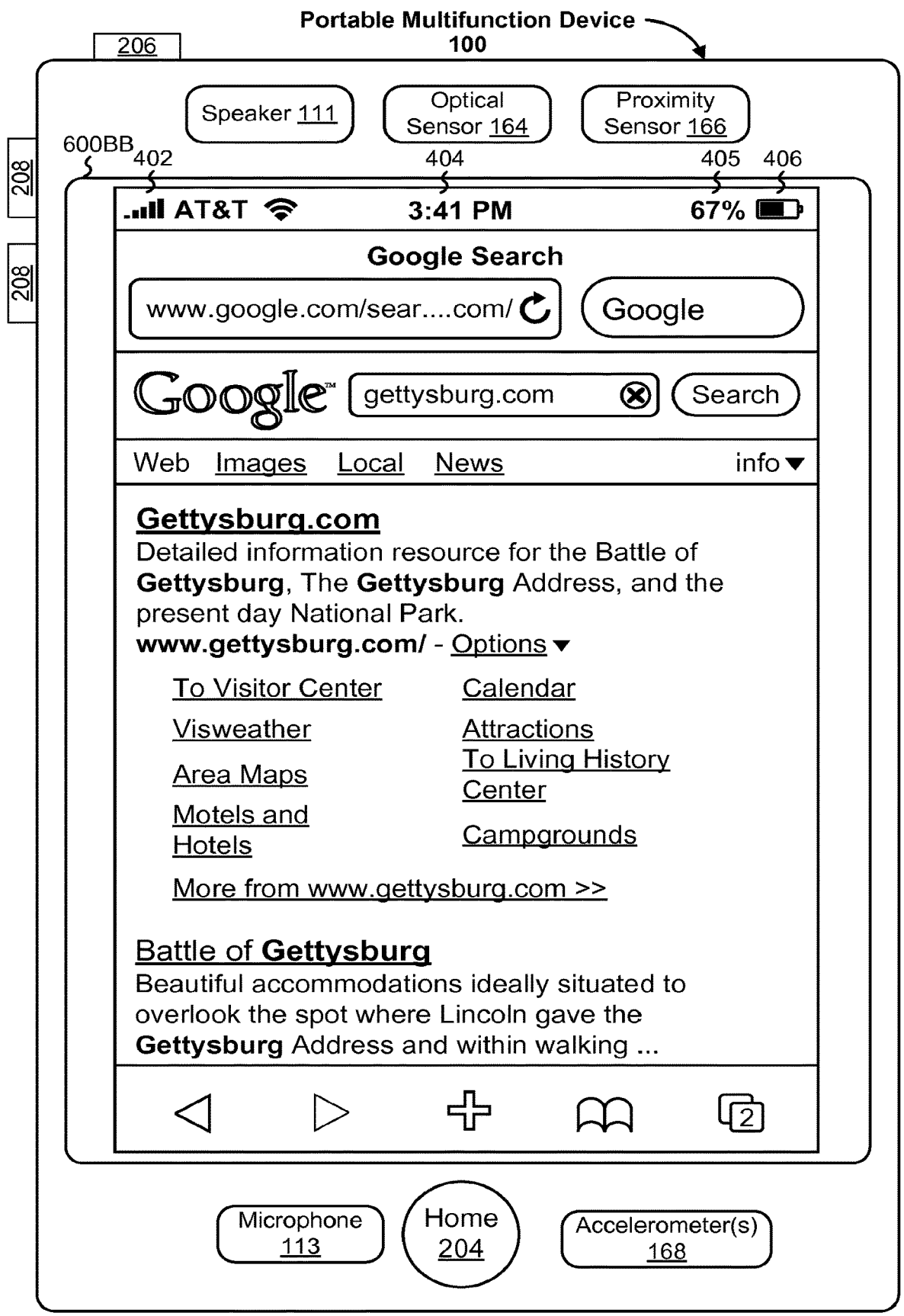
Figure 6C:
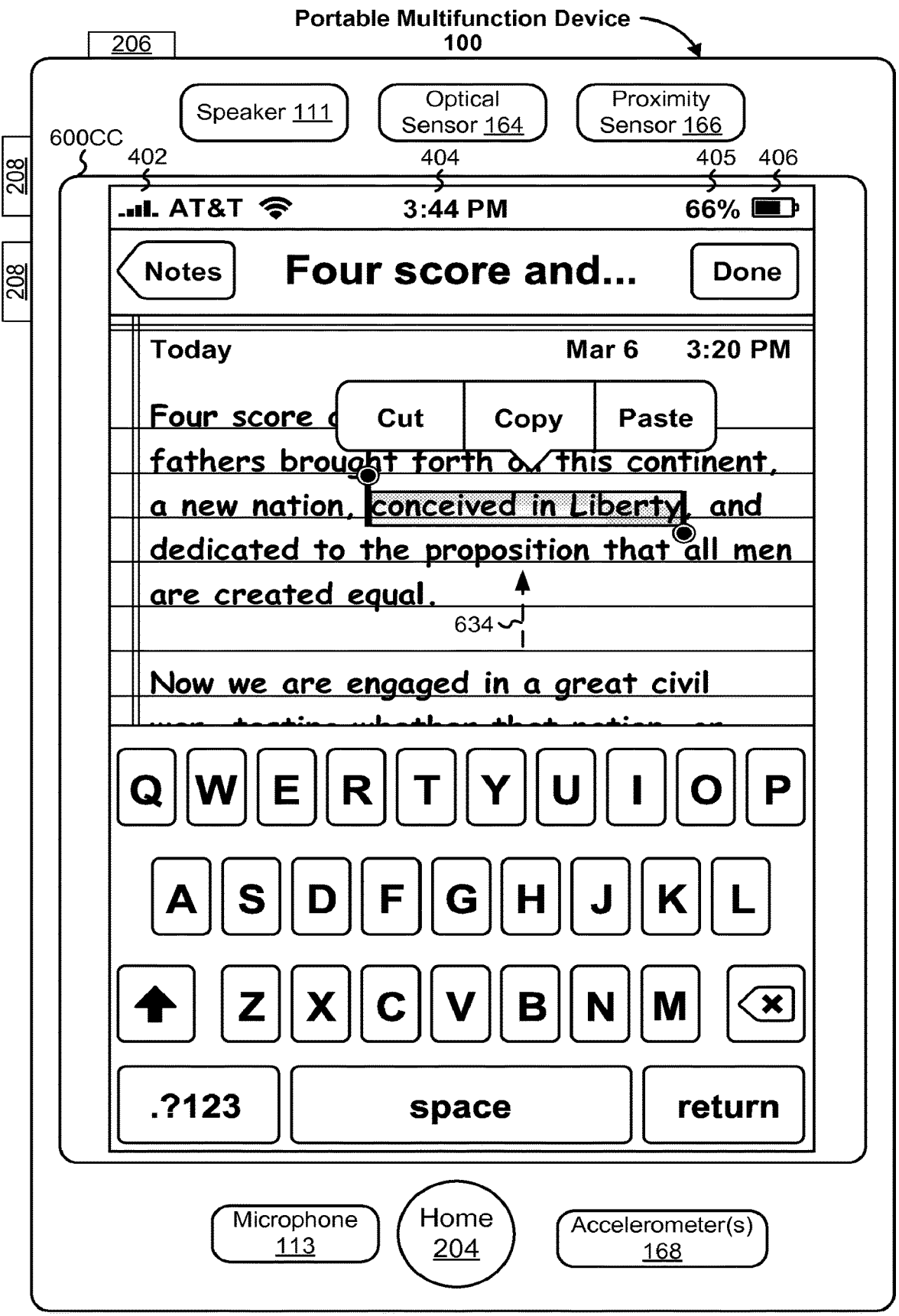
Figure 6D:
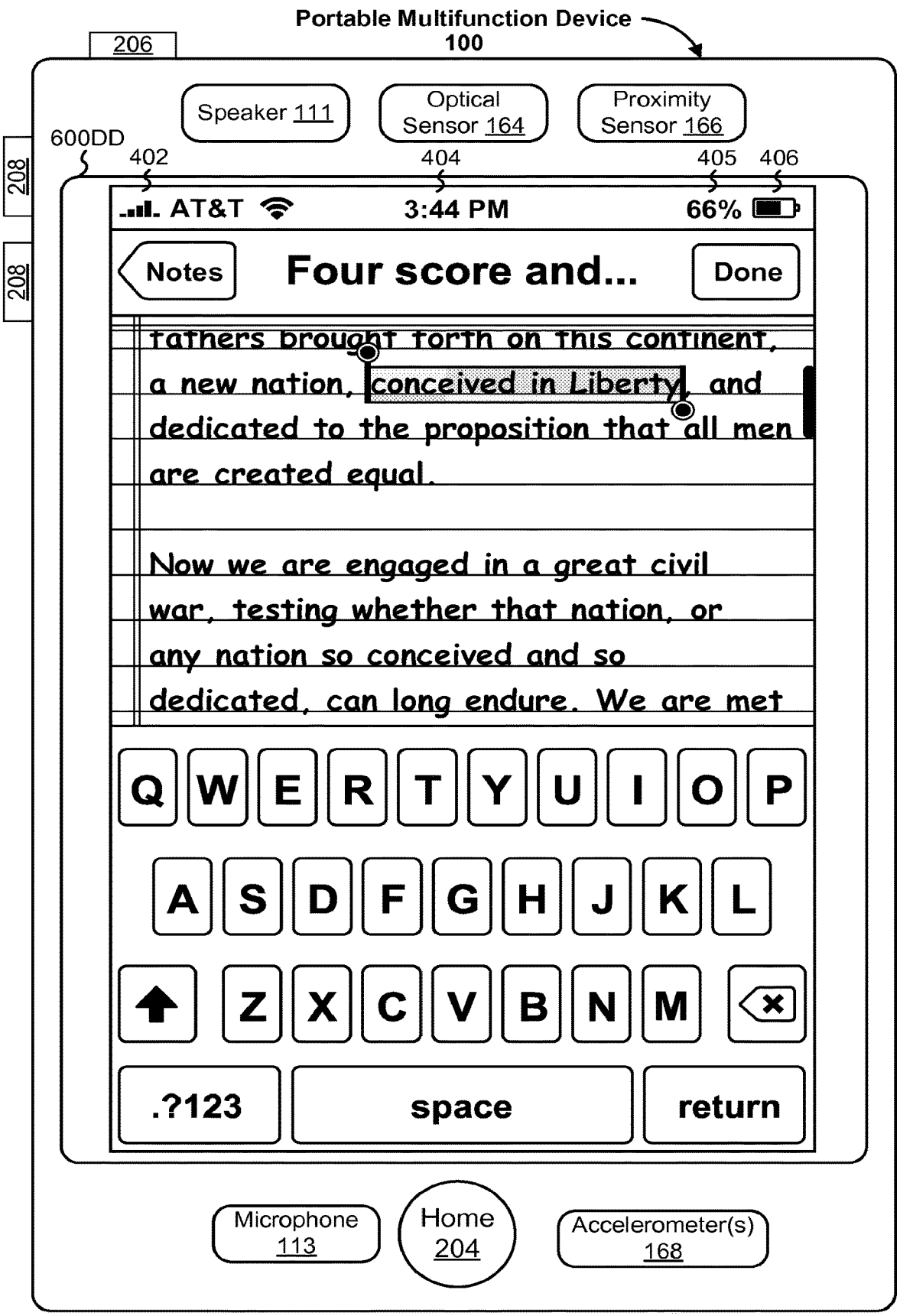
Figure 6E:
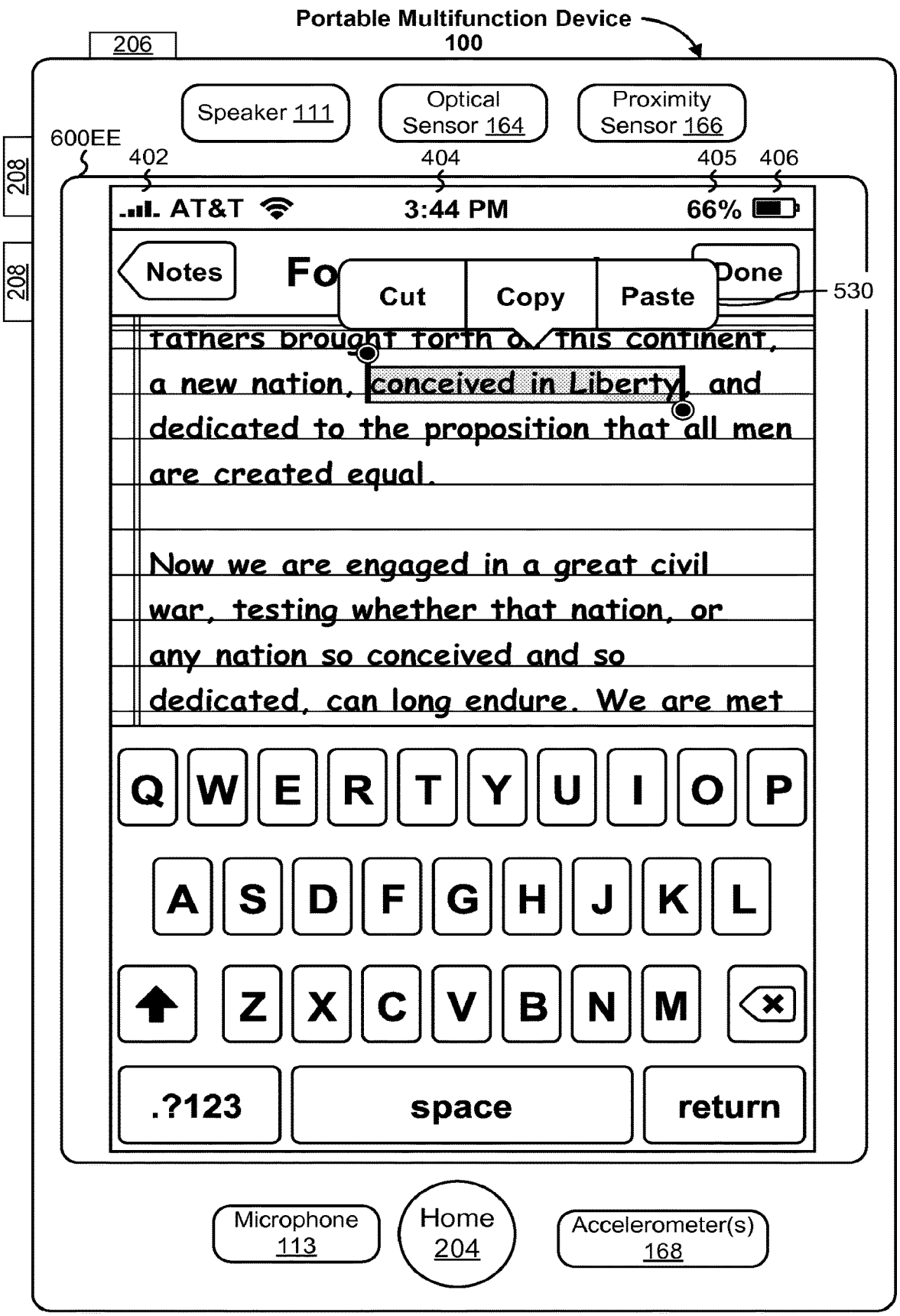
Figure 6F:
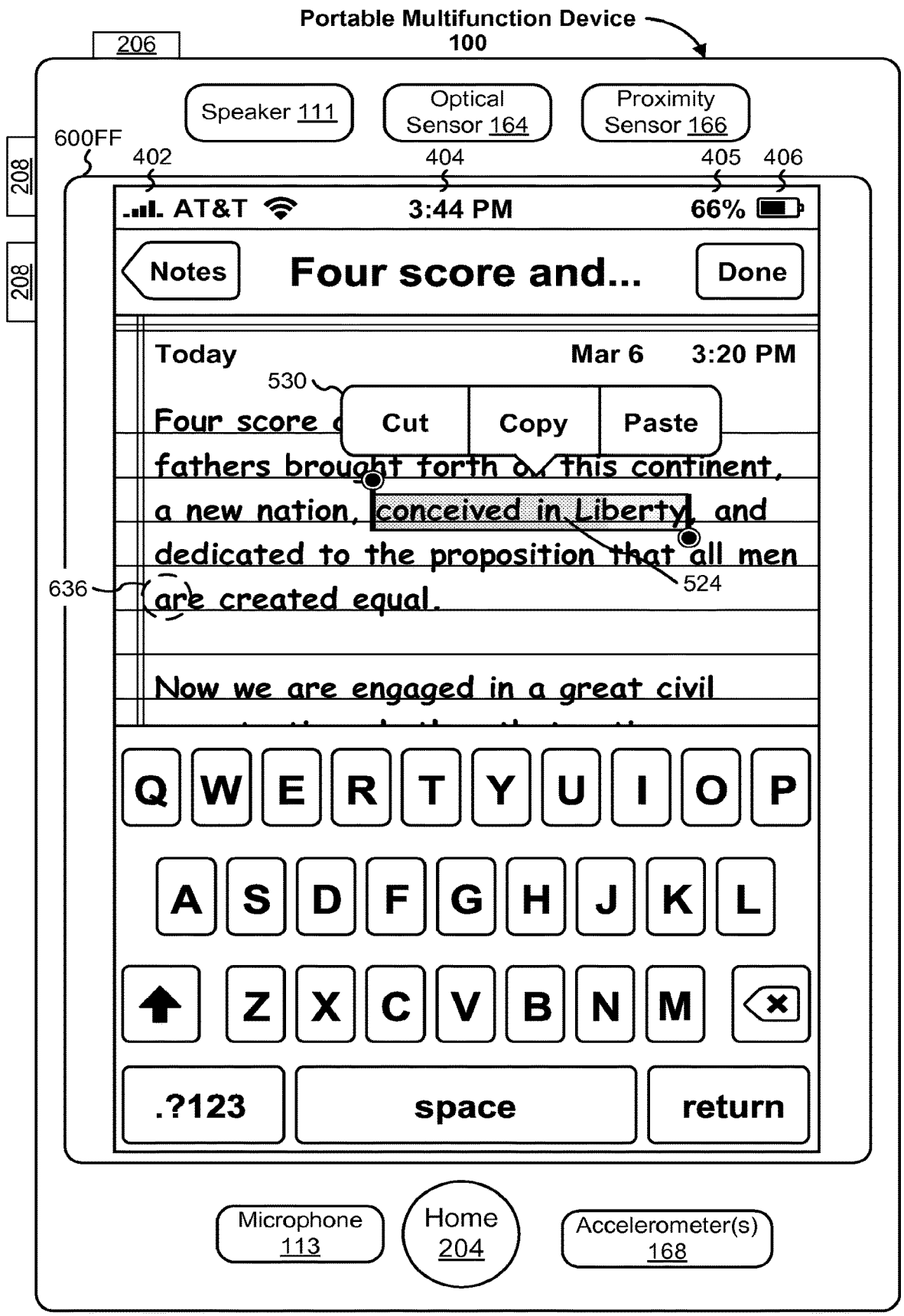
Figure 6G:
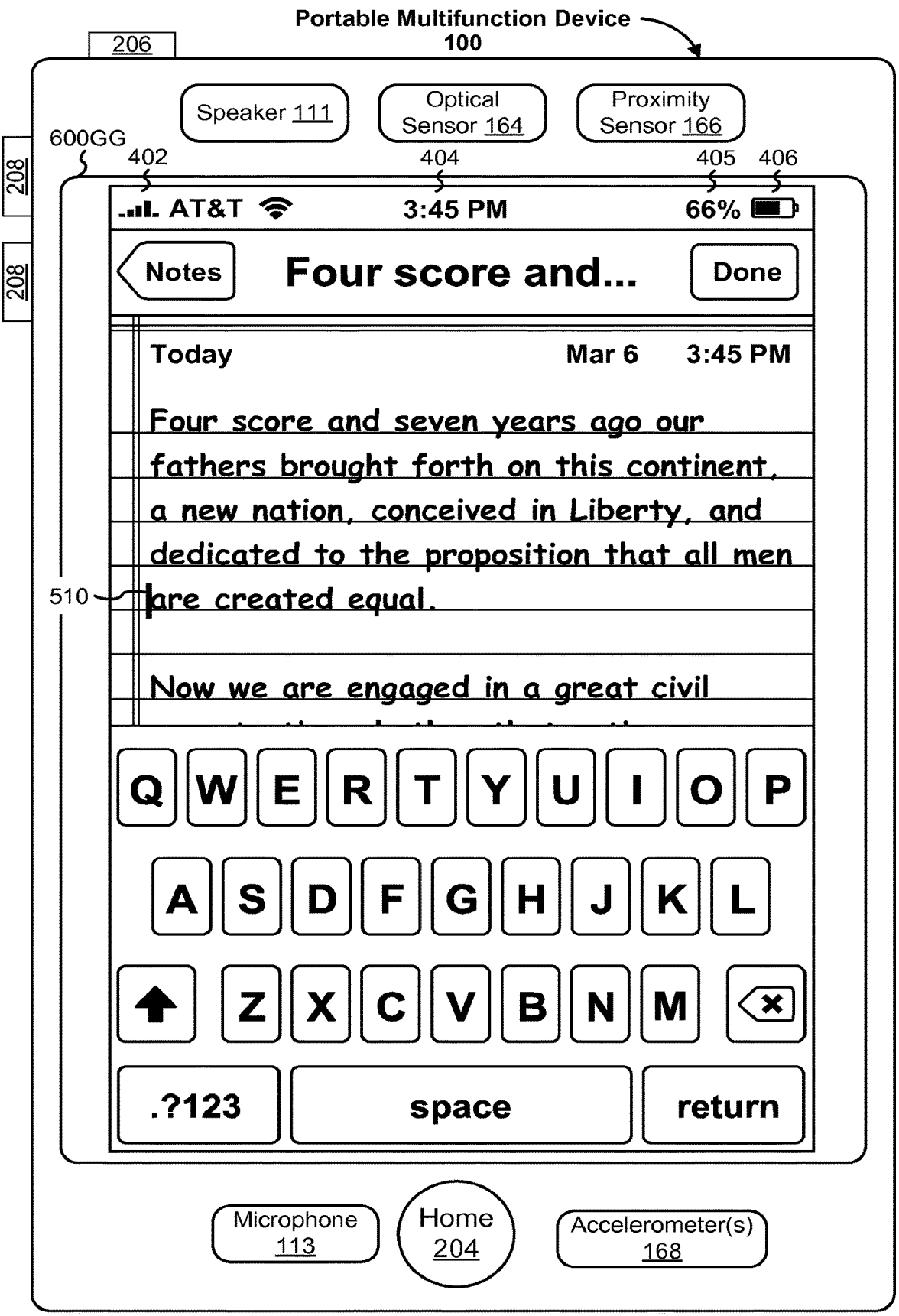
Figure 6H:
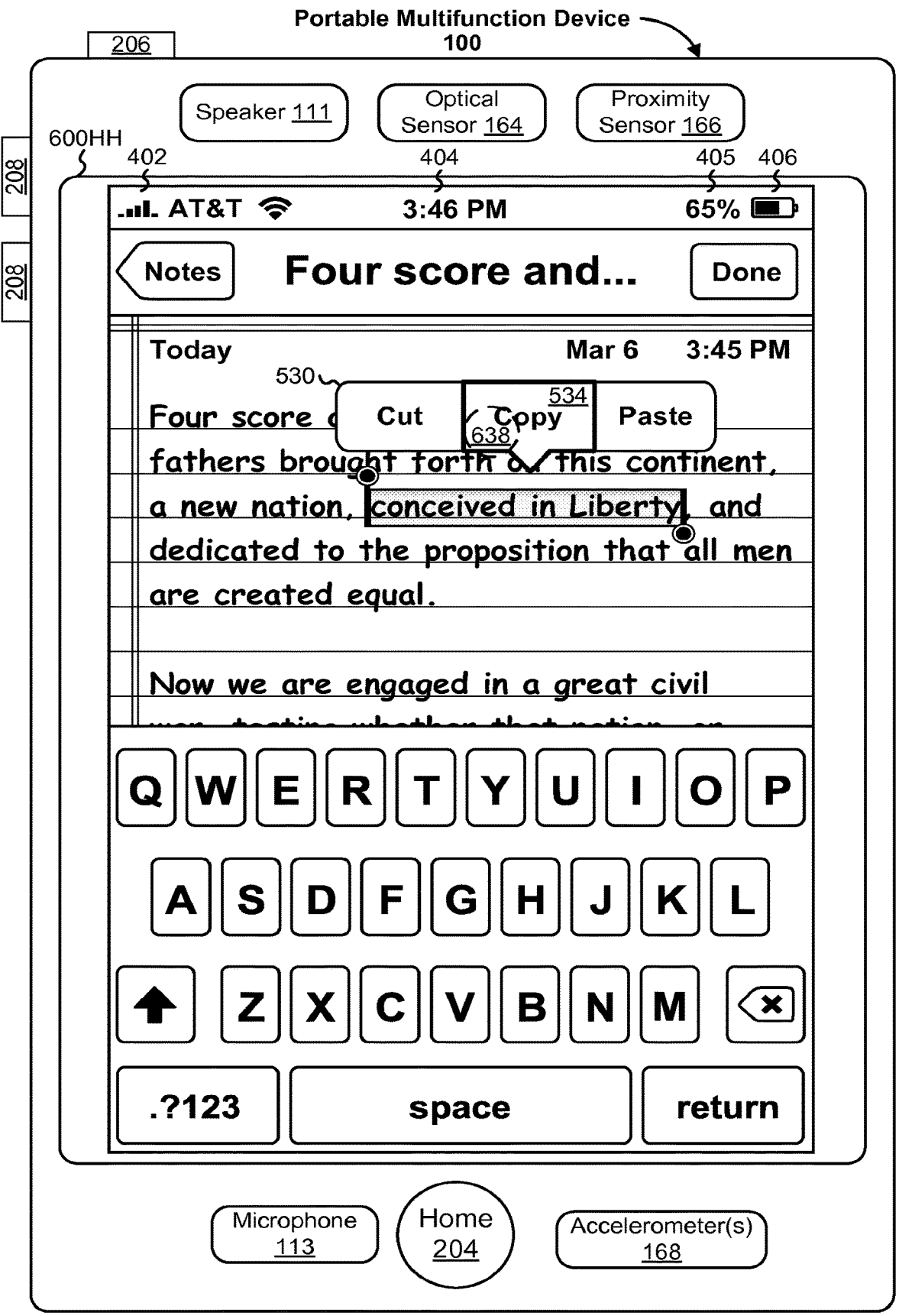
Figure 6I:
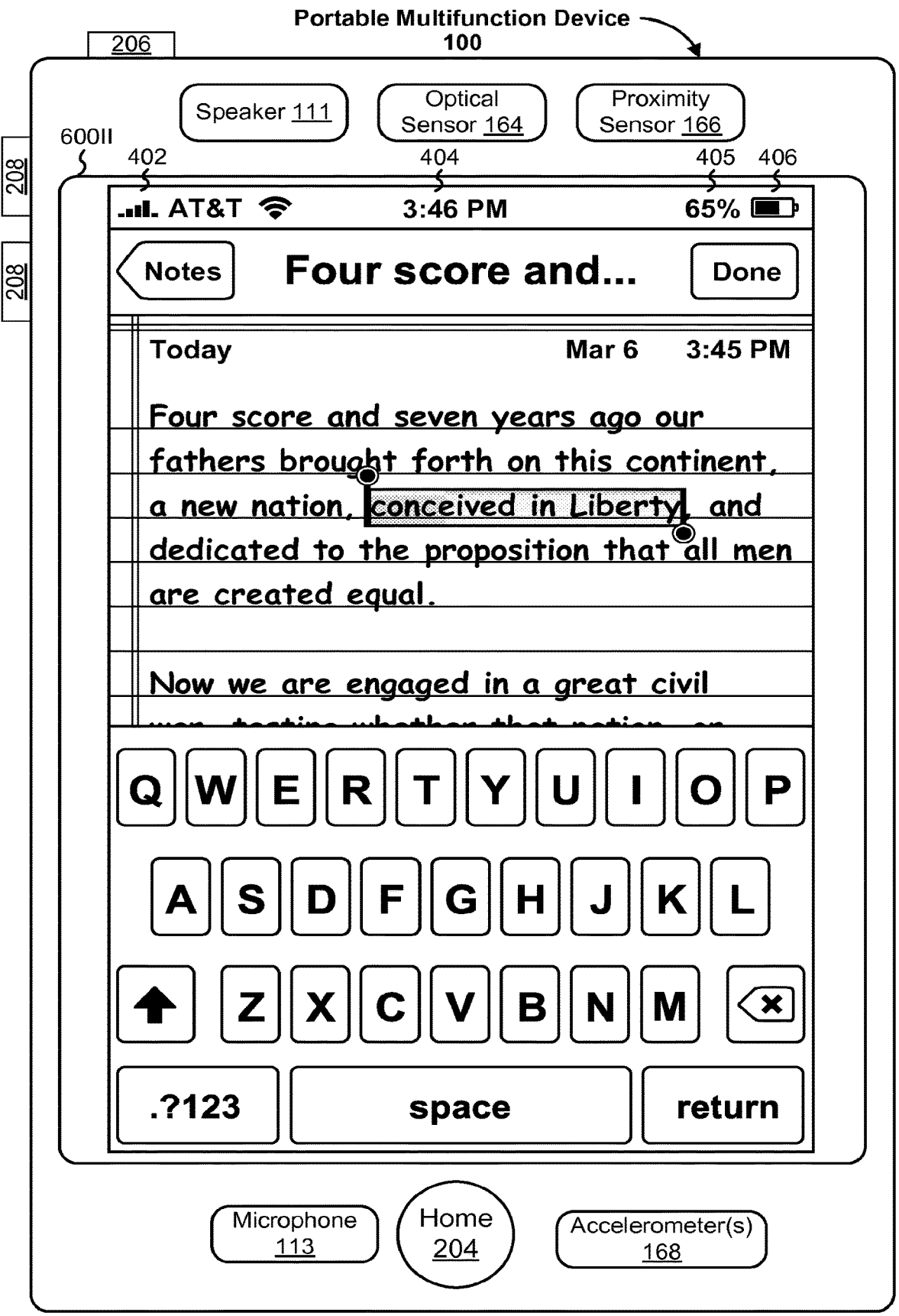
Figure 6J:
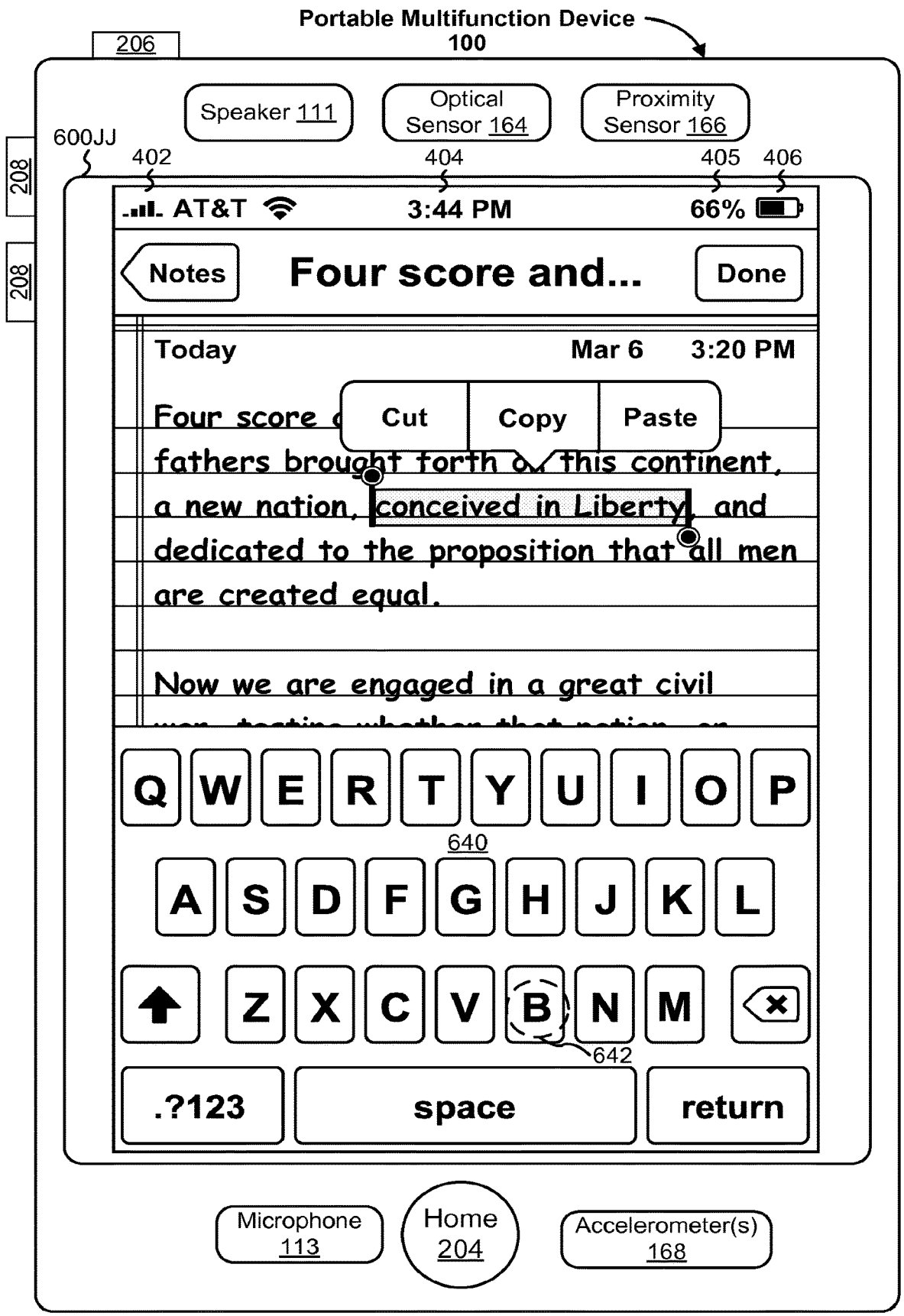
Figure 6K:
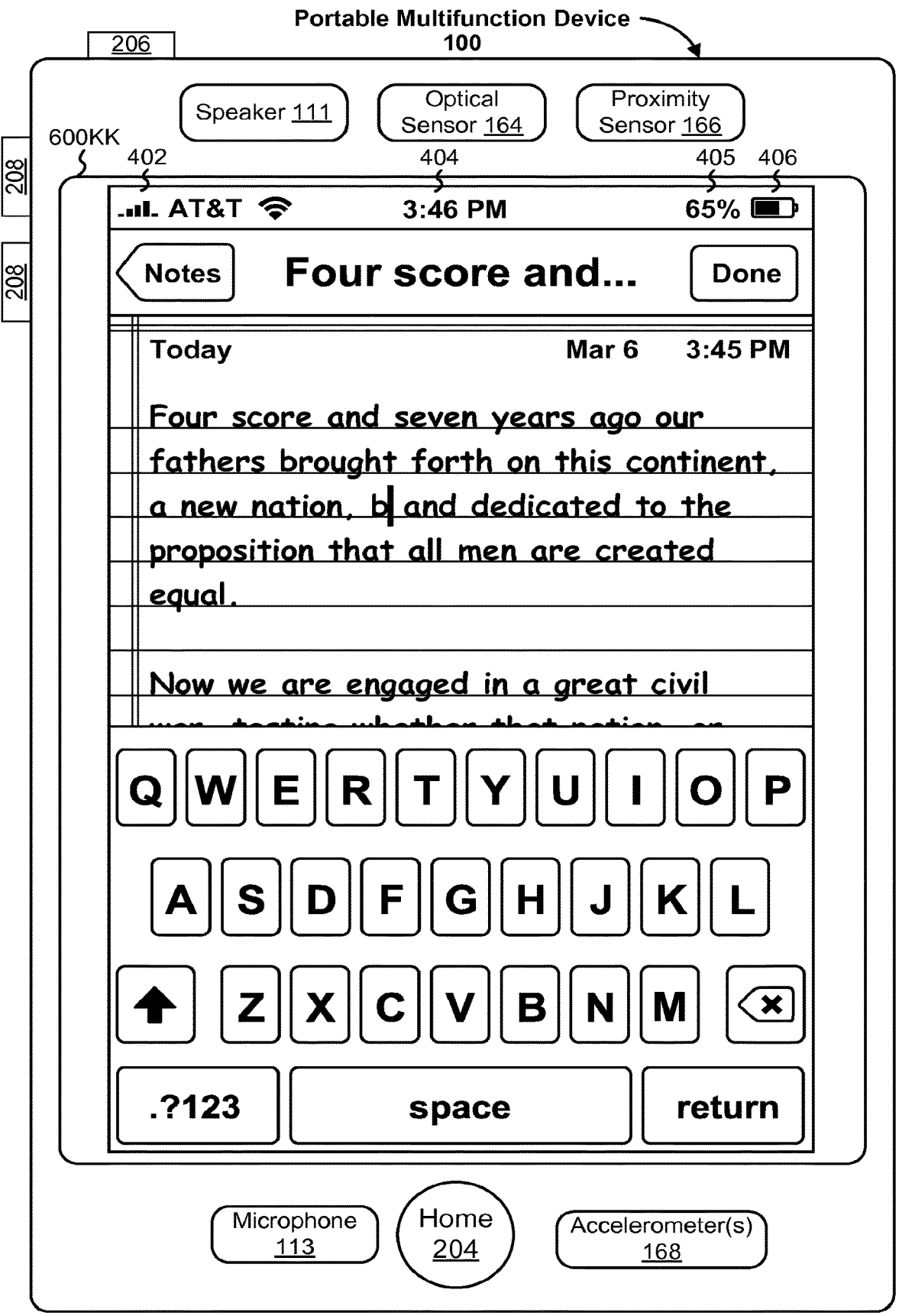
Figure 6L:
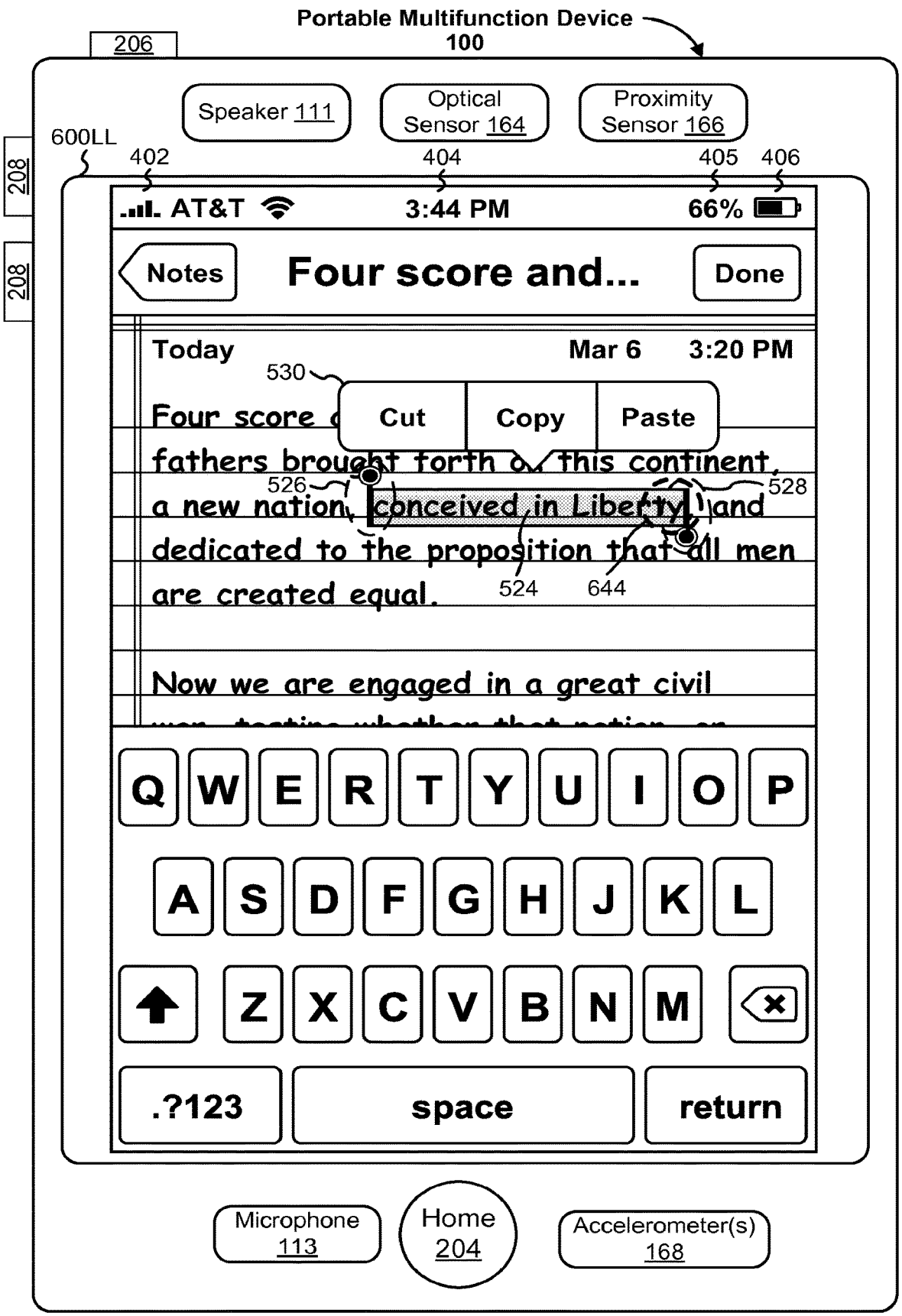
Figure 6M:
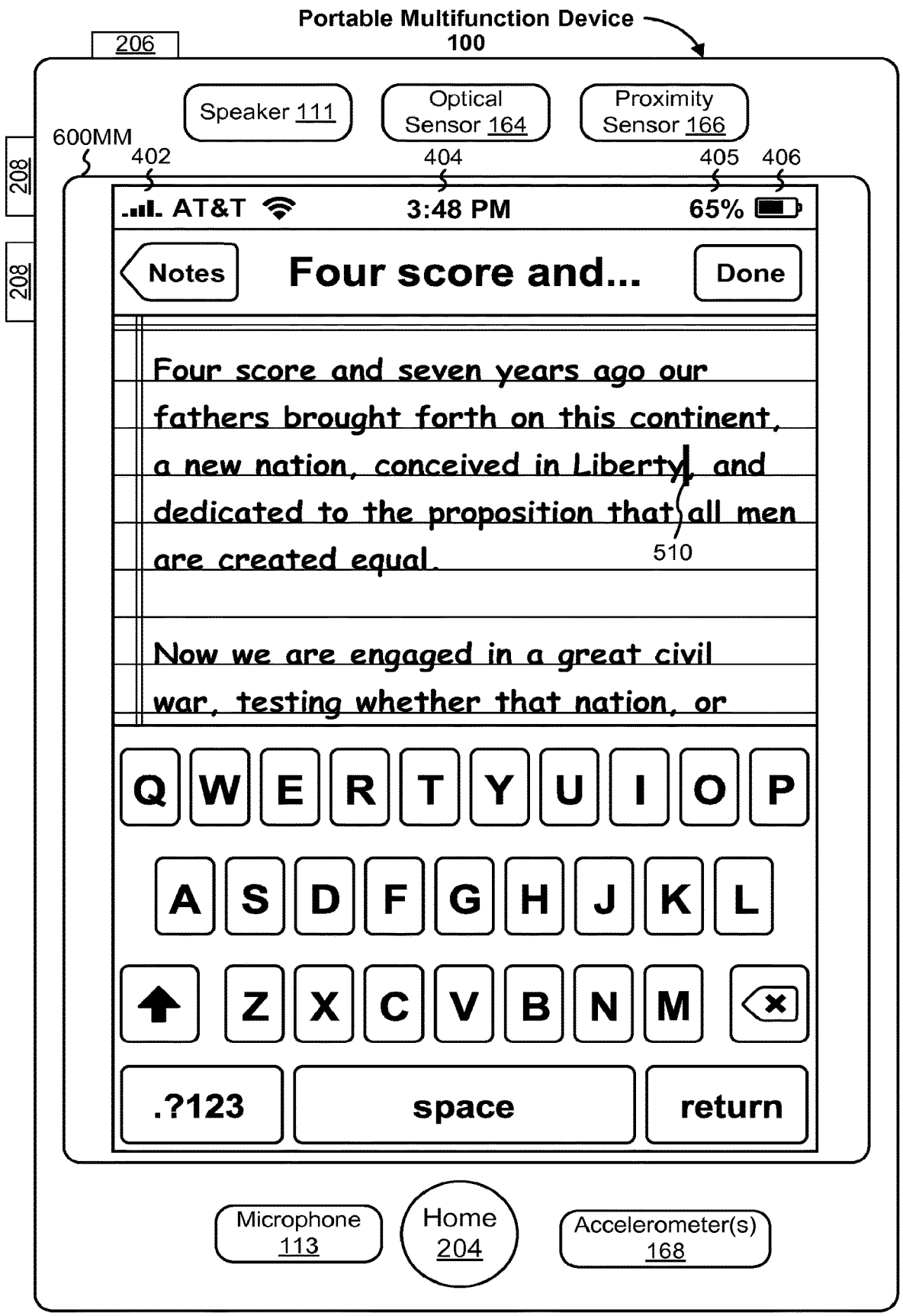
Figure 6N:
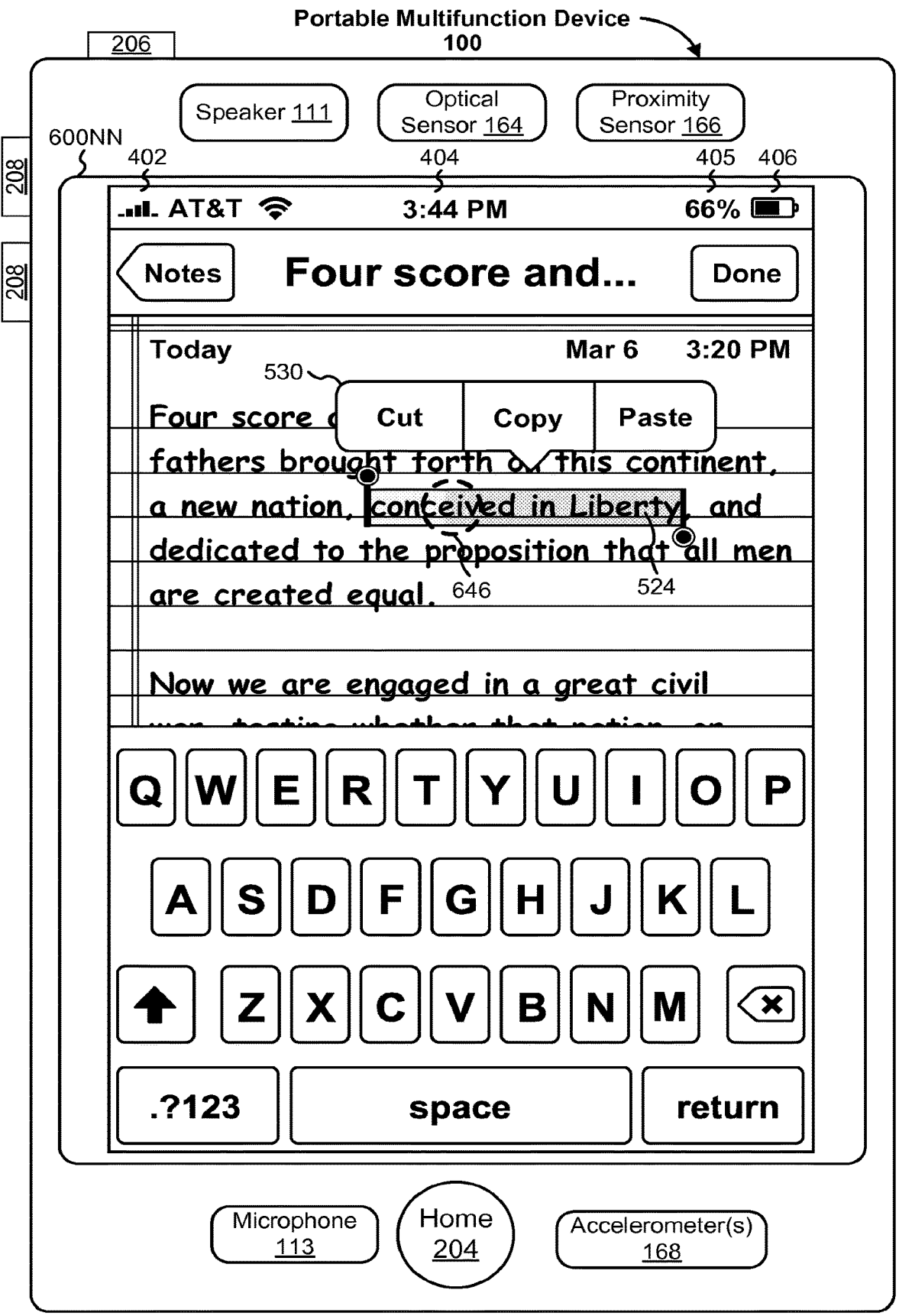
Figure 6O:
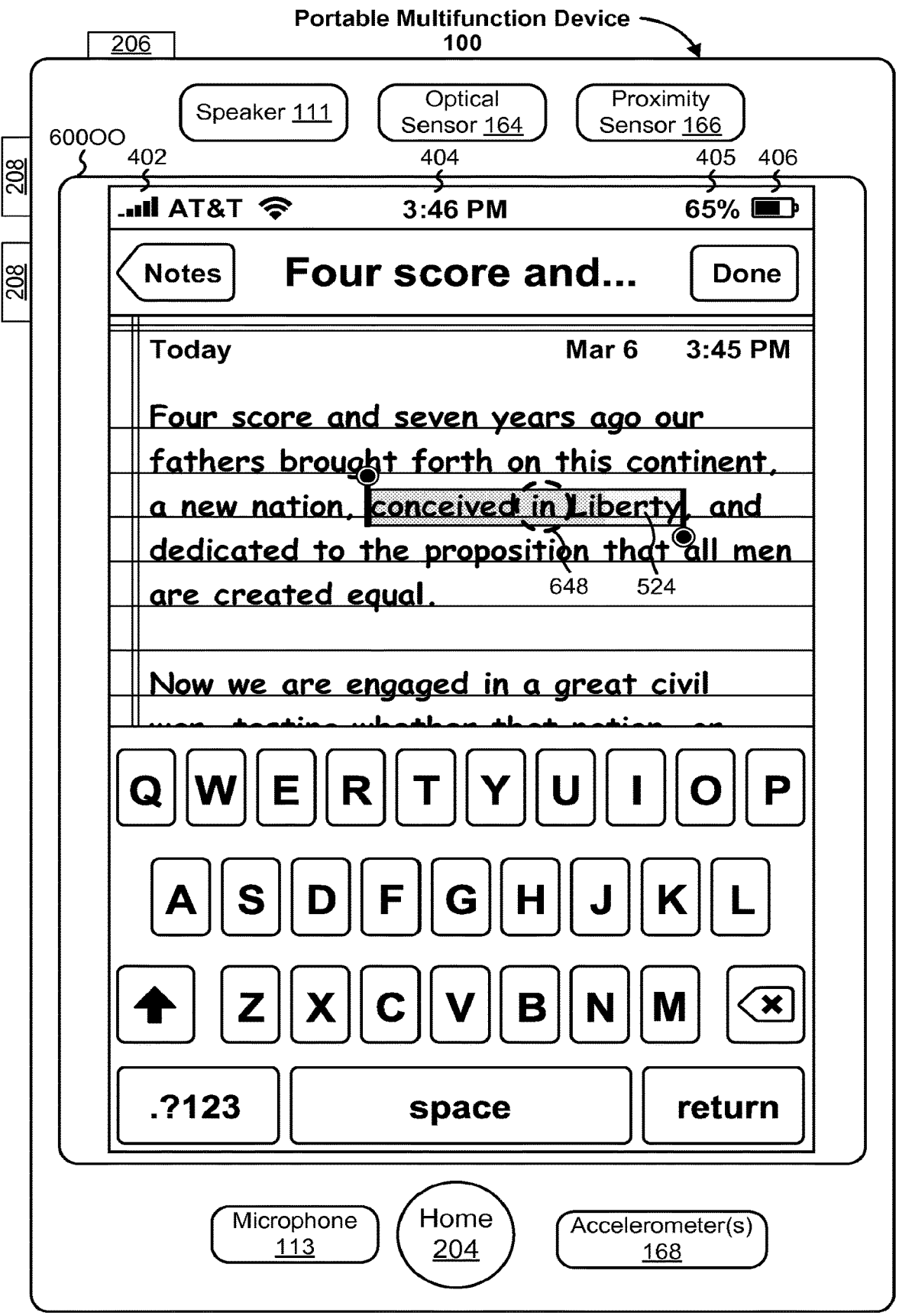
Figure 6P:
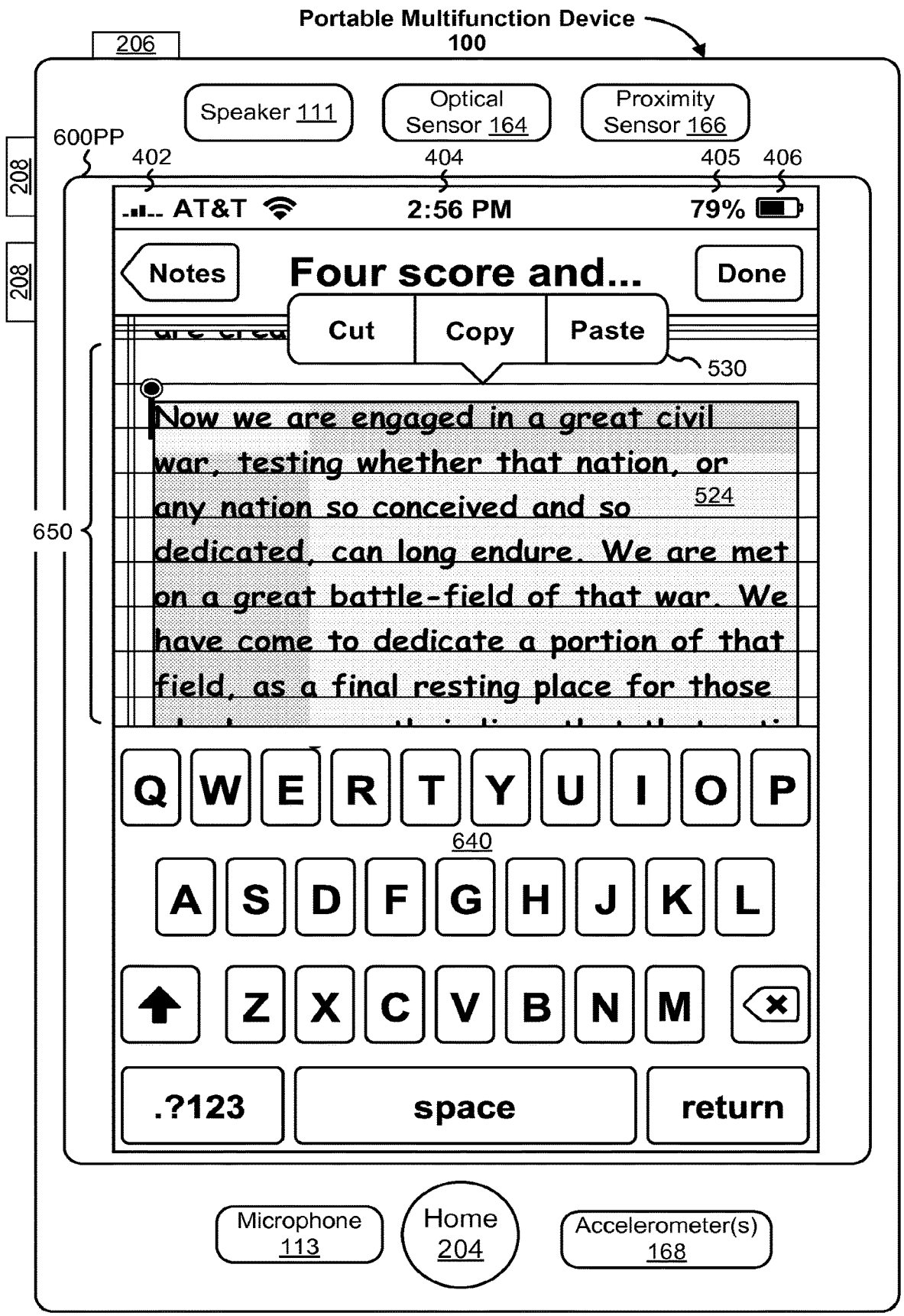
Figure 6Q:
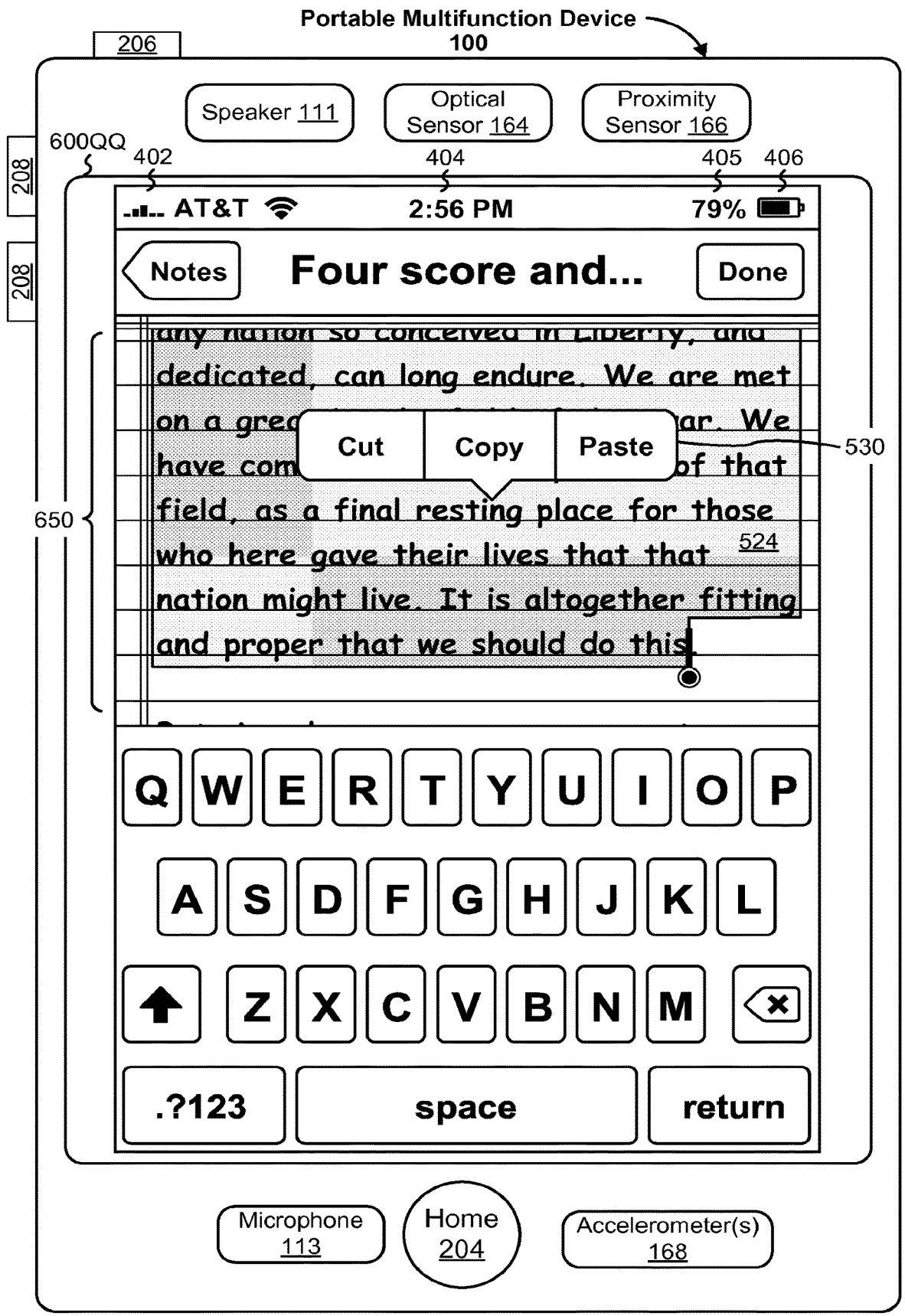
Figure 6R:
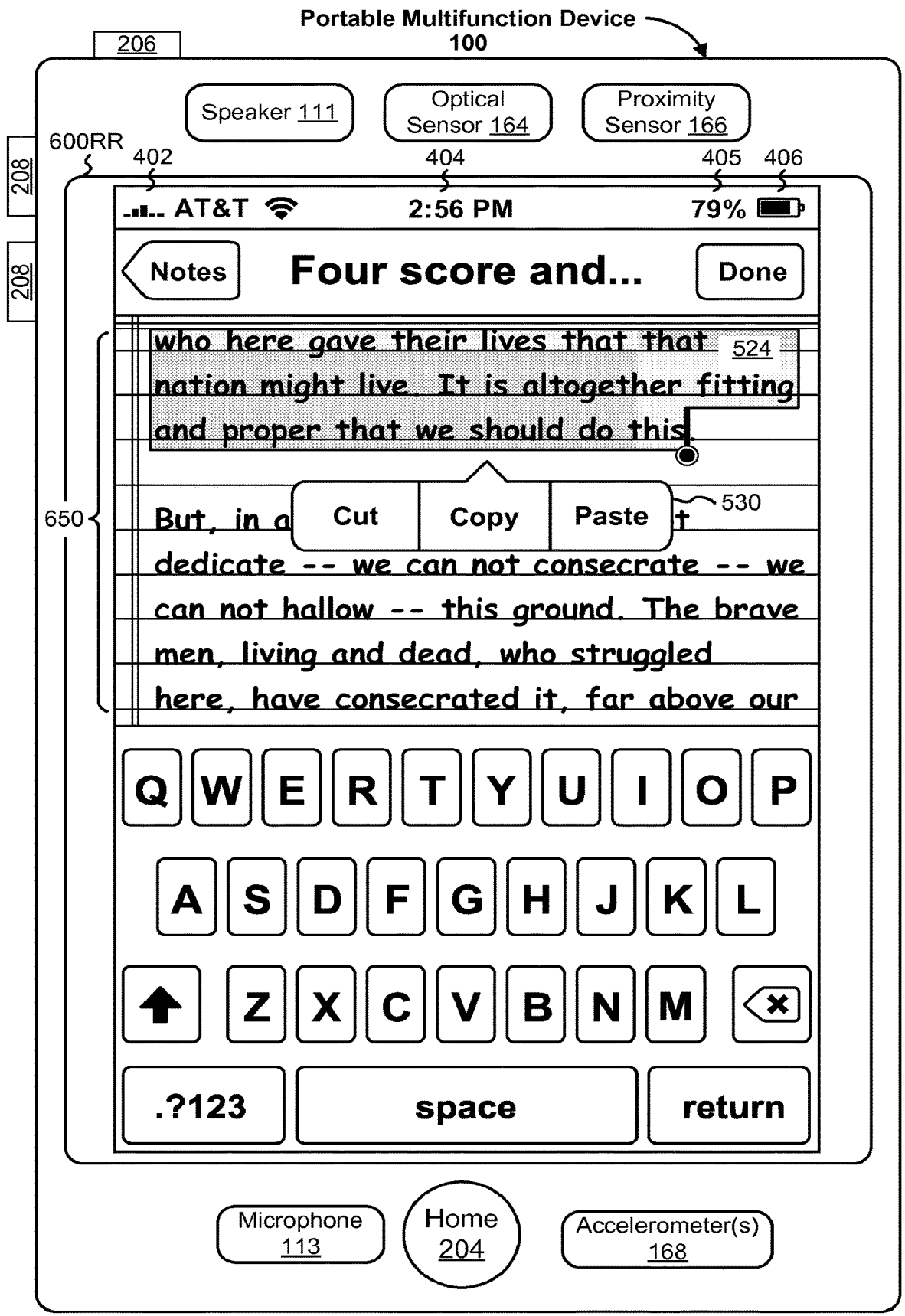
Figure 6S:
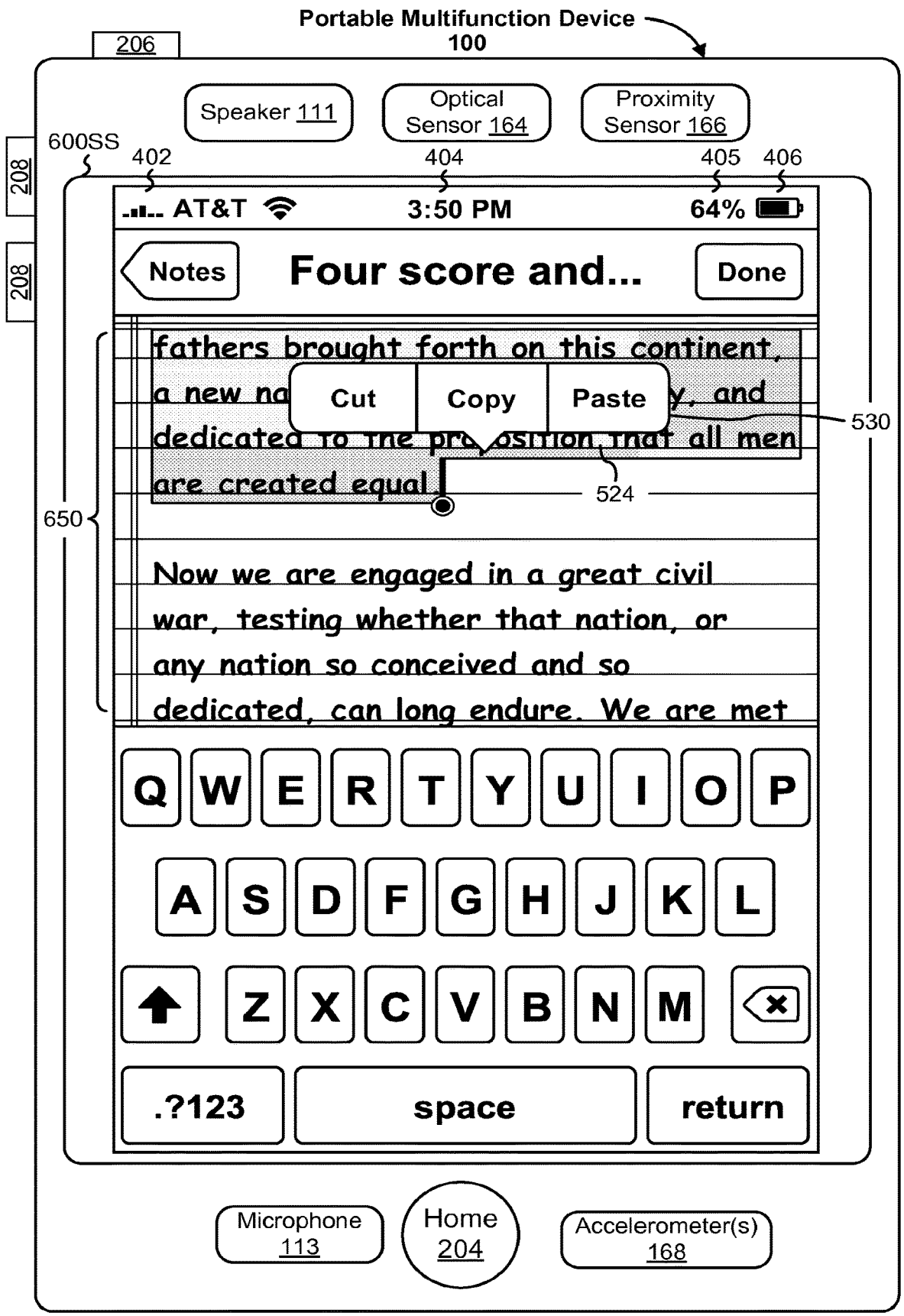
Figure 6T:
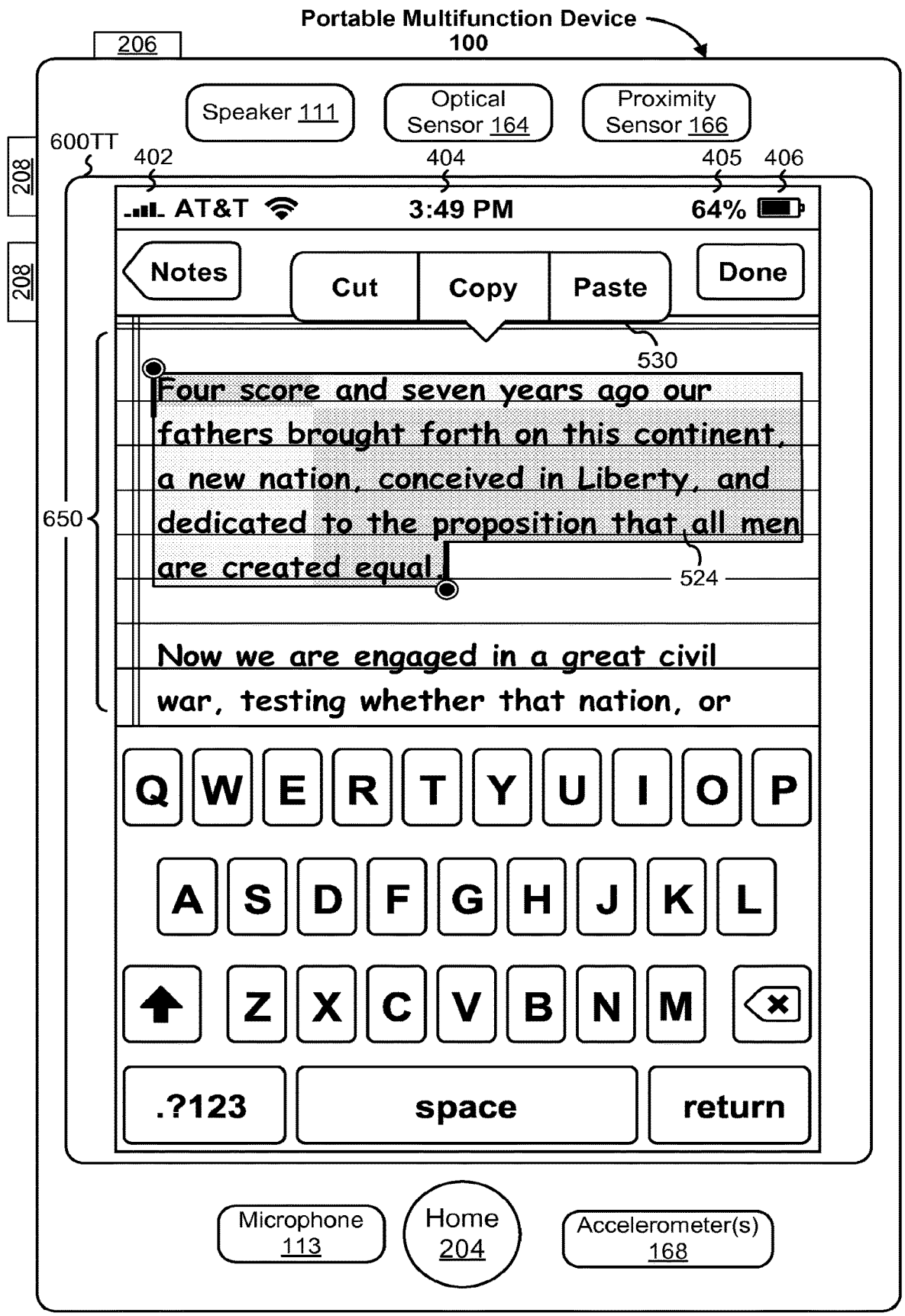
Figure 6U:
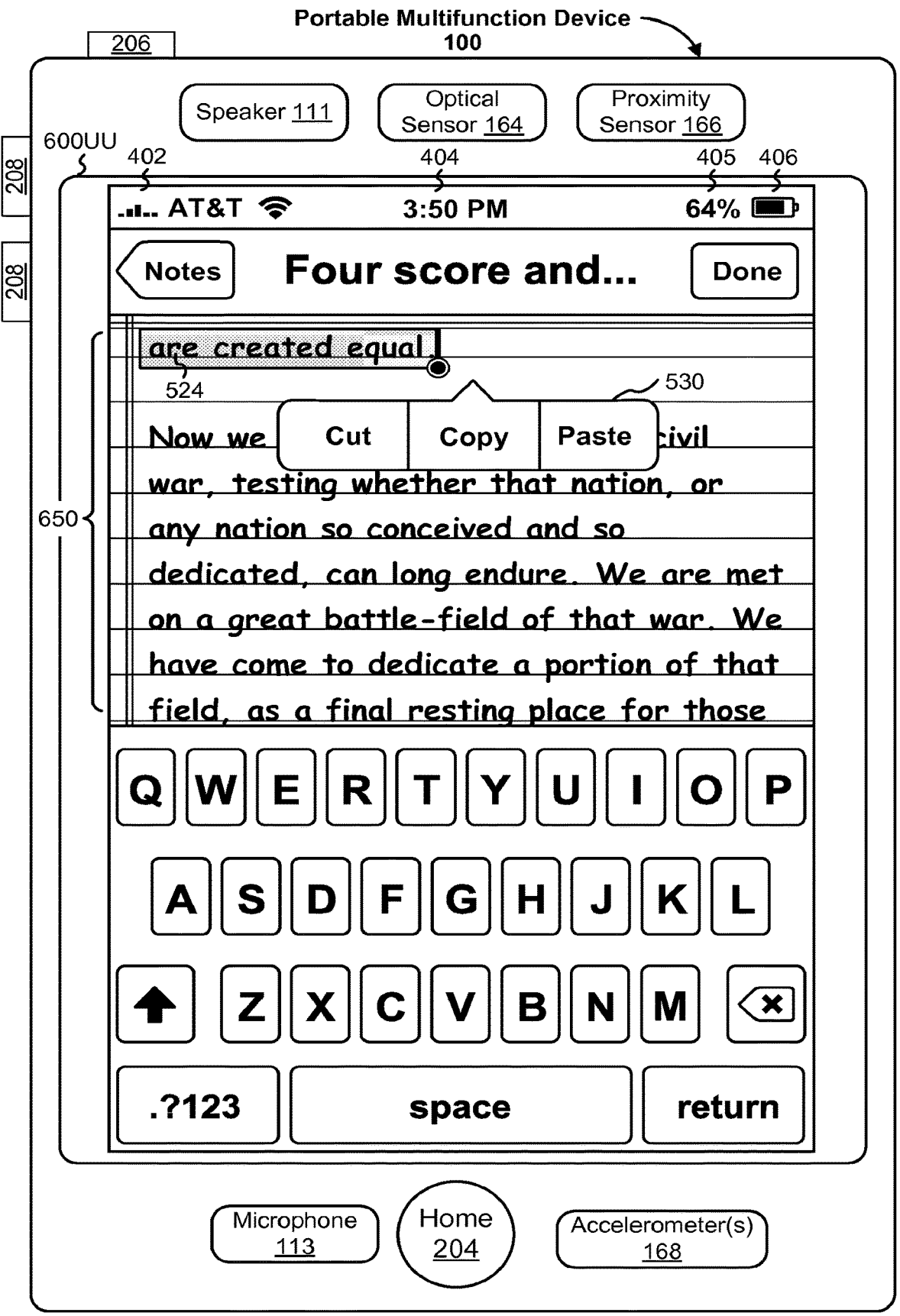

FIGS. 6Y-6Z illustrate initiating web browsing based on a web address in the selected content.

FIGS. 6AA-6BB illustrate initiating a search using information in selected content.

FIGS. 6CC-6OO illustrate actions that cause the command display area to disappear and/or reappear.

FIGS. 6PP-6UU illustrate changes in the placement of the display command area relative to the selected content.

FIGS. 7A-7E illustrate exemplary user interfaces for using a content magnifier to select a respective end of selected content in accordance with some embodiments. The user interfaces in these figures are used to illustrate the processes described below with respect to FIGS. 16A-16E.

Figure 8A:
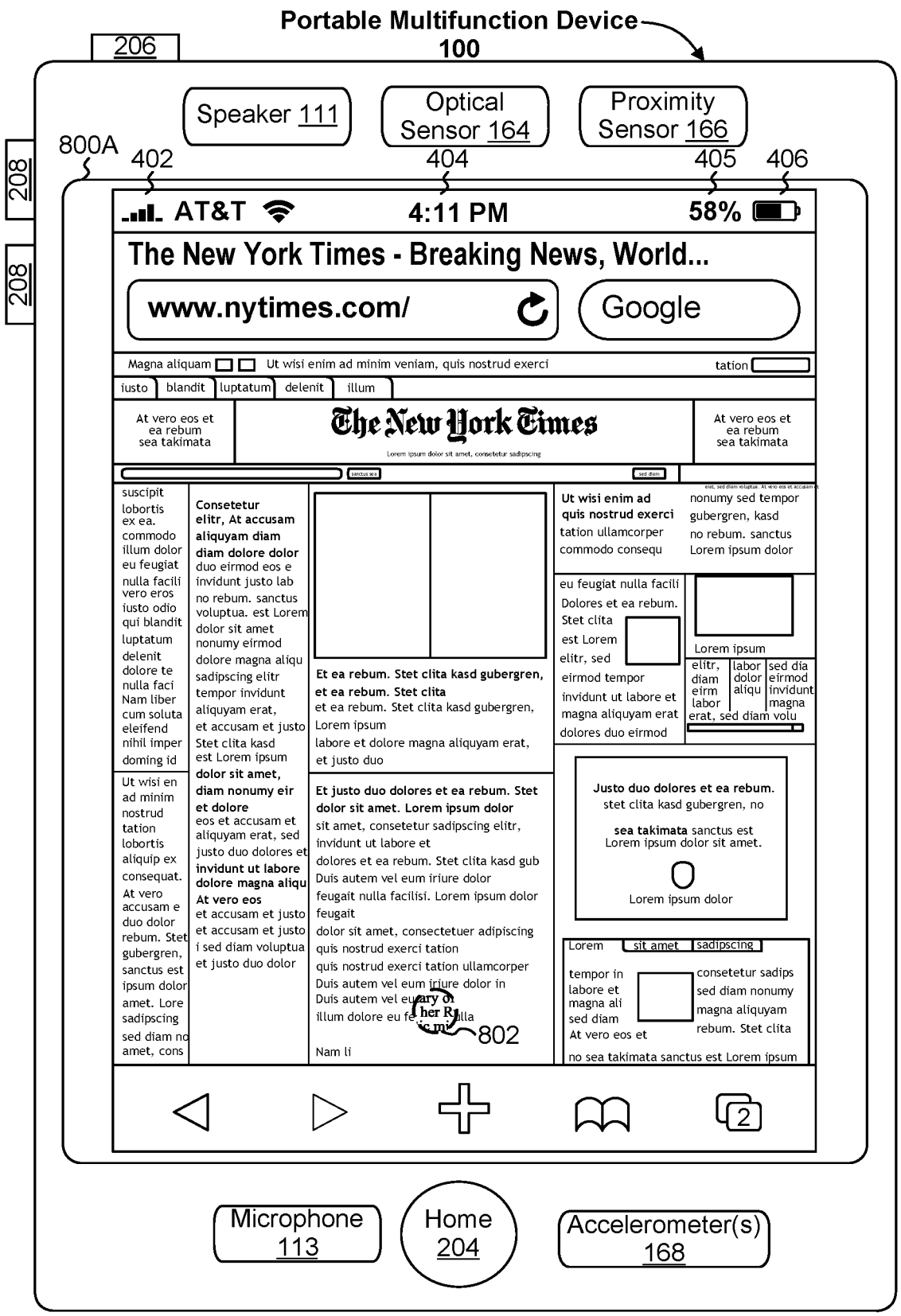
FIGS. 8A-8U illustrate exemplary user interfaces for selecting content in structured electronic documents in accordance with some embodiments.
Figure 8B:
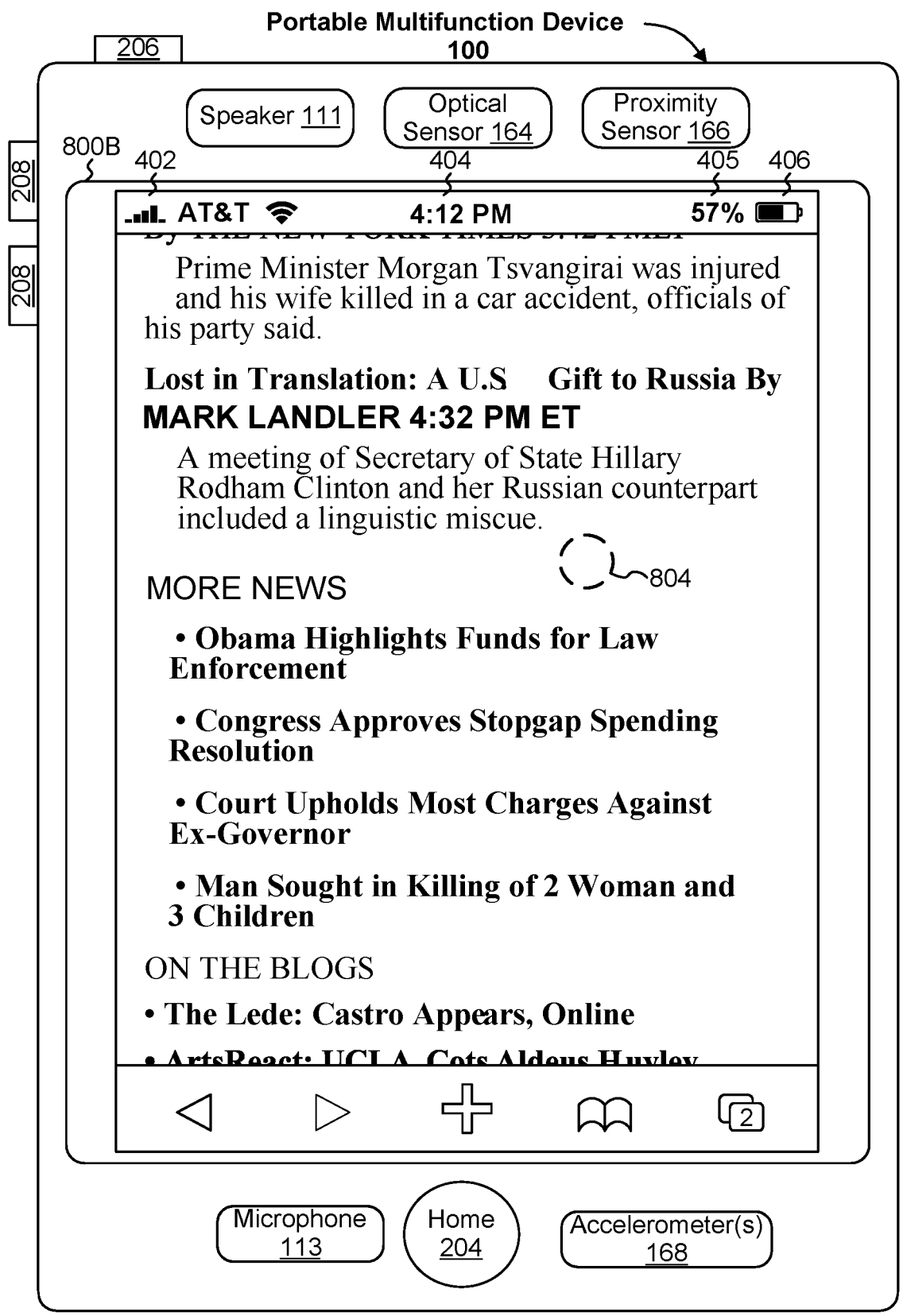
Figure 8C:
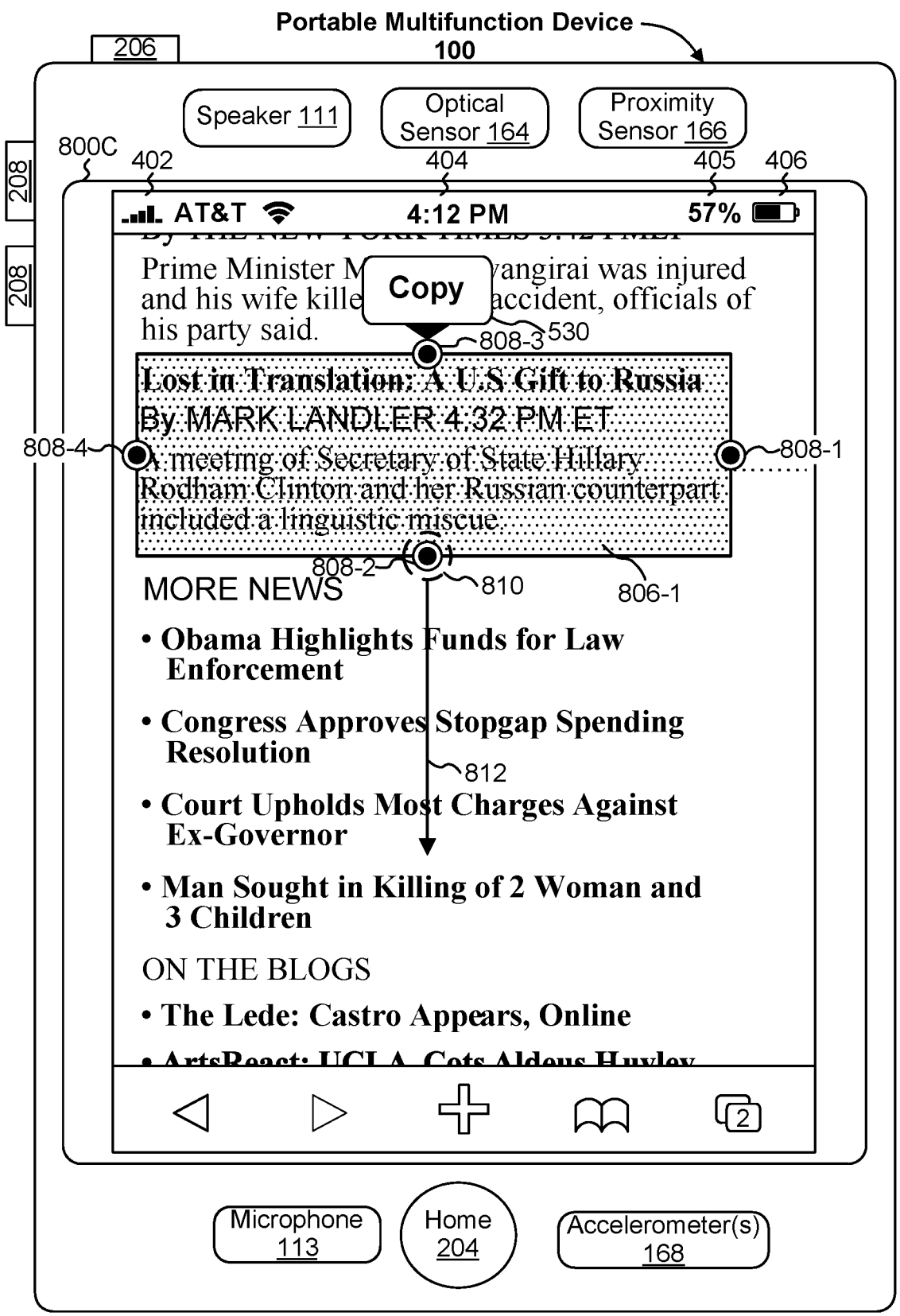
Figure 8D:
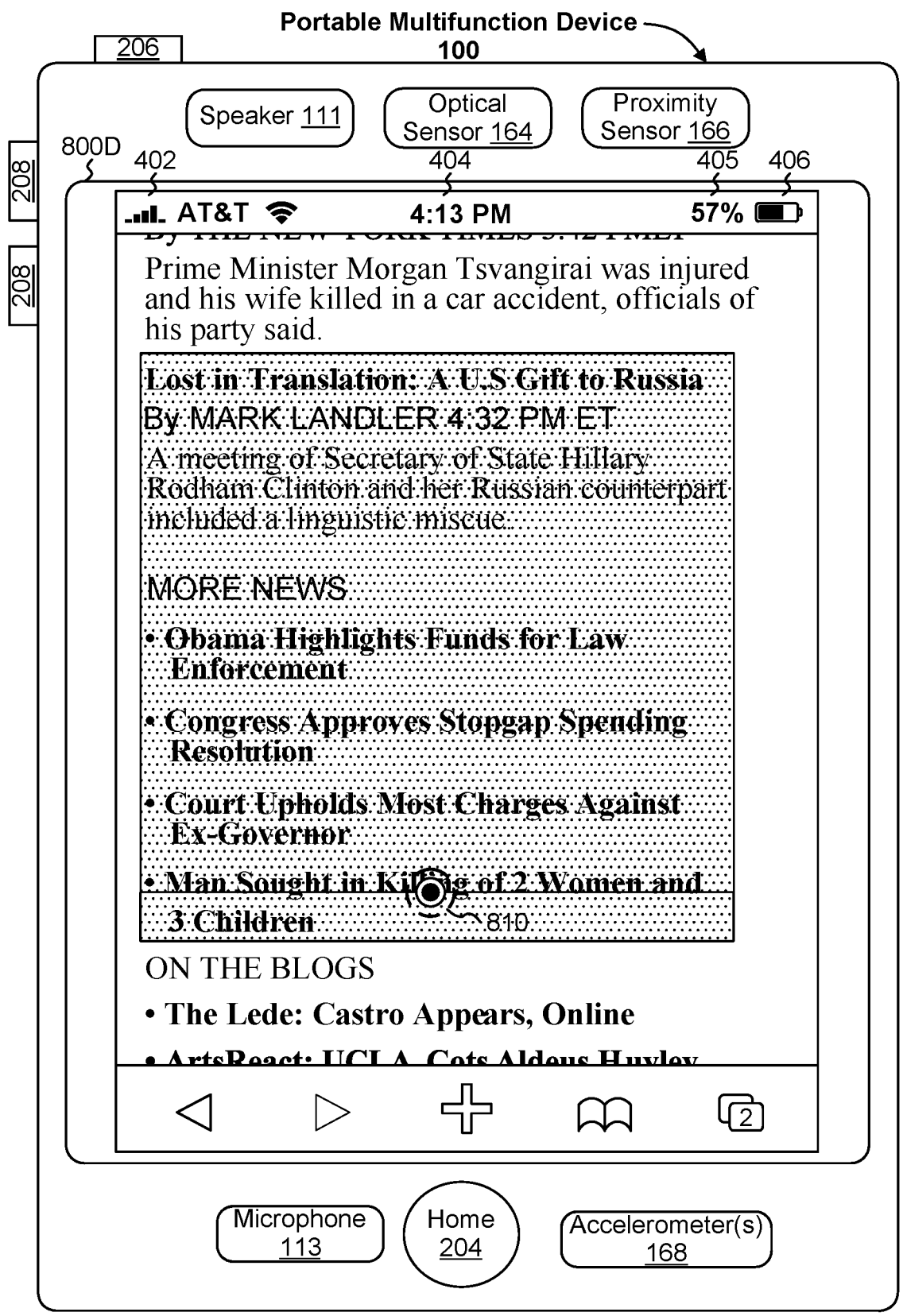
Figure 8E:
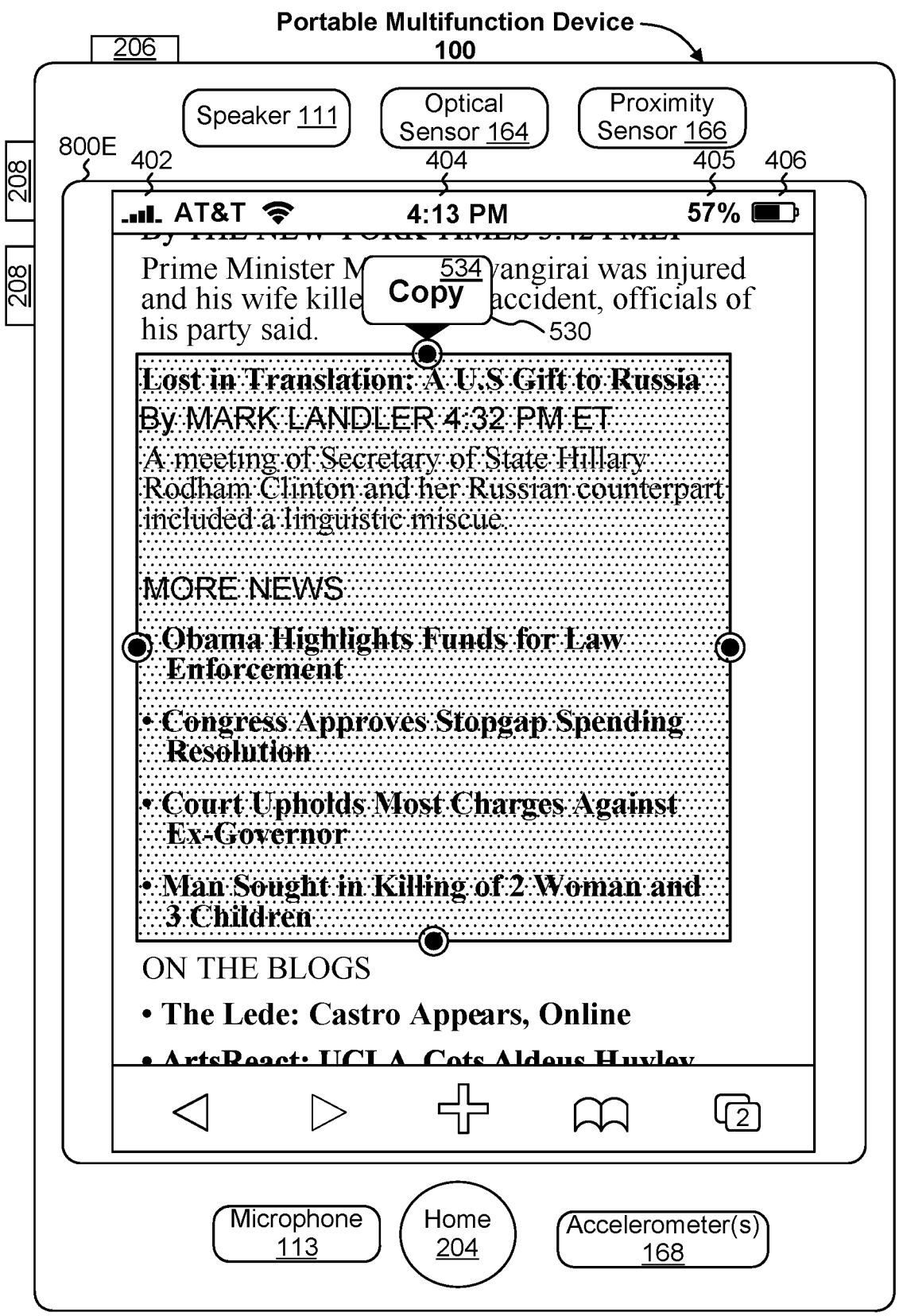
Figure 8F:
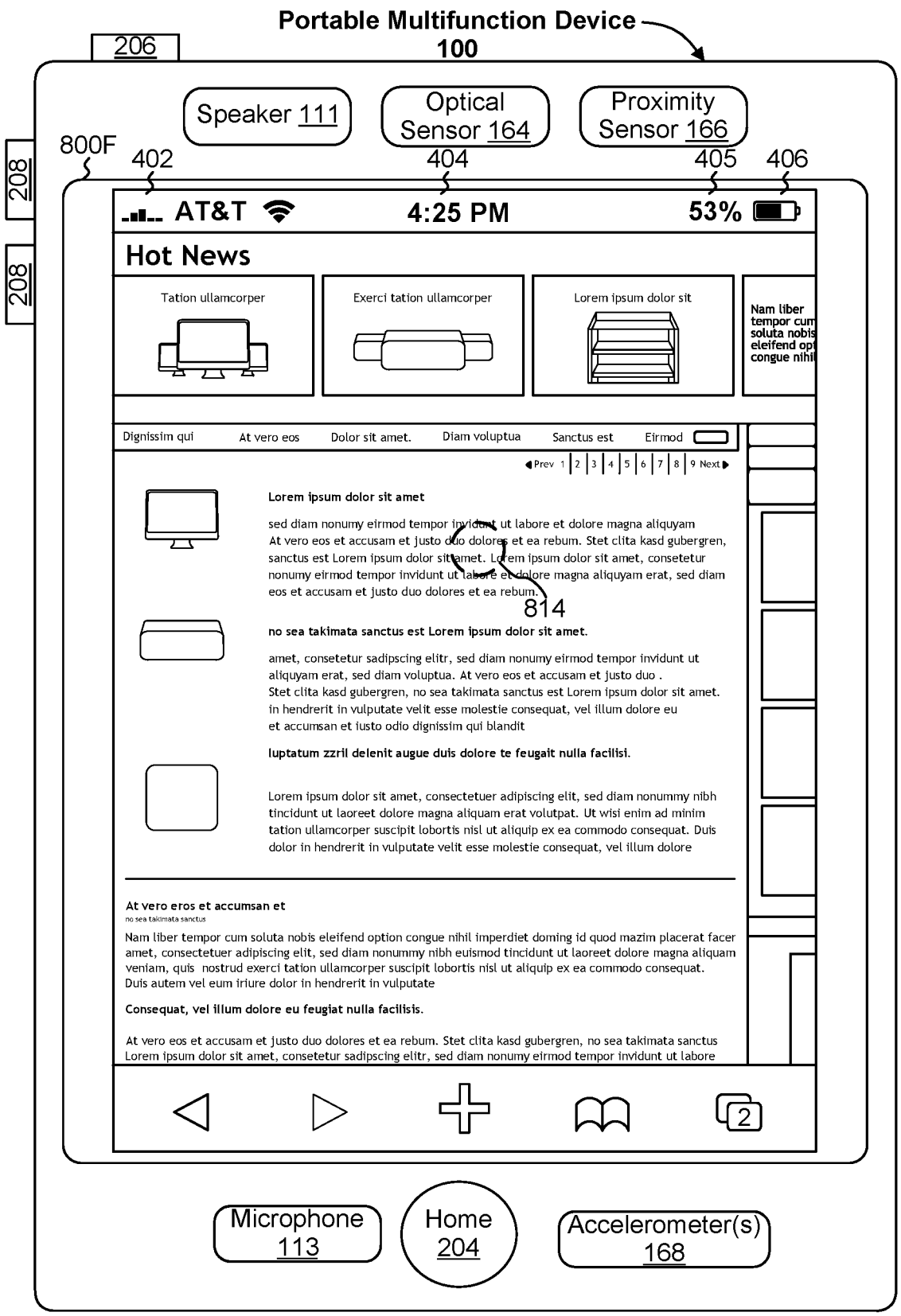
Figure 8G:
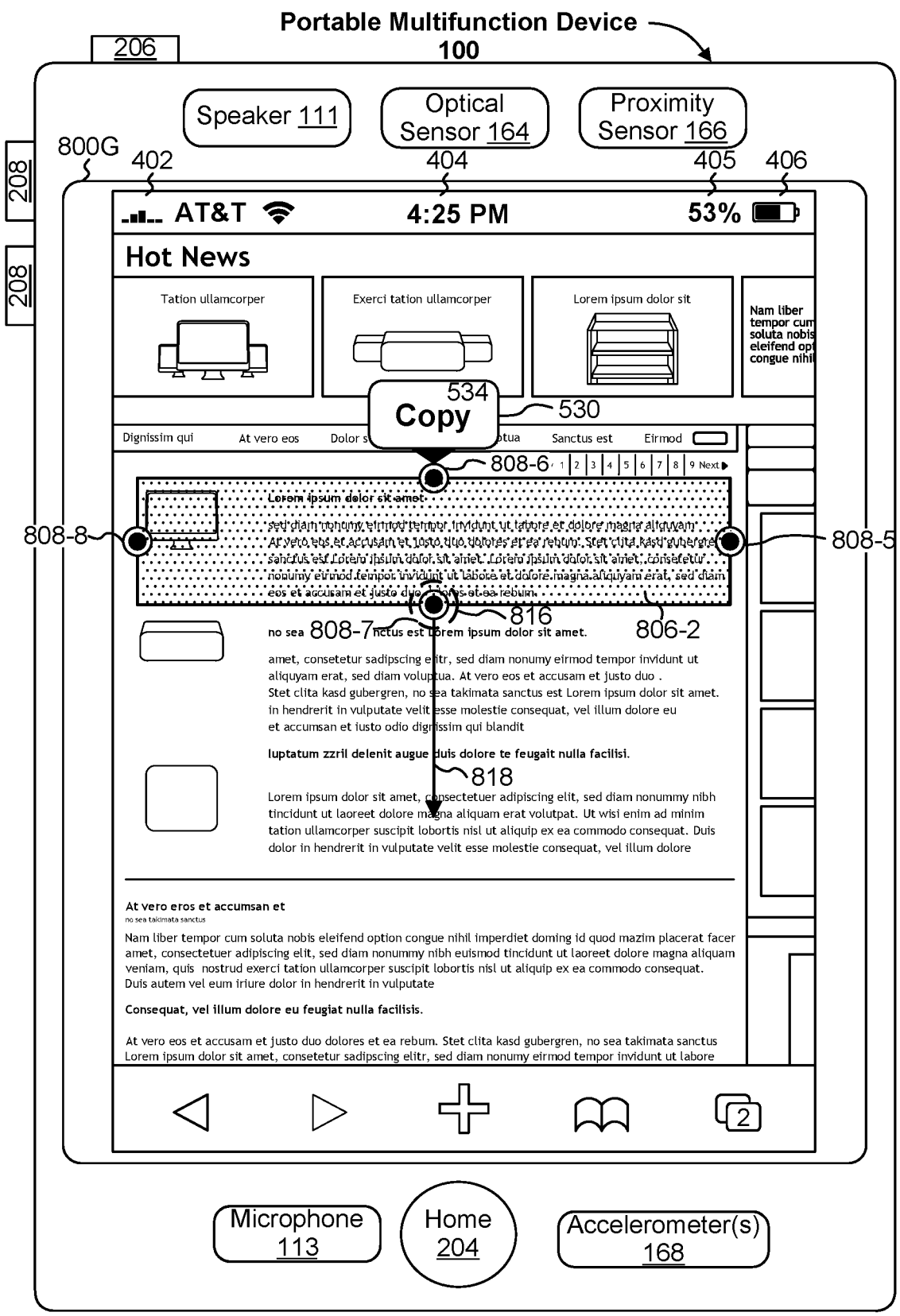
Figure 8H:
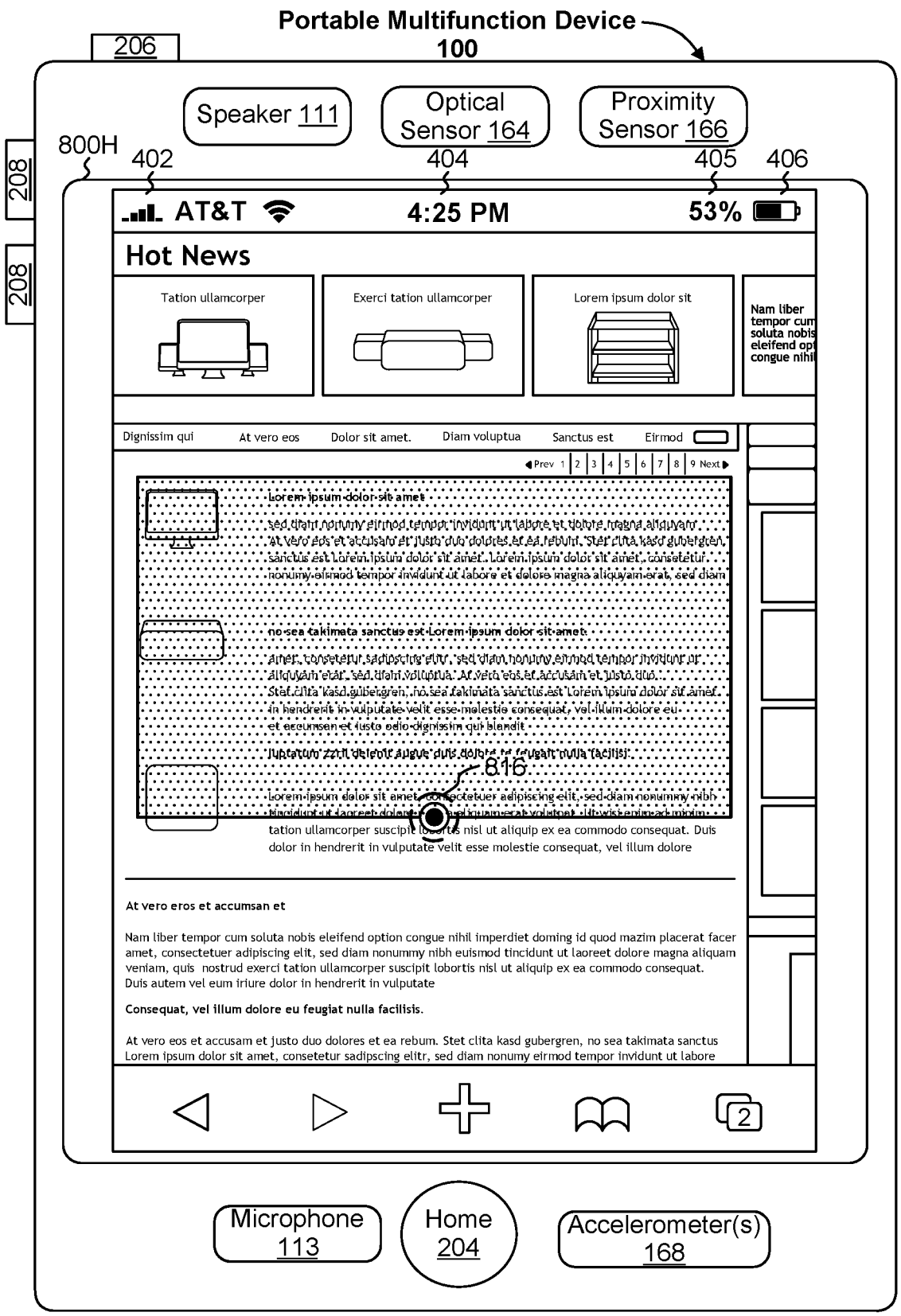
Figure 8I:
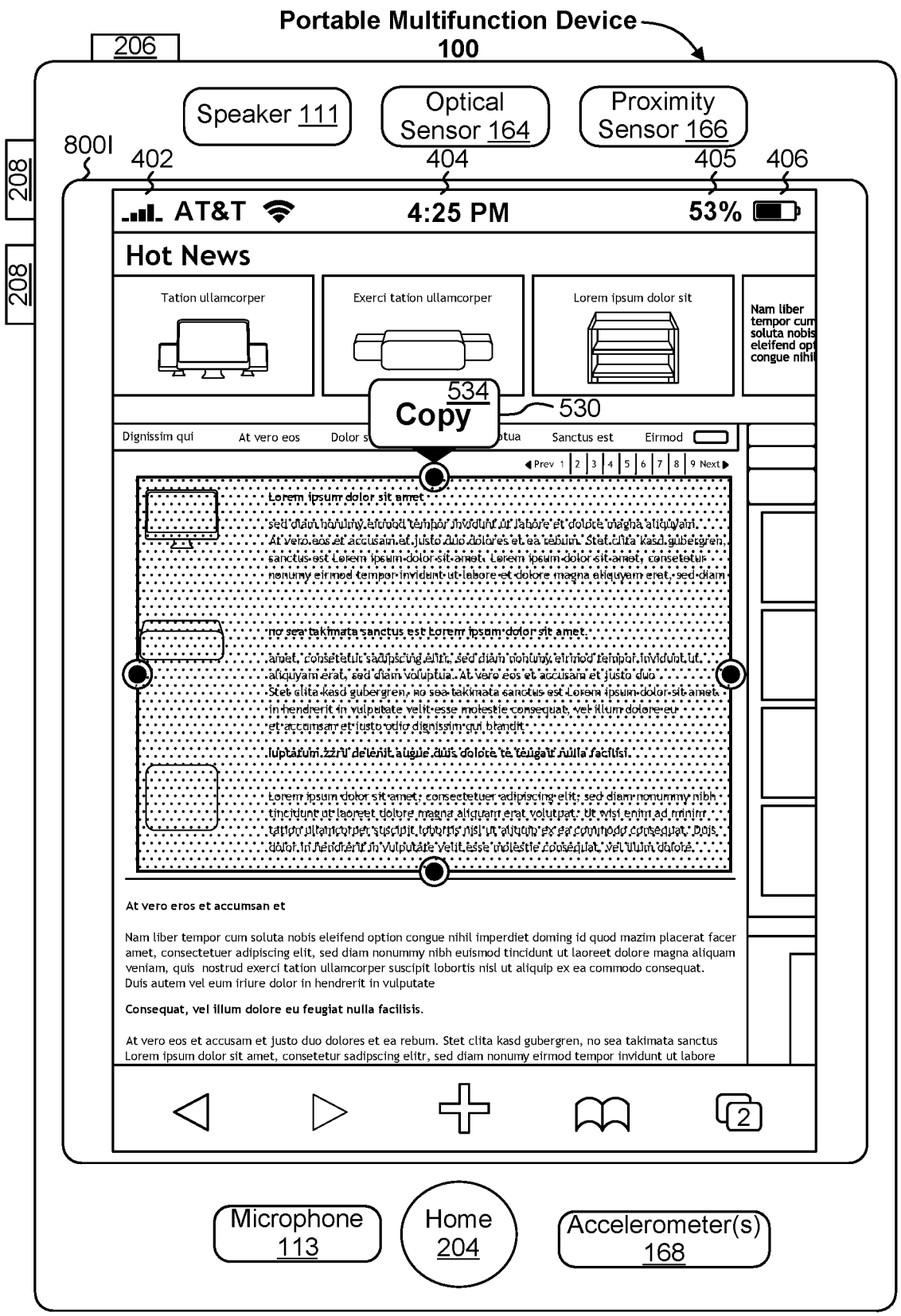
Figure 8J:
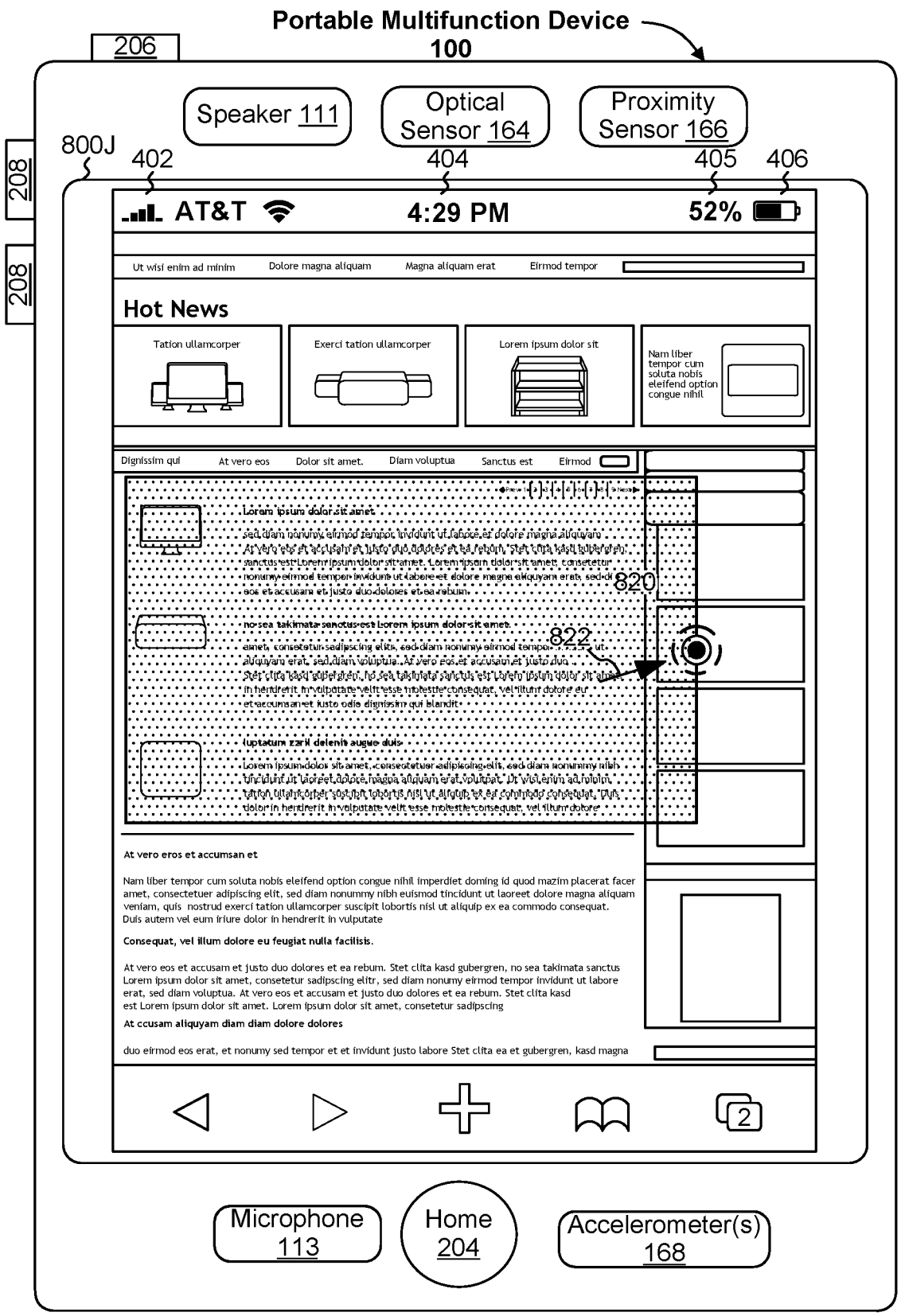
Figure 8K:
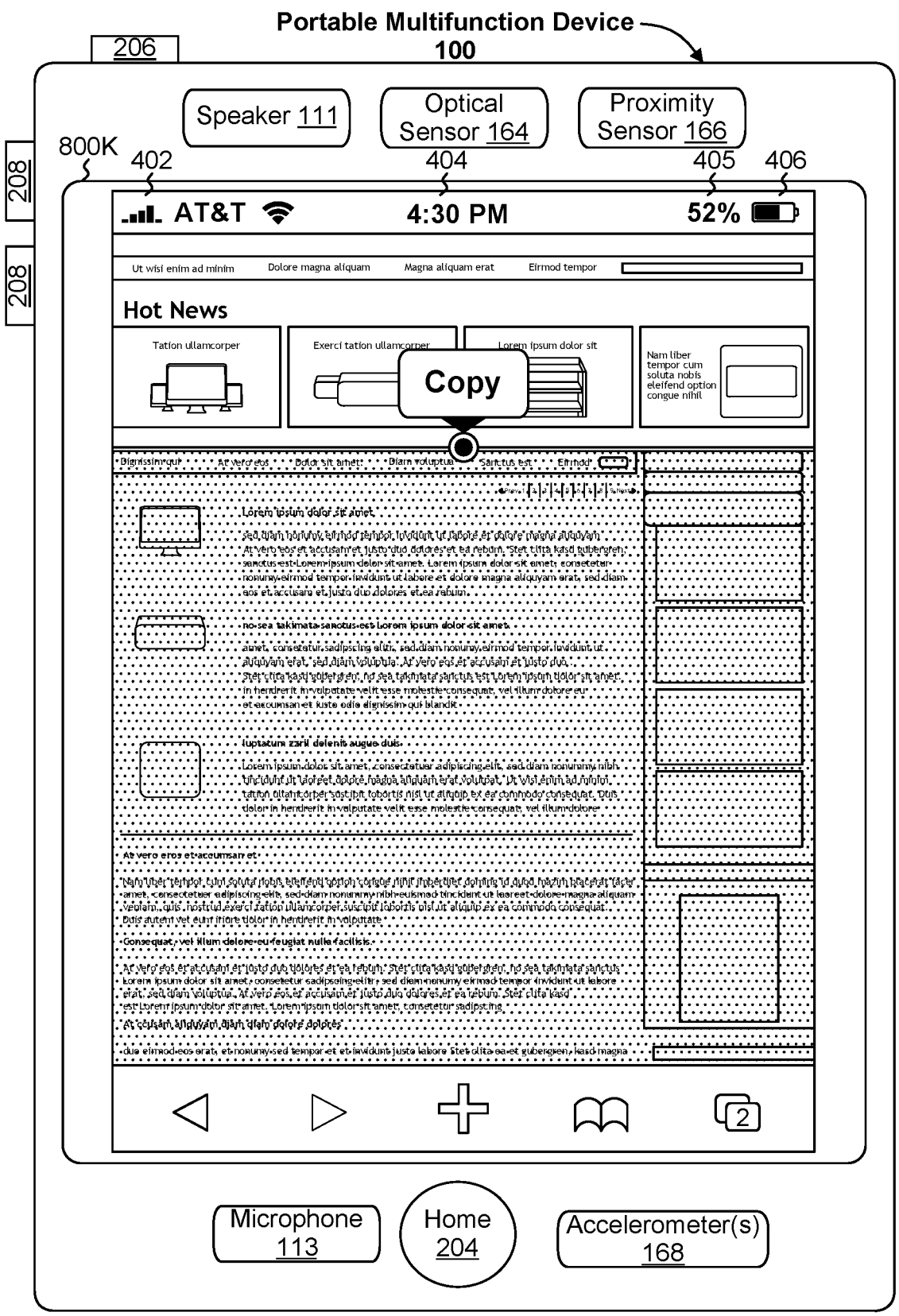
Figure 8L:
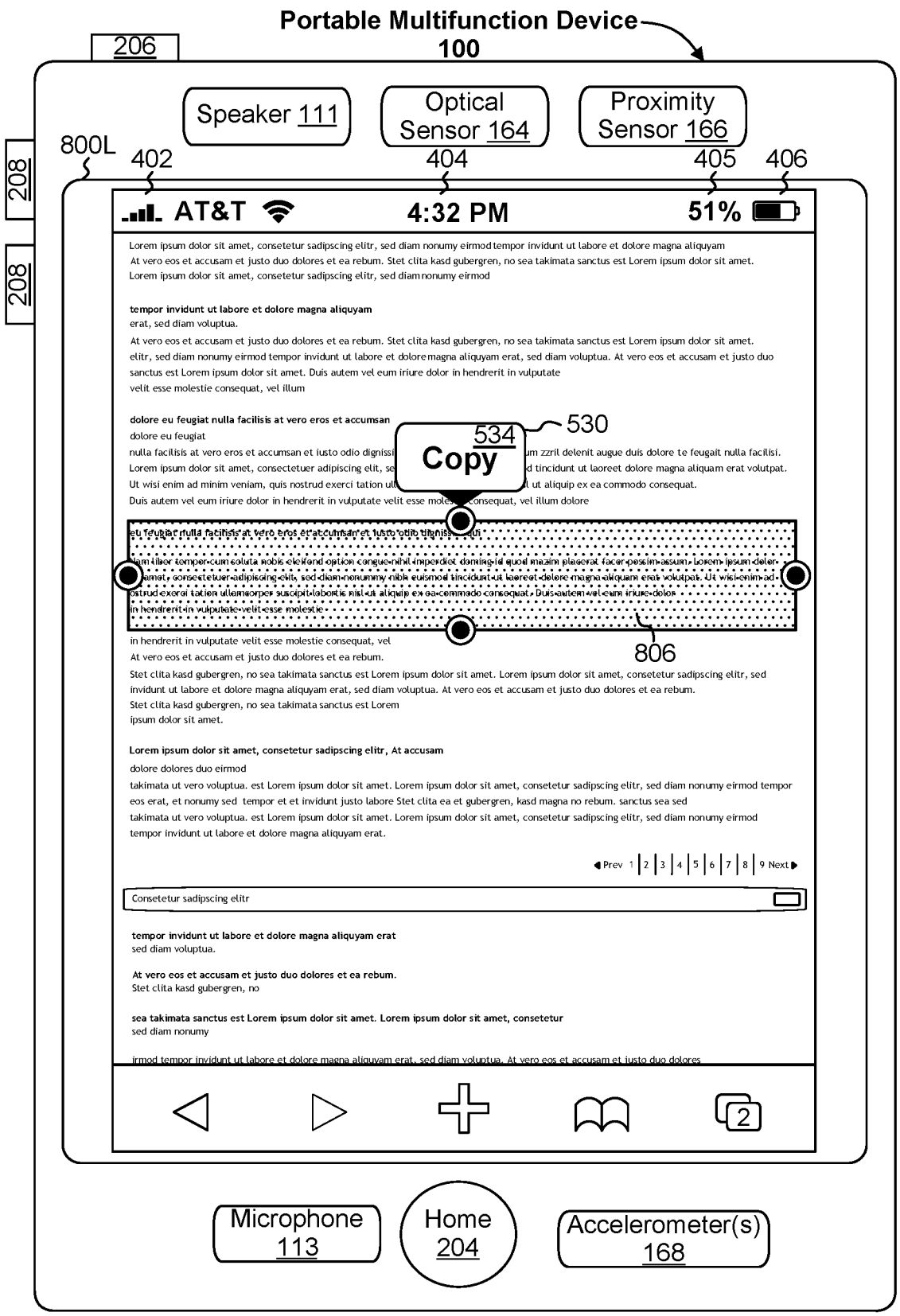
Figure 8M:
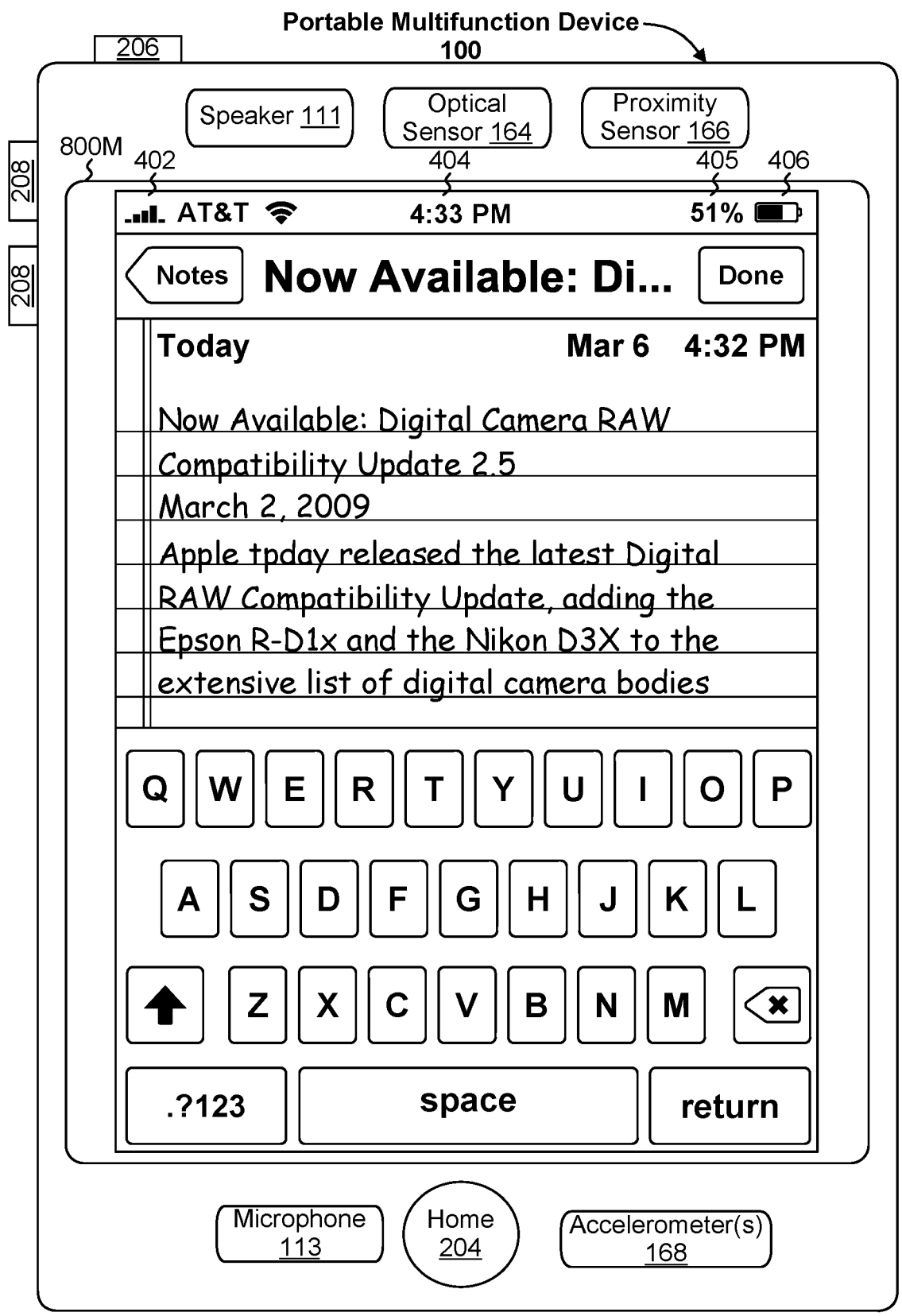
Figure 8N:
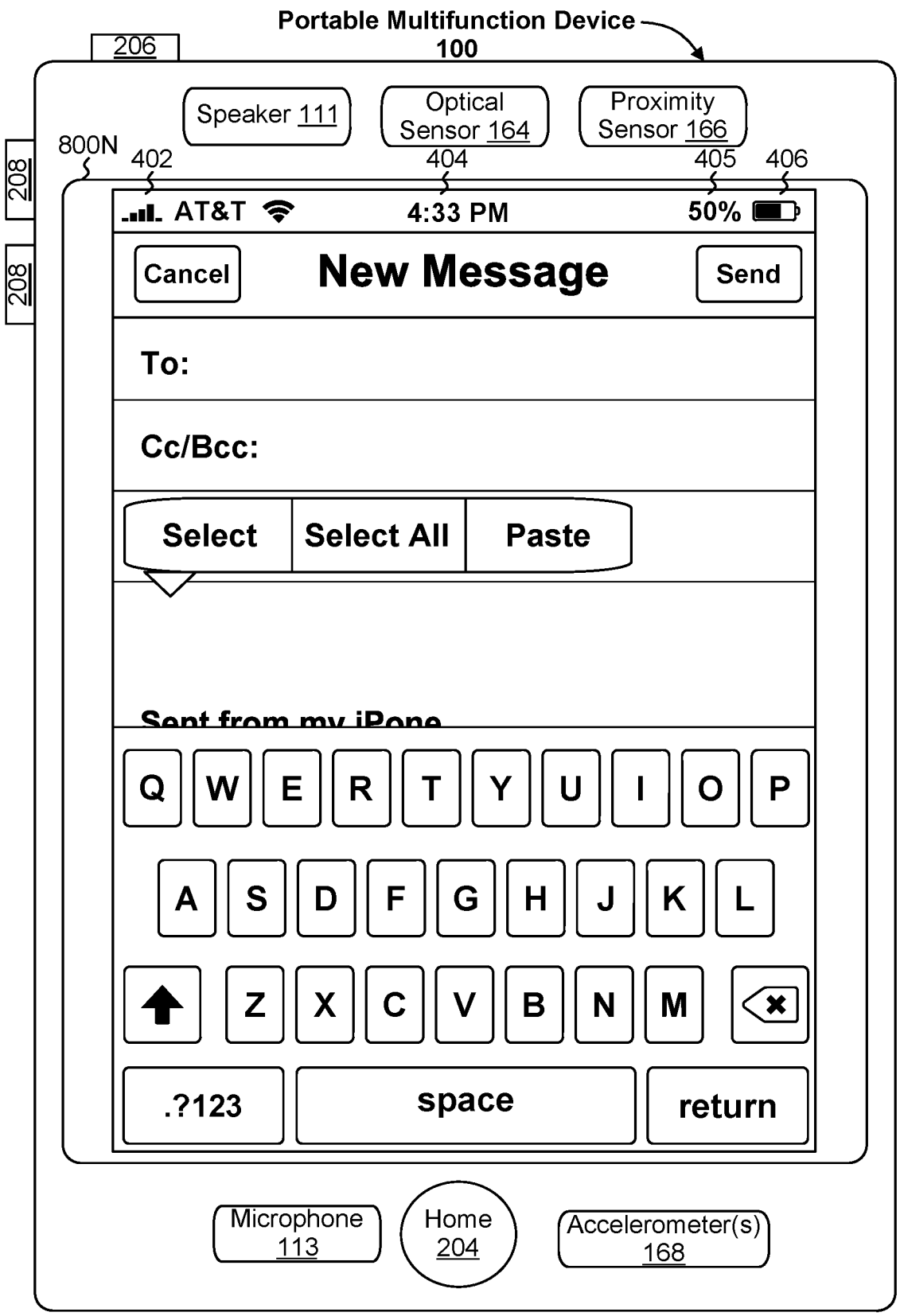
Figure 8O:
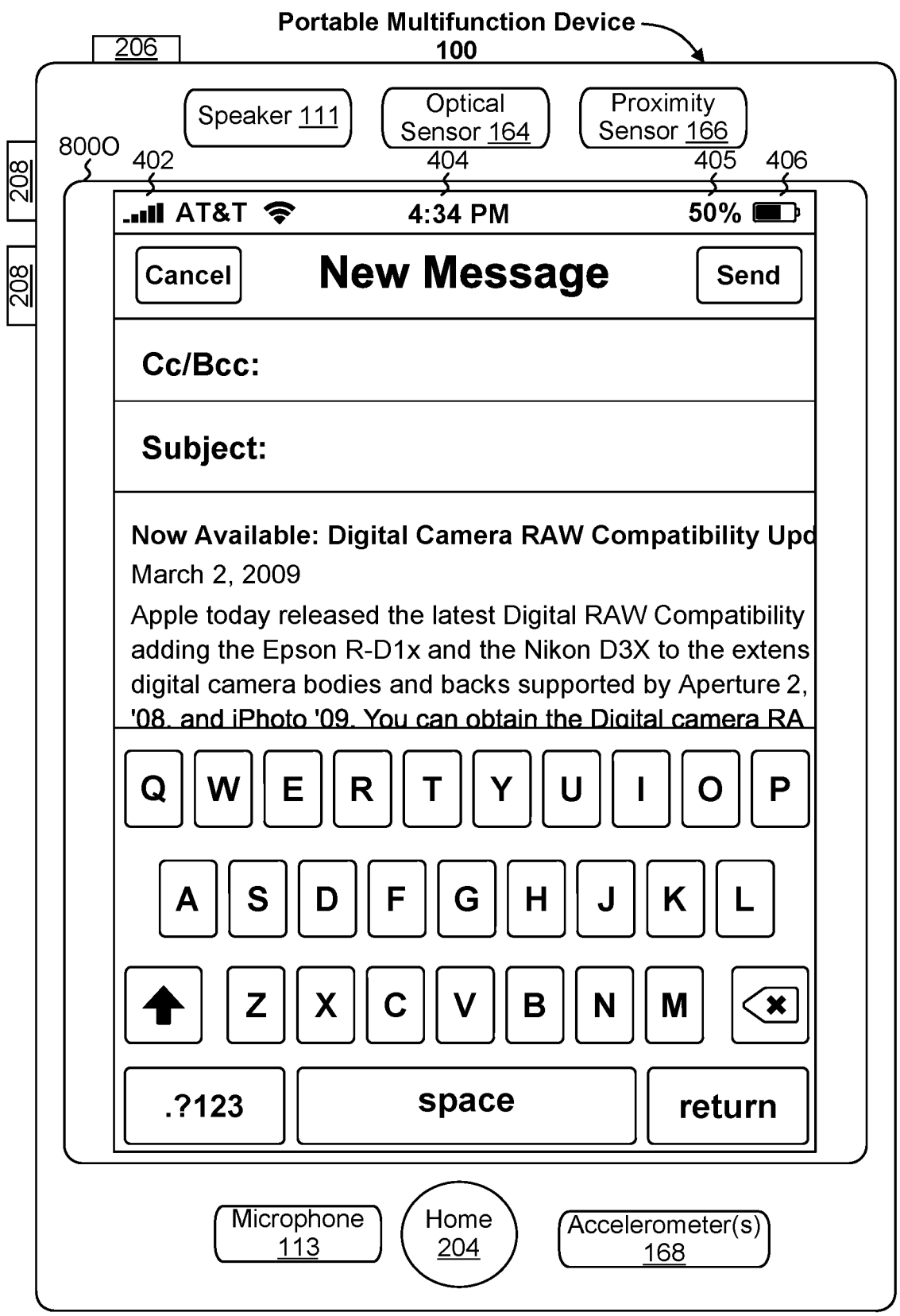
Figure 8P:
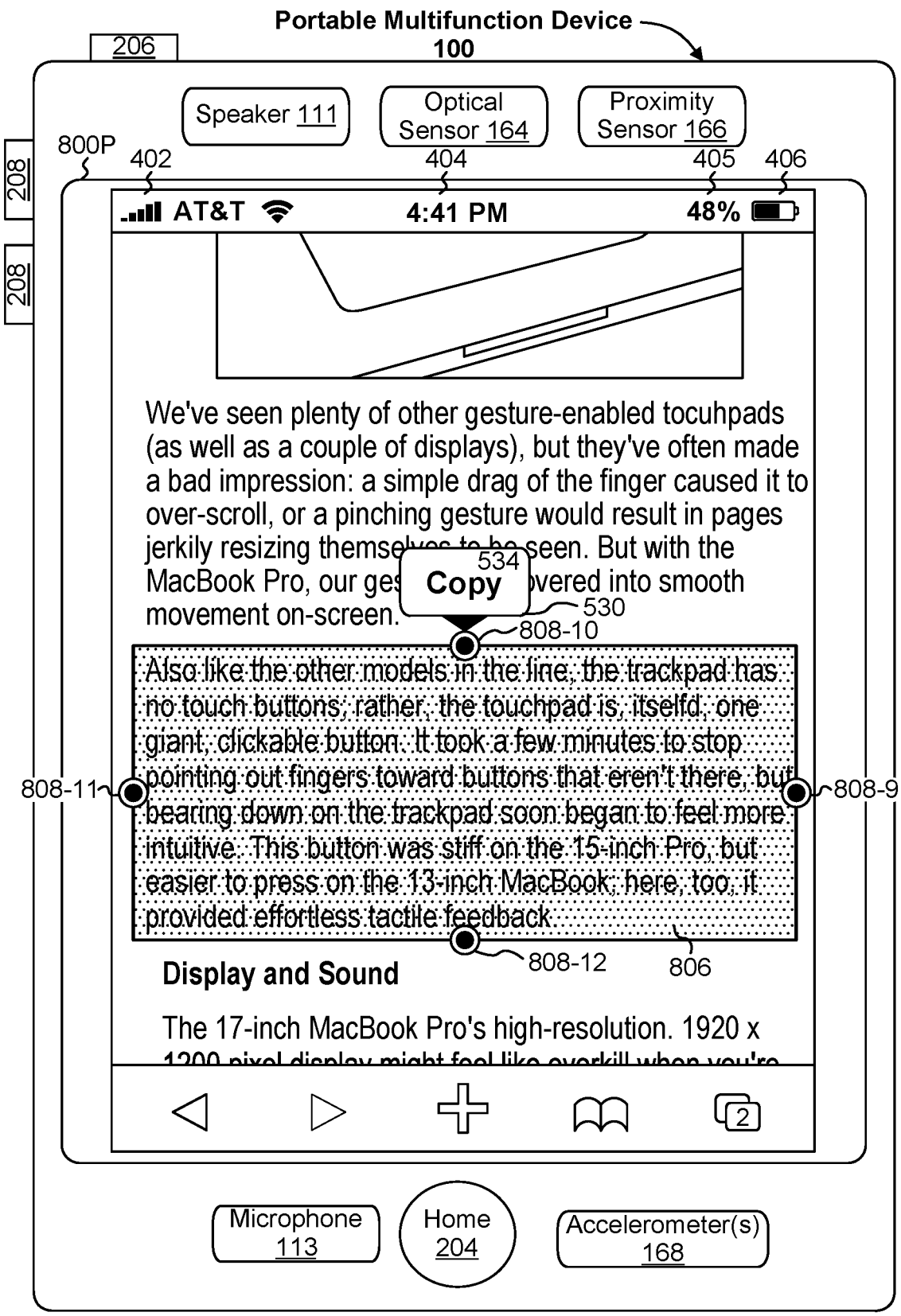
Figure 8Q:
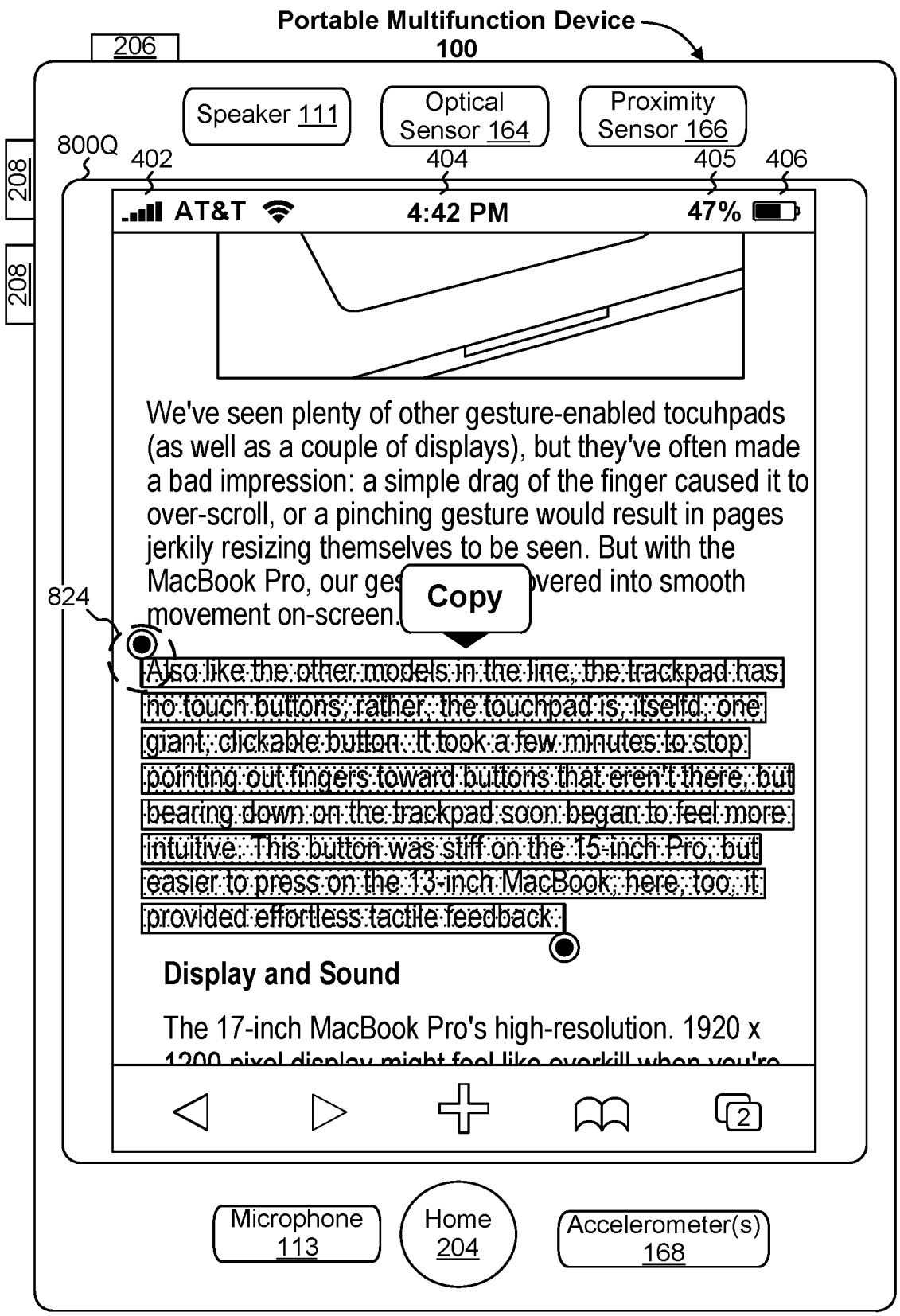
Figure 8R:
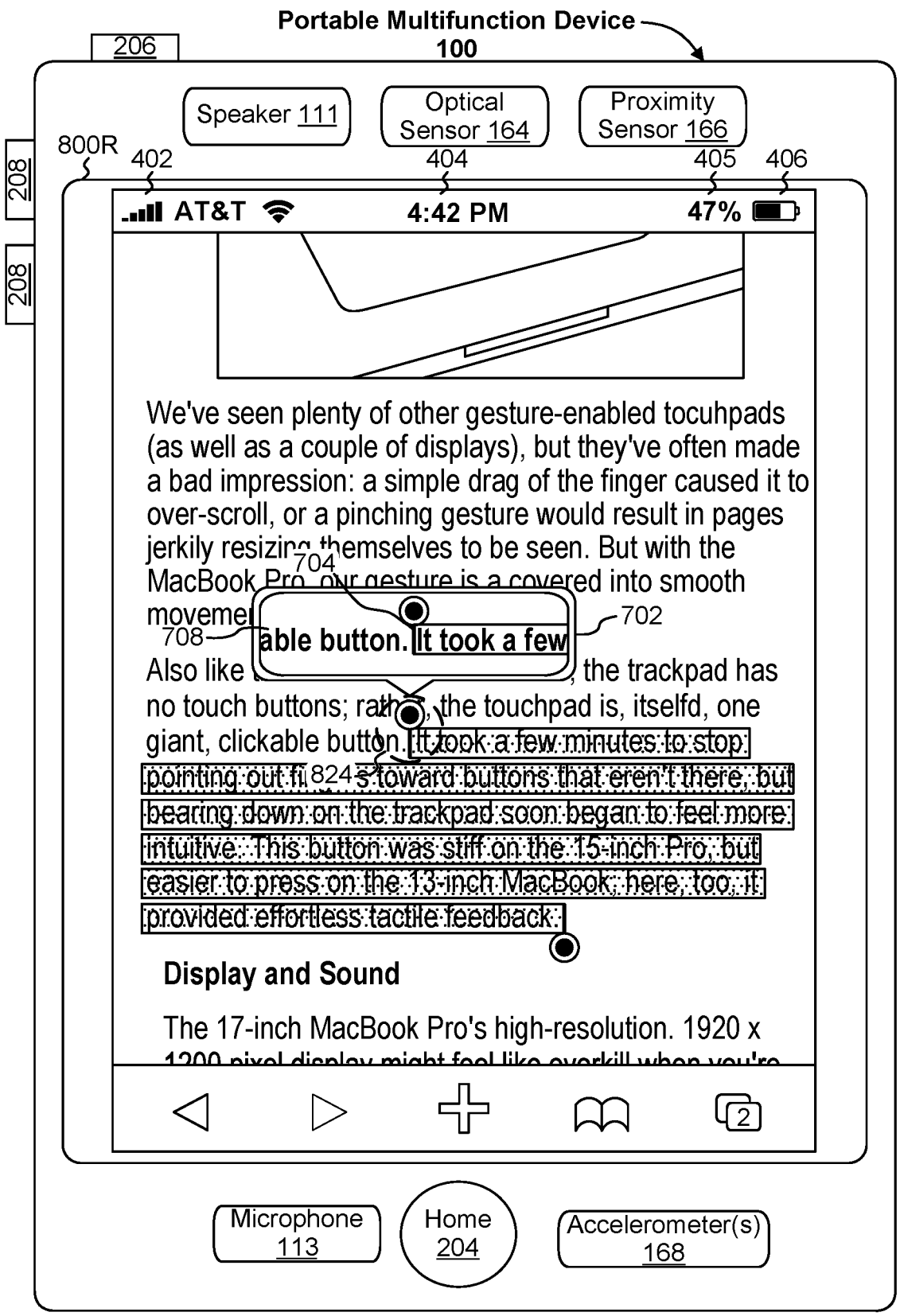
Figure 8S:
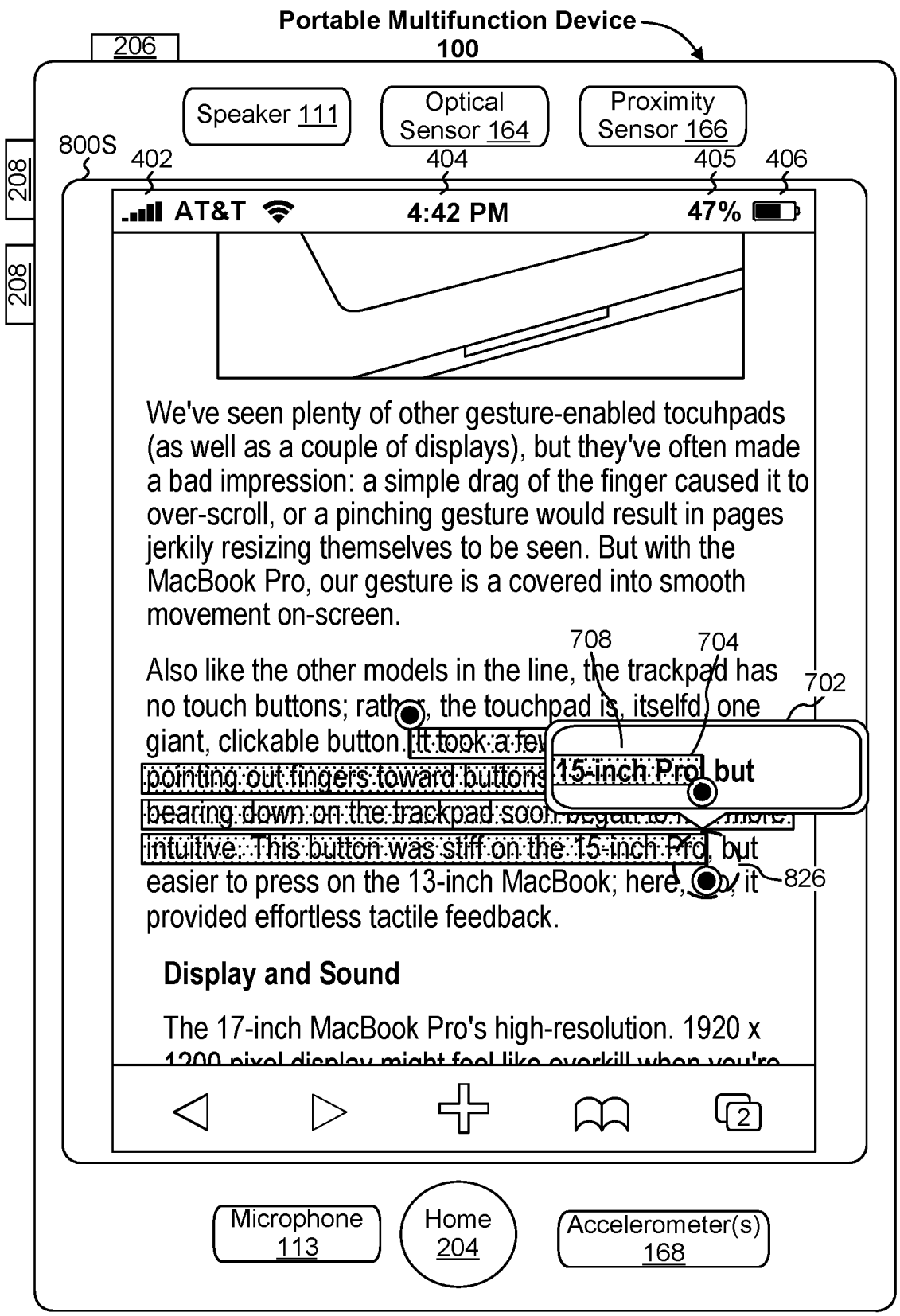
Figure 8T:
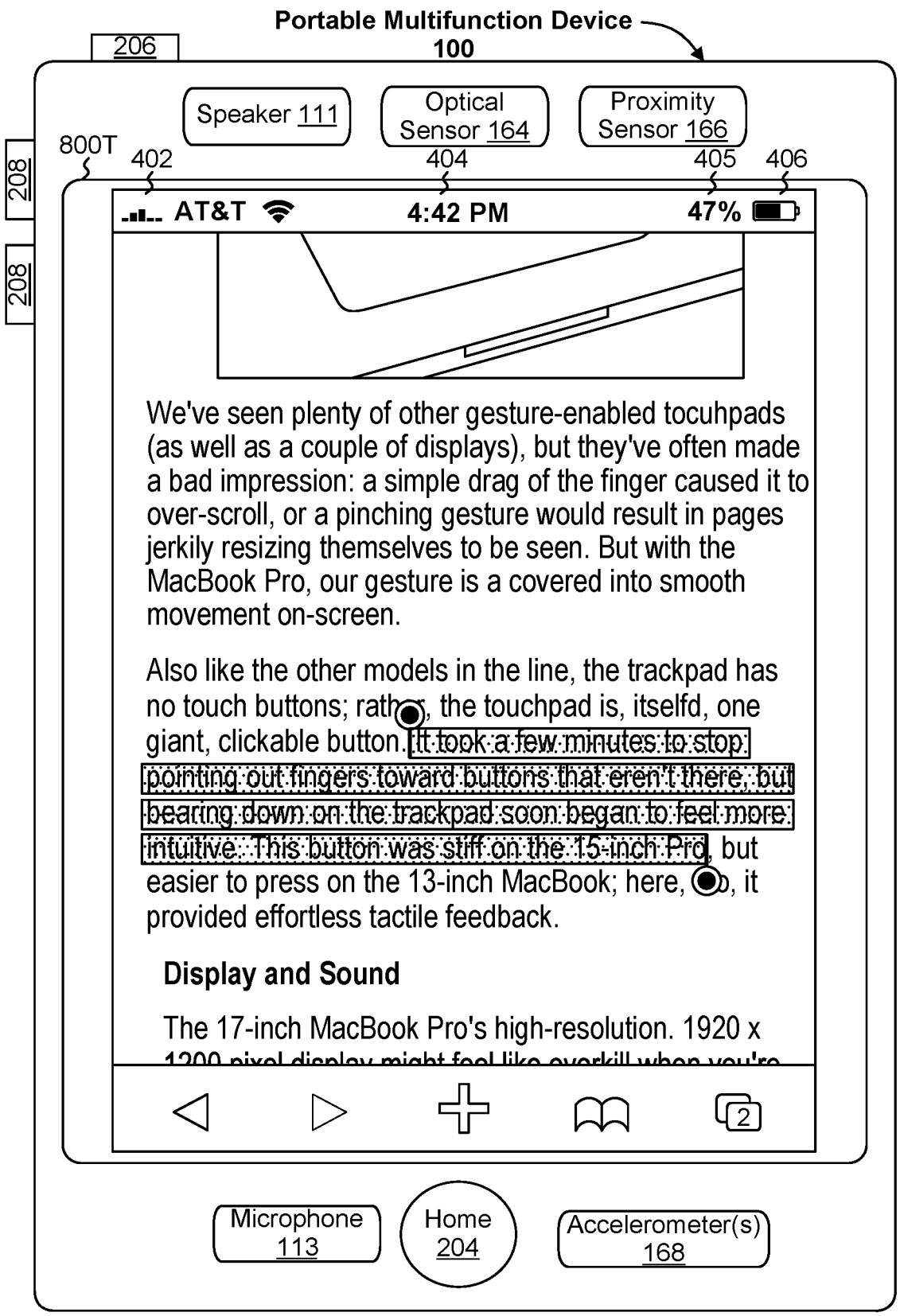
Figure 8U:
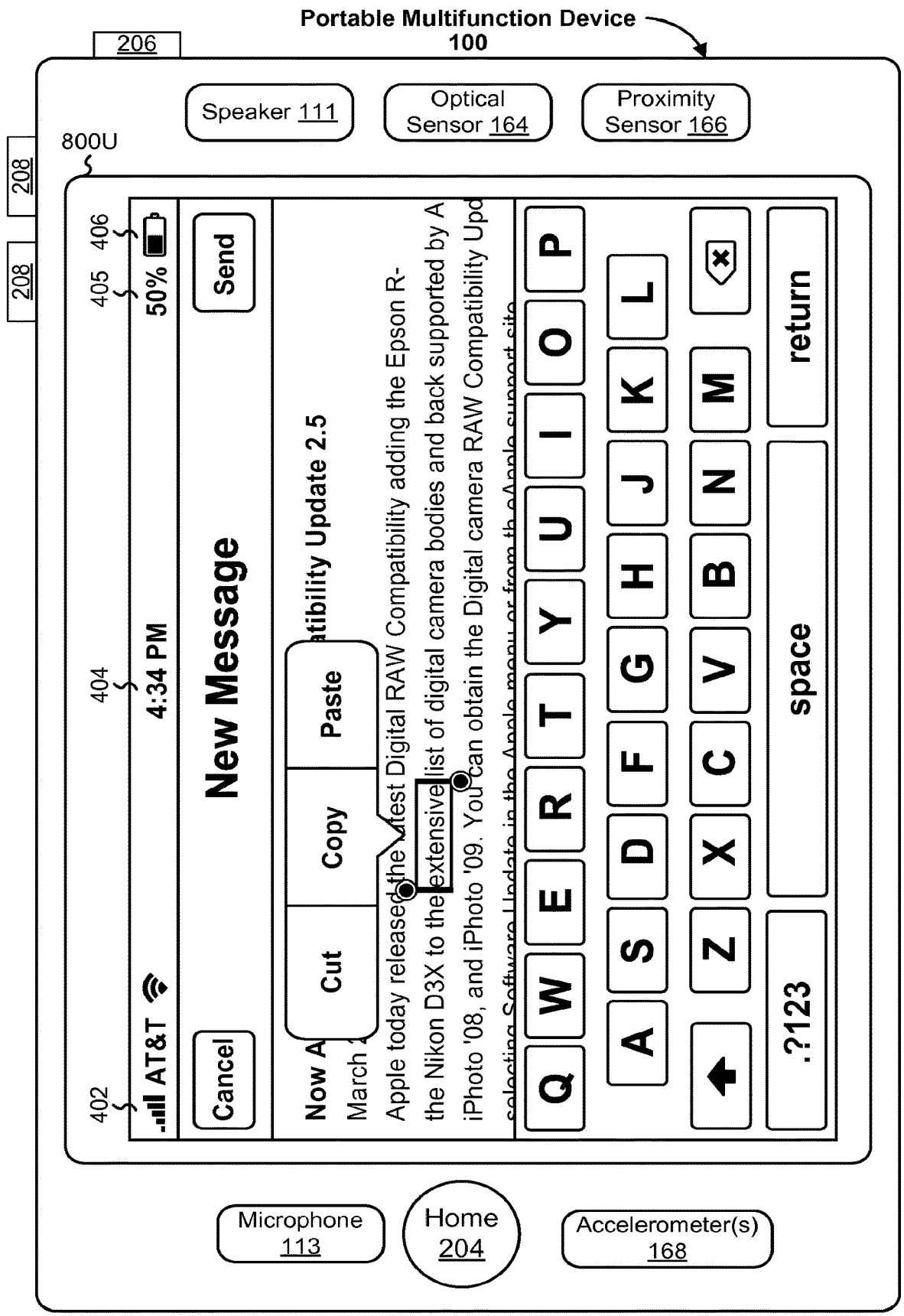
Figure 9A:
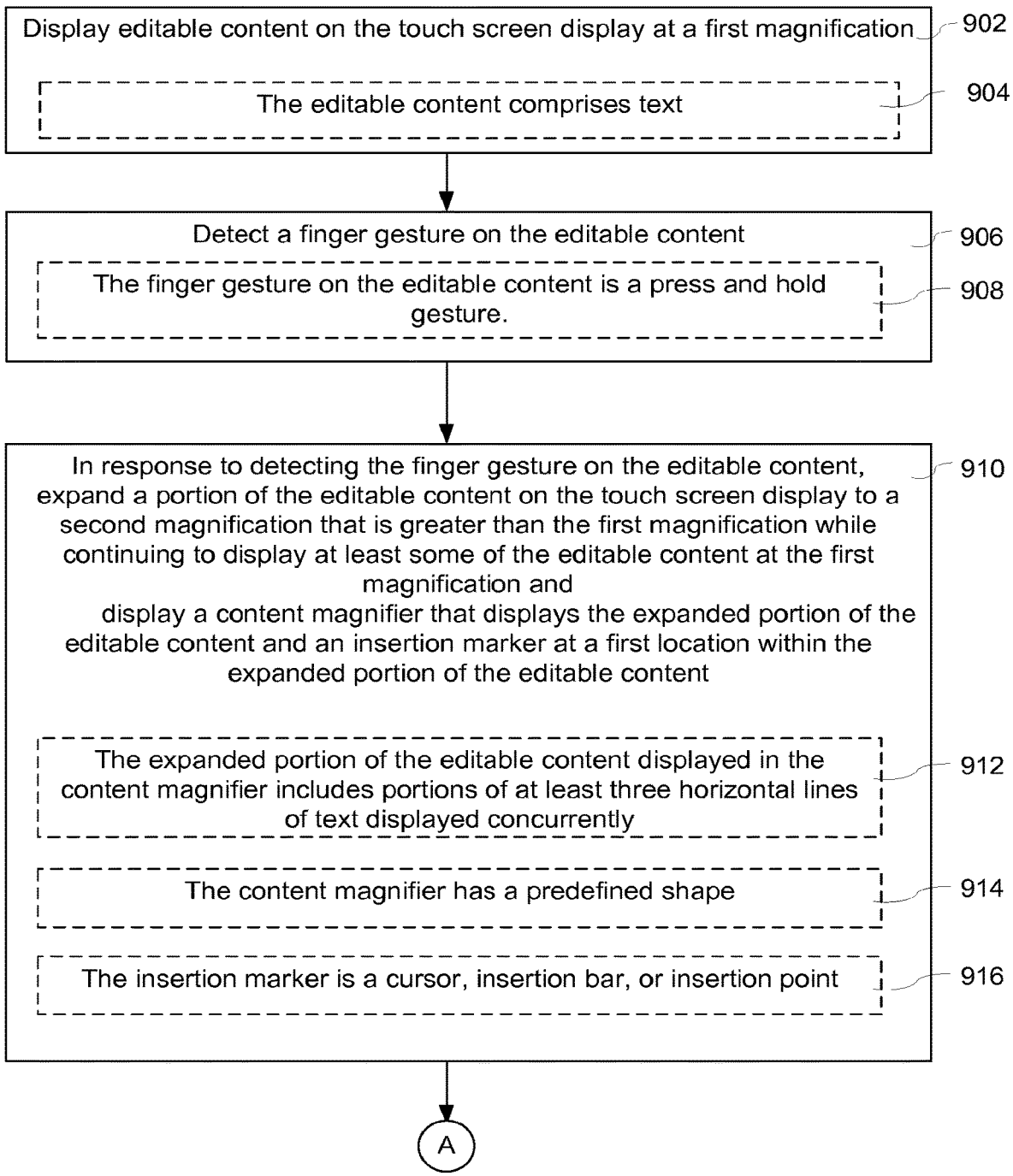
FIGS. 9A-9D are flow diagrams illustrating a method of selecting editable content in accordance with some embodiments.
Figure 9B:
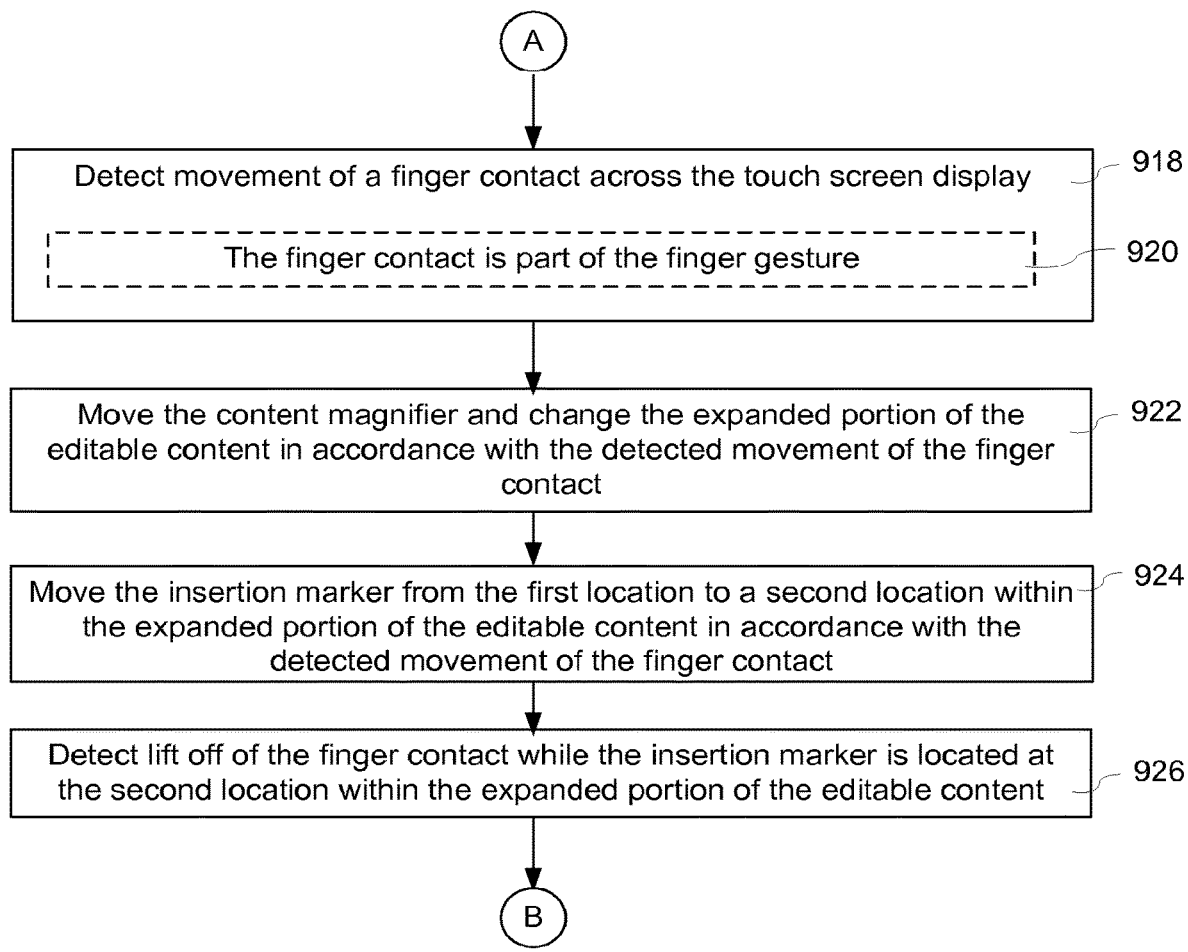
Figure 9C:
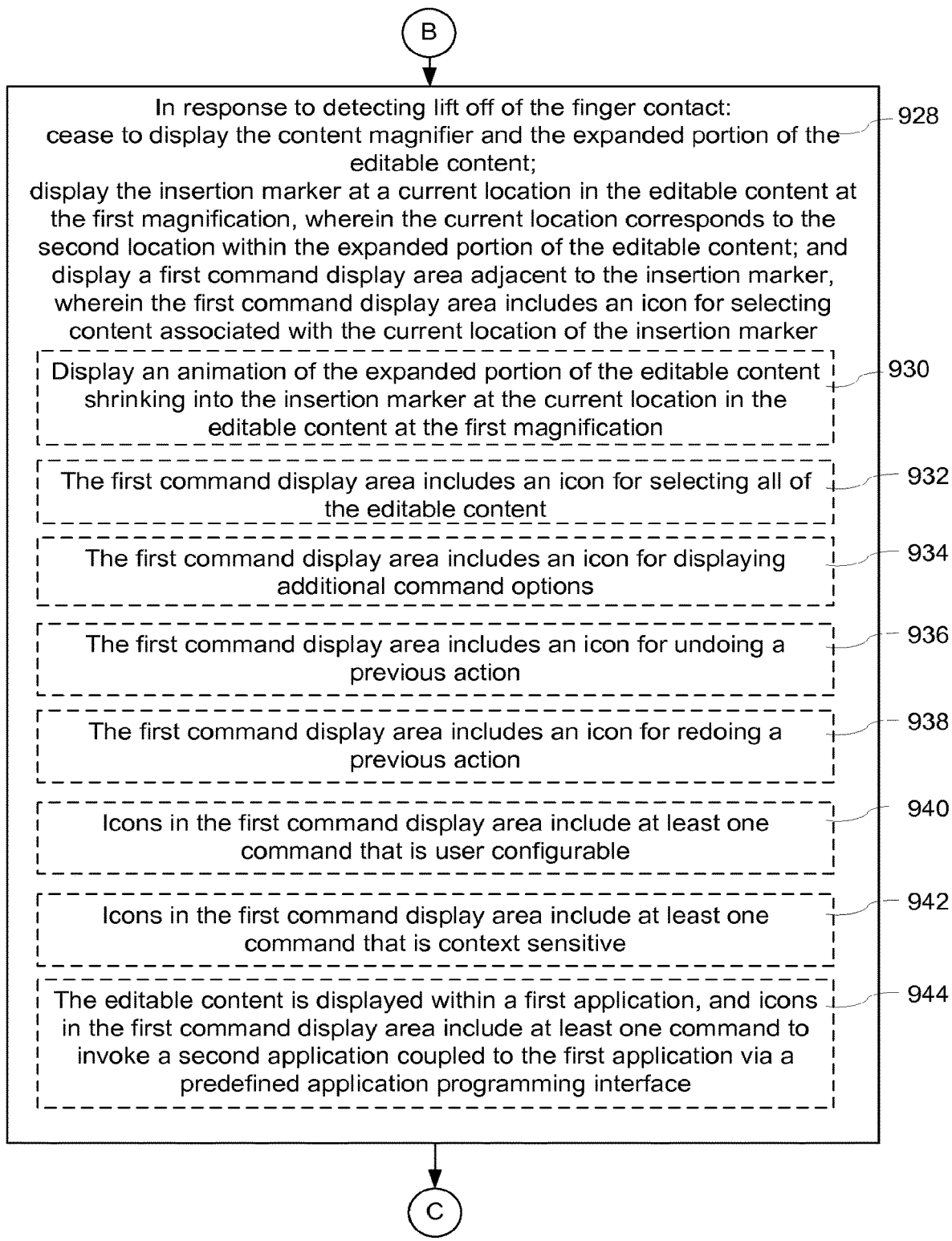
Figure 9D:
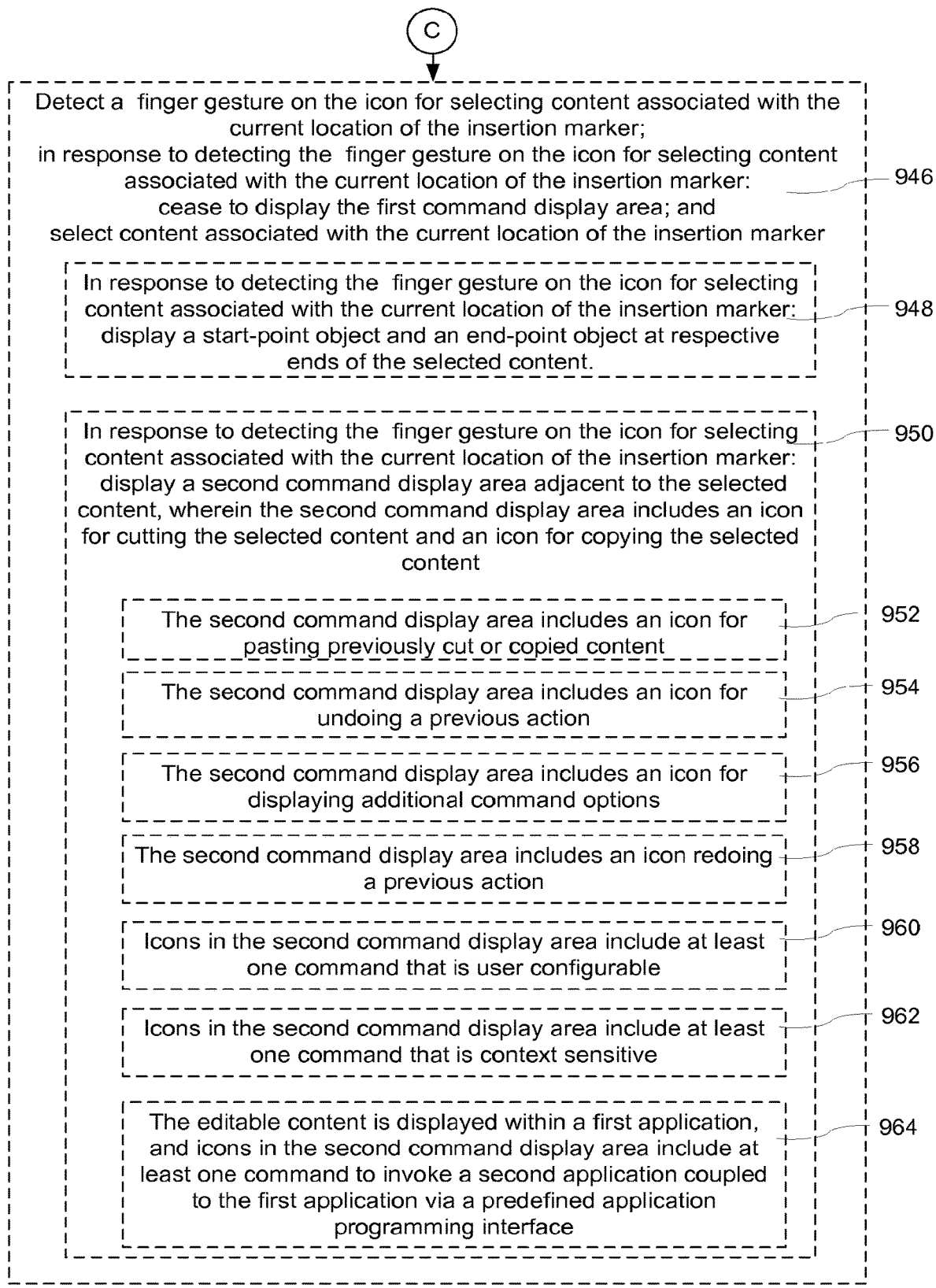
Figure 10A:
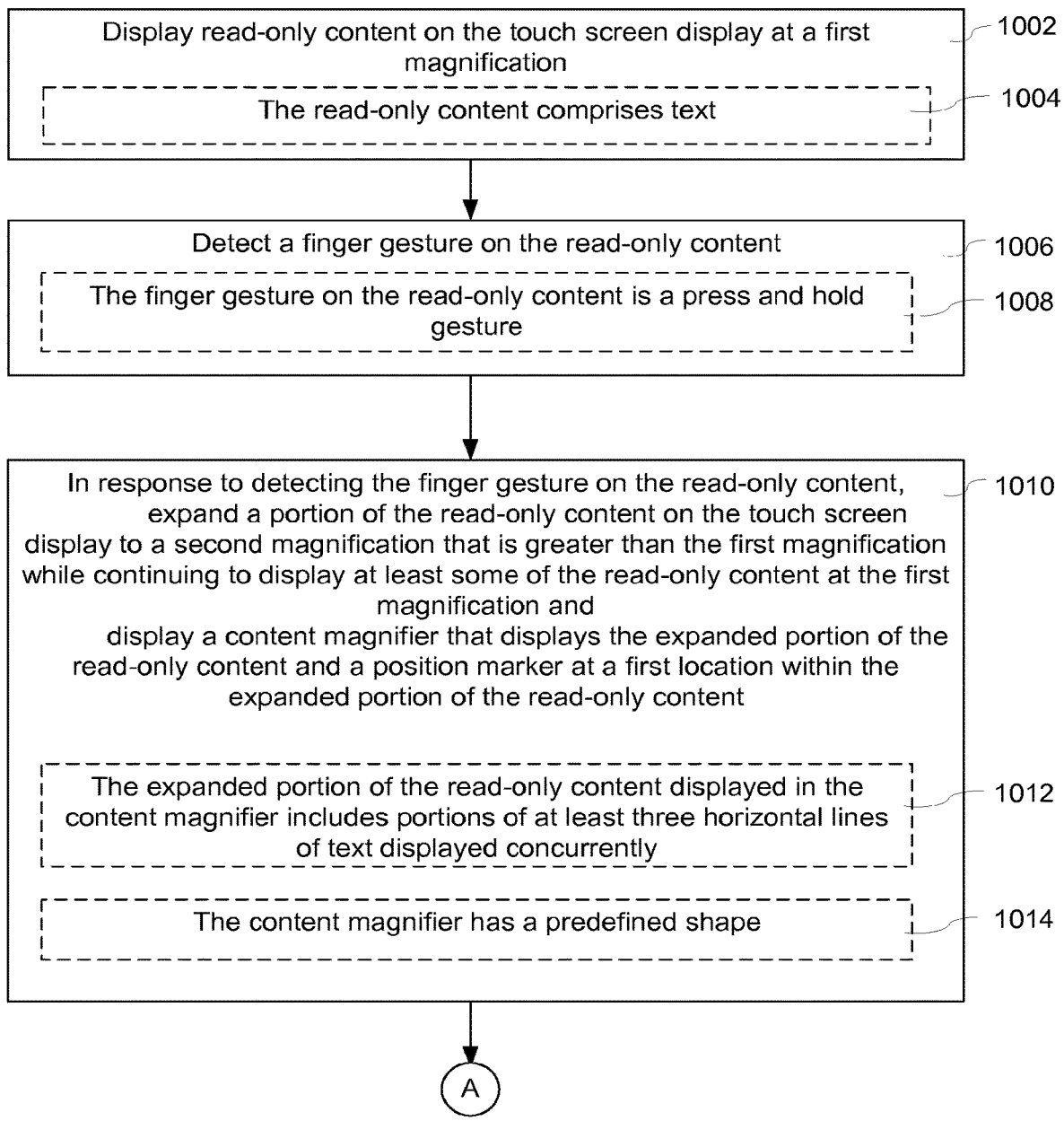
FIGS. 10A-10D are flow diagrams illustrating a method of selecting read-only content in accordance with some embodiments.
Figure 10B:
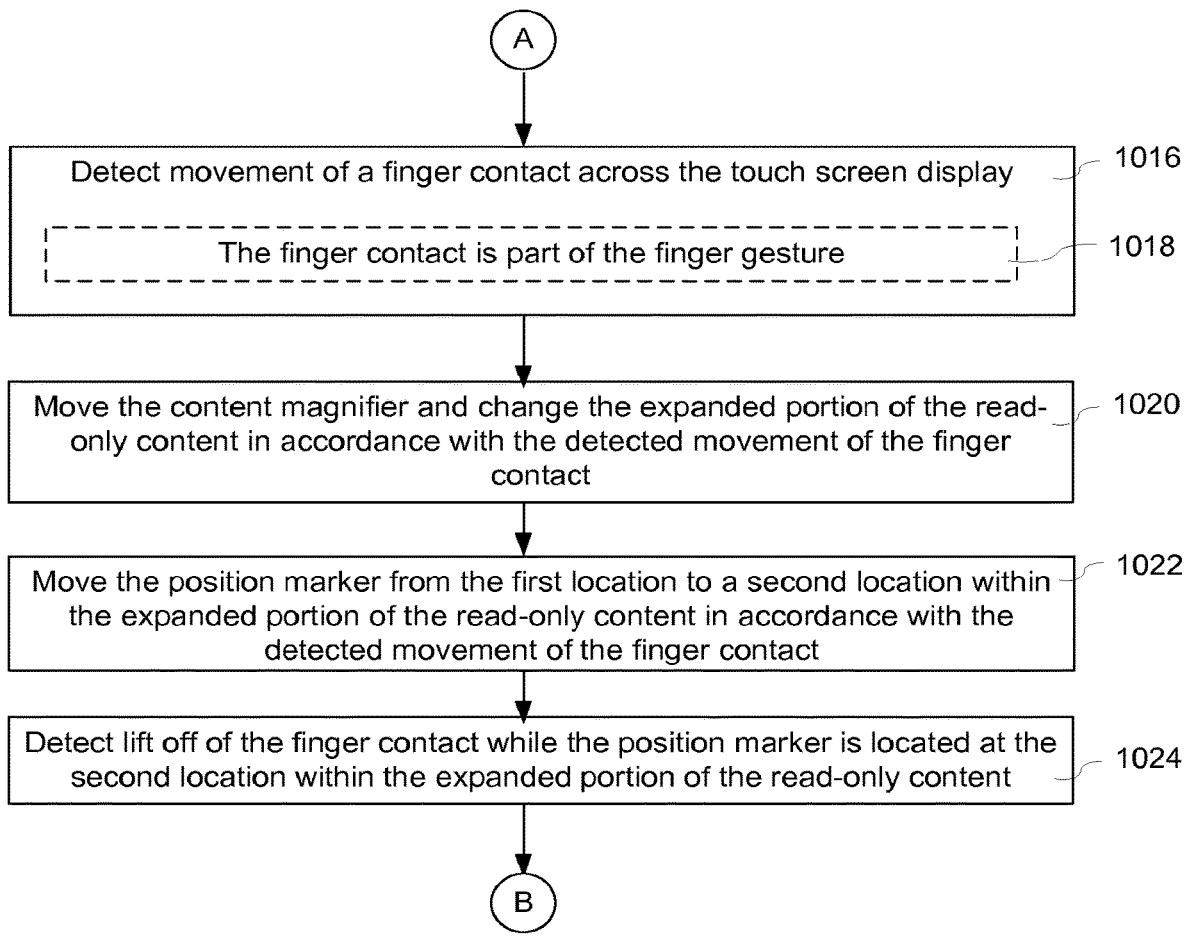
Figure 10C:
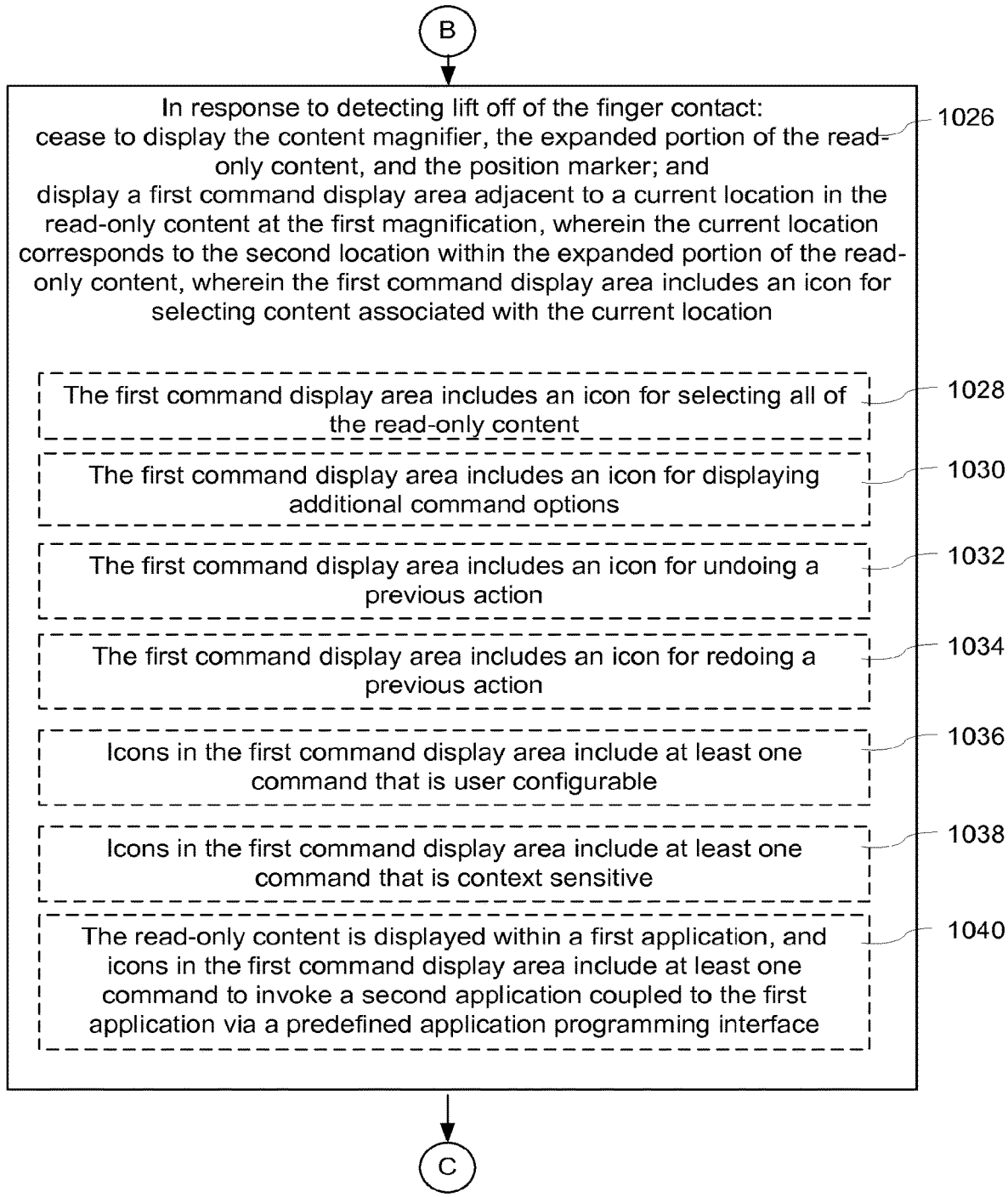
Figure 10D:
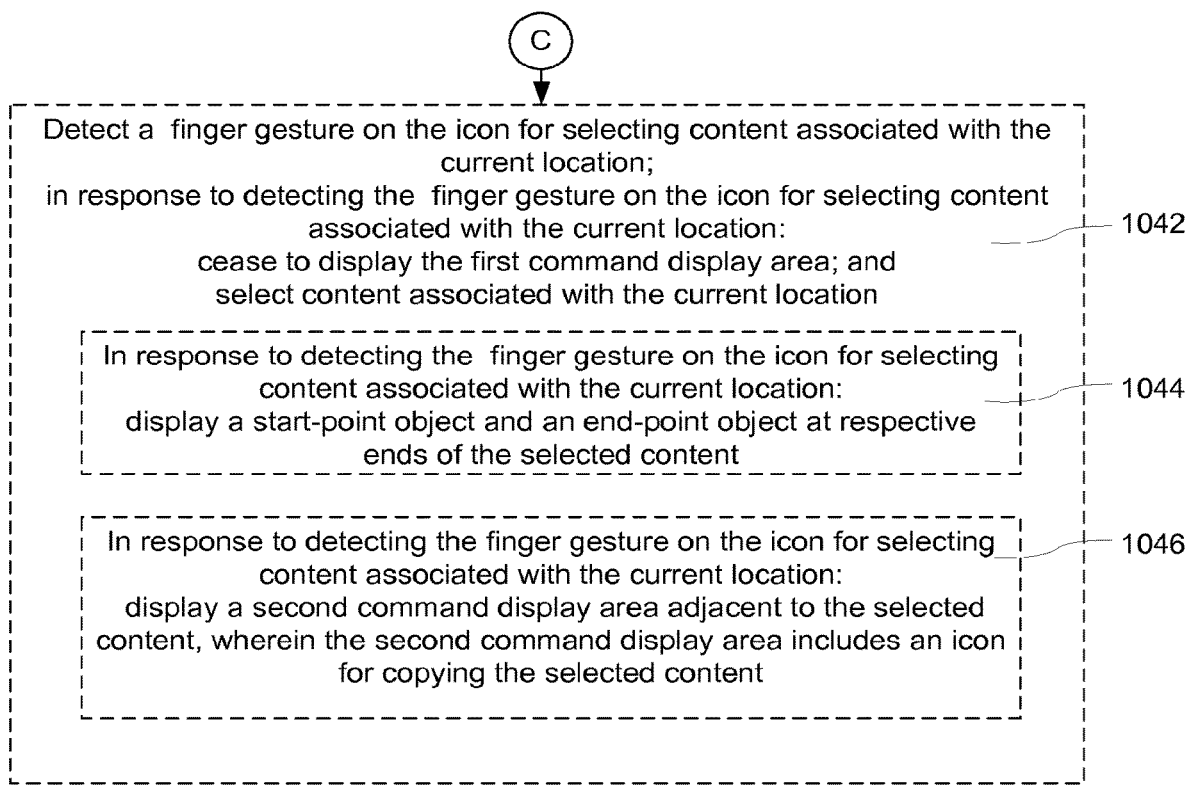

FIGS. 8A-8U illustrate exemplary user interfaces for selecting content in structured electronic documents in accordance with some embodiments. The user interfaces in these figures are used to illustrate the processes described below with respect to FIGS. 17A-17B, 18, and 19.

FIGS. 8A and 8B illustrate enlarging and centering a box of content prior to content selection. FIGS. 8B-8E illustrate selecting a first box of content, enlarging the selection to two boxes with a finger gesture, and copying the two boxes.

FIGS. 8F-8K illustrate selecting a first box of content and enlarging the selected boxes of content with finger gestures.

FIGS. 8L-8M illustrate copying a box of content and pasting the box into a note (FIG. 8M) and into an email (FIG. 8N-8O).

FIGS. 8P-8U illustrate selecting content within a single box of content on a web page (FIGS. 8P-8T) and in an HTML email message (FIG. 8U).

FIGS. 9A-9D are flow diagrams illustrating a method of selecting editable content in accordance with some embodiments. The method 900 is performed at a multifunction device (e.g., 300, FIG. 3) with a touch screen display. In some embodiments, the method is performed at a portable multifunction device with a touch screen display (e.g., portable multifunction device 100). Some operations in method 900 may be combined and/or the order of some operations may be changed.

As described below, the method 900 provides an intuitive way to select editable content at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (902) editable content 502 on the touch screen display at a first magnification (FIG. 5A). In some embodiments, the editable content 502 comprises (904) text (e.g., plain text, unstructured text, or formatted text).

The device detects (906) a finger gesture 504 on the editable content 502 (FIG. 5A). In some embodiments, the finger gesture on the editable content is a press and hold gesture (908).

In response to detecting the finger gesture 504 on the editable content 502, the device: expands a portion 506 (FIG. 5B) of the editable content on the touch screen display to a second magnification that is greater than the first magnification while continuing to display at least some of the editable content 502 at the first magnification and displays a content magnifier (910) (e.g., as shown in FIG. 5B). The content magnifier 508 displays the expanded portion 506 of the editable content and an insertion marker 510 at a first location within the expanded portion of the editable content (e.g., at the end of the word "equal" in FIG. 5B).

In some embodiments, the expanded portion 506 of the editable content displayed in the content magnifier includes (912) portions of at least three horizontal lines of text displayed concurrently (e.g., analogous to that shown in FIG. 5O).

In some embodiments, the content magnifier 508 has a predefined shape (e.g., a circle in FIG. 5B) (914).

In some embodiments, the insertion marker 510 is a cursor, insertion bar, or insertion point (916).

The device detects (918) movement (e.g., 512, FIG. 5B) of a finger contact 514 across the touch screen display. In some embodiments, the finger contact 514 is part of the finger gesture (e.g., when the finger gesture 504 (FIG. 5A) is a "press and hold" gesture) (920).

The device moves the content magnifier 508 and changes the expanded portion 506 of the editable content in accordance with the detected movement 512 of the finger contact 514 (922) (e.g., as shown in FIGS. 5B and 5C).

The device moves (924) the insertion marker 510 from the first location to a second location within the expanded portion of the editable content in accordance with the detected movement of the finger contact (e.g., from the end of the word "equal" in FIG. 5B to the beginning of the word "Four" in FIG. 5C).

The device detects (926) lift off of the finger contact 514 while the insertion marker 510 is located at the second location within the expanded portion 506 of the editable content (e.g., at the beginning of the word "Four" in FIG. 5C).

In response to detecting lift off of the finger contact, the device: ceases to display the content magnifier 508 and the expanded portion 506 of the editable content; displays the insertion marker 510 at a current location in the editable content at the first magnification (e.g., at the beginning of the word "Four" in FIG. 5D), wherein the current location corresponds to the second location within the expanded portion of the editable content; and displays a first command display area 516 adjacent to the insertion marker (928) (e.g., as shown in FIG. 5D). The first command display area 516 includes an icon for selecting content associated with the current location of the insertion marker 510 (e.g., "Select" icon 518, FIG. 5D).

In some embodiments, in response to detecting lift off of the finger contact 514, the device displays (930) an animation of the expanded portion 506 of the editable content shrinking into the insertion marker 510 at the current location in the editable content at the first magnification.

In some embodiments, the first command display area 516 includes (932) an icon for selecting all of the editable content (e.g., "Select All" icon 520, FIG. 5D).

In some embodiments, the first command display area 516 includes (934) an icon for displaying additional command options (not shown, but analogous to the " . . . " icon 602 in FIG. 6K).

In some embodiments, the first command display area 516 includes (936) an icon for undoing a previous action (not shown, but analogous to the "Undo" icon 604, FIG. 6N).

In some embodiments, the first command display area 516 includes (938) an icon for redoing a previous action (not shown, but analogous to the "Redo" icon 605, FIG. 6N).

In some embodiments, icons in the first command display area 516 include (940) at least one command that is user configurable.

In some embodiments, icons in the first command display area 516 include (942) at least one command that is context sensitive.

In some embodiments, the editable content 502 is displayed within a first application, and icons in the first command display area 516 include (944) at least one command to invoke a second application coupled to the first application via a predefined application programming interface.

In some embodiments, the device detects (946) a finger gesture on the icon for selecting content associated with the current location of the insertion marker (e.g., a tap gesture 522 on "Select" icon 518, FIG. 5D). In response to detecting the finger gesture on the icon for selecting content associated with the current location of the insertion marker, the device ceases to display the first command display area 516 and selects content associated with the current location of the insertion marker. In some embodiments, a word is selected if the insertion marker is within the word (e.g., the word "nation" in FIGS. 5H-5I), adjacent to the first letter of the word (e.g., the word "Four" in FIGS. 5D-5E), or adjacent to the last letter of the word (e.g., the word "forth" in FIGS. 5F-5G). In some embodiments, the closest word and any punctuation and/or spaces are selected if the insertion marker 510 is currently located after a sentence and not within a word or adjacent to the first or last letter of a word (e.g., "equal." in FIGS. 5J-5K).

In some embodiments, in response to detecting the finger gesture on the icon for selecting content associated with the current location of the insertion marker, the device displays (948) a start-point object 526 (FIG. 5E) and an end-point object 528 at respective ends of the selected content 524. For example, in response to detecting the tap gesture 522 on "Select" icon 518 (FIG. 5D), the device displays a start-point object 526 and an end-point object 528 at respective ends of the selected word "Four" (FIG. 5E).

In some embodiments, in response to detecting the finger gesture on the icon for selecting content associated with the current location of the insertion marker, the device displays (950) a second command display area adjacent to the selected content (e.g., second command display area 530 is adjacent to the selected word "Four" in FIG. 5E). The second command display area 530 includes an icon for cutting the selected content and an icon for copying the selected content (e.g., "Cut" icon 532 and "Copy" icon 534, FIG. 5E).

In some embodiments, the second command display area 530 includes (952) an icon for pasting previously cut or copied content (e.g., "Paste" icon 536, FIG. 5E).

In some embodiments, the second command display area includes (954) an icon for undoing a previous action (e.g., "Undo" icon 604, FIG. 6N).

In some embodiments, the second command display area includes (956) an icon for displaying additional command options (e.g., " . . . " icon 602, FIG. 6K).

In some embodiments, the second command display area includes (958) an icon redoing a previous action (e.g., "Redo" icon 605, FIG. 6N).

In some embodiments, icons in the second command display area include (960) at least one command that is user configurable.

In some embodiments, icons in the second command display area include (962) at least one command that is context sensitive.

In some embodiments, the editable content is displayed within a first application, and icons in the second command display area include (964) at least one command to invoke a second application coupled to the first application via a predefined application programming interface.

The second command display area 530 may include one or more of the icons discussed below with respect to FIGS. 6A-6BB.

FIGS. 10A-10D are flow diagrams illustrating a method of selecting read-only content in accordance with some embodiments. The method 1000 is performed at a multifunction device (e.g., 300, FIG. 3) with a touch screen display. In some embodiments, the method is performed at a portable multifunction device with a touch screen display (e.g., portable multifunction device 100). Some operations in method 1000 may be combined and/or the order of some operations may be changed.

As described below, the method 1000 provides an intuitive way to select read-only content at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1002) read-only content 538 on the touch screen display at a first magnification (FIG. 5M). In some embodiments, the read-only content 538 comprises (1004) text (e.g., plain text, unstructured text, formatted, or text in a web page).

The device detects (1006) a finger gesture 540 on the read-only content (FIG. 5M). In some embodiments, the finger gesture on the read-only content is a press and hold gesture (1008).

In response to detecting the finger gesture 540 on the read-only content 538, the device: expands a portion 544 of the read-only content on the touch screen display to a second magnification that is greater than the first magnification while continuing to display at least some of the read-only content 538 at the first magnification and displays a content magnifier (1010) (e.g., as shown in FIG. 5N). The content magnifier 508 displays the expanded portion 544 of the read-only content and a position marker 546 at a first location within the expanded portion of the read-only content (e.g., in the middle of the word "earth" in FIG. 5N).

In some embodiments, the expanded portion 544 of the read-only content displayed in the content magnifier includes (1012) portions of at least three horizontal lines of text displayed concurrently (e.g., as shown in FIG. 5O).

In some embodiments, the content magnifier 508 has a predefined shape (e.g., a circle in FIG. 5N) (1014).

For read-only content, the insertion marker 510 becomes a position marker 546 that is used in processes that select existing read-only content (e.g., for copying), but not for processes that modify the existing (read-only) content.

The device detects (1016) movement (e.g., 548, FIG. 5N) of a finger contact 550 across the touch screen display. In some embodiments, the finger contact 550 is part of the finger gesture (e.g., when the finger gesture 540 is a "press and hold" gesture) (1018).

The device moves the content magnifier 508 and changes the expanded portion 544 of the read-only content in accordance with the detected movement 548 of the finger contact 550 (1020).

The device moves (1022) the position marker 546 from the first location to a second location within the expanded portion of the read-only content in accordance with the detected movement of the finger contact (e.g., from the middle of the word "earth" in FIG. 5N to the middle of the word "nation" in FIG. 5O).

The device detects (1024) lift off of the finger contact 550 while the position marker 546 is located at the second location within the expanded portion 544 of the read-only content (e.g., in the middle of the word "nation" in FIG. 5O).

In response to detecting lift off of the finger contact, the device: ceases to display the content magnifier 508, the expanded portion 544 of the read-only content, and the position marker 546; and displays a first command display area 516 adjacent to a current location in the read-only content at the first magnification (1026). The current location corresponds to the second location within the expanded portion of the read-only content (e.g., the middle of the word "nation" in FIG. 5P). The first command display area 516 includes an icon for selecting content associated with the current location (e.g., "Select" icon 518, FIG. 5P).

In some embodiments, the first command display area 516 includes (1028) an icon for selecting all of the read-only content (e.g., "Select All" icon 520, FIG. 5P).

In some embodiments, the first command display area 516 includes (1030) an icon for displaying additional command options (not shown, but analogous to the " . . . " icon 602 in FIG. 6K).

In some embodiments, the first command display area 516 includes (1032) an icon for undoing a previous action (not shown, but analogous to the "Undo" icon 604, FIG. 6N).

In some embodiments, the first command display area 516 includes (1034) an icon redoing a previous action (not shown, but analogous to the "Redo" icon 605, FIG. 6N).

In some embodiments, icons in the first command display area 516 include (1036) at least one command that is user configurable.

In some embodiments, icons in the first command display area 516 include (1038) at least one command that is context sensitive.

In some embodiments, the read-only content 538 is displayed within a first application, and icons in the first command display area 516 include (1040) at least one command to invoke a second application coupled to the first application via a predefined application programming interface.

In some embodiments, the device detects (1042) a finger gesture on the icon for selecting content associated with the current location (e.g., a tap gesture 552 on "Select" icon 518, FIG. 5P). In response to detecting the finger gesture on the icon for selecting content associated with the current location, the device: ceases to display the first command display area 516 and selects content associated with the current location. In some embodiments, a word is selected if the current location is within the word (e.g., the word "nation" in FIGS. 5P-5Q), adjacent to the first letter of the word, or adjacent to the last letter of the word. In some embodiments, the closest word and any punctuation and/or spaces are selected if the current location is after a sentence and not within a word or adjacent to the first or last letter of a word. In some embodiments, this content selection is analogous to that described above for editable content, but no insertion marker 510 is displayed because the content is read-only content.

In some embodiments, in response to detecting the finger gesture on the icon for selecting content associated with the current location, the device displays (1044) a start-point object 526 and an end-point object 528 at respective ends of the selected content 524. For example, in response to detecting the tap gesture 552 on "Select" icon 518 (FIG. 5P), the device displays a start-point object 526 and an end-point object 528 at respective ends of the selected word "nation" (FIG. 5Q).

In some embodiments, in response to detecting the finger gesture on the icon for selecting content associated with the current location, the device displays (1046) a second command display area adjacent to the selected content (e.g., second command display area 530 is adjacent to the selected word "nation" in FIG. 5Q). The second command display area 530 includes an icon for copying the selected content (e.g., "copy" icon 534, FIG. 5Q).

The second command display area 530 may include one or more of the icons discussed below with respect to FIGS. 6A-6BB.

In some embodiments, the same content can be either editable or read-only, depending on the context or mode of an application, in which case the method for initially selecting content changes accordingly (e.g., from method 900 to method 1000). For example, the content in the notes application 153 is editable in FIGS. 5A-5L, whereas the content in the notes application 153 is read-only in FIGS. 5M-5Q. The read-only mode in the notes application 153 may be entered in response to activation of the "Done" icon (FIG. 5A), while the editing mode may be entered in response to activation of the "+" icon (FIG. 5M) or by a gesture (e.g., a tap gesture) on the read-only content 538.

Figure 11A:
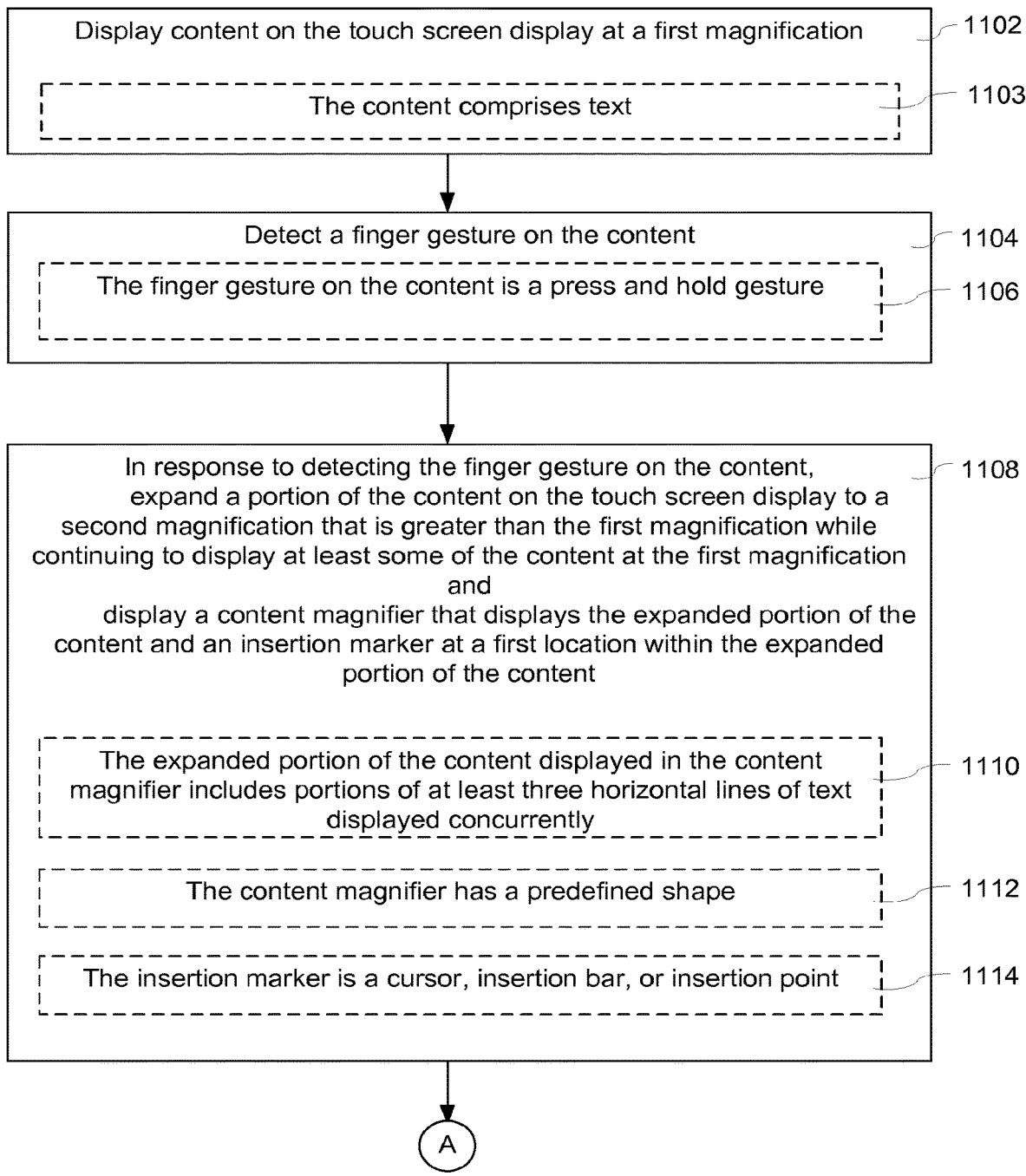
FIGS. 11A-11C are flow diagrams illustrating a method of selecting content in accordance with some embodiments.
Figure 11B:
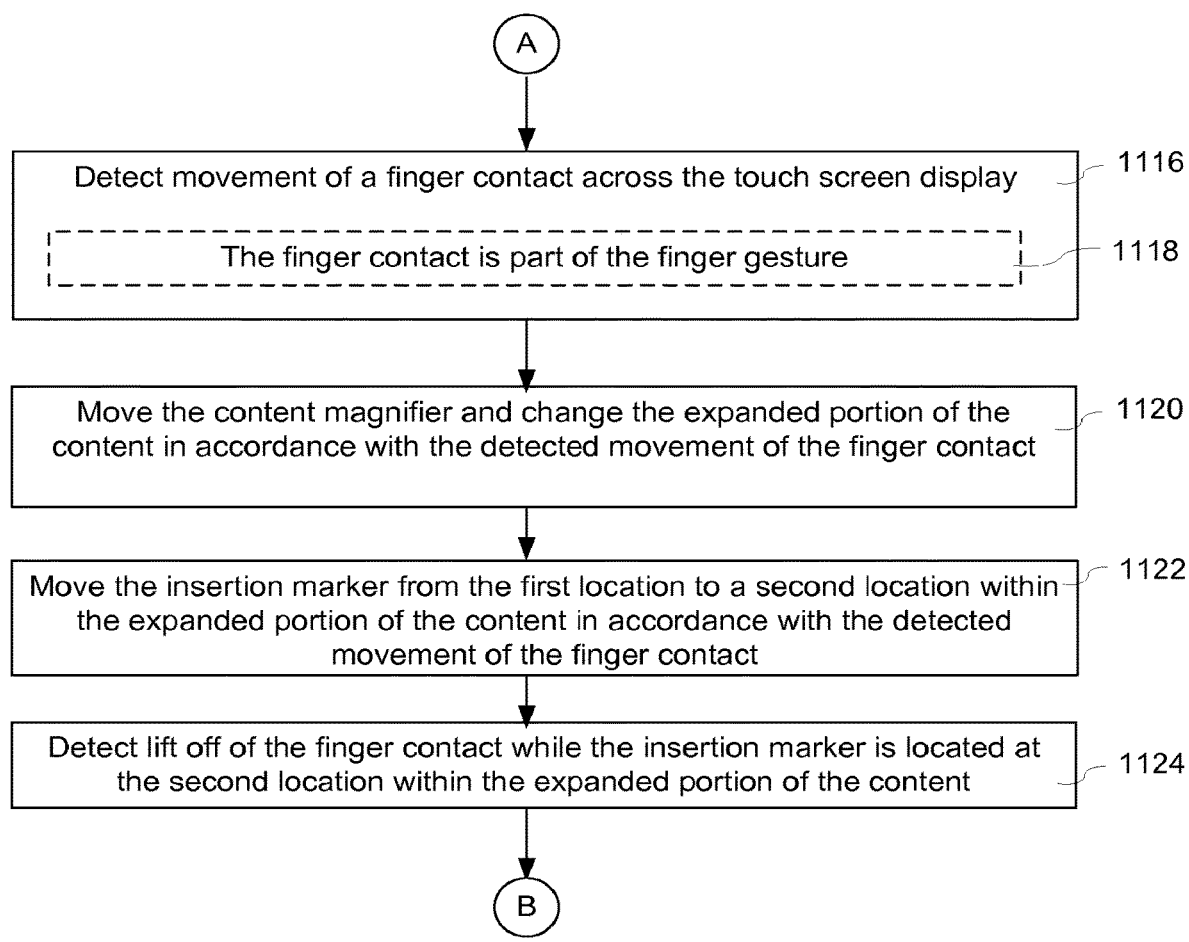
Figure 11C:
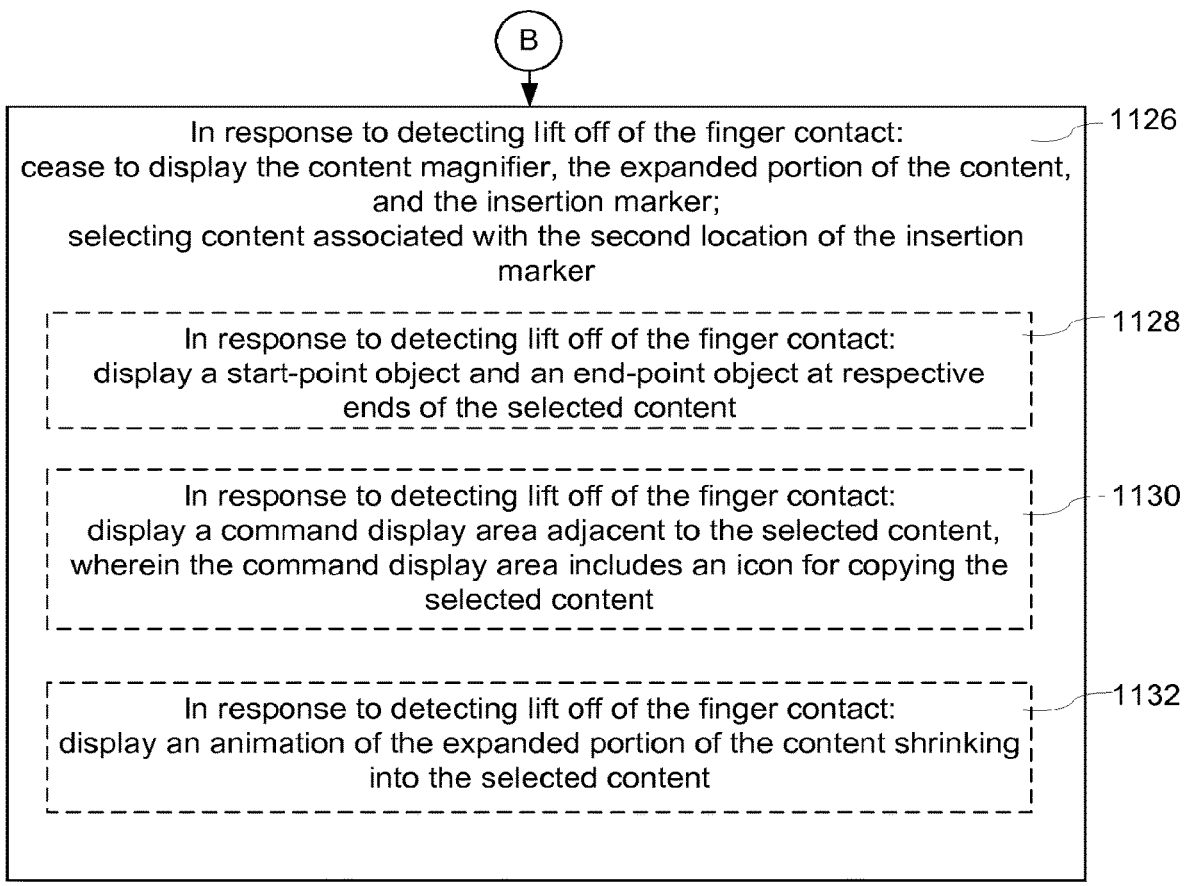

FIGS. 11A-11C are flow diagrams illustrating a method of selecting content in accordance with some embodiments. The method 1100 is performed at a multifunction device (e.g., 300, FIG. 3) with a touch screen display. In some embodiments, the method is performed at a portable multifunction device with a touch screen display (e.g., portable multifunction device 100). Some operations in method 1100 may be combined and/or the order of some operations may be changed.

As described below, the method 1100 provides an intuitive way to select content at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1102) content on the touch screen display at a first magnification. In some embodiments, the content comprises (1103) text (e.g., plain text, unstructured text, formatted text, or text in a web page). The content may be either editable 502 or read-only 538.

The device detects (1104) a finger gesture on the content (e.g., gesture 504, FIG. 5A). In some embodiments, the finger gesture on the content is a press and hold gesture (1106).

In response to detecting the finger gesture on the content, the device: expands a portion 506 of the content on the touch screen display to a second magnification that is greater than the first magnification while continuing to display at least some of the content at the first magnification; and displays a content magnifier (1108) (e.g., as shown in FIG. 5B). The content magnifier 508 displays the expanded portion 506 of the content and an insertion marker 510 at a first location within the expanded portion of the content (e.g., at the end of the word "equal" in FIG. 5B).

In some embodiments, the expanded portion of the content displayed in the content magnifier includes (1110) portions of at least three horizontal lines of text displayed concurrently (e.g., as shown in FIG. 5O).

In some embodiments, the content magnifier has a predefined shape (e.g., a circle in FIG. 5B) (1112).

In some embodiments, the insertion marker is a cursor, insertion bar, or insertion point (1114).

The device detects (1116) movement (e.g., 512, FIG. 5B) of a finger contact across the touch screen display. In some embodiments, the finger contact 514 is part of the finger gesture (e.g., when the finger gesture 504 (FIG. 5A) is a "press and hold" gesture) (1118).

The device moves the content magnifier 508 and changes the expanded portion 506 of the content in accordance with the detected movement 512 of the finger contact 514 (1120) (e.g., as shown in FIGS. 5B and 5C).

The device moves (1122) the insertion marker 510 from the first location to a second location within the expanded portion of the content in accordance with the detected movement of the finger contact (e.g., from the end of the word "equal" in FIG. 5B to the beginning of the word "Four" in FIG. 5C).

The device detects (1124) lift off of the finger contact 514 while the insertion marker 510 is located at the second location within the expanded portion 506 of the content (e.g., at the beginning of the word "Four" in FIG. 5C).

In response to detecting lift off of the finger contact, the device: ceases to display the content magnifier 508, the expanded portion 506 of the content, and the insertion marker 510; and selects content associated with the second location of the insertion marker (1126) (e.g., as shown in FIG. 5E, where the word "Four" is selected). In some embodiments, a word is selected if the insertion marker is within the word, adjacent to the first letter of the word (e.g., the word "Four" in FIG. 5C), or adjacent to the last letter of the word. In some embodiments, the closest word and any punctuation and/or spaces are selected if the insertion marker 510 is currently located after a sentence and not within a word or adjacent to the first or last letter of a word.

In some embodiments, in response to detecting lift off of the finger contact, the device displays (1128) a start-point object 526 and an end-point object 528 at respective ends of the selected content 524. For example, in response to detecting lift off of the finger contact 514 (FIG. 5C), the device displays a start-point object 526 and an end-point object 528 at respective ends of the selected word "Four" (FIG. 5E).

In some embodiments, in response to detecting lift off of the finger contact, the device displays (1130) a command display area 530 adjacent to the selected content (e.g., command display area 530 is adjacent to the selected word "Four" in FIG. 5E). The command display area 530 includes an icon for copying the selected content (e.g., "Copy" icon 534, FIG. 5E). The command display area 530 may include one or more of the icons discussed below with respect to FIGS. 6A-6BB.

In some embodiments, in response to detecting lift off of the finger contact, the device displays (1132) an animation of the expanded portion 506 of the content shrinking into the selected content 524.

Figure 12:
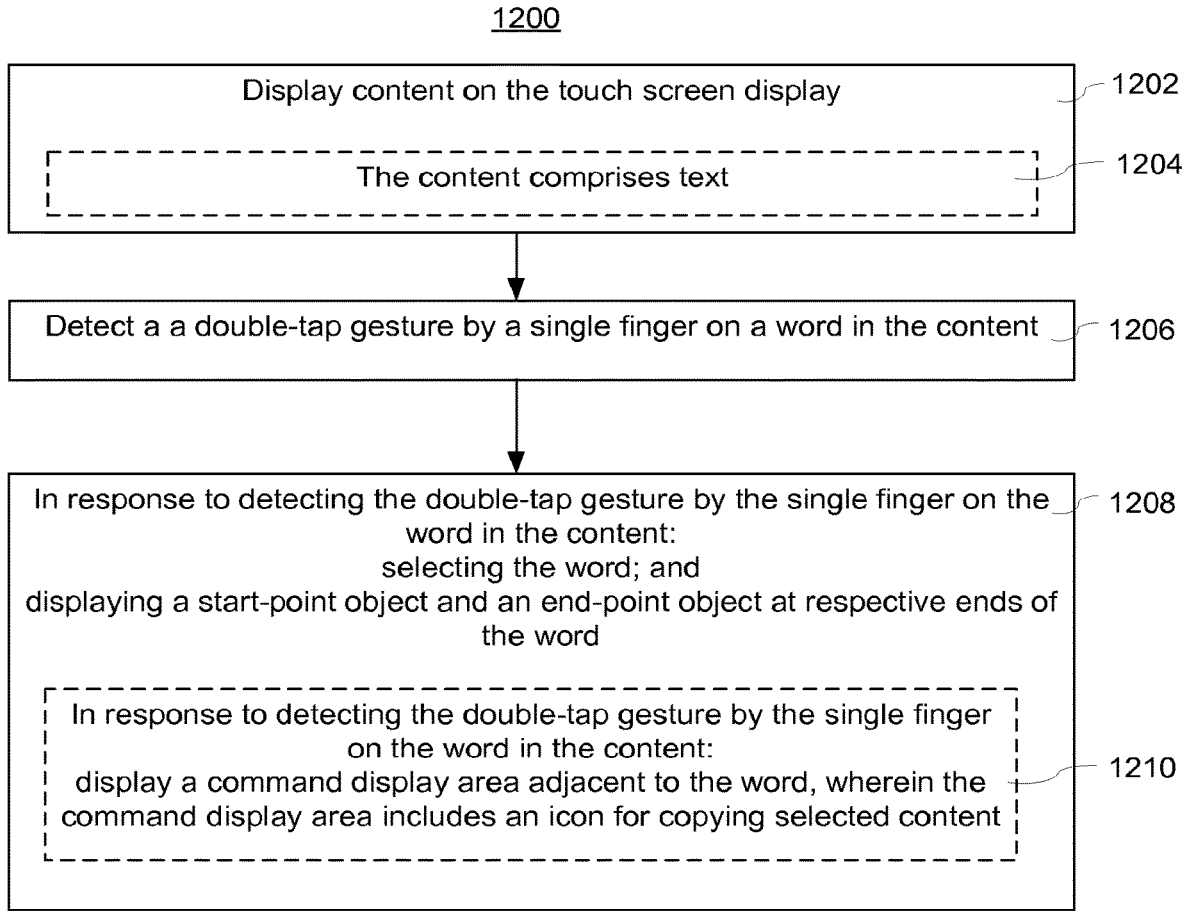
FIG. 12 is a flow diagram illustrating a method of selecting a word with a double-tap gesture by a single finger in accordance with some embodiments.
Figure 13A:
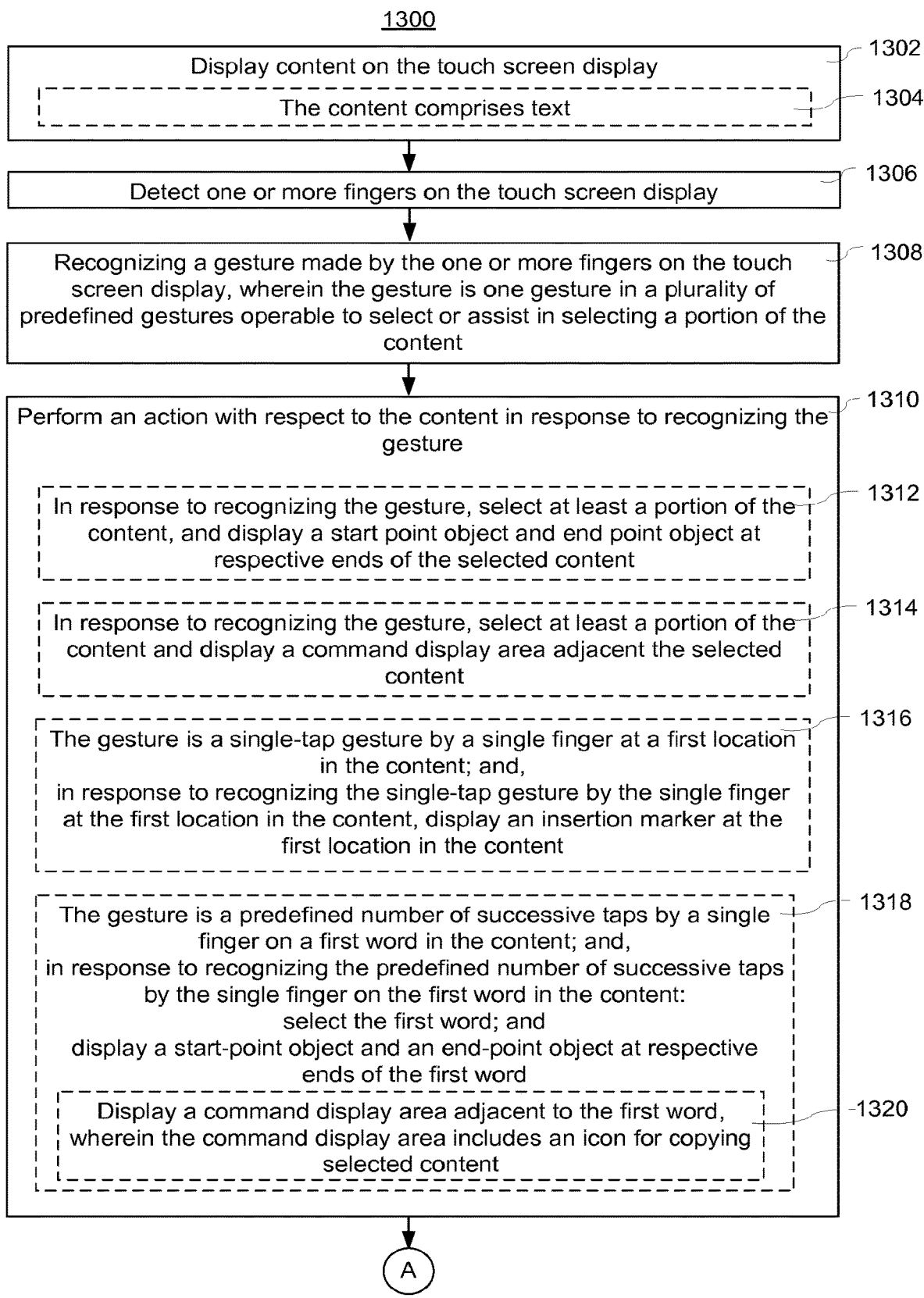
Figure 13C:
Figure 13D:
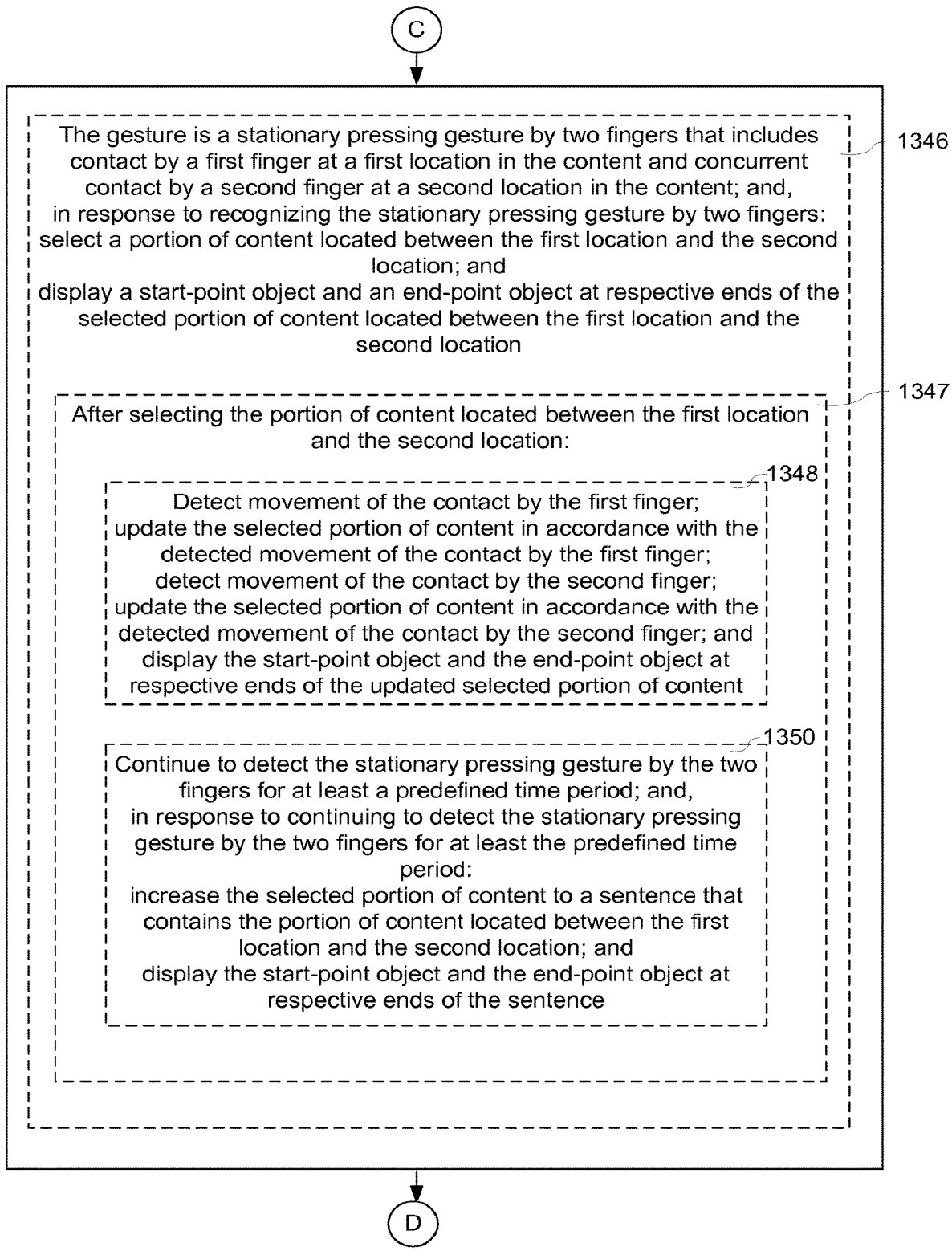
Figure 13E:
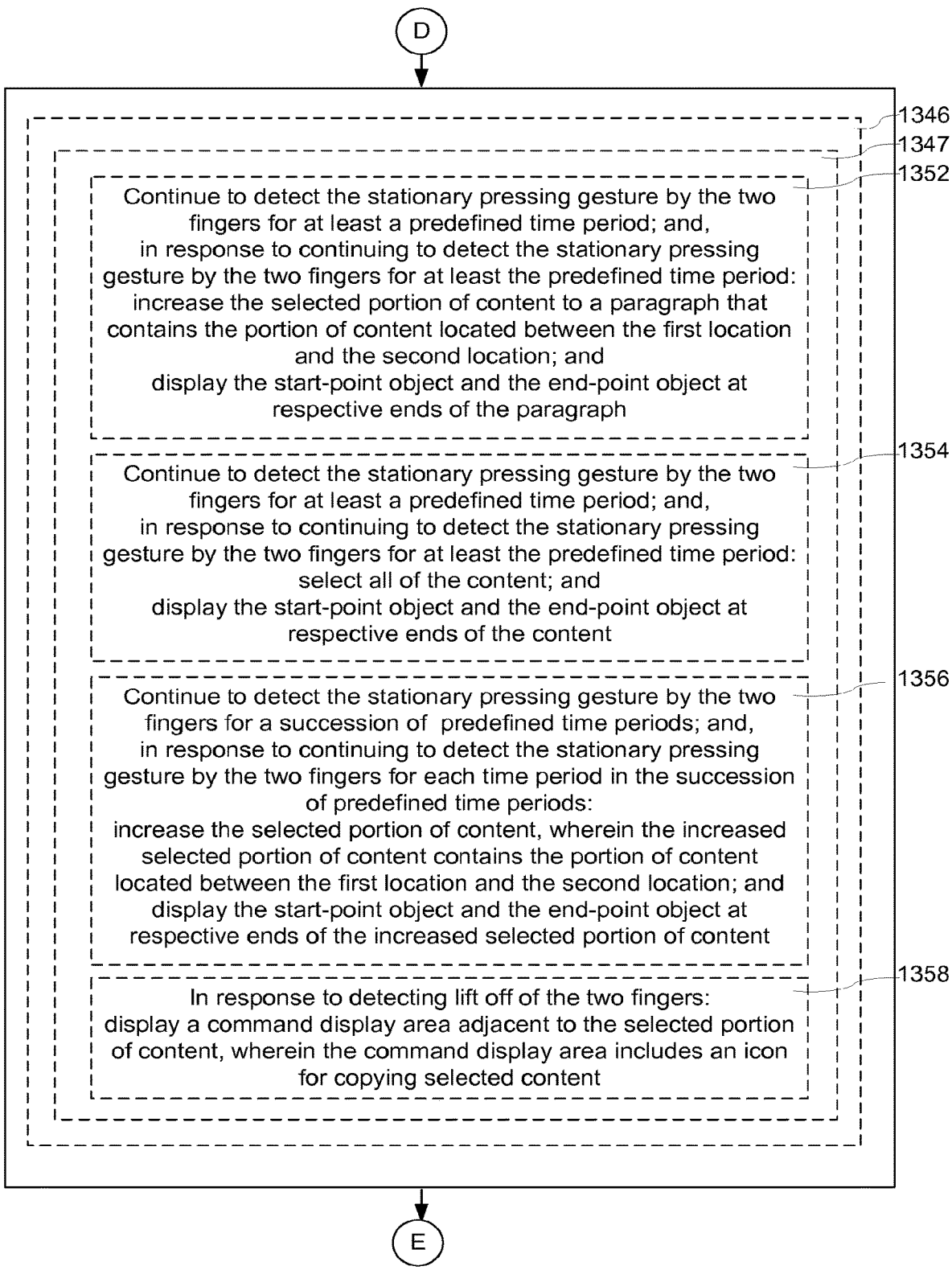
Figure 13F:
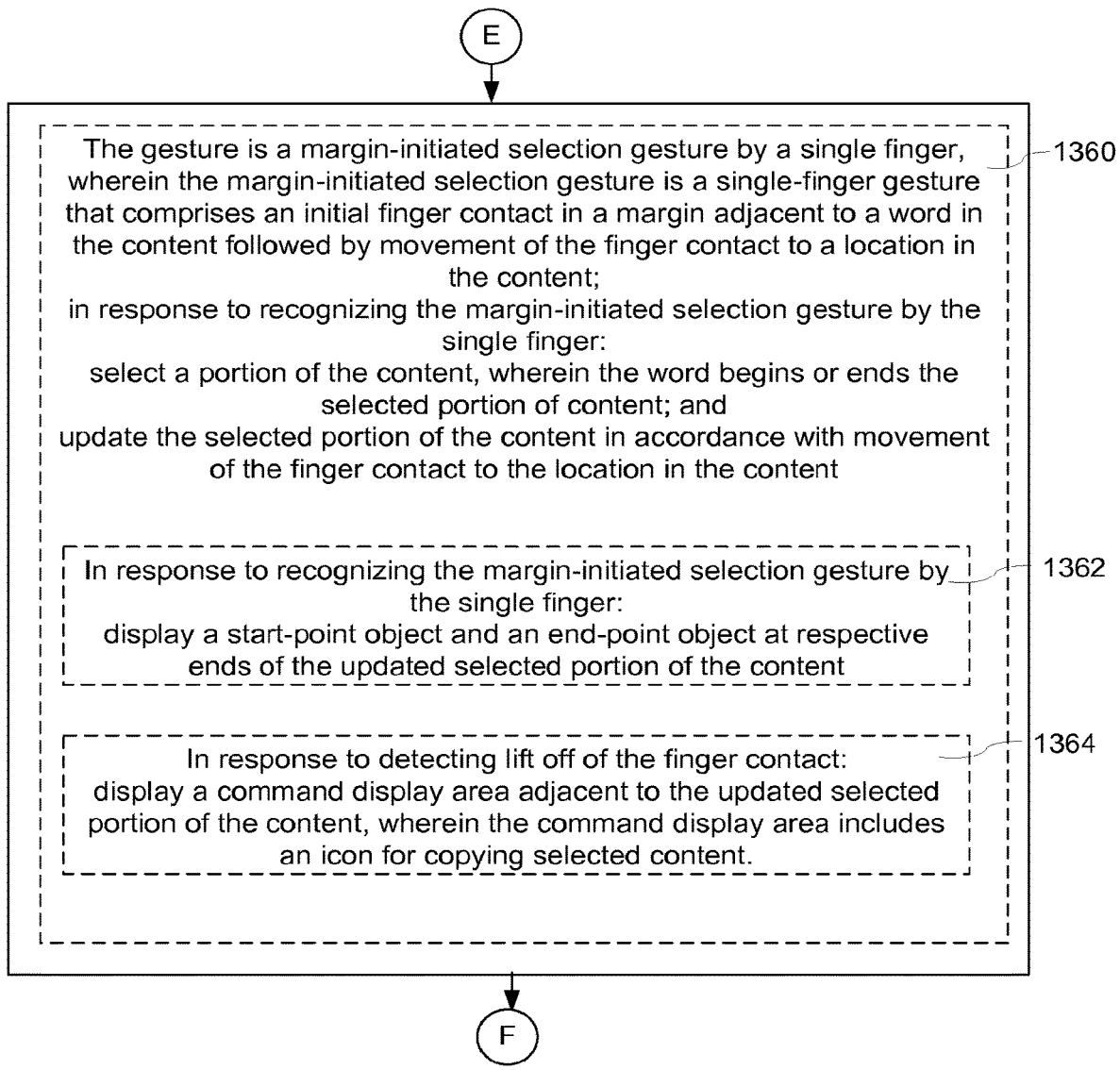
Figure 13G:
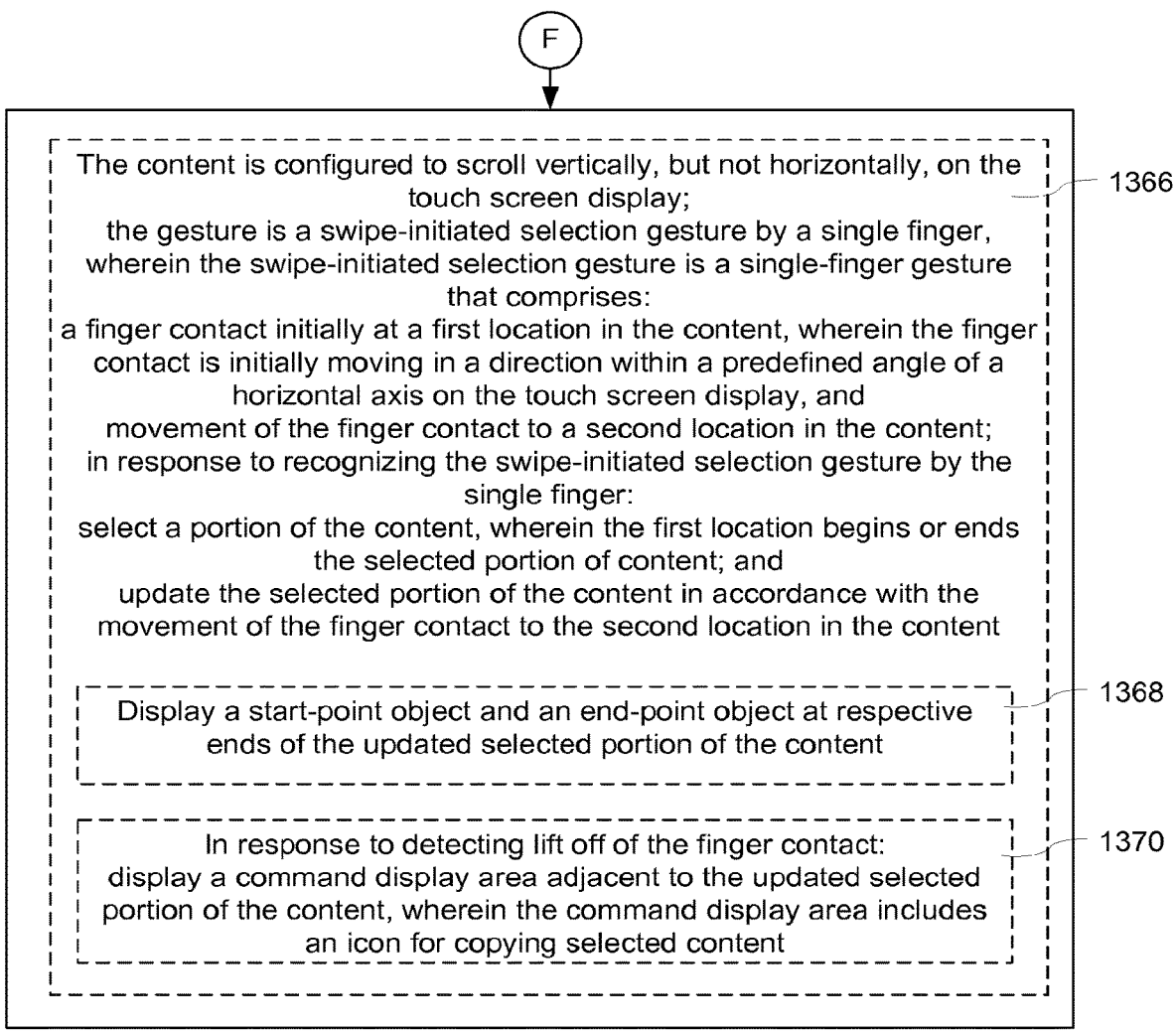
Figure 14A:
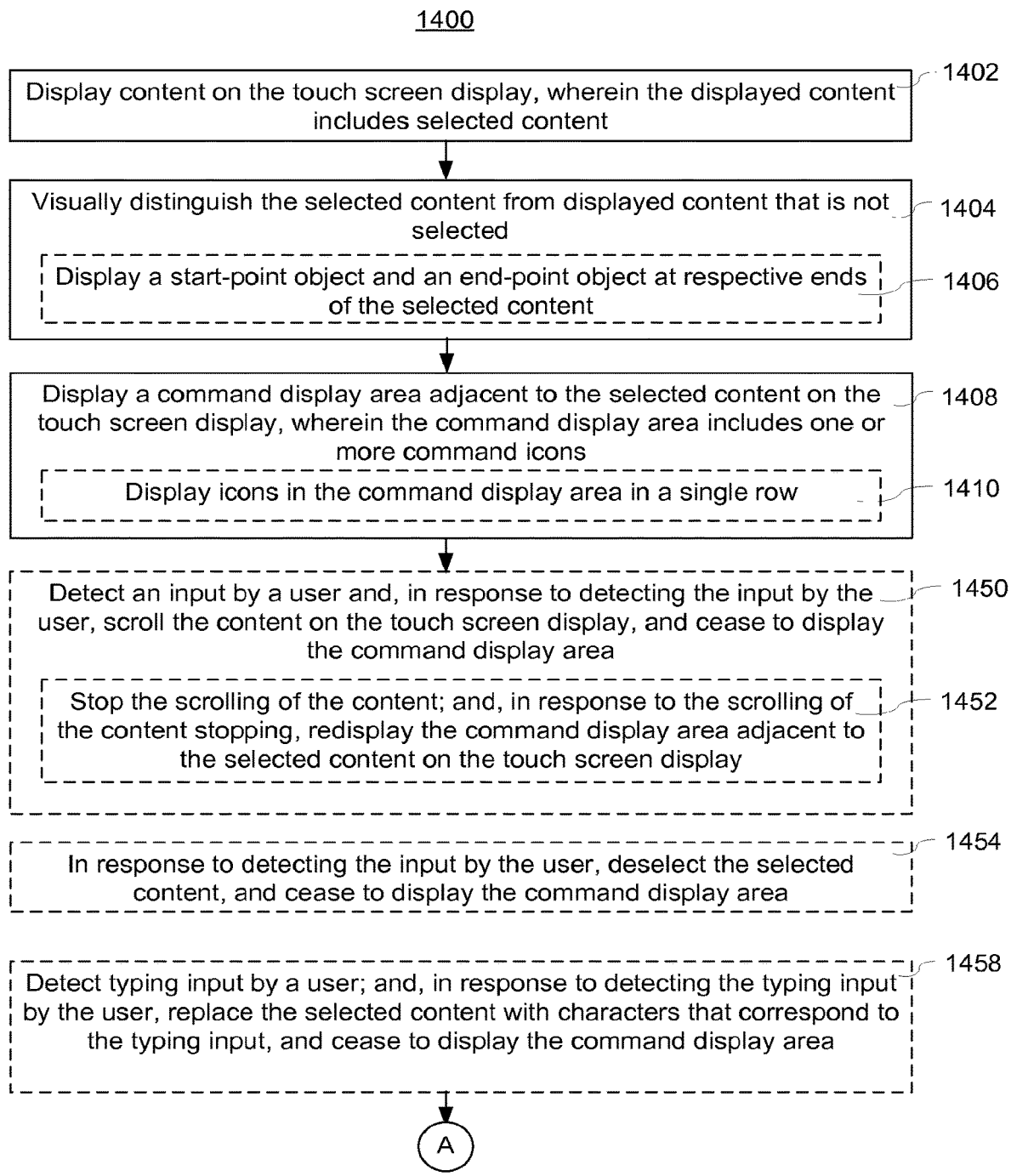
Figure 14B:
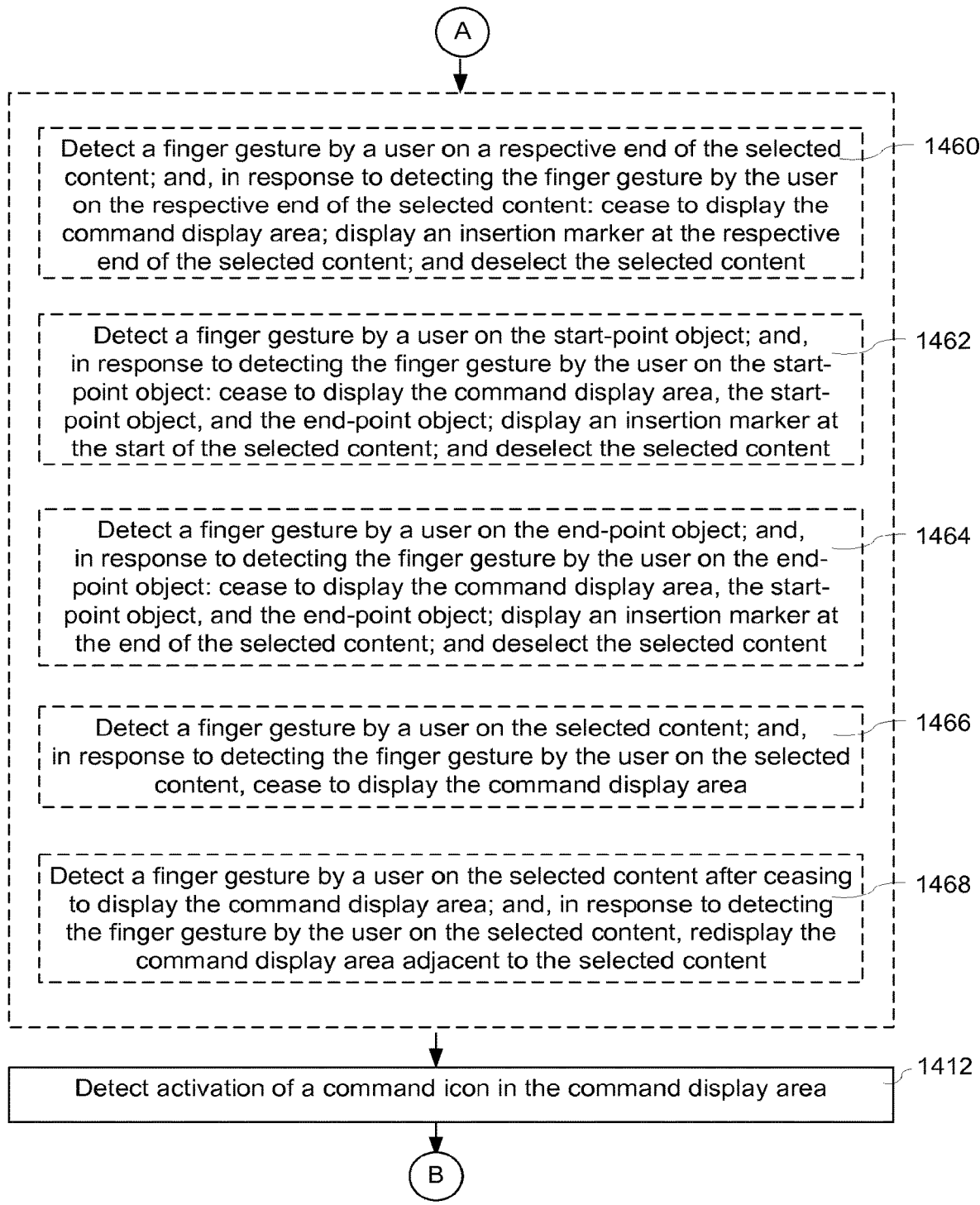
Figure 14C:
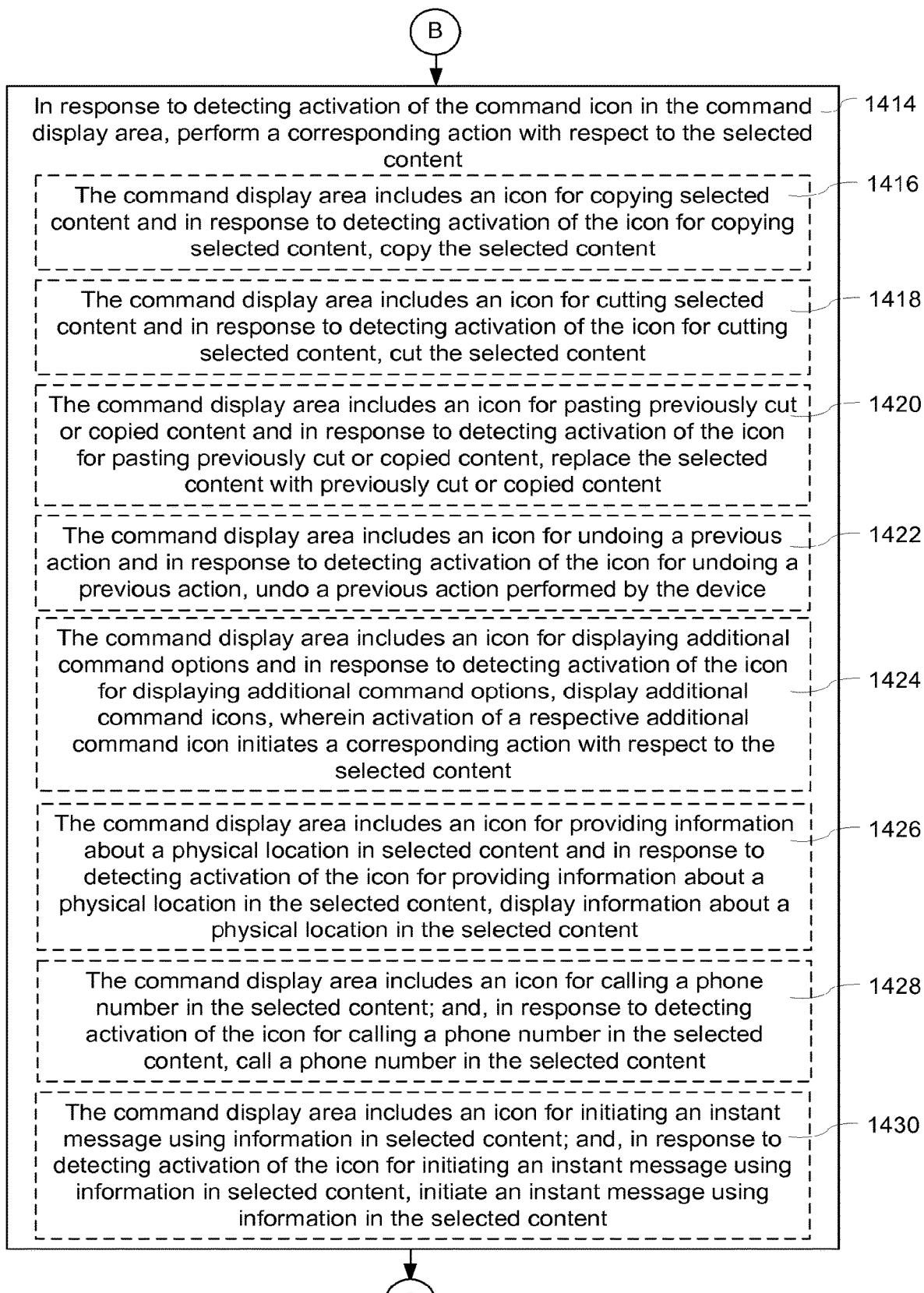

FIG. 12 is a flow diagram illustrating a method of selecting a word with a double-tap gesture by a single finger in accordance with some embodiments. The method 1200 is performed at a multifunction device (e.g., 300, FIG. 3) with a touch screen display. In some embodiments, the method is performed at a portable multifunction device with a touch screen display (e.g., portable multifunction device 100).

As described below, the method 1200 provides a fast and easy way to select a word at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1202) content on the touch screen display. In some embodiments, the content comprises (1204) text (e.g., plain text, unstructured text, formatted text, or text in a web page). The content may be either editable 502 or read-only 538.

The device detects (1206) a double-tap gesture by a single finger on a word in the content. For example, the device detects a double-tap gesture 554 by a single finger on the word "forth" in FIG. 5T.

In response to detecting the double-tap gesture 554 by the single finger on the word in the content, the device selects the word, and displays a start-point object and an end-point object at respective ends of the word (1208). For example, in response to detecting the double-tap gesture 554 by the single finger on the word "forth" in FIG. 5T, the device selects "forth", and displays a start-point object 526 and an end-point object 528 at respective ends of "forth," as shown in FIG. 5U.

In some embodiments, in response to detecting the double-tap gesture 554 by the single finger on the word in the content, the device displays (1210) a command display area adjacent to the word. For example, the device displays command display area 530 adjacent to "forth" in FIG. 5U. The command display area 530 includes an icon for copying selected content (e.g., "Copy" icon 534, FIG. 5U).

The command display area 530 may include one or more of the icons discussed below with respect to FIGS. 6A-6BB. Analogous methods to method 1200 may be used with some of the other content selection gestures described below to rapidly select desired portions of text, without needing to use the content magnifier 508 to position the insertion marker 510.

FIGS. 13A-13G are flow diagrams illustrating a method of selecting content with finger gestures in accordance with some embodiments. The method 1300 is performed at a multifunction device (e.g., 300, FIG. 3) with a touch screen display. In some embodiments, the method is performed at a portable multifunction device with a touch screen display (e.g., portable multifunction device 100). Some operations in method 1300 may be combined and/or the order of some operations may be changed.

As described below, the method 1300 provides a fast and easy way to select content at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1302) content on the touch screen display. In some embodiments, the content comprises (1304) text (e.g., plain text, unstructured text, formatted text, or text in a web page). The content may be either editable 502 or read-only 538.

The device detects (1306) one or more fingers on the touch screen display.

The device recognizes (1308) a gesture made by the one or more fingers on the touch screen display. The gesture is one gesture in a plurality of predefined gestures operable to select or assist in selecting a portion of the content.

The device performs (1310) an action with respect to the content in response to recognizing the gesture.

In some embodiments, performing an action includes, in response to recognizing the gesture, selecting at least a portion of the content, and displaying a start point object 526 and end point object 528 at respective ends of the selected content 524 (1312).

In some embodiments, performing an action includes, in response to recognizing the gesture, selecting at least a portion of the content and displaying a command display area 530 adjacent the selected content (1314). The command display area 530 includes one or more icons corresponding to respective commands. The command display area 530 may include one or more of the icons discussed below with respect to FIGS. 6A-6BB.

In some embodiments, the gesture is a single-tap gesture by a single finger at a first location in the content (1316). In response to recognizing the single-tap gesture by the single finger at the first location in the content, the device displays an insertion marker 510 at the first location in the content.

Figure 5W:
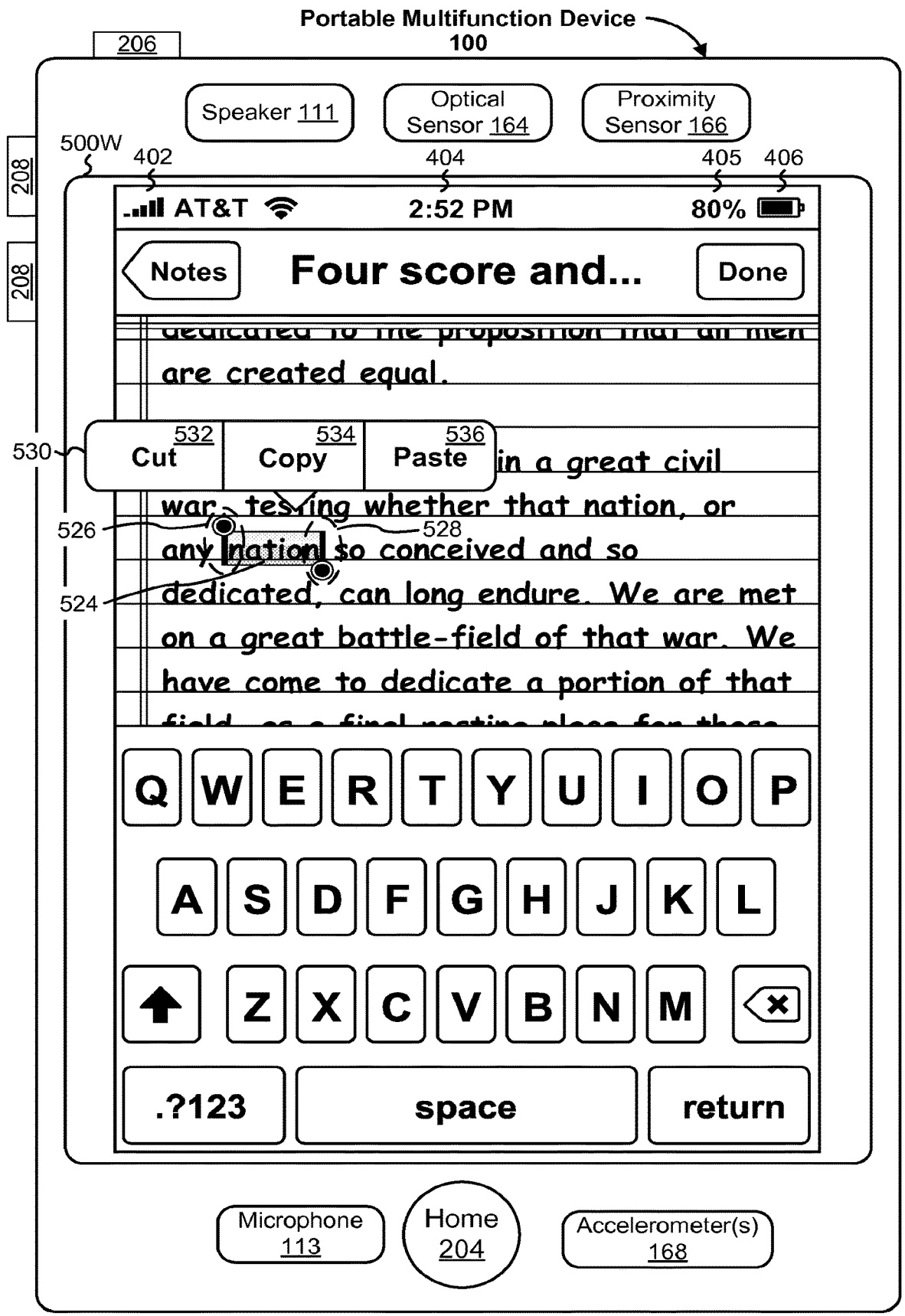

In some embodiments, the gesture is a predefined number of successive taps by a single finger (e.g., a double-tap gesture) on a first word in the content (1318). In response to recognizing the predefined number of successive taps by the single finger on the first word in the content, the device selects the first word and displays a start-point object and an end-point object at respective ends of the first word. For example, in response to recognizing a double-tap gesture 566 (FIG. 5V) on the word "nation," the device selects the word "nation" and displays a start-point object 526 and an end-point object 528 at respective ends of "nation" (FIG. 5W). In some embodiments, in response to recognizing the predefined number of successive taps by the single finger on the first word in the content, the device displays (1320) a command display area 530 (FIG. 5W) adjacent to the first word. The command display area 530 includes an icon for copying selected content (e.g., "Copy" icon 534, FIG. 5W). The command display area 530 may include one or more of the icons discussed below with respect to FIGS. 6A-6BB.

Figure 5X:
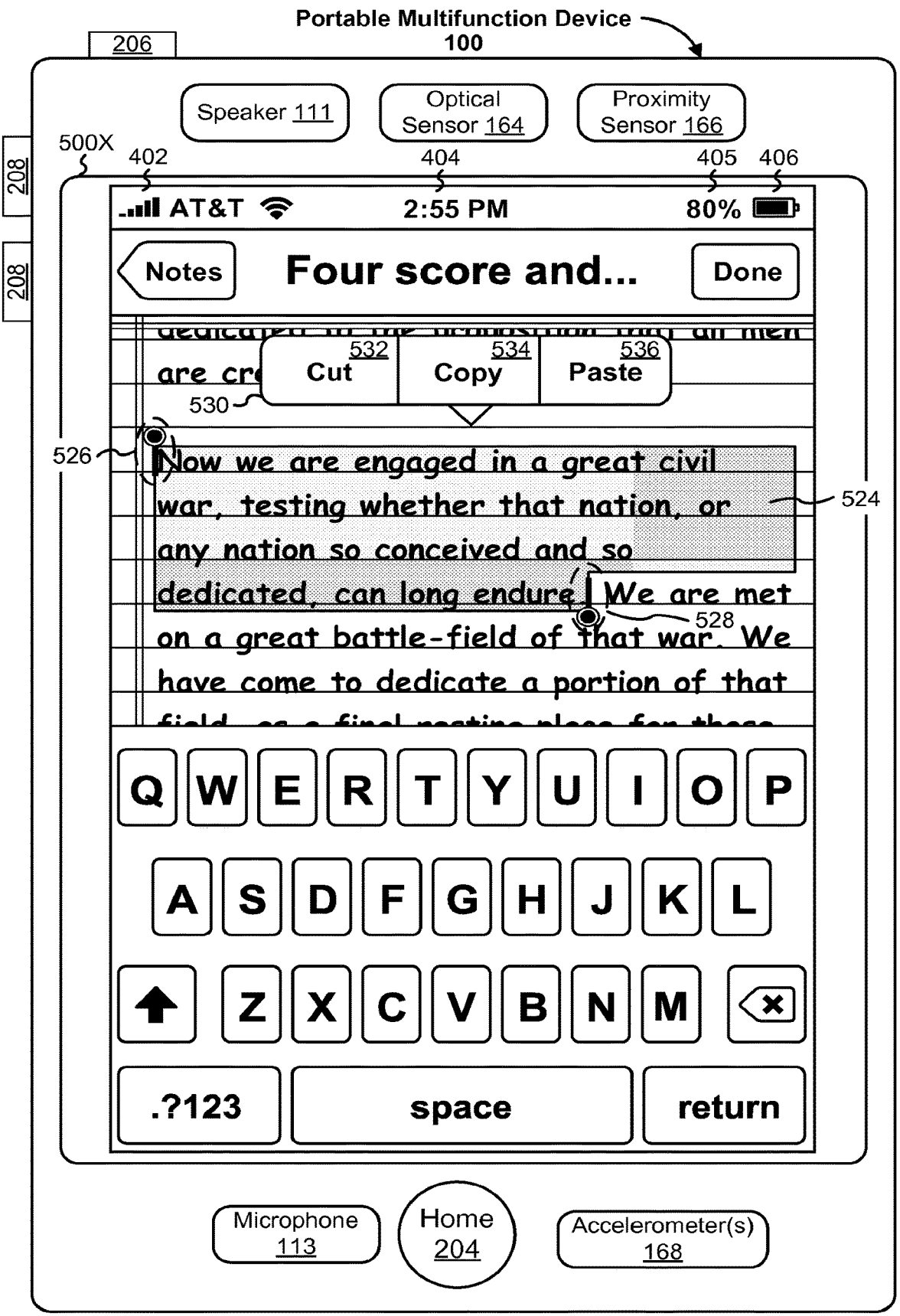
Figure 5Y:
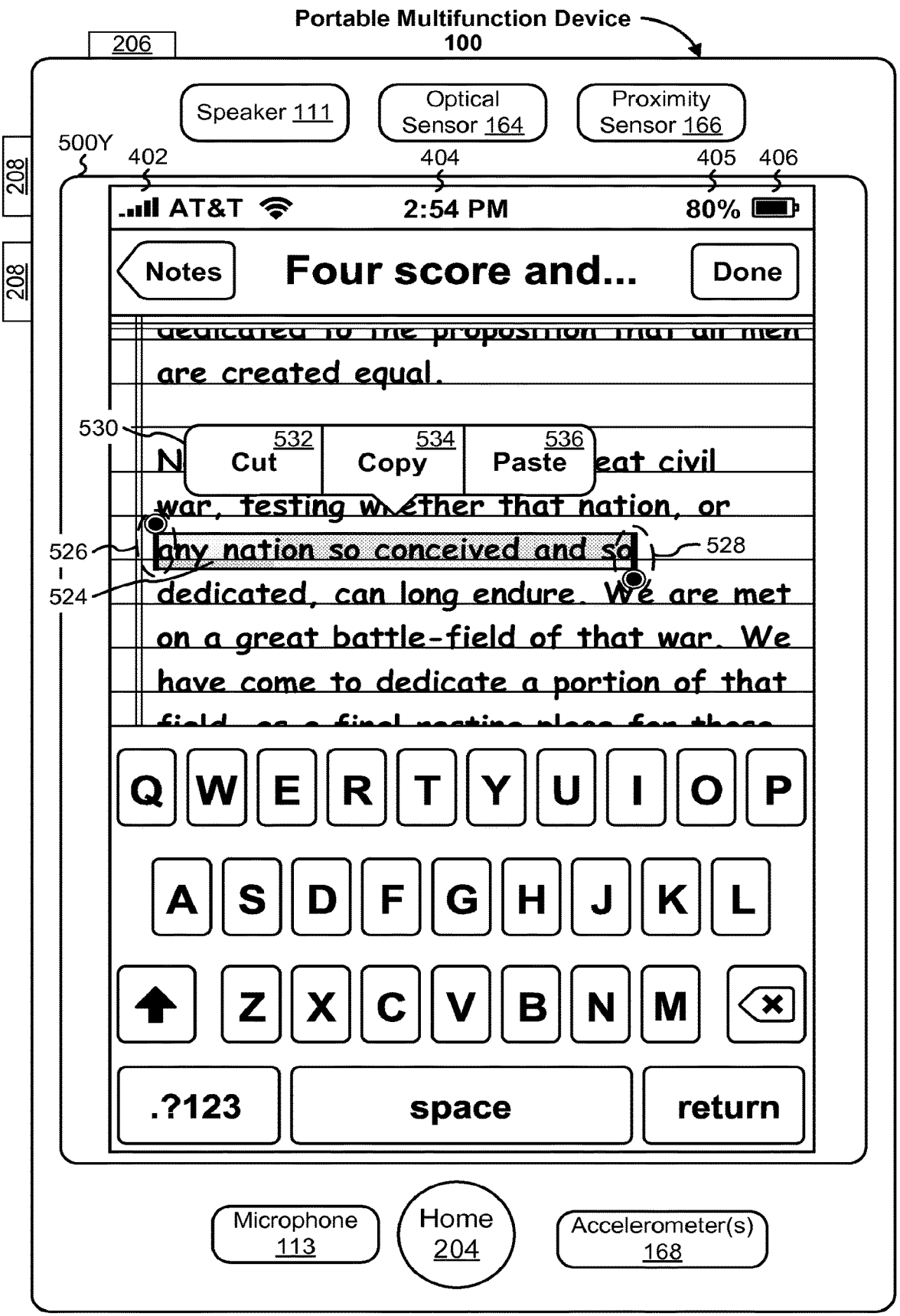

In some embodiments, the gesture is a predefined number of successive taps by a single finger (e.g., a triple-tap gesture) on a sentence in the content (1322). In some embodiments, the gesture is on a single line of text in the content. In response to recognizing the predefined number of successive taps by the single finger on the sentence (or single line of text) in the content, the device selects the sentence (or single line of text) and displays a start-point object and an end-point object at respective ends of the sentence (or single line of text). For example, in response to recognizing a triple-tap gesture 562 on a sentence (FIG. 5V), the device selects the sentence and displays a start-point object 526 and an end-point object 528 at respective ends of the sentence (FIG. 5X). Alternatively, in response to recognizing a triple-tap gesture 564 on a single line of text (FIG. 5V), the device selects the single line of text and displays a start-point object 526 and an end-point object 528 at respective ends of the single line of text (FIG. 5Y). In some embodiments, in response to recognizing the predefined number of successive taps by the single finger on the sentence in the content (or single line of text), the device displays (1324) a command display area 530 adjacent to the sentence (or single line of text). The command display area 530 includes an icon for copying selected content (e.g., "Copy" icon 534, FIG. 5X or 5Y). The command display area 530 may include one or more of the icons discussed below with respect to FIGS. 6A-6BB.

Figure 5Z:
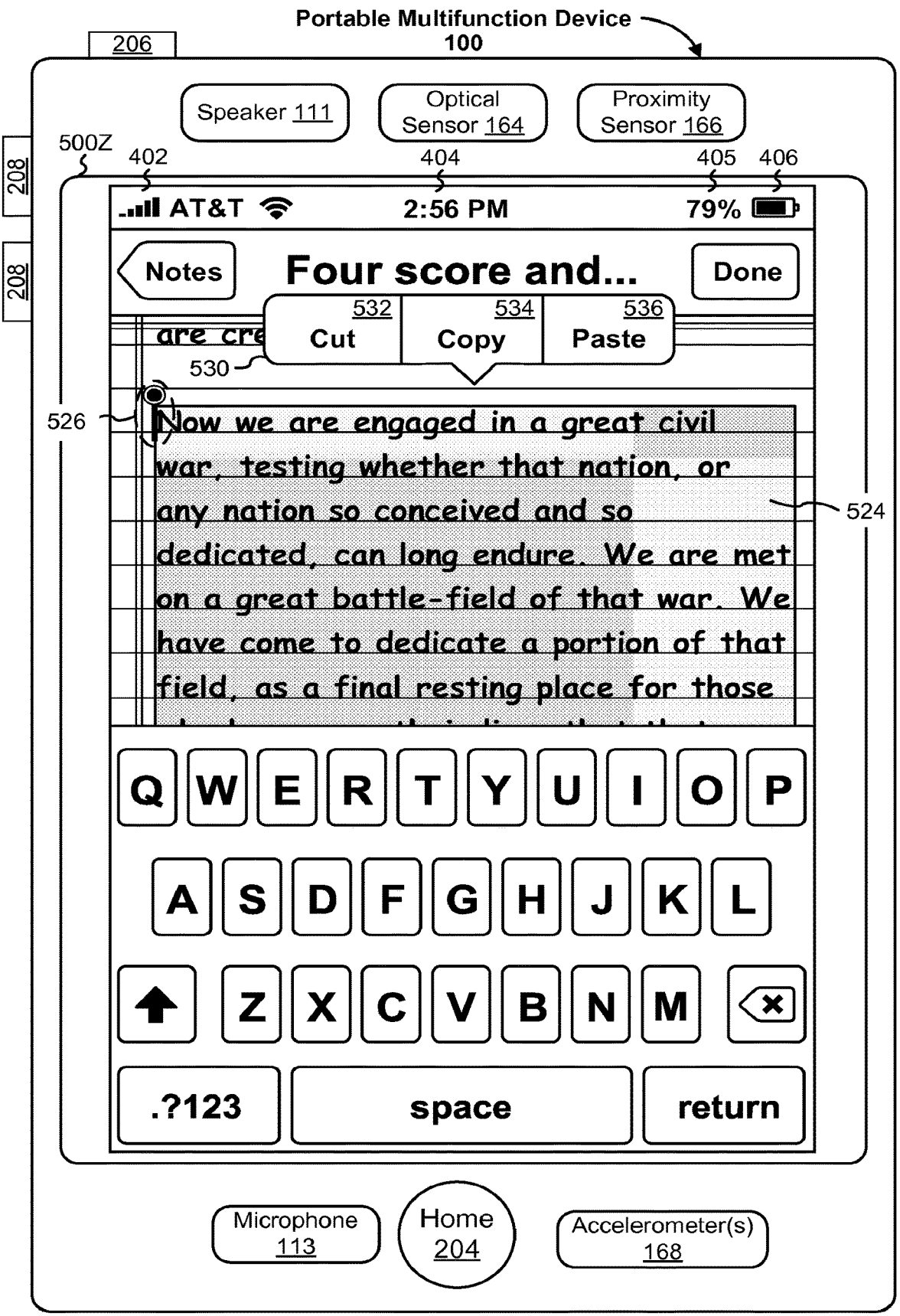
Figure 5A:
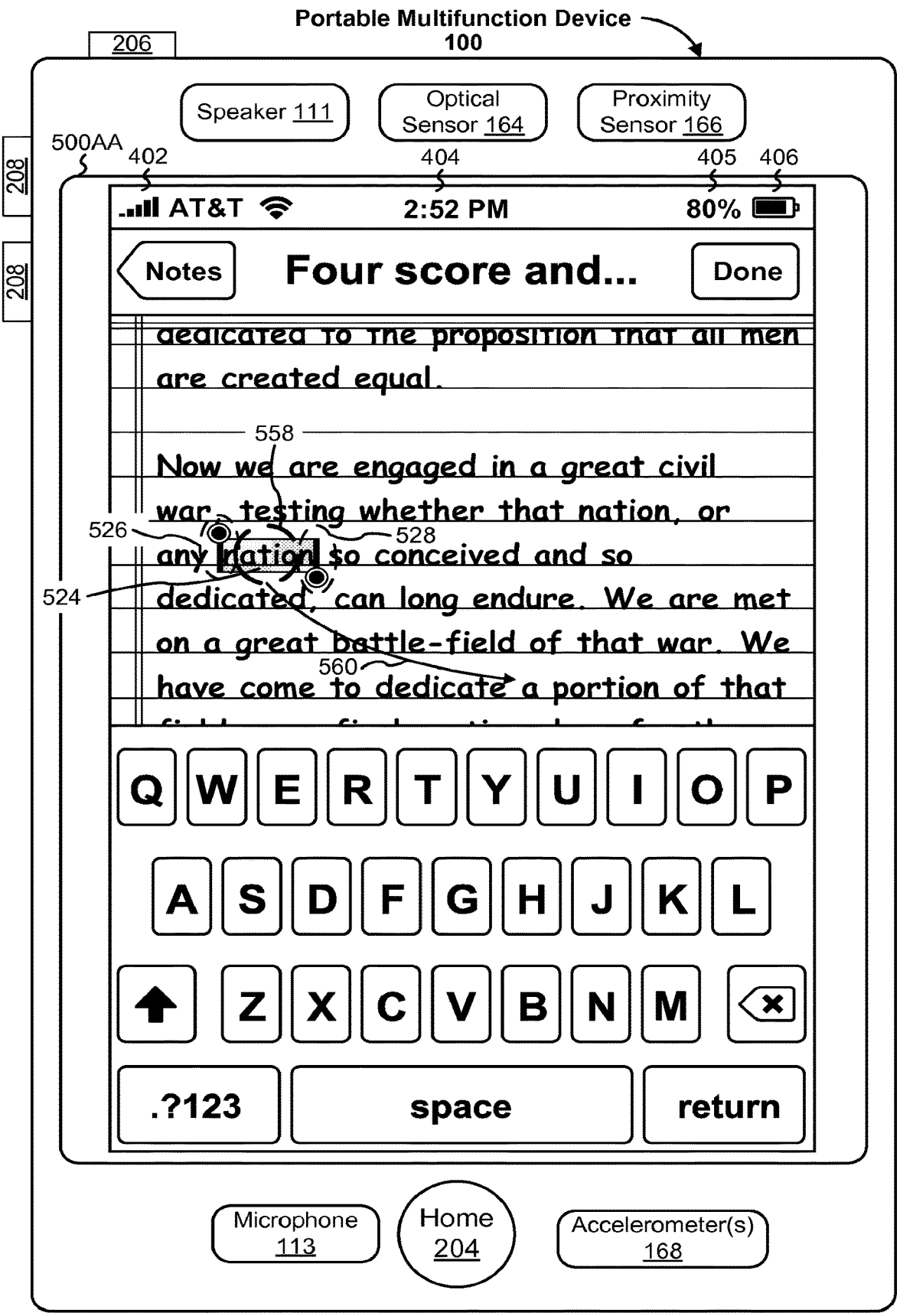
Figure 5B:
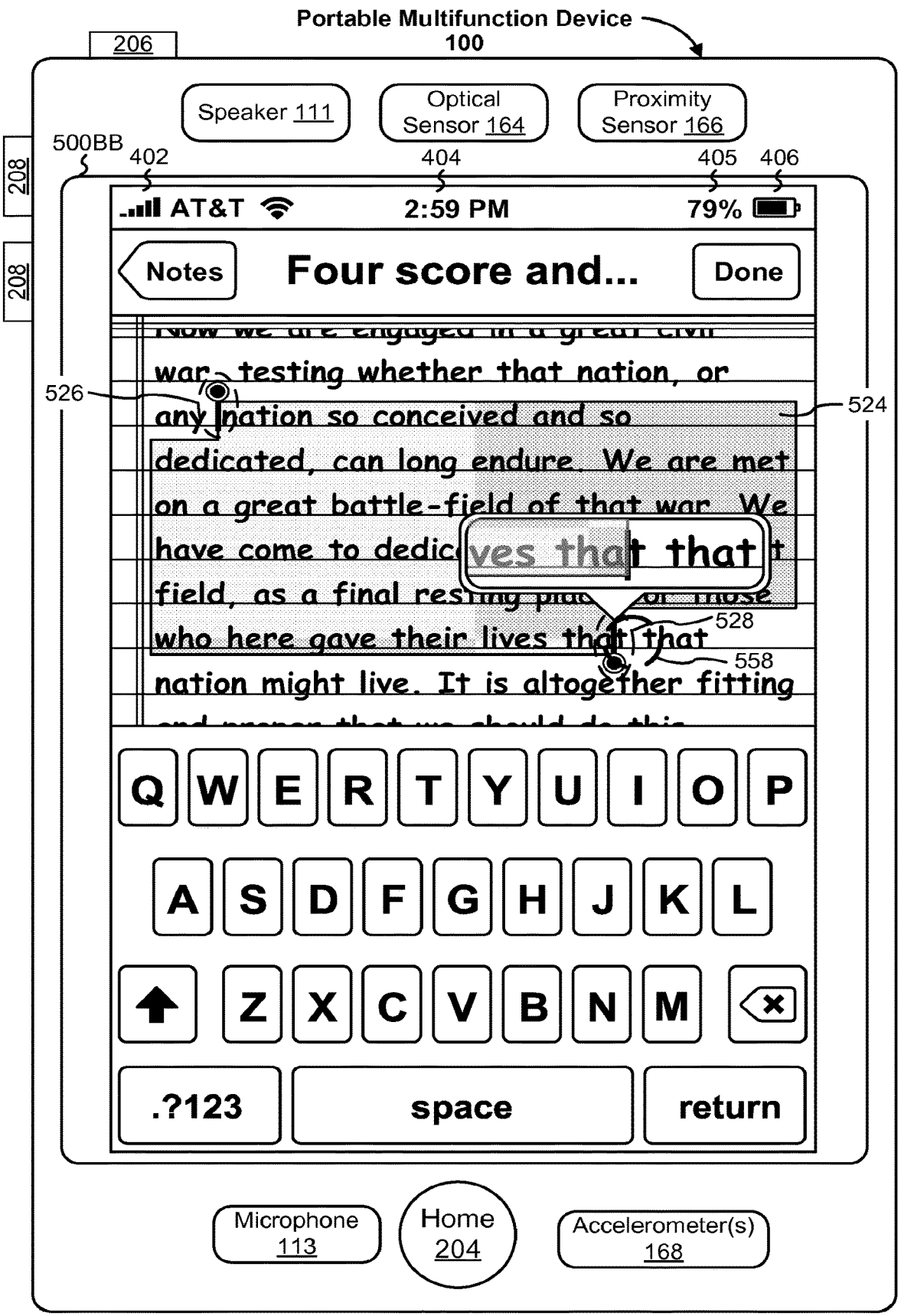
Figure 5C:
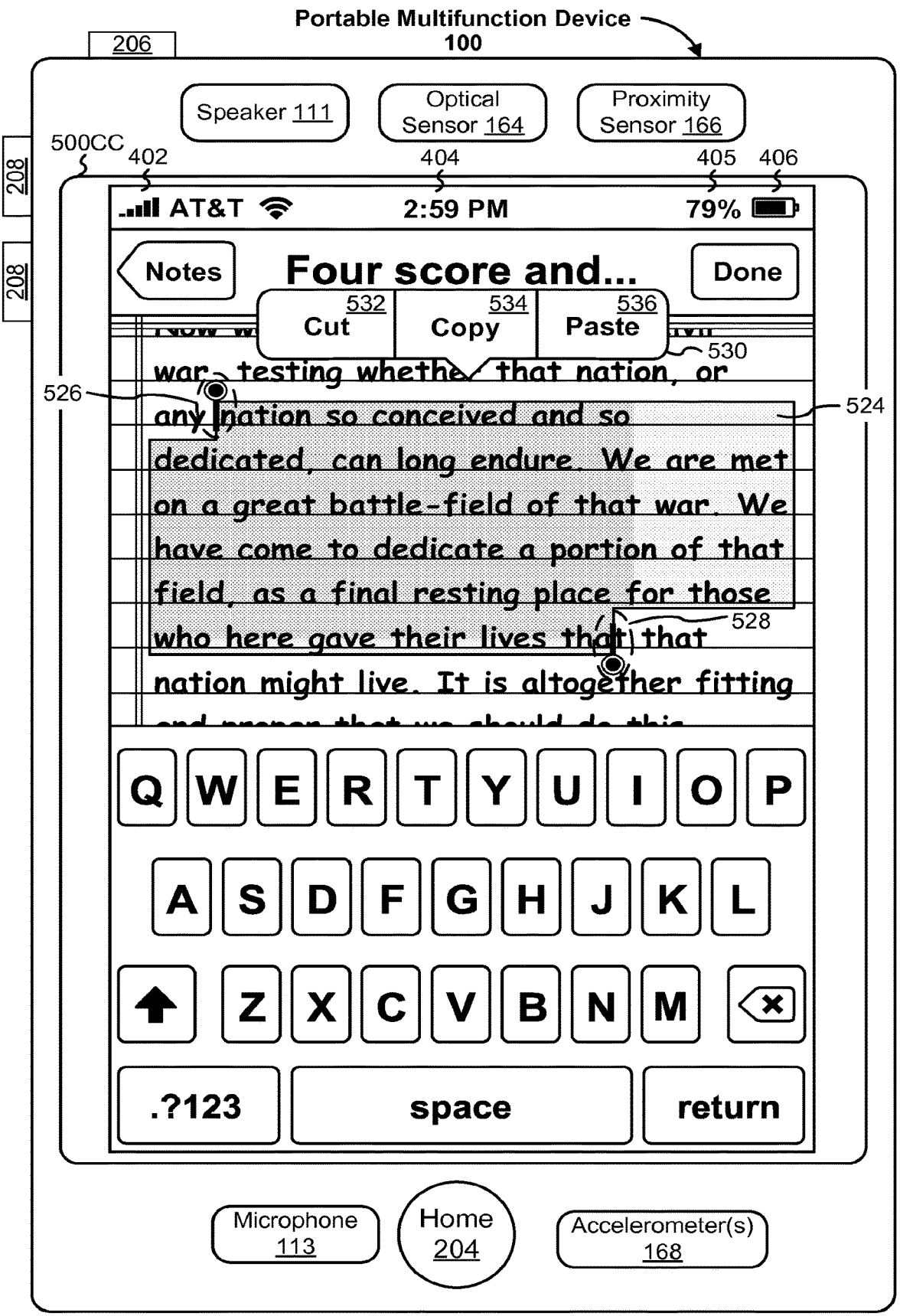
Figure 5D:
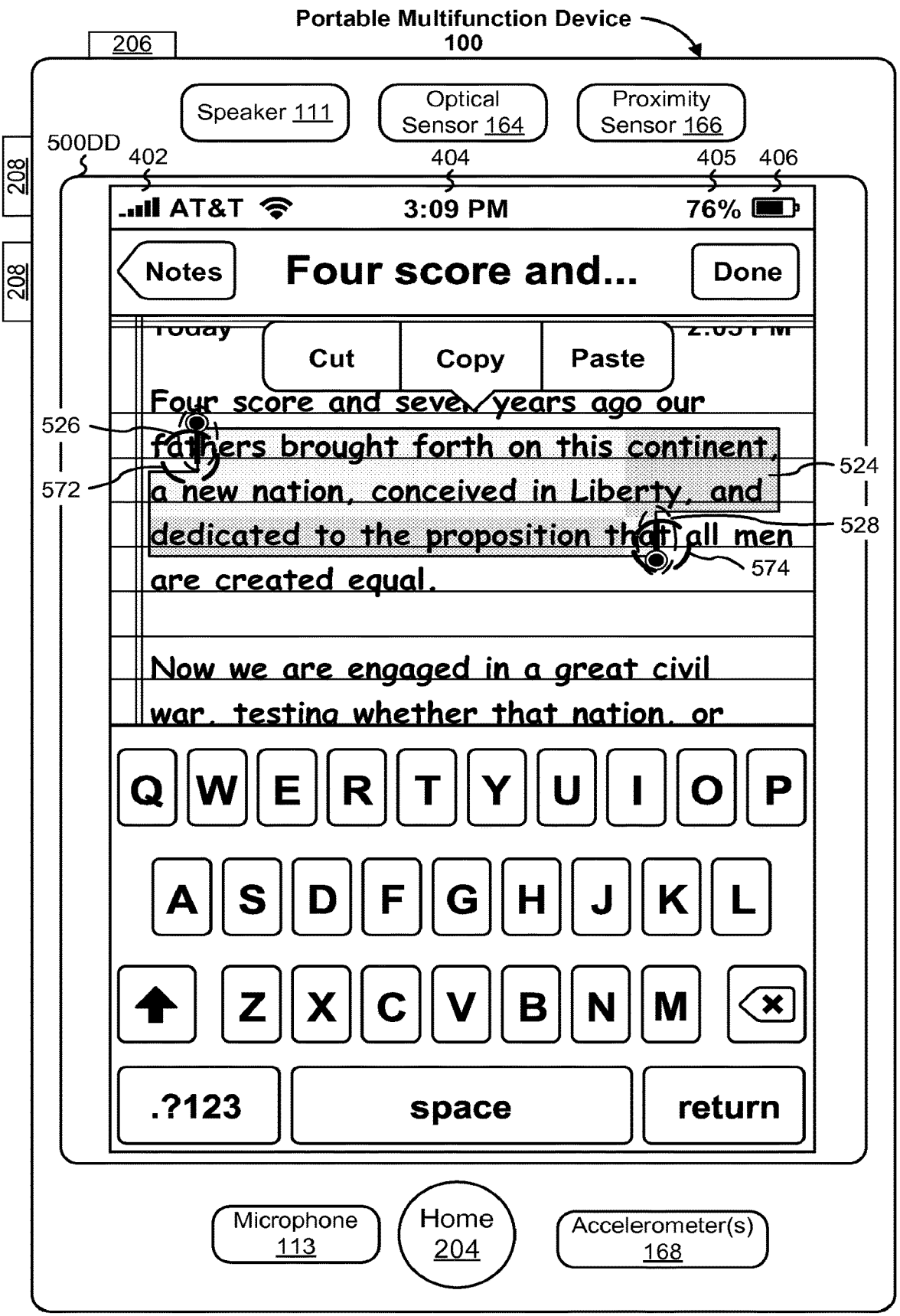
Figure 5E:
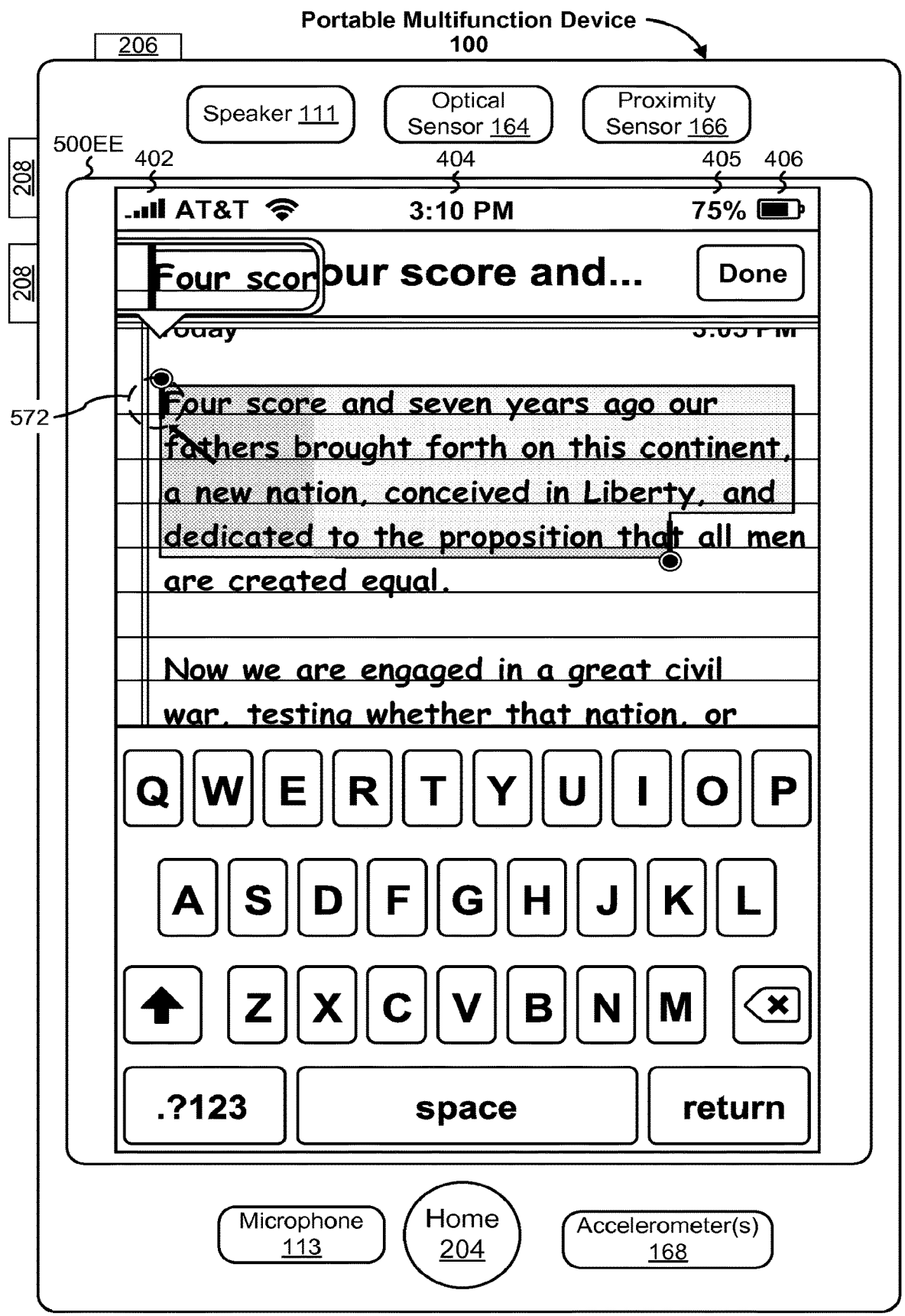
Figure 5F:
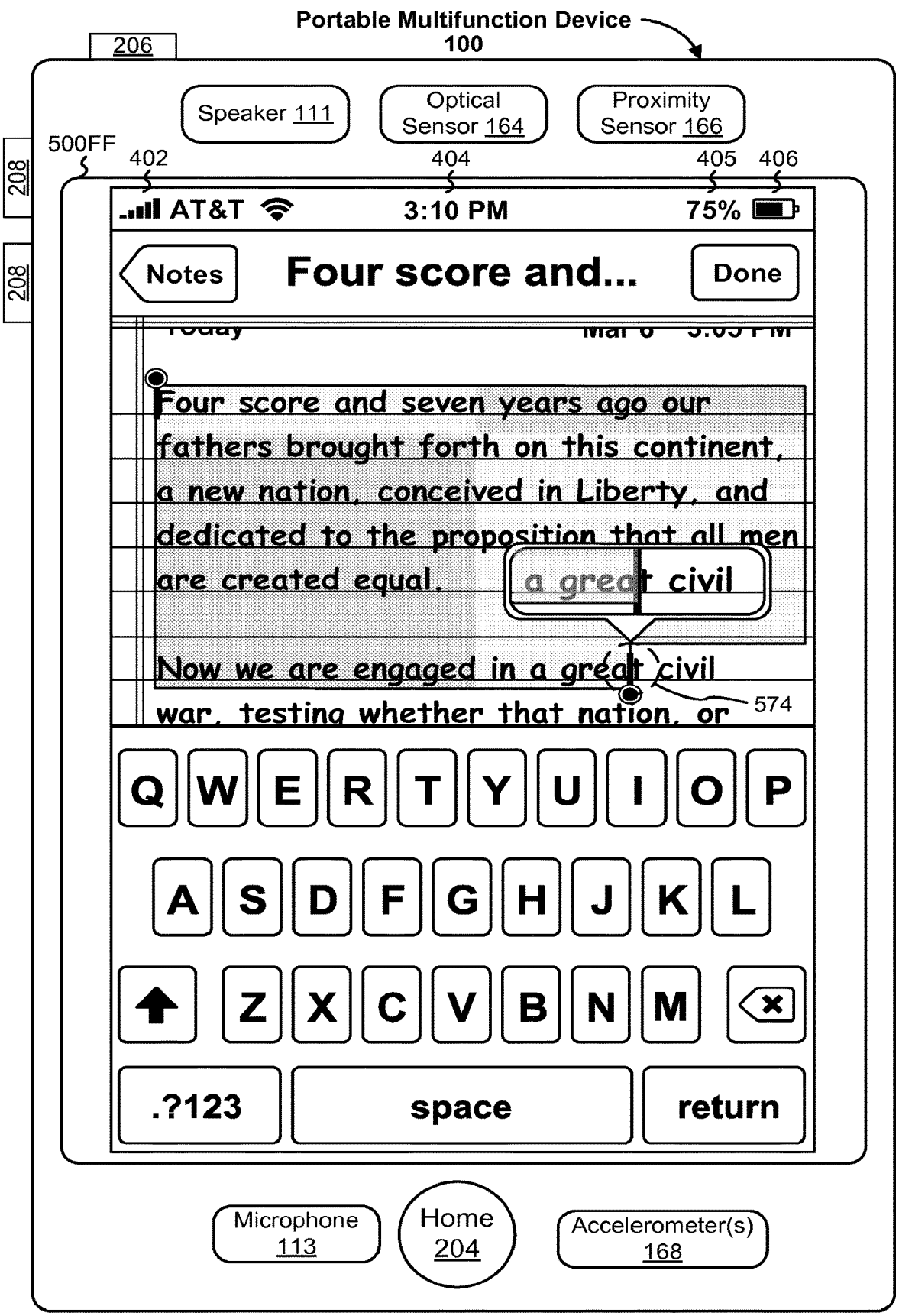
Figure 5G:
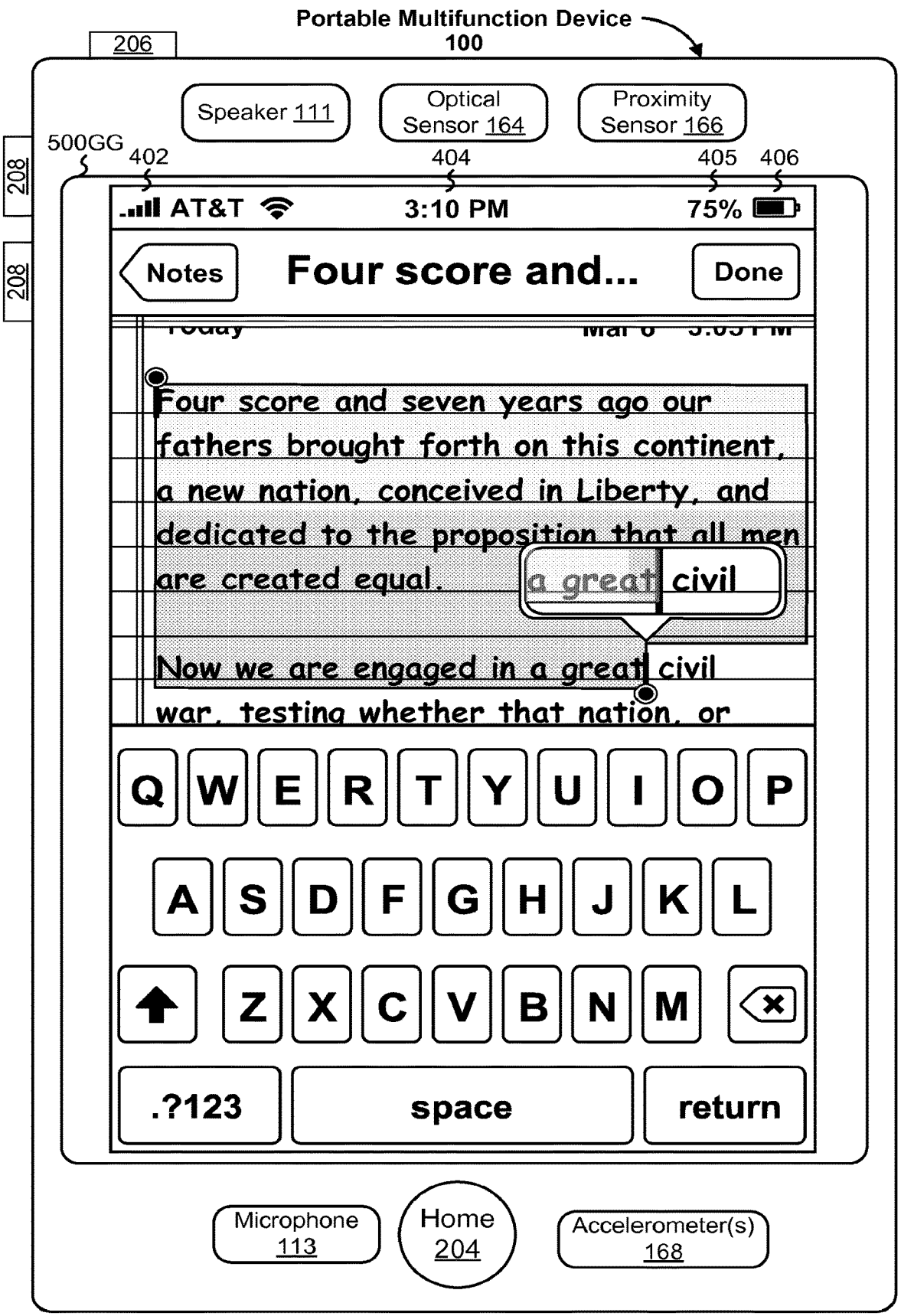
Figure 5H:
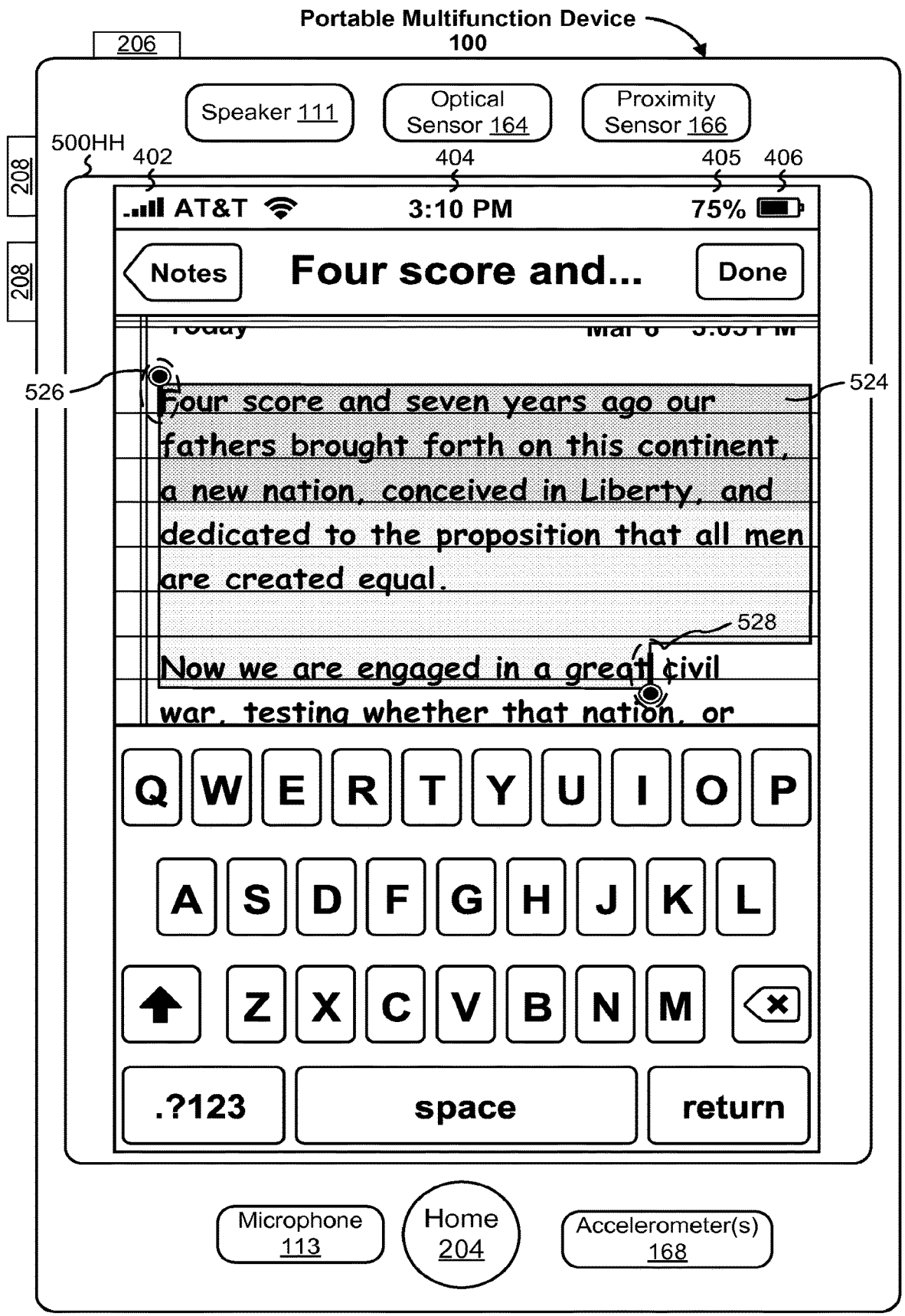
Figure 5I:
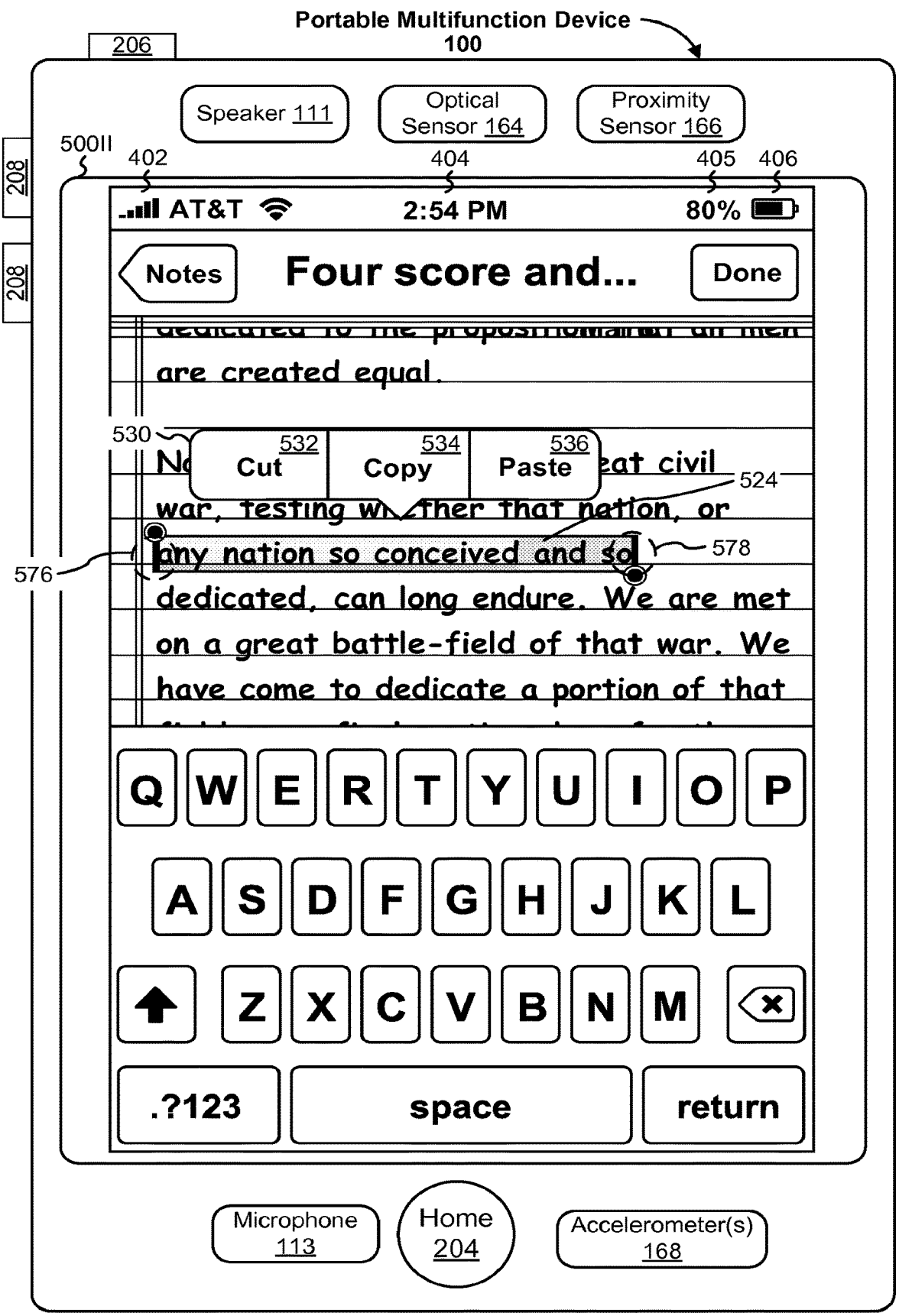
Figure 5J:
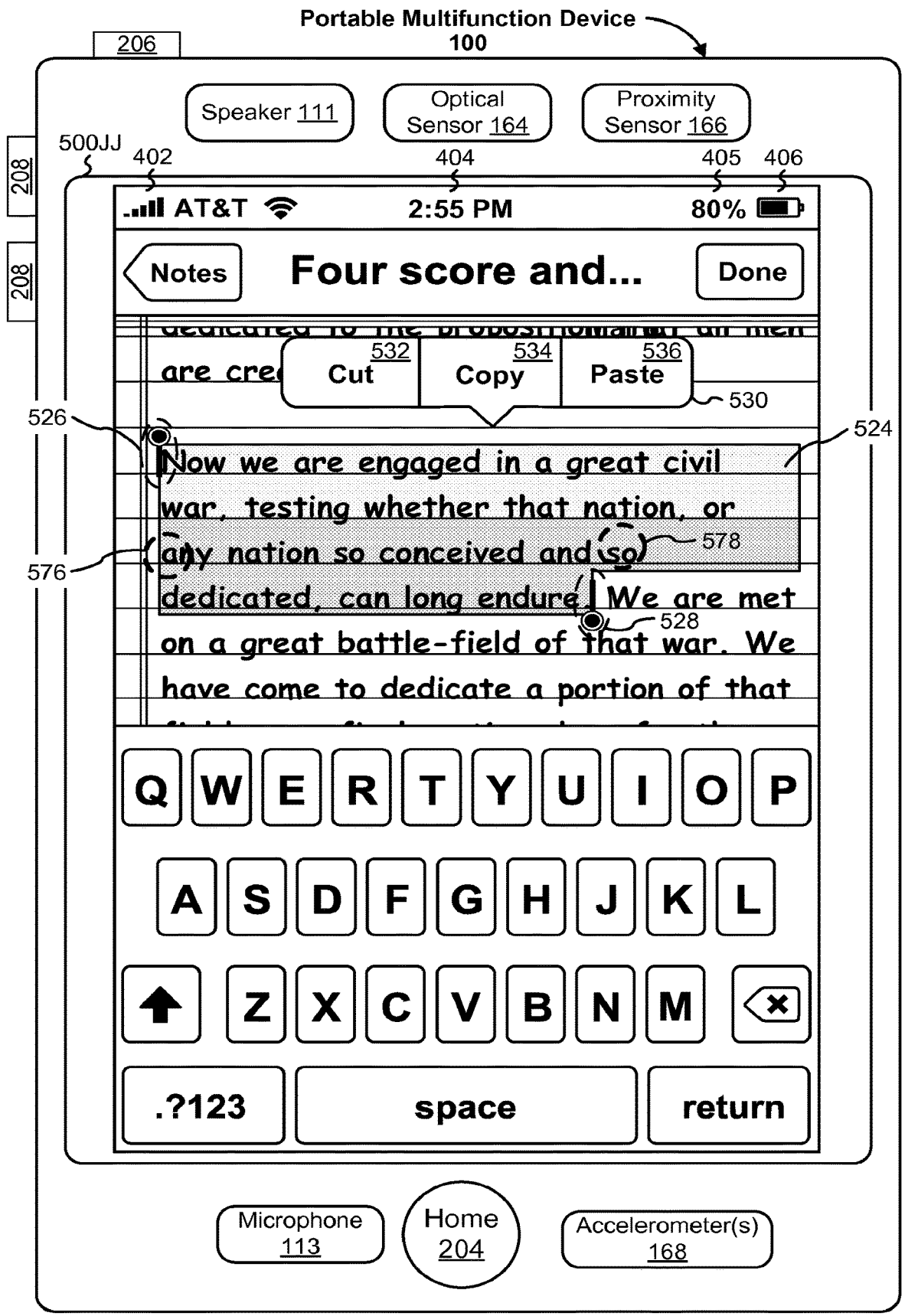
Figure 5K:
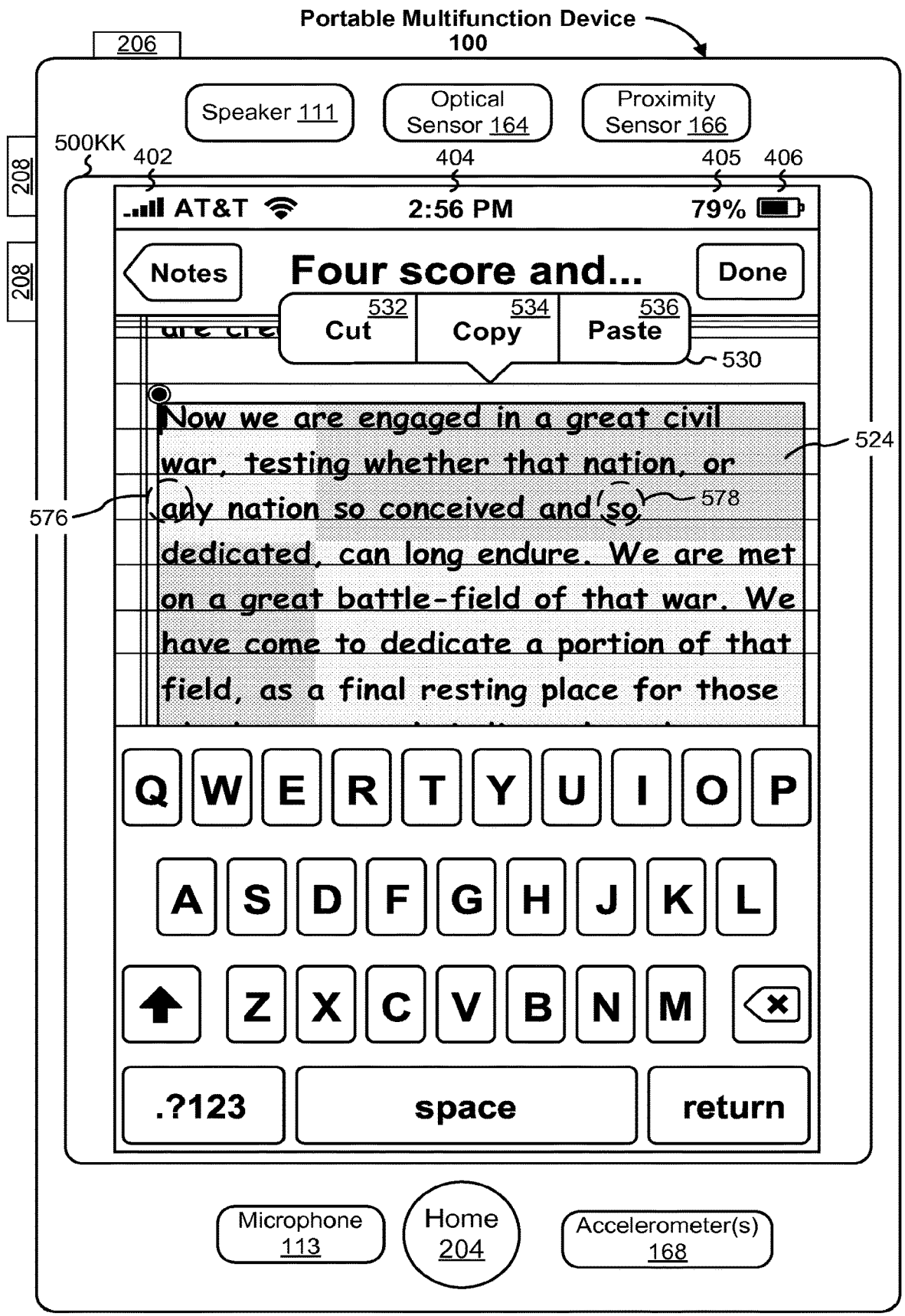
Figure 5L:
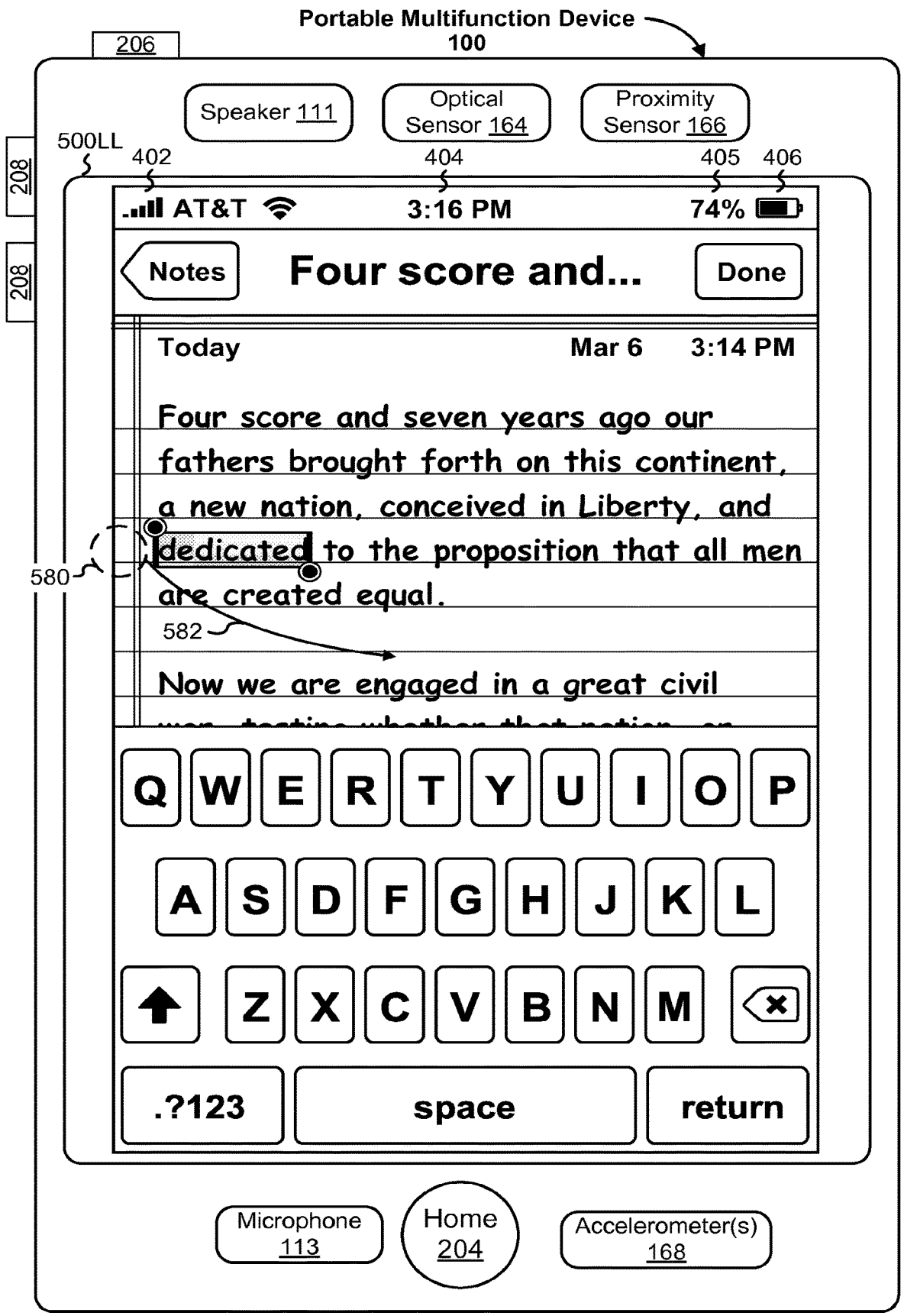
Figure 5M:
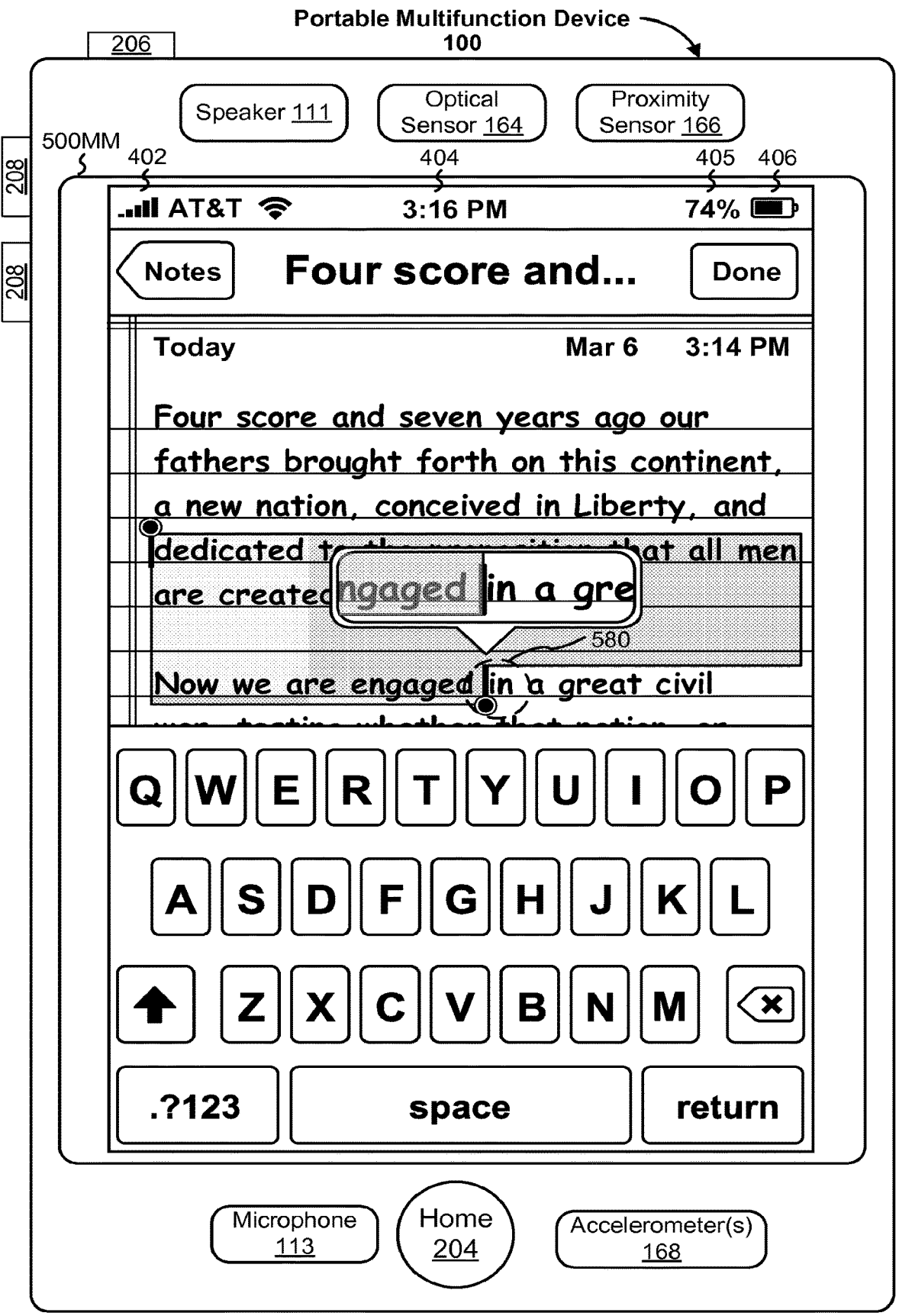
Figure 5N:
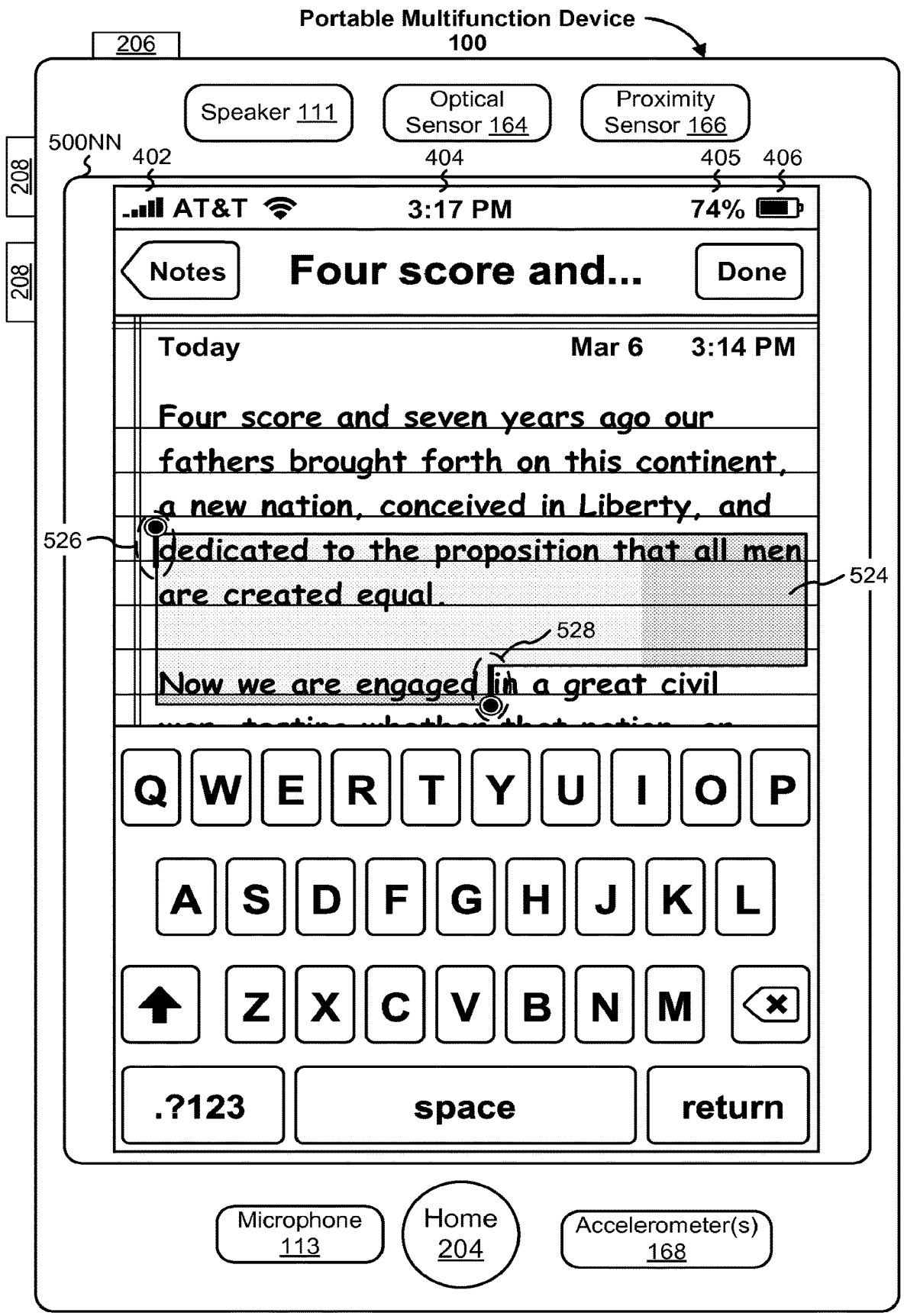
Figure 5O:
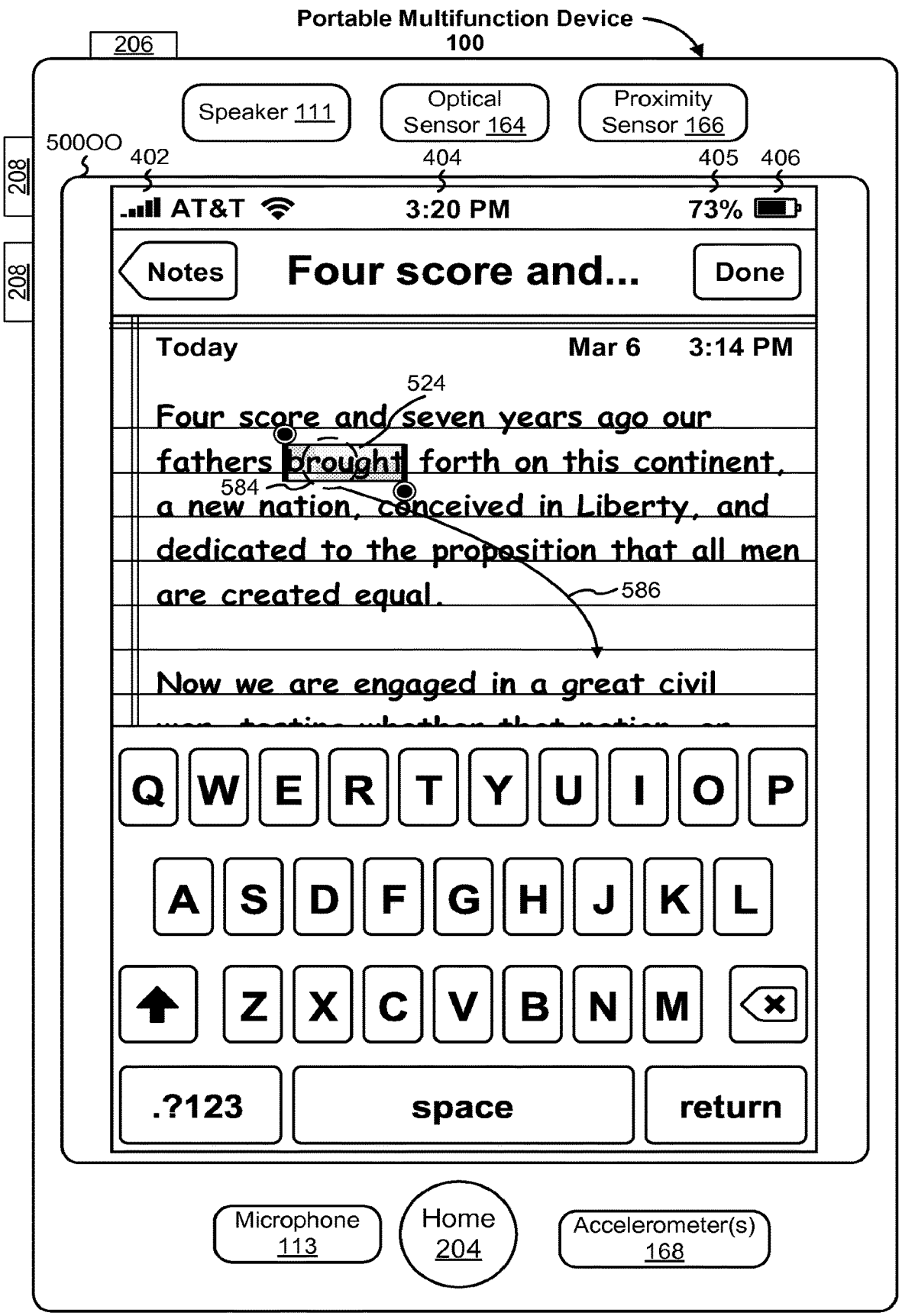
Figure 5P:
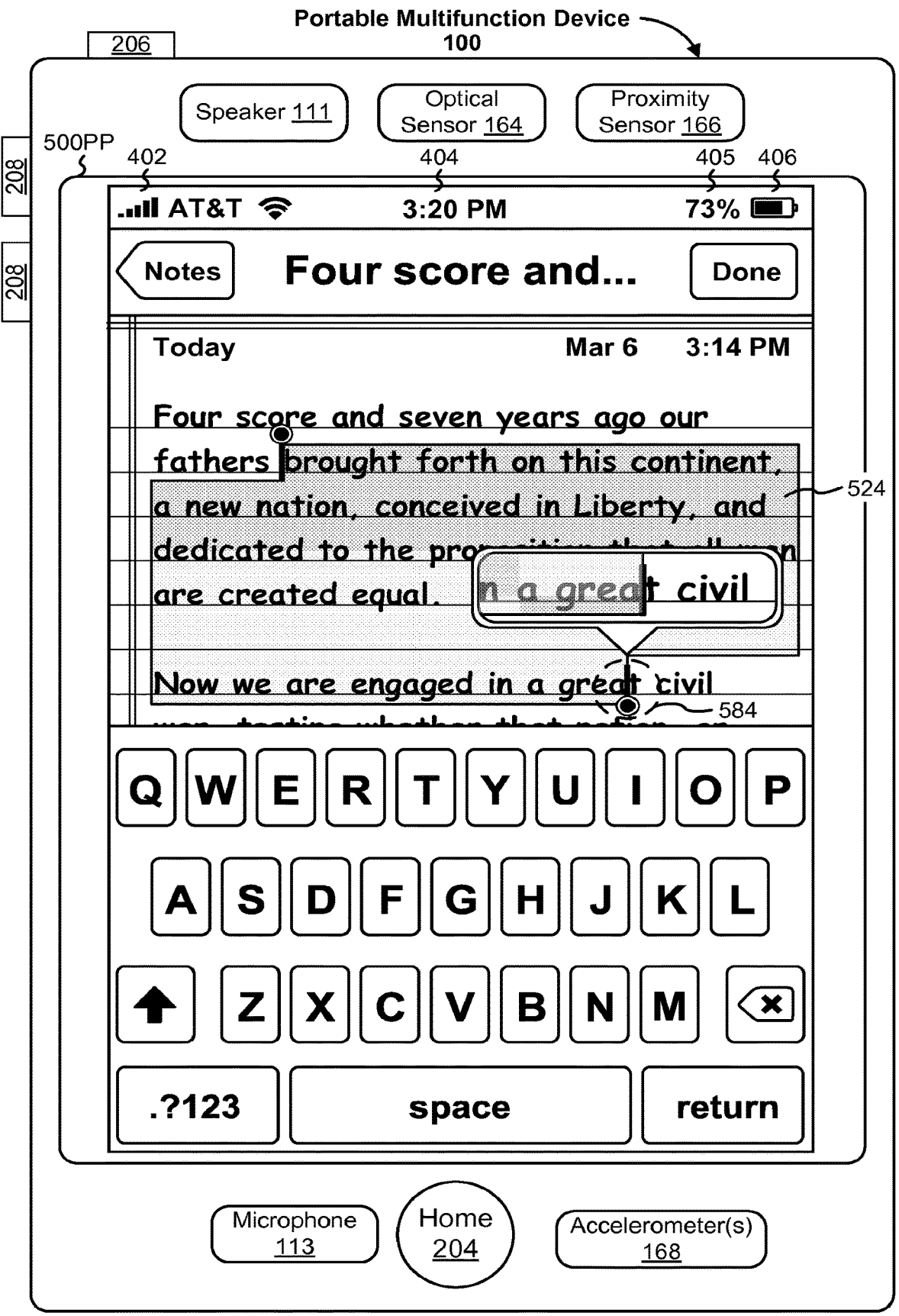
Figure 5Q:
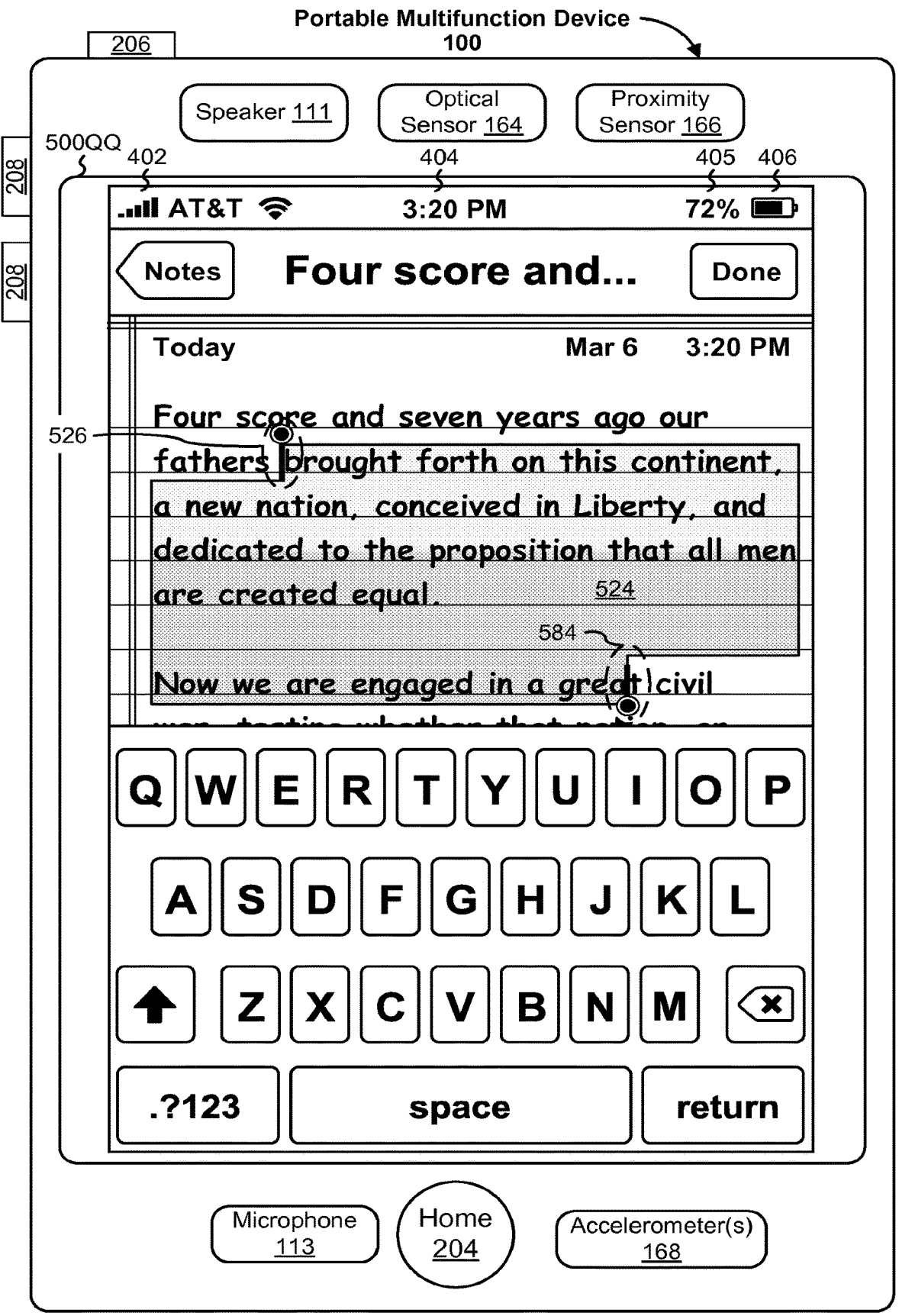

In some embodiments, the gesture is a predefined number of successive taps by a single finger (e.g., a quadruple-tap gesture) on a paragraph in the content (1326). In response to recognizing the predefined number of successive taps by the single finger on the paragraph in the content, the device selects the paragraph and displays a start-point object and an end-point object at respective ends of the paragraph. For example, in response to recognizing a quadruple-tap gesture 566 on a paragraph (FIG. 5V), the device selects the paragraph and displays a start-point object 526 and an end-point object 528 at respective ends of the paragraph (FIG. 5Z). In some embodiments, in response to recognizing the predefined number of successive taps by the single finger on the paragraph in the content, the device displays (1328) a command display area 530 adjacent to the paragraph. The command display area 530 includes an icon for copying selected content (e.g., "Copy" icon 534, FIG. 5Z). The command display area 530 may include one or more of the icons discussed below with respect to FIGS. 6A-6BB.

In some embodiments, the gesture is a stationary (or substantially stationary) pressing gesture by a single finger at a first location in the content (1330). For example, a single finger contact that moves less than a predefined amount (e.g., 1-2 mm) in a predefined time (e.g., 0.2-0.5 seconds) is a stationary pressing gesture, which is also referred to as a press and hold gesture (e.g., gesture 504, FIG. 5A). The content is displayed at a first magnification. In response to recognizing the stationary pressing gesture by the single finger at a first location in the content, the device expands a portion 506 of the content proximate the first location on the touch screen display to a second magnification that is greater than the first magnification while continuing to display at least some of the content at the first magnification and displays a content magnifier 508 (FIG. 5B). The content magnifier displays the expanded portion 506 of the content, and an insertion marker 510 at a location within the expanded portion of the content that corresponds to the first location. In some embodiments, the device, detects movement (e.g., 512, FIG. 5B) of the single finger across the touch screen display; moves the content magnifier 508 and changes the expanded portion 506 of the content in accordance with the detected movement of the single finger; and moves the insertion marker 510 to a second location within the expanded portion of the content in accordance with the detected movement of the single finger (1332).

In some embodiments, the gesture is a tap-and-a-half gesture by a single finger (1334). The tap-and-a-half gesture is a single-finger gesture that comprises a single tap followed immediately (e.g., within a predefined time period such as 0.3-0.5 seconds) by a finger contact 558 (FIG. 5AA) that subsequently moves (e.g., movement 560, FIG. 5AA) on the touch screen display. In response to recognizing the tap-and-a-half gesture by the single finger, the device selects a portion of the content (e.g., selects a word in the content). In some embodiments, the initially selected portion is in accordance with the location of the single tap on the touch screen display (e.g., selecting a word located at or proximate to the single tap). In some embodiments, the initially selected portion is in accordance with an initial location of the finger contact (e.g., selecting a word located at or proximate to the initial location of the finger contact after the single tap, such as the word "nation" in FIG. 5AA). In response to recognizing the tap-and-a-half gesture by the single finger, the device updates the selected portion of the content in accordance with detected movement of the finger contact 558 on the touch screen display (e.g., increasing the selected portion 524 as shown in FIGS. 5AA and 5BB). In some embodiments, in response to recognizing the tap-and-a-half gesture by the single finger, the device displays (1336) a start-point object 526 and an end-point object 528 at respective ends of the updated selected portion of the content 524. In some embodiments, updating the selected portion of the content in accordance with detected movement of the finger contact on the touch screen display includes the device moving one end of the selected portion of the content in accordance with detected movement of the finger contact on the touch screen display while maintaining another end of the selected portion of the content at a fixed location in the content (1338). For example, the end of the selected portion of the content may be increased as the finger contact moves forward through text on the display, while the beginning of the selected portion of the content remains fixed, as illustrated in FIGS. 5AA and 5BB. Conversely, the start of the selected portion of the content may be increased as the finger contact moves backward through text on the display, while the end of the selected portion of the content remains fixed. In some embodiments, the start-point object 526 and the end-point object 528 are displayed moving in accordance with their respective ends of the updated selected portion of the content 524. In some embodiments, in response to detecting lift off of the finger contact, the device displays (1340) a command display area 530 (FIG. 5CC) adjacent to the updated selected portion of the content 524 (FIG. 5CC). The command display area 530 includes an icon for copying selected content (e.g., "Copy" icon 534, FIG. 5CC). The command display area 530 may include one or more of the icons discussed below with respect to FIGS. 6A-6BB.

In some embodiments, the gesture is a single-tap gesture by two-fingers (e.g., 568 and 570, FIG. 5V) on a paragraph in the content (1342). In response to recognizing the single-tap gesture by two-fingers on a paragraph in the content, the device selects the paragraph in the content and displays a start-point object and an end-point object at respective ends of the paragraph, as shown in FIG. 5Z. In some embodiments, the device selects a sentence or other predefined portion of text, rather than a paragraph. In some embodiments, in response to recognizing the single-tap gesture by two-fingers on a paragraph in the content, the device displays (1344) a command display area 530 (FIG. 5Z) adjacent to the paragraph. The command display area includes an icon for copying selected content (e.g., "Copy" icon 534, FIG. 5Z). The command display area 530 may include one or more of the icons discussed below with respect to FIGS. 6A-6BB.

In some embodiments, the gesture is a stationary (or substantially stationary) pressing gesture by two fingers that includes contact 572 (FIG. 5DD) by a first finger at a first location in the content and concurrent contact 574 (FIG. 5DD) by a second finger at a second location in the content (1346). For example, each of the two finger contacts moves less than a predefined amount (e.g., 1-3 mm) in a predefined time (e.g., 0.4 seconds). In response to recognizing the stationary pressing gesture by two fingers, the device selects the portion of content located between the first location and the second location and displays a start-point object 526 and an end-point object 528 at respective ends of the selected portion of content 524 located between the first location and the second location (FIG. 5DD).

In some embodiments, after selecting the portion of content located between the first location and the second location (1347), the device: detects movement of the contact 572 (FIG. 5EE) by the first finger; updates the selected portion of content in accordance with the detected movement of the contact by the first finger (FIG. 5EE); detects movement of the contact 574 (FIG. 5FF) by the second finger; updates the selected portion of content in accordance with the detected movement of the contact by the second finger (FIG. 5GG); and displays the start-point object 526 and the end-point object 528 at respective ends of the updated selected portion of content 524 (1348) (FIG. 5HH).

In some embodiments, after selecting the portion of content located between the first location and the second location, the device continues (1350) to detect the stationary pressing gesture by the two fingers (e.g., 576 and 578, FIG. 5II) for at least a predefined time period. For example, the device continues to detect the stationary pressing gesture by the two fingers for at least 0.6 additional seconds. In response to continuing to detect the stationary pressing gesture by the two fingers for at least the predefined time period, the device increases the selected portion of content to a sentence that contains the portion of content located between the first location and the second location and displays the start-point object and the end-point object at respective ends of the sentence (FIG. 5JJ).

In some embodiments, after selecting the portion of content located between the first location and the second location, the device continues (1352) to detect the stationary pressing gesture by the two fingers (e.g., 576 and 578, FIG. 5II) for at least a predefined time period. For example, the device continues to detect the stationary pressing gesture by the two fingers for at least 0.6 additional seconds. In response to continuing to detect the stationary pressing gesture by the two fingers for at least the predefined time period, the device increases the selected portion of content to a paragraph that contains the portion of content located between the first location and the second location and displays the start-point object and the end-point object at respective ends of the paragraph (FIG. 5KK).

In some embodiments, after selecting the portion of content located between the first location and the second location, the device continues (1354) to detect the stationary pressing gesture by the two fingers (e.g., 576 and 578, FIG. 5II) for at least a predefined time period. For example, the device continues to detect the stationary pressing gesture by the two fingers for at least 0.6 additional seconds. In response to continuing to detect the stationary pressing gesture by the two fingers for at least the predefined time period, the device selects all of the content and displays the start-point object and the end-point object at respective ends of the content.

In some embodiments, after selecting the portion of content located between the first location and the second location, the device continues (1356) to detect the stationary pressing gesture by the two fingers (e.g., 576 and 578, FIG. 5II) for a succession (or plurality) of predefined time periods. In response to continuing to detect the stationary pressing gesture by the two fingers for each time period in the succession of predefined time periods, the device increases the selected portion of content and displays the start-point object and the end-point object at respective ends of the increased selected portion of content (e.g., from FIGS. 5II, to 5JJ, to 5KK). The increased selected portion of content contains the portion of content located between the first location and the second location.

In some embodiments, in response to detecting lift off of the two fingers (e.g., 576 and 578), the device displays (1358) a command display area 530 adjacent to the selected portion of content 524. The command display area 530 includes an icon for copying selected content (e.g., "Copy" icon 530). The command display area 530 may include one or more of the icons discussed below with respect to FIGS. 6A-6BB.

In some embodiments, the gesture is a margin-initiated selection gesture by a single finger (1360). The margin-initiated selection gesture is a single-finger gesture that comprises an initial finger contact (e.g., a finger-down event 580, FIG. 5LL) in a margin adjacent to a word (e.g., the word "dedicated" in FIG. 5LL) in the content followed by movement of the finger contact (e.g., movement 582 of the finger contact 580 (FIG. 5LL) across the word or a portion thereof) to a location in the content. In response to recognizing the margin-initiated selection gesture by the single finger, the device selects a portion of the content, wherein the word begins or ends the selected portion of content (e.g., the word "dedicated" in FIG. 5LL begins the selected portion), and updates the selected portion of the content in accordance with movement 582 of the finger contact to the location in the content. In some embodiments, in response to recognizing the margin-initiated selection gesture by the single finger, the device displays (1362) a start-point object and an end-point object at respective ends of the updated selected portion of the content (FIG. 5NN). In some embodiments, the device displays the start-point object and the end-point object during updating, too (FIG. 5MM). In some embodiments, in response to detecting lift off of the finger contact, the device displays (1364) a command display area 530 adjacent to the updated selected portion of the content 524 (not shown). The command display area 530 includes an icon for copying selected content (e.g., "Copy" icon 534). The command display area 530 may include one or more of the icons discussed below with respect to FIGS. 6A-6BB.

In some embodiments where the content is configured to scroll vertically, but not horizontally, on the touch screen display, the gesture is a swipe-initiated selection gesture by a single finger (1366). The swipe-initiated selection gesture is a single-finger gesture that comprises: (1) a finger contact (e.g., a finger-down event 584, FIG. 5OO) initially at a first location (e.g., the word "brought" in FIG. 5OO) in the content, wherein the finger contact is initially moving in a direction within a predefined angle of a horizontal axis on the touch screen display (e.g., within 5°-30° of the horizontal axis), and (2) movement of the finger contact to a second location in the content (e.g., movement 586, FIG. 5OO). In some embodiments, the finger contact 584 initially moves a predefined number of units of movement prior to a timeout period expiration (e.g., 3.2 mm in 1.5 seconds). In some embodiments, the finger contact moves with an initial speed above a predefined threshold initial speed (e.g., 2 mm/sec). In response to recognizing the swipe-initiated selection gesture by the single finger, the device selects a portion of the content, wherein the first location begins or ends the selected portion of content (e.g., the word "brought" in FIG. 5OO begins the selected portion), and updates the selected portion 524 of the content in accordance with the movement of the finger contact 584 to the second location in the content (FIG. 5PP). In some embodiments, the device displays (1368) a start-point object 526 and an end-point object 528 at respective ends of the updated selected portion 524 of the content (FIG. 5QQ). In some embodiments, the device displays the start-point object and the end-point object during updating, too (FIG. 5PP). In some embodiments, in response to detecting lift off of the finger contact, the device displays (1370) a command display area 530 adjacent to the updated selected portion 524 of the content (not shown). The command display area 530 includes an icon for copying selected content (e.g., "Copy" icon 534). The command display area 530 may include one or more of the icons discussed below with respect to FIGS. 6A-6BB.

FIGS. 14A-14D are flow diagrams illustrating a method of using a command display area for selected content in accordance with some embodiments. The method 1400 is performed at a multifunction device (e.g., 300, FIG. 3) with a touch screen display. In some embodiments, the method is performed at a portable multifunction device with a touch screen display (e.g., portable multifunction device 100). Some operations in method 1400 may be combined and/or the order of some operations may be changed.

As described below, the method 1400 provides an intuitive way to use a command display area to interact with selected content at a multifunction device with a touch screen display. The method efficiently displays and activates commands with respect to selected content. The method also makes the command display area appear when needed and disappear when no longer needed. The method reduces the cognitive burden on a user when interacting with selected content, thereby creating a more efficient human-machine interface. For battery-operated devices, enabling a user to interact with selected content faster and more efficiently conserves power and increases the time between battery charges.

The device displays (1402) content on the touch screen display (e.g., editable content 502 or read-only content 538). The displayed content includes selected content 524 (e.g., content selected in response to detecting one or more touch gestures by a user on the touch screen display).

The device visually distinguishes (1404) the selected content 524 from displayed content that is not selected (e.g., by shading and/or coloring the background of the selected content).

In some embodiments, the device displays (1406) a start-point object 526 and an end-point object 528 at respective ends of the selected content 524.

The device displays (1408) a command display area 530 adjacent to the selected content 524 on the touch screen display. The command display area 530 includes one or more command icons. In some embodiments, icons in the command display area 530 are displayed in a single row (1410), which makes it easier to select a respective icon with a finger.

The device detects (1412) activation of a command icon in the command display area 530 (e.g., by a finger gesture such as a tap gesture on the command icon or by detecting a spoken word that corresponds to the command icon (voice activation)).

In response to detecting activation of the command icon in the command display area, the device performs (1414) a corresponding action with respect to the selected content.

In some embodiments, the command display area 530 includes an icon for copying selected content (e.g., "Copy" icon 534, FIG. 6A). The device detects (1416) activation of the icon for copying selected content (e.g., by voice or by a finger gesture such as a tap gesture on "Copy" icon). In response to detecting activation of the icon for copying selected content, the device copies the selected content (e.g., to a clipboard or memory location in the multifunction device).

In some embodiments, the command display area includes an icon for cutting selected content (e.g., "Cut" icon 532, FIG. 6A). The device detects (1418) activation of the icon for cutting selected content (e.g., by voice or by a finger gesture such as a tap gesture on "Cut" icon 532, FIG. 6A). In response to detecting activation of the icon for cutting selected content, the device cuts the selected content 524 (FIG. 6B).

In some embodiments, the command display area includes an icon for pasting previously cut or copied content (e.g., "Paste" icon 536, FIG. 6C). The device detects (1420) activation of the icon for pasting previously cut or copied content (e.g., by voice or by a finger gesture such as a tap gesture on "Paste" icon 536, FIG. 6C). In response to detecting activation of the icon for pasting previously cut or copied content, the device replaces the selected content with previously cut or copied content. For example, in response to activating the "Paste" icon in FIG. 6C, the device replaces the selected content "endure" (FIG. 6C) with the previously copied content "nation" (FIG. 6D). Alternatively, if no content is selected, the device pastes the previously copied content at the position of the insertion marker 510 (e.g., as illustrated in FIGS. 6E and 6F for pasting into a note; as illustrated in FIGS. 6G and 6H for pasting into an instant message; and as illustrated in FIGS. 6I and 6J for pasting into an email).

In some embodiments, the command display area includes an icon for undoing a previous action (e.g., "Undo" icon 604, FIG. 6N). The device detects (1422) activation of the icon for undoing a previous action (e.g., by voice or by a finger gesture such as a tap gesture on "Undo" icon 604, FIG. 6N). In response to detecting activation of the icon for undoing a previous action, the device undoes a previous action performed by the device.

For example, suppose the word "iPhone" in FIG. 6L was mistakenly cut in FIG. 6M. In some embodiments, the cutting action may be undone by activating the "Undo" icon 604 in FIG. 6N, thereby restoring the word "iPhone" in FIG. 6P. Alternatively, in some embodiments, in response to detecting a shaking gesture (e.g., with accelerometers 168), the device undoes the previous cutting action and restores the word "iPhone" in FIG. 6P. Alternatively, in some embodiments, in response to detecting a shaking gesture (e.g., with accelerometers 168), the device displays an undo icon 606, FIG. 6O. The device undoes the previous cutting action and restores the word "iPhone" in FIG. 6P in response to a finger gesture (e.g., a tap gesture) on the undo icon 606.

In some embodiments, the command display area 530 includes an icon for displaying additional command options (e.g., " . . . " icon 602, FIG. 6K). The device detects (1424) activation of the icon for displaying additional command options (e.g., by voice or by a finger gesture such as a tap gesture on " . . . " icon 602, FIG. 6K). In response to detecting activation of the icon for displaying additional command options, the device displays additional command icons (e.g., undo 606 and redo 608 in FIG. 6O). Activation of a respective additional command icon (e.g., by voice or by a finger gesture such as a tap gesture on the respective additional command icon, not shown) initiates a corresponding action with respect to the selected content. The additional commands may be one or more of the commands that can alternatively be displayed as part of the command display area 530, such as Map it, Call it, etc., as described herein.

In some embodiments, the command display area 530 includes an icon for providing information about a physical location in selected content (e.g., "Map it" icon 614, FIG. 6Q). The device detects (1426) activation of the icon for providing information about a physical location in the selected content (e.g., by voice or by a finger gesture such as a tap gesture on "Map it" icon 614, FIG. 6Q). In response to detecting activation of the icon for providing information about a physical location in the selected content, the device displays information about a physical location in the selected content (e.g., showing the physical location on a map in a mapping application, FIG. 6R). In some embodiments, the device may recognize the physical location (e.g., an address) in the selected content (e.g., selected content 612, FIG. 6Q). In some embodiments, the device may recognize the physical location (e.g., an address) in the selected content, even if the selected content includes additional information besides the address. For example, the device may recognize the address in selected content 610 (FIG. 6K), even though selected content 610 includes other information besides the address.

In some embodiments, the command display area 530 includes an icon for calling a phone number in the selected content (e.g., "Call it" icon 616, FIG. 6S). The device detects (1428) activation of the icon for calling a phone number in the selected content (e.g., by voice or by a finger gesture such as a tap gesture on "Call it" icon 616, FIG. 6S). In response to detecting activation of the icon for calling a phone number in the selected content, the device calls a phone number in the selected content (FIG. 6T). In some embodiments, the device may recognize the phone number in the selected content (e.g., selected content 622, FIG. 6S). In some embodiments, the device may recognize the phone number in the selected content, even if the selected content includes additional information besides the phone number. For example, the device may recognize the phone number in selected content 610 (FIG. 6K), even though selected content 610 includes other information besides the phone number.

In some embodiments, the command display area 530 includes an icon for initiating an instant message using information in selected content (e.g., "Text message" icon 618, FIG. 6S). The device detects (1430) activation of the icon for initiating an instant message using information in selected content (e.g., by voice or by a finger gesture such as a tap gesture on "Text message" icon 618, FIG. 6S). In response to detecting activation of the icon for initiating an instant message using information in selected content, the device initiates an instant message using information in the selected content (e.g., opening an instant messaging application and presenting an instant message input area for an instant message to an address or phone number (for a telephony-based instant message) in the selected content, FIG. 6U).

In some embodiments, the command display area 530 includes an icon for initiating an email message using an email address in selected content (e.g., "E-mail" icon 624, FIG. 6W). The device detects (1432) activation of the icon for initiating an email message using an email address in selected content (e.g., by voice or by a finger gesture such as a tap gesture on "Email" icon 624, FIG. 6W). In response to detecting activation of the icon for initiating an email message using an email address in selected content, the device initiates an email message using an email address in the selected content (e.g., opening an email application and presenting an email input area for an email message to an email address in the selected content (FIG. 6X). In some embodiments, the device may recognize the email address in the selected content (e.g., selected content 630, FIG. 6W). In some embodiments, the device may recognize the email address in the selected content, even if the selected content includes additional information besides the email address. For example, the device may recognize the email address in selected content 610 (FIG. 6K), even though selected content 610 includes other information besides the email address.

In some embodiments, the command display area 530 includes an icon for initiating a slide show using images in selected content. The device detects (1434) activation of the icon for initiating a slide show using images in selected content (e.g., by voice or by a finger gesture such as a tap gesture on a "Slide show" icon). In response to detecting activation of the icon for initiating a slide show using images in selected content, the device initiates a slide show using images in the selected content.

In some embodiments, the command display area 530 includes an icon for displaying a webpage using a web address in selected content (e.g., "Browse" icon 626, FIG. 6Y). The device detects (1436) activation of the icon for displaying a webpage using a web address in selected content (e.g., by voice or by a finger gesture such as a tap gesture on "Browse" icon 626, FIG. 6Y). In response to detecting activation of the icon for displaying a webpage using a web address in selected content, the device displays a webpage using a web address in the selected content (e.g., in a browser application, FIG. 6Z). In some embodiments, the device may recognize the web address in the selected content (e.g., selected content 628, FIG. 6Y). In some embodiments, the device may recognize the web address in the selected content, even if the selected content includes additional information besides the email address. For example, the device may recognize the web address in selected content 610 (FIG. 6K), even though selected content 610 includes other information besides the web address.

In some embodiments, the command display area 530 includes an icon for initiating a search using information in selected content (e.g., "Search" icon 632, FIG. 6AA). The device detects (1438) activation of the icon for initiating a search using information in selected content (e.g., by voice or by a finger gesture such as a tap gesture on "Search" icon 632, FIG. 6AA). In response to detecting activation of the icon for initiating a search using information in selected content, the device initiates a search using information in the selected content (e.g., using the selected content or a portion thereof as search input for a web search, FIG. 6BB). In some embodiments, the search includes an Internet search (e.g., a Google search, FIG. 6BB). In some embodiments, the search includes a search of information on the device (e.g., a Spotlight search).

In some embodiments, the command display area includes an icon for adding information to a contacts application (e.g., "Add to Contacts" icon 620, FIG. 6S). The device detects (1440) activation of the icon for adding information to a contacts application (e.g., by voice or by a finger gesture such as a tap gesture on "Add to Contacts" icon 620, FIG. 6S). In response to detecting activation of the icon for adding information to a contacts application, the device adds information in the selected content to a contacts application (FIG. 6V).

In some embodiments, the command display area moves (1442) on the touch screen display as the selected content moves.

In some embodiments, icons in the command display area include (1444) at least one command that is user configurable. For example, a user may be able to add a "Select All" icon to the Cut, Copy, and Paste icons in the command display area 530 via a settings menu. Similarly, a user may be able to add a "Map it," "Search," or other icon to the command display area 530 via a settings menu.

In some embodiments, icons in the command display area include (1446) at least one command that is context sensitive. For example, the cut and paste icons are not displayed for read-only content. Similarly, the paste icon is not displayed when an image has been copied and the input field requires text input.

In some embodiments, the content is displayed within a first application (e.g., email 140), and icons in the command display area include (1448) at least one command to invoke a second application (e.g., browser 147, map 154, or contacts 137) coupled to the first application via a predefined application programming interface.

In some embodiments, the device detects (1450, FIG. 14A) an input by a user prior to detecting activation of the command icon (e.g., a finger gesture such as a swipe gesture 634 on the content, FIG. 6CC). In response to detecting the input by the user, the device scrolls the content on the touch screen display and ceases to display the command display area (FIG. 6DD). In some embodiments, the device stops the scrolling of the content. In response to the scrolling of the content stopping, the device redisplays (1452) the command display area adjacent to the selected content on the touch screen display (FIG. 6EE). In other words, the command display area 530 disappears during scrolling and reappears when the scrolling stops, as illustrated in FIGS. 6CC-6EE. This gives the viewer an unobstructed view of the content during scrolling. The command display area 530 is typically displayed adjacent to the selected content, such as just above or just below the selected content. In some cases, the command display area overlaps or is displayed within the selected content.

In some embodiments, the device detects an input by a user prior to detecting activation of the command icon. For example, the device detects a finger gesture such as a tap gesture 636 (FIG. 6FF) at a location on the touch screen display away from the selected content 524 (e.g., at least a predefined minimum distance away from the selected content, such as 3.2 mm). In response to detecting the input by the user, the device deselects the selected content and ceases to display the command display area (1454) (FIG. 6GG).

In some embodiments, in response to detecting activation of the command icon (e.g., by a finger tap gesture 638 on "Copy" icon 534, FIG. 6HH) in the command display area 530, the device ceases (1456, FIG. 14D) to display the command display area (FIG. 6II).

In some embodiments, the device detects typing input by a user prior to detecting activation of the command icon. For example, the device detects finger gesture 642 on the "b" key in keyboard 640 (FIG. 6JJ). In response to detecting the typing input by the user, the device replaces the selected content with characters that correspond to the typing input and ceases to display the command display area (1458, FIG. 14A) (FIG. 6KK).

In some embodiments, the device detects a finger gesture by a user on a respective end of the selected content (i.e., the beginning or the end of the selected content) prior to detecting activation of the command icon (e.g., a finger tap gesture on the beginning or end of the selected content). In response to detecting the finger gesture by the user on the respective end of the selected content, the device ceases to display the command display area; displays an insertion marker at the respective end of the selected content; and deselects the selected content (1460). For example, in response to detecting finger gesture 644 (FIG. 6LL) by the user on the end of the selected content 524, the device ceases to display the command display area 530; displays an insertion marker 510 at the end of the selected content; and deselects the selected content (FIG. 6MM).

In some embodiments, the device detects a finger gesture by a user on the start-point object prior to detecting activation of the command icon (e.g., a finger tap gesture on the start-point object). In response to detecting the finger gesture by the user on the start-point object, the device ceases to display the command display area, the start-point object, and the end-point object; displays an insertion marker at the start of the selected content; and deselects the selected content (1462).

In some embodiments, the device detects a finger gesture by a user on the end-point object prior to detecting activation of the command icon (e.g., a finger tap gesture 644 (FIG. 6LL) on the end-point object 528). In response to detecting the finger gesture by the user on the end-point object, the device ceases to display the command display area, the start-point object, and the end-point object; displays an insertion marker 510 at the end of the selected content; and deselects the selected content (1464) (FIG. 6MM).

In some embodiments, the device detects a finger gesture by a user on the selected content prior to detecting activation of the command icon (e.g., a finger tap gesture 646 (FIG. 6NN) in the middle of the selected content). In response to detecting the finger gesture by the user on the selected content, the device ceases (1466) to display the command display area 530. In some embodiments, the device detects a finger gesture by a user on the selected content after ceasing to display the command display area and prior to detecting activation of the command icon (e.g., another finger tap gesture 648 (FIG. 6OO) in the middle of the selected content). In response to detecting the finger gesture by the user on the selected content, the device redisplays (1468) the command display area 530 adjacent to the selected content (FIG. 6NN). In other words, the user may toggle display of the command display area on and off by tapping within the selected content 524.

Figure 15A:
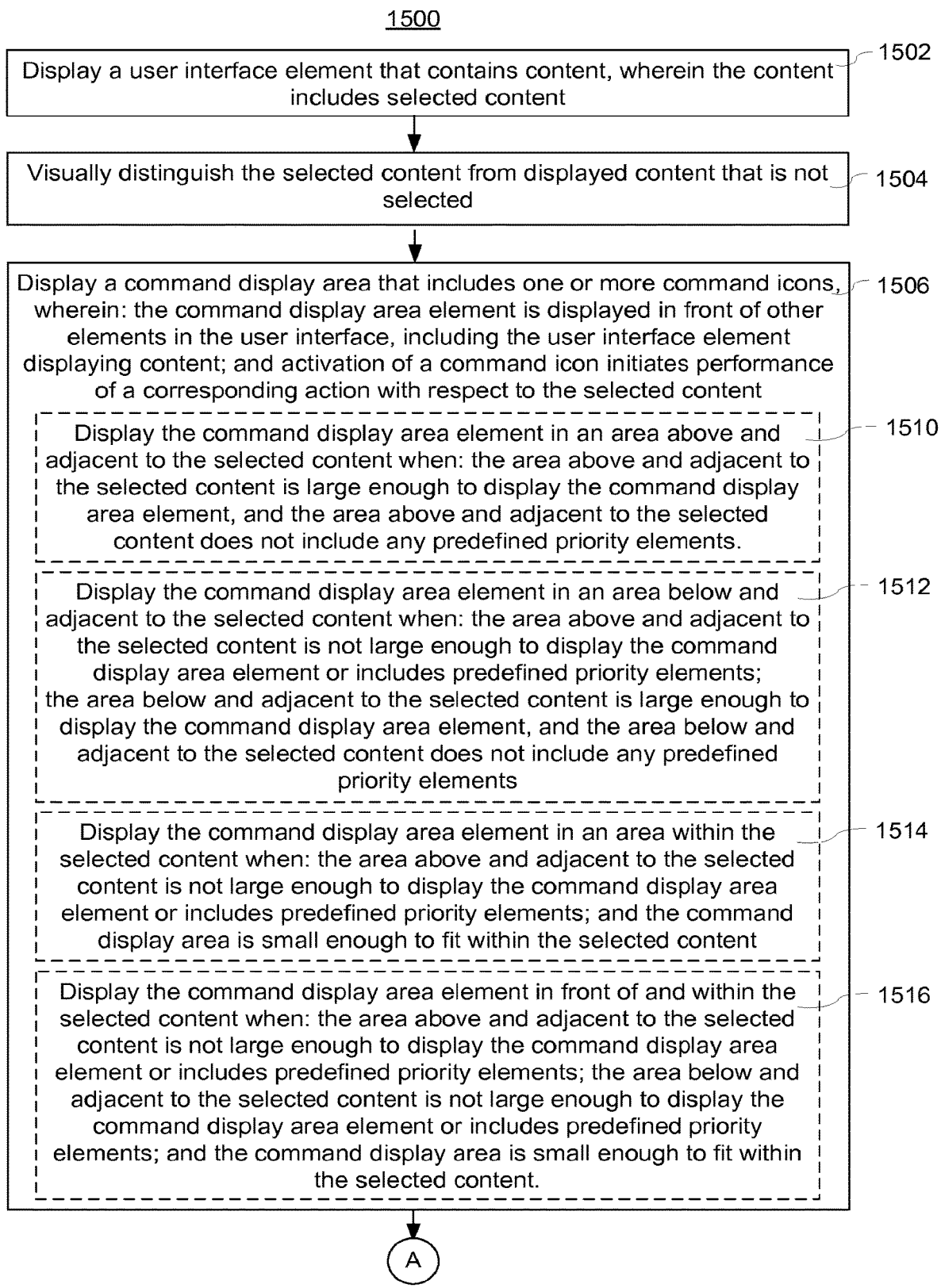
FIGS. 15A-15C are flow diagrams illustrating a method of positioning a command display area in accordance with some embodiments.
Figure 15B:
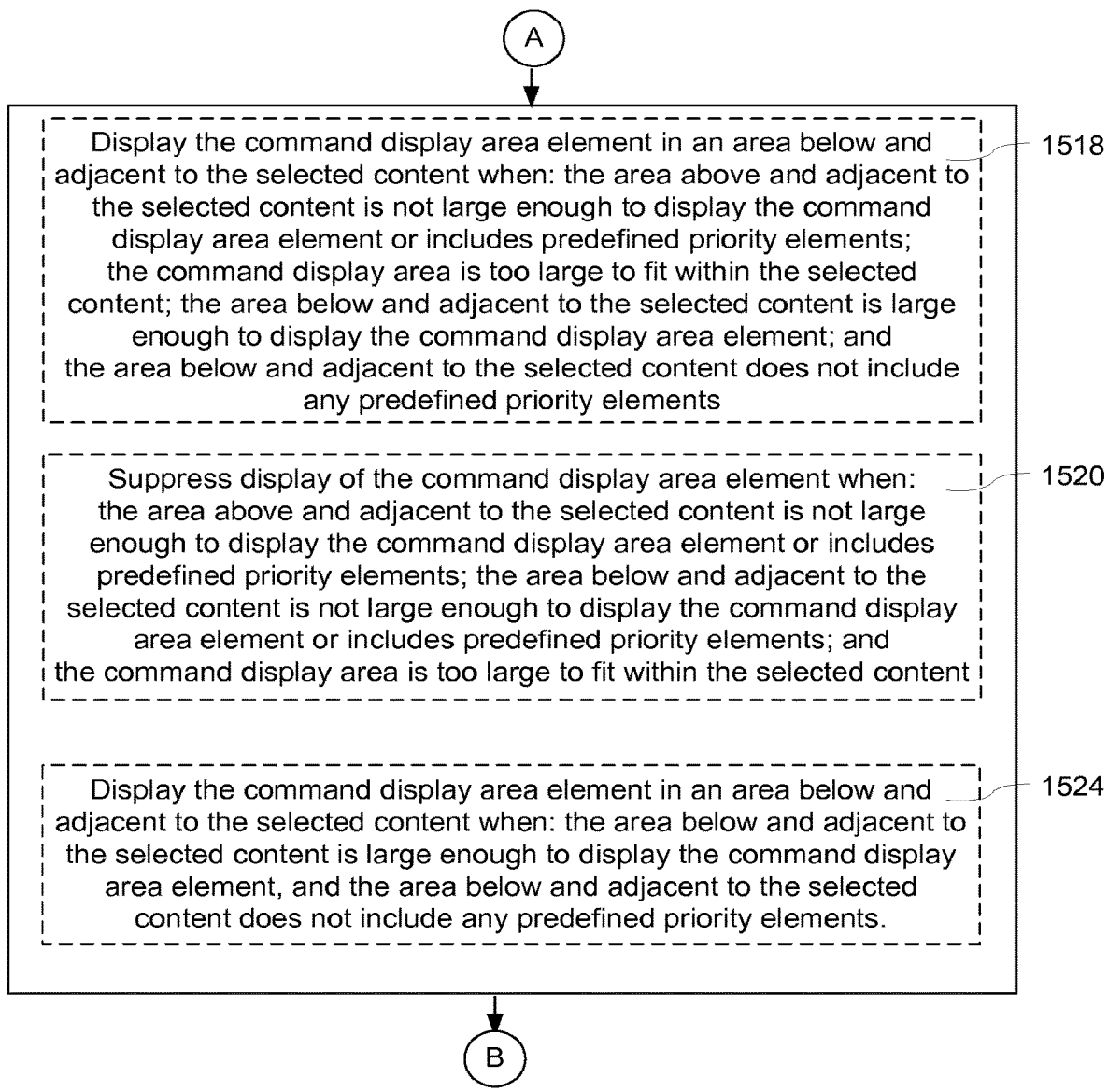
Figure 15C:
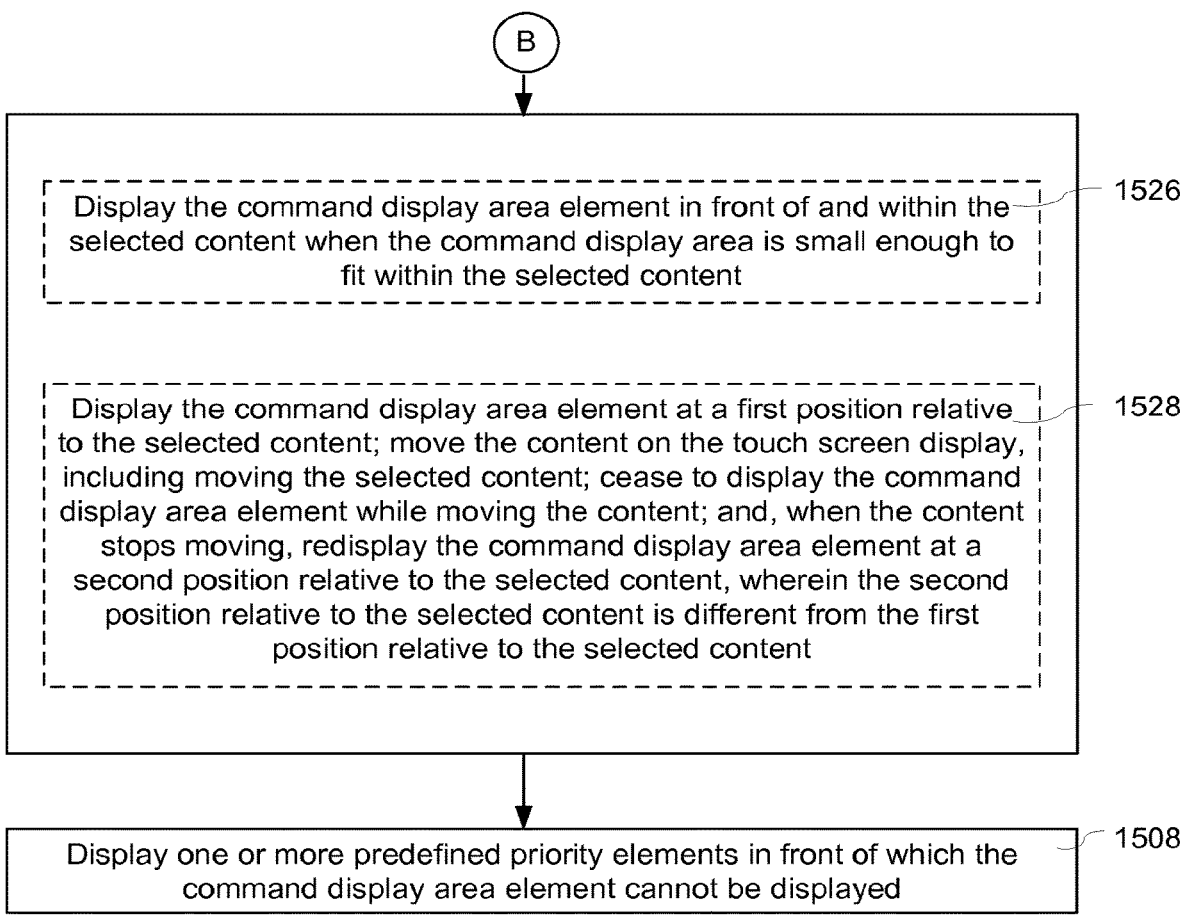
Figure 16A:
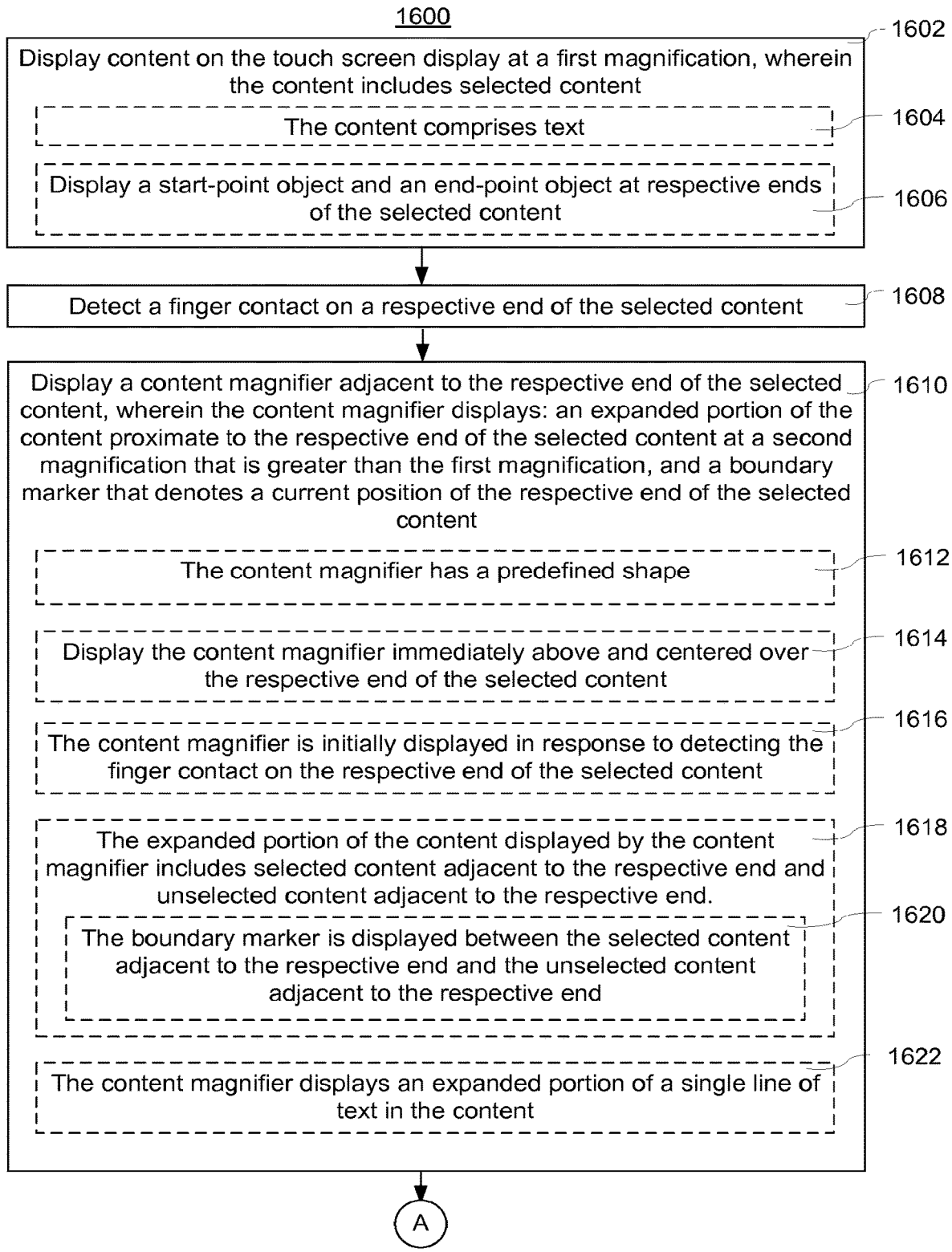
Figure 16B:
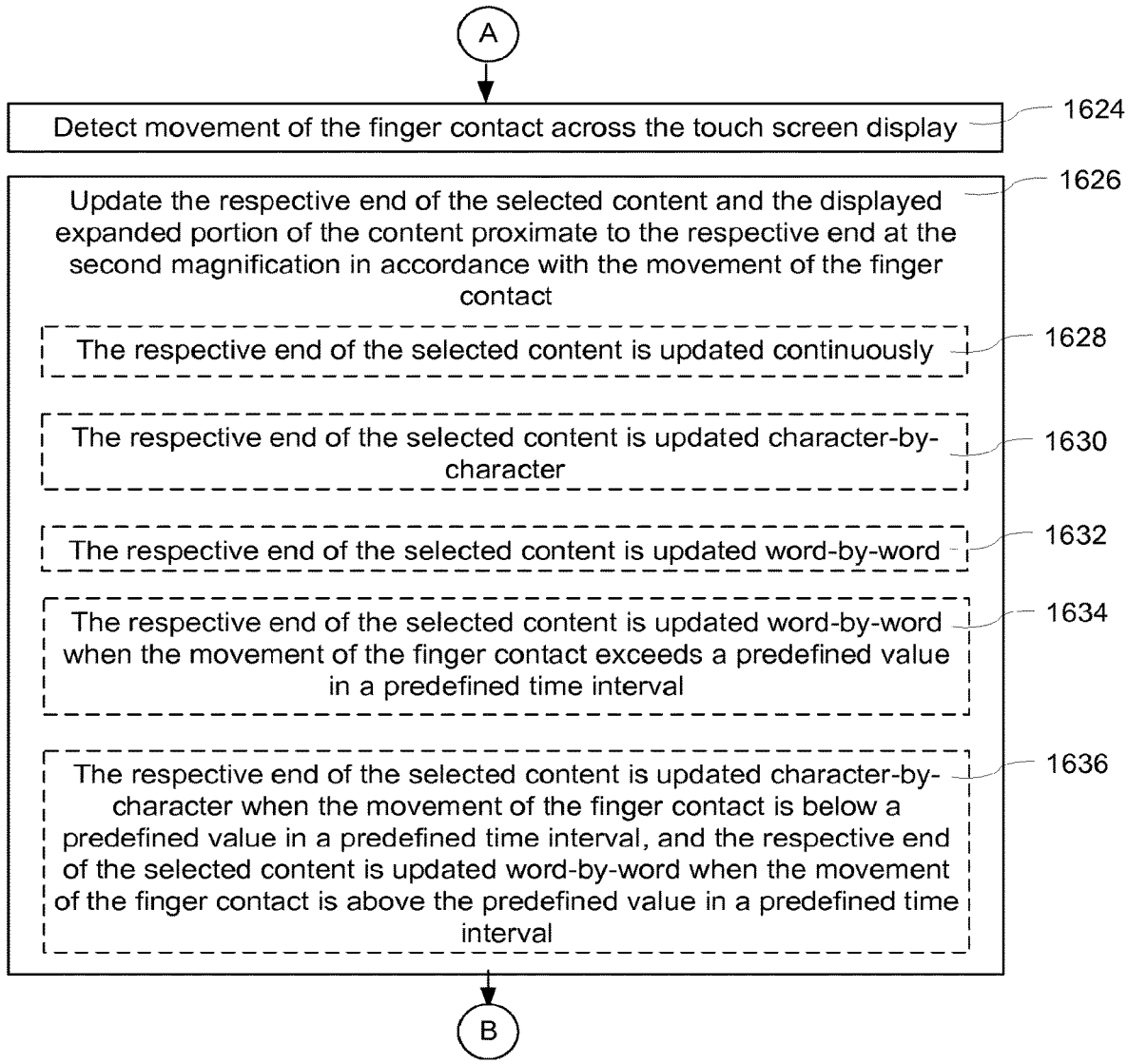
Figure 16C:
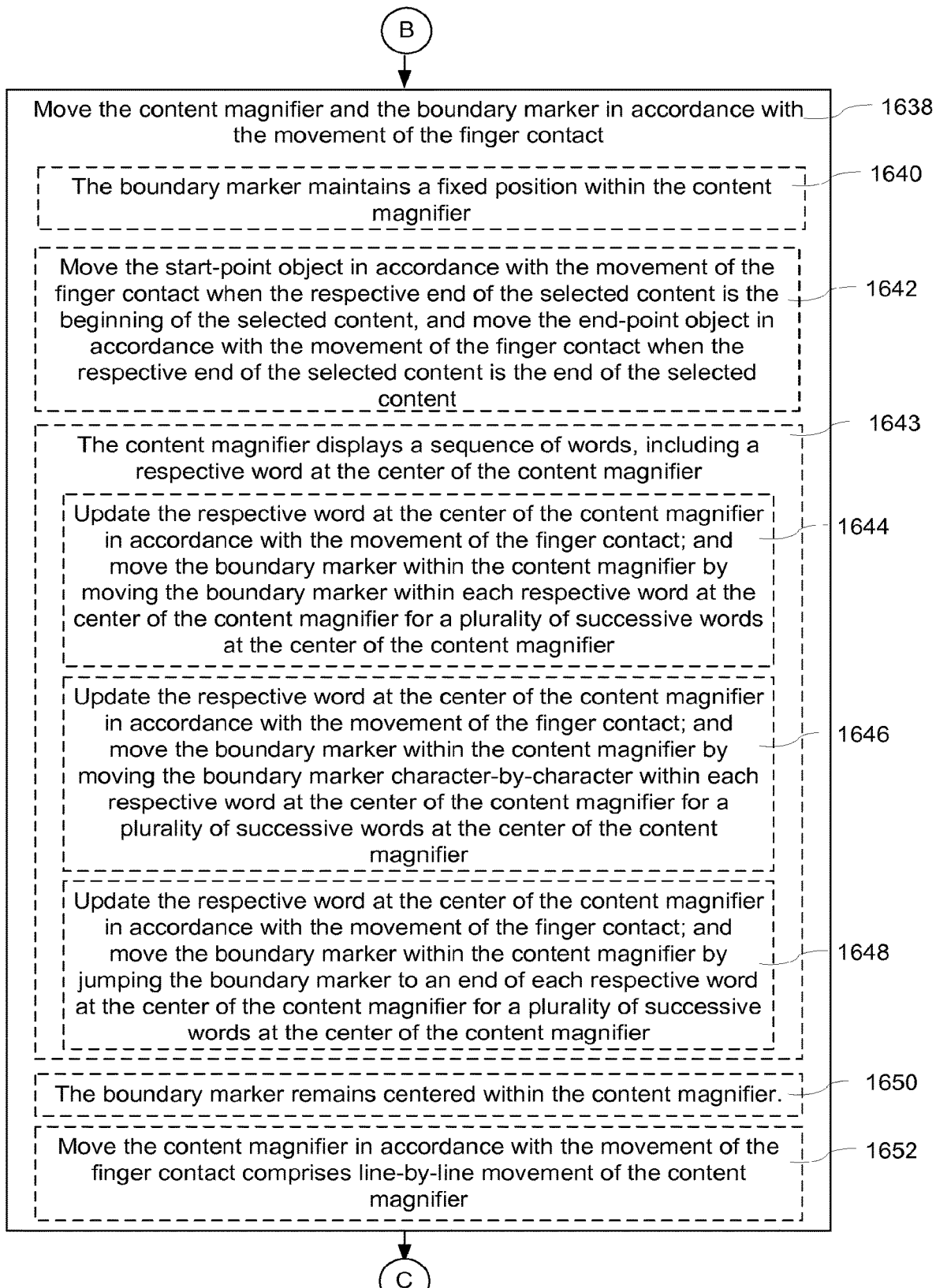

FIGS. 15A-15C are flow diagrams illustrating a method of positioning a command display area in accordance with some embodiments. The method 1500 is performed at a multifunction device (e.g., 300, FIG. 3) with a touch screen display. In some embodiments, the method is performed at a portable multifunction device with a touch screen display (e.g., portable multifunction device 100). Some operations in method 1500 may be combined and/or the order of some operations may be changed.

As described below, the method 1500 provides an efficient way to position a command display area so that the command display area does not obscure other important user interface elements on a touch screen display. The method reduces the cognitive burden on a user when using the command display area, thereby creating a more efficient human-machine interface. For battery-operated devices, enabling a user to use the command display area faster and more efficiently conserves power and increases the time between battery charges.

The device displays (1502) a user interface element that contains content 650 (FIG. 6PP). The content includes selected content 524 (e.g., content selected in response to detecting one or more touch gestures by a user on the touch screen display).

The device visually distinguishes (1504) the selected content 524 from displayed content that is not selected (e.g., by shading and/or coloring the background of the selected content).

The device displays (1506) a command display area 530 element that includes one or more command icons. For purposes of this discussion, the command display area 530 is one of a number of UI elements, each of which has a respective display priority, as explained in more detail below. The command display area 530 element is displayed in front of other elements in the user interface, including the user interface element displaying content 650. Activation of a command icon initiates performance of a corresponding action with respect to the selected content 524.

The device displays (1508, FIG. 15C) one or more predefined priority elements in front of which the command display area element cannot be displayed (e.g., a keyboard 640, FIG. 6PP)

In some embodiments, displaying the command display area 530 element comprises displaying (1510) the command display area element in an area above and adjacent to the selected content when: the area above and adjacent to the selected content is large enough to display the command display area element, and the area above and adjacent to the selected content does not include any predefined priority elements (e.g., FIGS. 6PP and 6TT).

In some embodiments, the device displays (1512) the command display area element in an area below and adjacent to the selected content when: the area above and adjacent to the selected content is not large enough to display the command display area element or includes predefined priority elements; the area below and adjacent to the selected content is large enough to display the command display area element, and the area below and adjacent to the selected content does not include any predefined priority elements (e.g., FIGS. 6RR and 6UU).

In some embodiments, the device displays (1514) the command display area element in an area within the selected content when: the area above and adjacent to the selected content is not large enough to display the command display area element or includes predefined priority elements; and the command display area is small enough to fit within the selected content (e.g., FIGS. 6QQ and 6SS).

In some embodiments, the device displays (1516) the command display area element in front of and within the selected content when: the area above and adjacent to the selected content is not large enough to display the command display area element or includes predefined priority elements; the area below and adjacent to the selected content is not large enough to display the command display area element or includes predefined priority elements; and the command display area is small enough to fit within the selected content (e.g., FIG. 6QQ).

In some embodiments, the device displays (1518) the command display area element in an area below and adjacent to the selected content when: the area above and adjacent to the selected content is not large enough to display the command display area element or includes predefined priority elements; the command display area is too large to fit within the selected content; the arca below and adjacent to the selected content is large enough to display the command display area element; and the area below and adjacent to the selected content does not include any predefined priority elements (e.g., FIG. 6UU).

In some embodiments, the device suppresses (1520) display of the command display area element when: the arca above and adjacent to the selected content is not large enough to display the command display area element or includes predefined priority elements; the area below and adjacent to the selected content is not large enough to display the command display area element or includes predefined priority elements; and the command display area is too large to fit within the selected content.

In some embodiments, the device displays (1524) the command display area element in an area below and adjacent to the selected content when: the area below and adjacent to the selected content is large enough to display the command display area element, and the area below and adjacent to the selected content does not include any predefined priority elements (e.g., FIGS. 6RR and 6UU).

In some embodiments, the device displays (1526) the command display area element in front of and within the selected content when: the command display area is small enough to fit within the selected content (e.g., FIGS. 6QQ and 6SS)

In some embodiments, the device displays (1528) the command display area 530 element at a first position relative to the selected content 524 (e.g., just above the selected content, FIG. 6PP). The device moves the content on the touch screen display, including moving the selected content (e.g., scrolling the content in response to a finger gesture). The device ceases to display the command display area element while moving the content. When the content stops moving, the device redisplays the command display area 530 element at a second position relative to the selected content. The second position relative to the selected content is different from the first position relative to the selected content (e.g., just below the selected content, FIG. 6RR, or within the selected content, FIG. 6QQ).

FIGS. 16A-16E are flow diagrams illustrating a method of updating a respective end of selected content with a content magnifier in accordance with some embodiments. The method 1600 is performed at a multifunction device (e.g., 300, FIG. 3) with a touch screen display. In some embodiments, the method is performed at a portable multifunction device with a touch screen display (e.g., portable multifunction device 100). Some operations in method 1600 may be combined and/or the order of some operations may be changed.

As described below, the method 1600 provides an intuitive way to adjust a respective end of selected content at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1602) content on the touch screen display at a first magnification (e.g., editable content 502 or read-only content 538). The content includes selected content 524 (e.g., content selected in response to detecting one or more touch gestures by a user on the touch screen display). In some embodiments, the content comprises (1604) text (e.g., plain text, unstructured text, formatted text, or text in a web page).

Figure 7A:
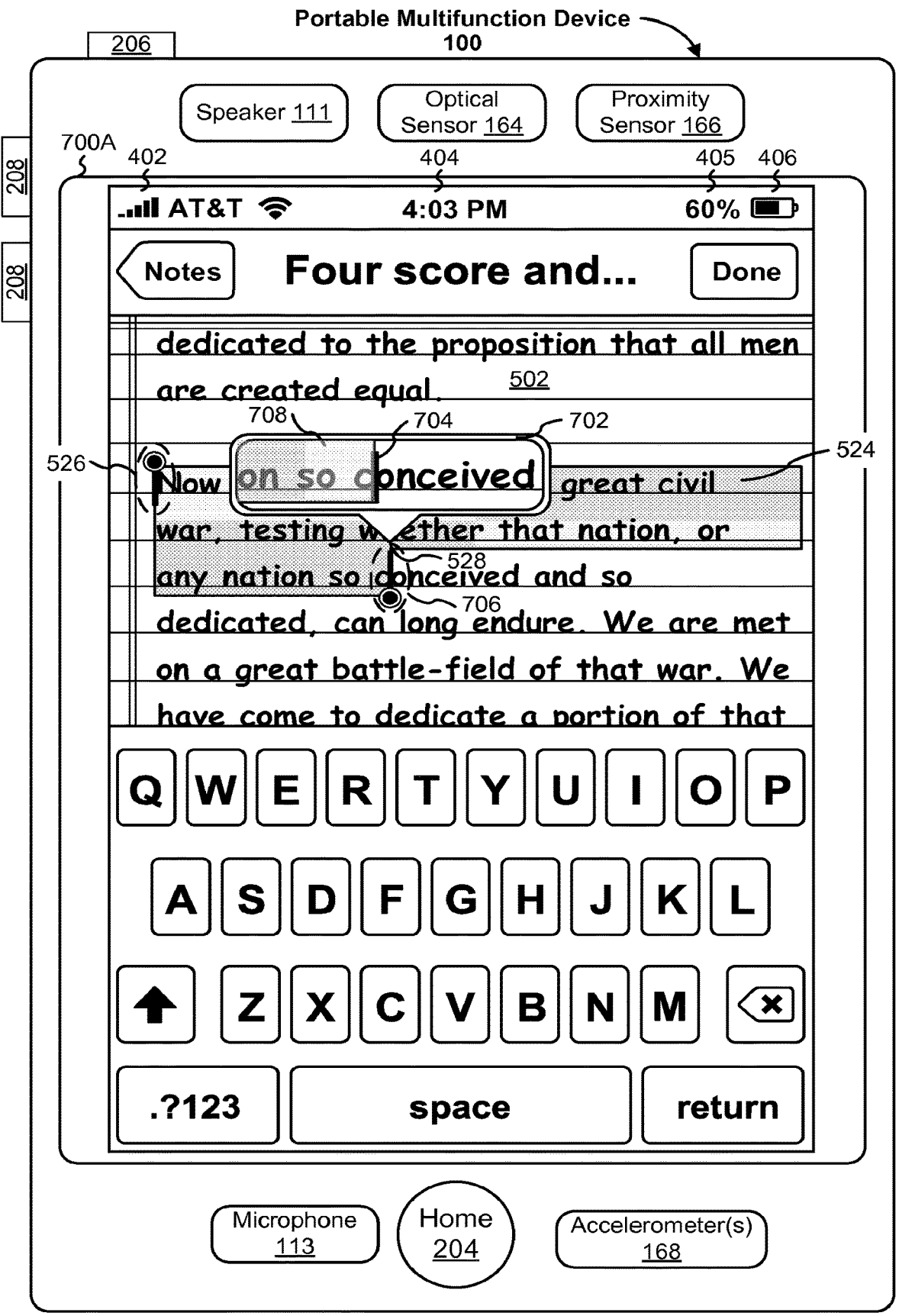
FIGS. 7A-7E illustrate exemplary user interfaces for using a content magnifier to select a respective end of selected content in accordance with some embodiments.
Figure 7B:
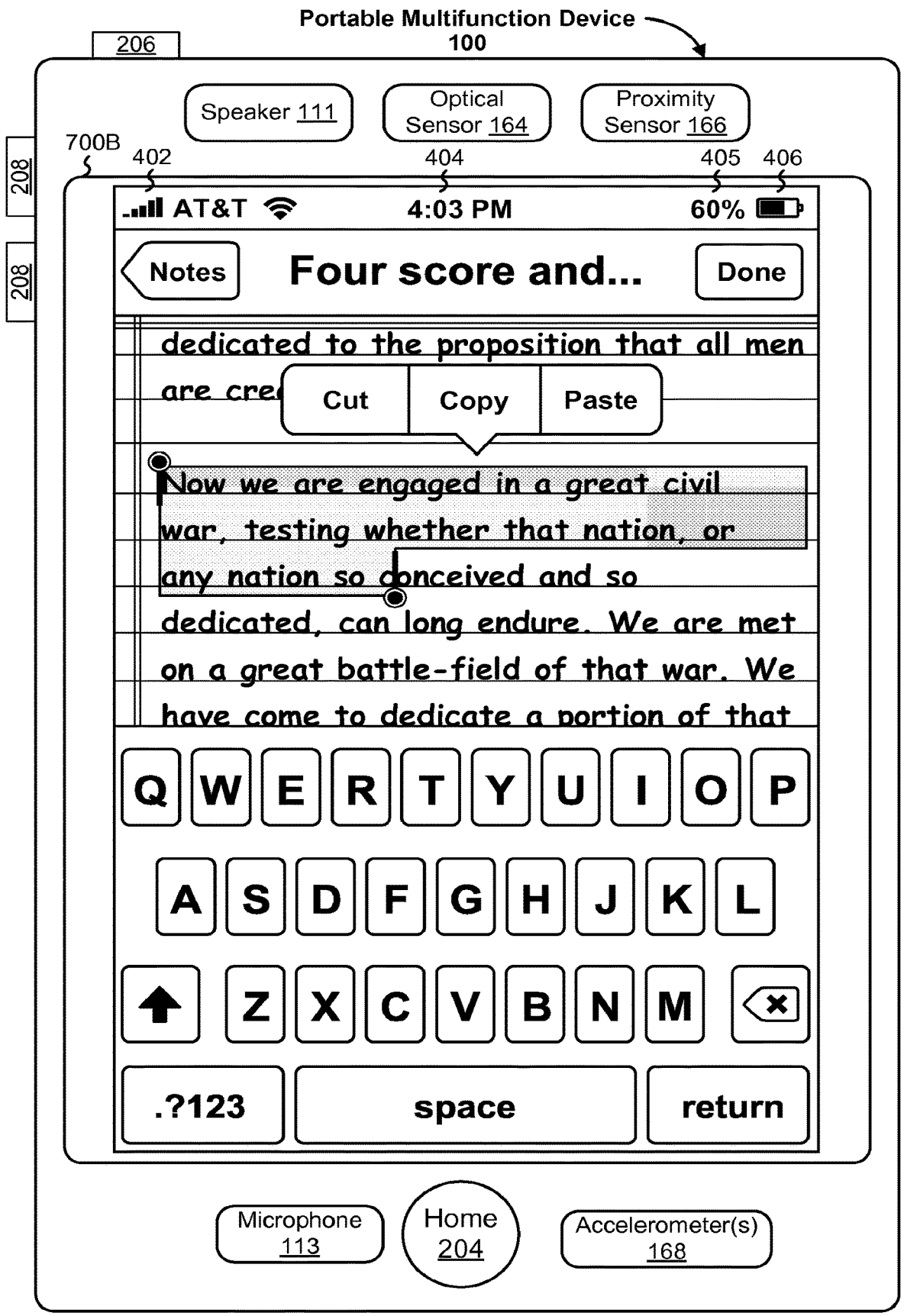

In some embodiments, the device displays (1606) a start-point object 526 and an end-point object 528 at respective ends of the selected content 524 (FIG. 7A).

The device detects (1608) a finger contact on a respective end of the selected content (which end may include a start-point object or end-point object or a hidden hit region of one of these objects). The respective end is either the beginning or the end of the selected content.

The device displays (1610) a content magnifier 702 adjacent to the respective end of the selected content. The content magnifier displays: an expanded portion 708 of the content proximate to the respective end of the selected content at a second magnification that is greater than the first magnification, and a boundary marker 704 that denotes a current position of the respective end of the selected content.

In some embodiments, the content magnifier 702 has a predefined shape (e.g., a rectangle or a rectangle with rounded corners, as shown in FIG. 7A) (1612). In some embodiments, displaying the content magnifier adjacent to the respective end of the selected content comprises displaying (1614) the content magnifier immediately above and centered over (or substantially centered over) the respective end of the selected content. In some embodiments, the content magnifier is initially displayed in response to detecting the finger contact 706 on the respective end of the selected content (or contact on a corresponding start-point object or end-point object or a hidden hit region of one of these objects) (1616).

In some embodiments, the expanded portion 708 of the content displayed by the content magnifier includes (1618) selected content adjacent to the respective end (e.g., "on so c" in FIG. 7A) and unselected content adjacent to the respective end (e.g., "onceived" in FIG. 7A). In some embodiments, the boundary marker 704 is displayed between the selected content adjacent to the respective end and the unselected content adjacent to the respective end (1620).

In some embodiments, the content magnifier 708 displays (1622) an expanded portion of a single line of text in the content (FIG. 7A). In some embodiments, the content magnifier that assists in positioning the insertion marker (e.g., magnifier 508, FIG. 5B) displays portions of three or more lines of text, while the content magnifier that assists in setting an end point for selected content (e.g., magnifier 702, FIG. 7A) only displays an expanded portion of a single line of text that includes the respective end point.

The device detects (1624) movement of the finger contact 706 across the touch screen display.

The device updates (1626) the respective end of the selected content and the displayed expanded portion of the content proximate to the respective end at the second magnification in accordance with the movement of the finger contact.

In some embodiments, the respective end of the selected content is updated continuously (e.g., the end appears to move within and between characters) (1628).

In some embodiments, the respective end of the selected content is updated character-by-character (e.g., letter-by-letter) (1630).

In some embodiments, the respective end of the selected content is updated word-by-word (1632). In some embodiments, with word-by-word updating, when a location of the finger contact corresponds to a position within a current word (e.g., the position of a character in the middle of the current word), the respective end of the selected content advances to the end of the current word.

In some embodiments, the respective end of the selected content is updated word-by-word when the movement of the finger contact exceeds a predefined value in a predefined time interval (e.g., an average speed) (1634).

In some embodiments, the respective end of the selected content is updated character-by-character when the movement of the finger contact is below a predefined value in a predefined time interval, and the respective end of the selected content is updated word-by-word when the movement of the finger contact is above the predefined value in a predefined time interval (1636).

The device moves (1638) the content magnifier 702 and the boundary marker 704 in accordance with the movement of the finger contact 706. In some embodiments, the boundary marker maintains (1640) a fixed position within the content magnifier.

In some embodiments, the device moves the start-point object 526 in accordance with the movement of the finger contact when the respective end of the selected content is the beginning of the selected content (not shown), and the device moves the end-point object 528 in accordance with the movement of the finger contact when the respective end of the selected content is the end of the selected content (1642).

In some embodiments, the content magnifier displays a sequence of words, including a respective word at the center of the content magnifier (1643). The device updates the respective word at the center of the content magnifier (e.g., the word "conceived" in FIG. 7A) in accordance with the movement of the finger contact. The device moves the boundary marker within the content magnifier by moving the boundary marker within each respective word at the center of the content magnifier for a plurality of successive words at the center of the content magnifier (1644).

In some embodiments, the content magnifier displays a sequence of words, including a respective word at the center of the content magnifier. The device updates the respective word at the center of the content magnifier in accordance with the movement of the finger contact. The device moves the boundary marker within the content magnifier by moving the boundary marker character-by-character within each respective word at the center of the content magnifier for a plurality of successive words at the center of the content magnifier (1646).

In some embodiments, the content magnifier displays a sequence of words, including a respective word at the center of the content magnifier. The device updates the respective word at the center of the content magnifier in accordance with the movement of the finger contact. The device moves the boundary marker within the content magnifier by jumping the boundary marker to an end of each respective word at the center of the content magnifier for a plurality of successive words at the center of the content magnifier (1648). In other words, the device displays word-by-word selection within the content magnifier.

In some embodiments, the boundary marker 704 remains (1650) centered (or substantially centered) within the content magnifier 702.

In some embodiments, moving the content magnifier in accordance with the movement of the finger contact comprises line-by-line movement of the content magnifier 702 (1652). Line-by-line movement may snap the magnifier to a line of text containing the updated respective end of the selected content. In some embodiments, the content magnifier that assists in positioning the insertion marker (e.g., magnifier 508, FIG. 5B) moves continuously on the touch screen display, while the content magnifier that assists in setting an end point for selected content (e.g., magnifier 702, FIG. 7A) moves line-by-line. In some embodiments, both types of magnifiers move continuously. In some embodiments, both types of magnifiers move line-by-line.

In some embodiments, the device detects lift off of the finger contact from the touch screen display. In response to detecting lift off of the finger contact from the touch screen display, the device terminates display of the content magnifier (1654).

In some embodiments, the device detects lift off of the finger contact from the touch screen display when a location of the finger contact corresponds to a current position within a current word. In response to detecting lift off of the finger contact from the touch screen display when the location of the finger contact corresponds to the current position within the current word, the device terminates display of the content magnifier and places the respective end of the selected content at the current position within the current word (1656). For example, in response to detecting lift off of the finger contact 706 (FIG. 7A) from the touch screen display when the location of the finger contact corresponds to the current position within the current word (e.g., between the letter "c" and the letter "o" in "conceived", FIG. 7A), the device terminates display of the content magnifier 702 and places the respective end of the selected content 524 at the current position within the current word (e.g., between the letter "c" and the letter "o" in "conceived", FIG. 7B).

In some embodiments, the device detects lift off of the finger contact from the touch screen display when a location of the finger contact corresponds to a current position within a current word. In response to detecting lift off of the finger contact from the touch screen display when the location of the finger contact corresponds to the current position within the current word, the device terminates display of the content magnifier and places the respective end of the selected content at a respective end of the current word (1658). For example, the device may place the respective end of the selected content: (1) at the end of the current word for both the beginning and the end of the selected content; (2) at the end of the current word when the respective end of the selected content is the end of the selected content and at the beginning of the current word when the respective end of the selected content is the beginning of the selected content); or (3) at the respective end of the current word in accordance with the direction of movement of the finger contact just prior to detecting lift off. In some embodiments, in response to detecting lift off of the finger contact from the touch screen display, the device displays (1660) an animation of the content magnifier moving to a position that corresponds to the respective end of the current word prior to terminating display of the content magnifier (e.g., a position immediately above and centered over the respective end of the current word). For example, in response to detecting lift off of the finger contact 706 (FIG. 7A) from the touch screen display when the location of the finger contact corresponds to the current position within the current word (e.g., between the letter "c" and the letter "o" in "conceived", FIG. 7A), the device terminates display of the content magnifier 702 and places the end of the selected content 524 at the end of the current word (e.g., at the end of "conceived," FIG. 7E).

Figure 7C:
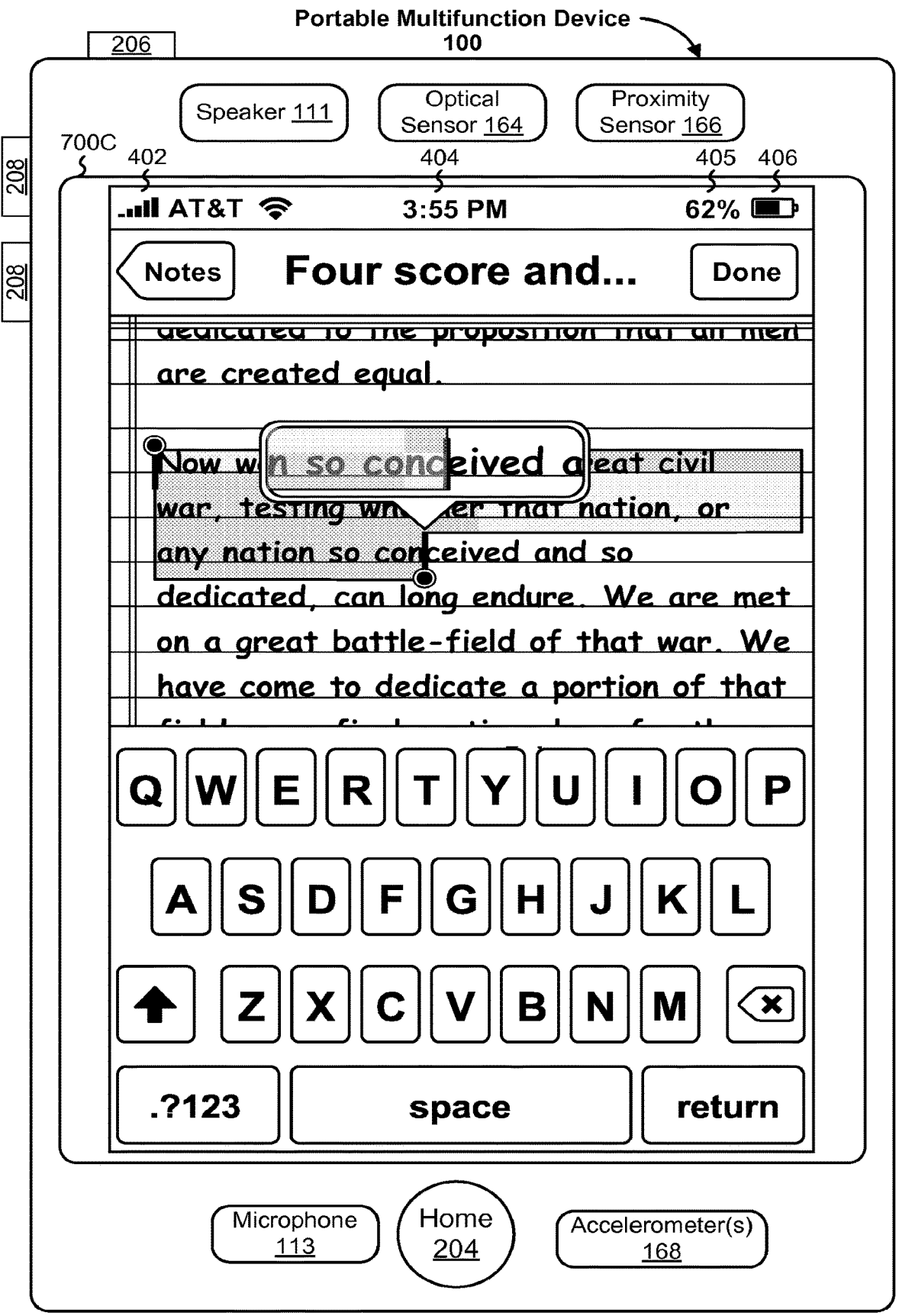
Figure 7D:
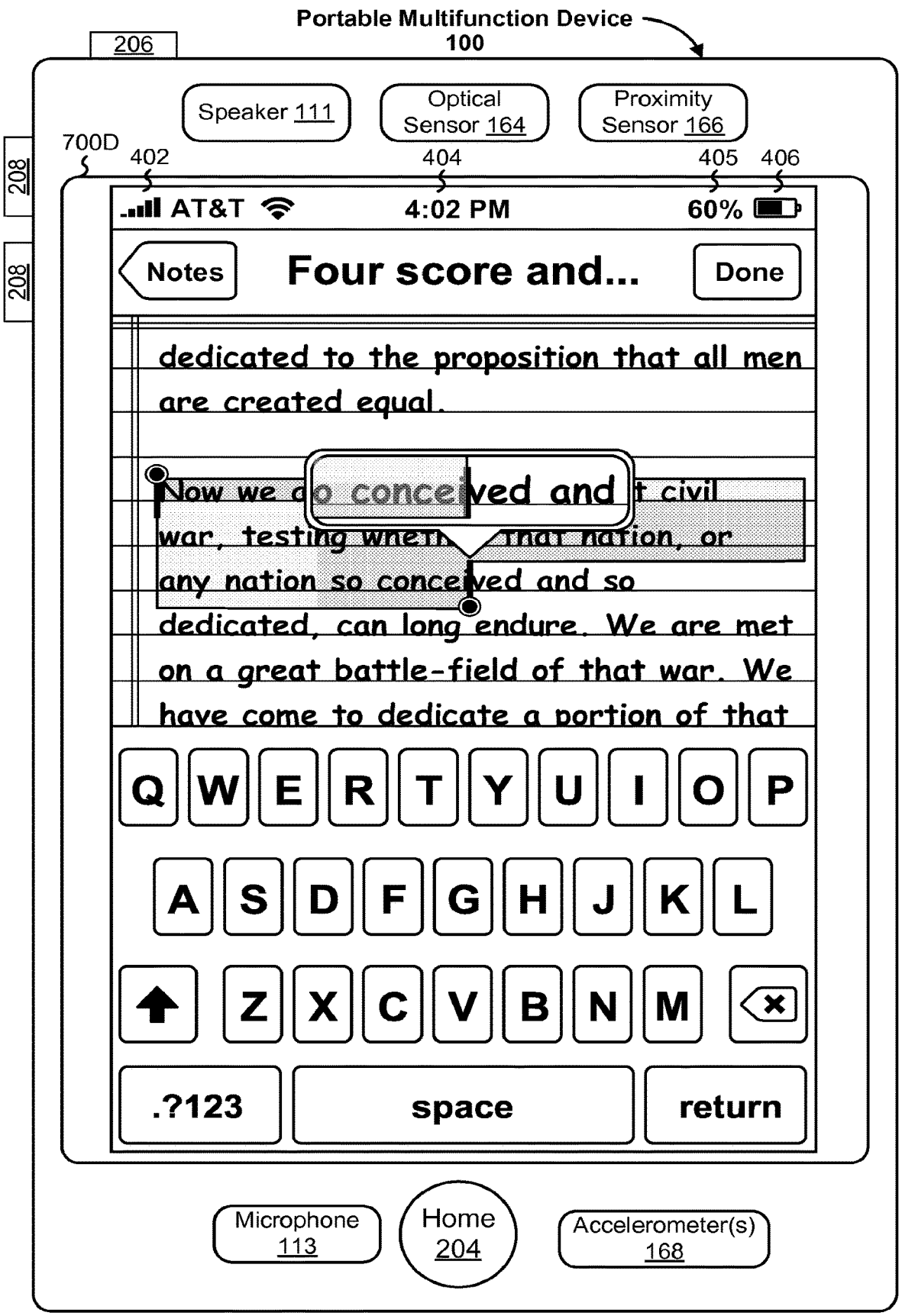
Figure 7E:
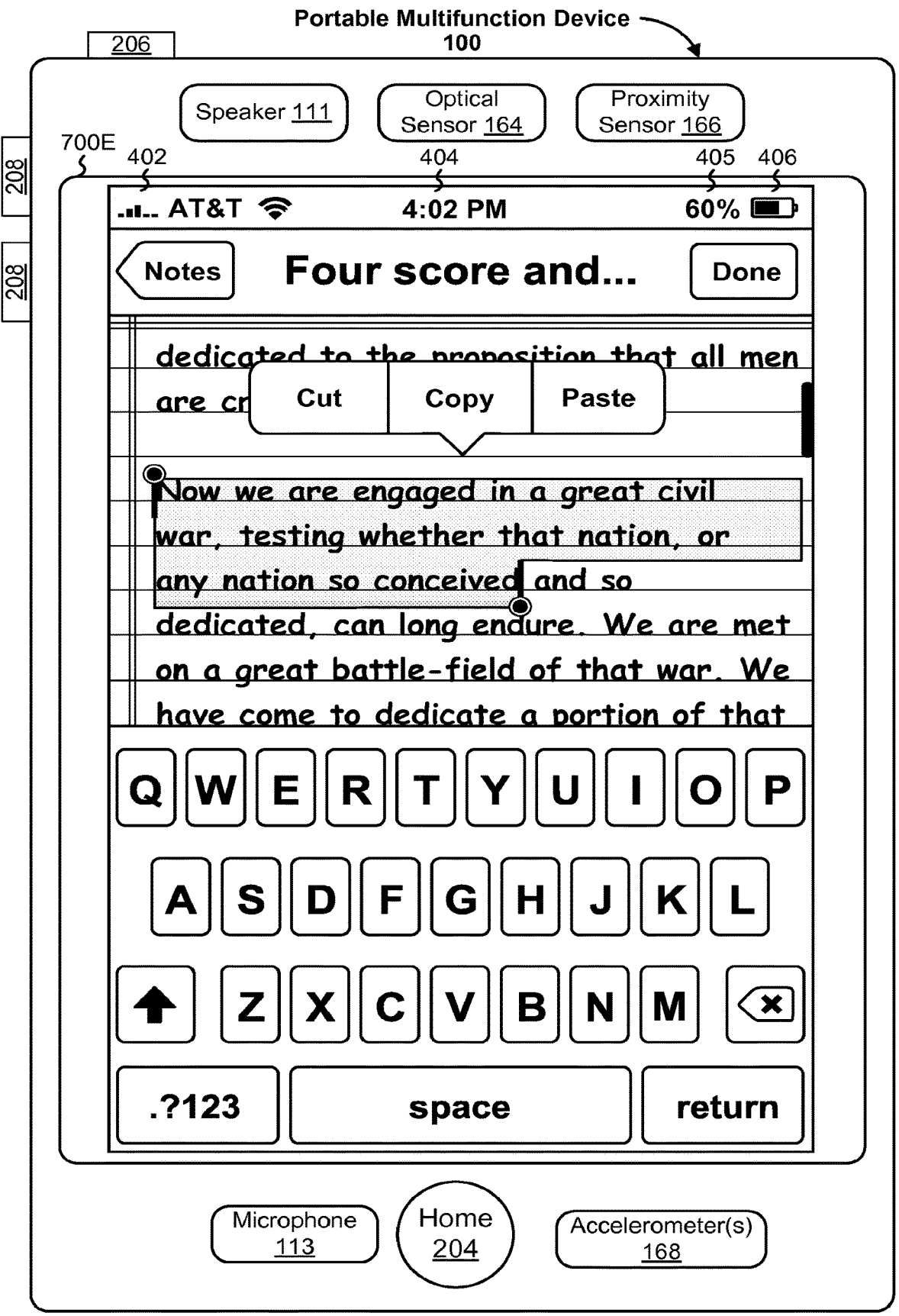

In some embodiments, the device detects lift off of the finger contact from the touch screen display when a location of the finger contact corresponds to a current position within a current word (e.g., between the letter "c" and the letter "o" in "conceived", FIG. 7A). In response to detecting lift off of the finger contact from the touch screen display when the location of the finger contact corresponds to the current position within the current word, the device: terminates display of the content magnifier; places the respective end of the selected content at the current position within the current word (e.g., between the letter "c" and the letter "o" in "conceived", FIG. 7B) when the movement of the finger contact is less than a predefined value in a predefined time interval (at lift off or in a time period just prior to detecting lift off, for example less than 1.6 mm within 0.5 seconds of detecting lift off); and places the respective end of the selected content at a respective end of the current word (e.g., at the end of "conceived," FIG. 7E) when the movement of the finger contact is greater than the predefined value in the predefined time interval (1662). For example, the device may place the respective end of the selected content: (1) at the end of the current word for both the beginning and the end of the selected content; (2) at the end of the current word when the respective end of the selected content is the end of the selected content and at the beginning of the current word when the respective end of the selected content is the beginning of the selected content); or (3) at the respective end of the current word in accordance with the direction of movement of the finger contact just prior to detecting lift off. In some embodiments, in response to detecting lift off of the finger contact from the touch screen display, the device displays (1664) an animation of the content magnifier moving to a position that corresponds to the respective end of the current word prior to terminating display of the content magnifier when the movement of the finger contact is greater than the predefined value in the predefined time interval. For example, in response to detecting lift off of the finger contact 706 between the letter "c" and the letter "o" in "conceived" (FIG. 7A), the device displays an animation of the content magnifier 702 moving (e.g., as illustrated in FIGS. 7C and 7D) to a position that corresponds to the respective end of the current word prior to terminating display of the content magnifier (e.g., at the end of "conceived," FIG. 7E).

Once the content is selected, the device may, in response to user input, perform operations on the selected content such as those described above with respect to FIGS. 6A-6BB.

Figure 17B:
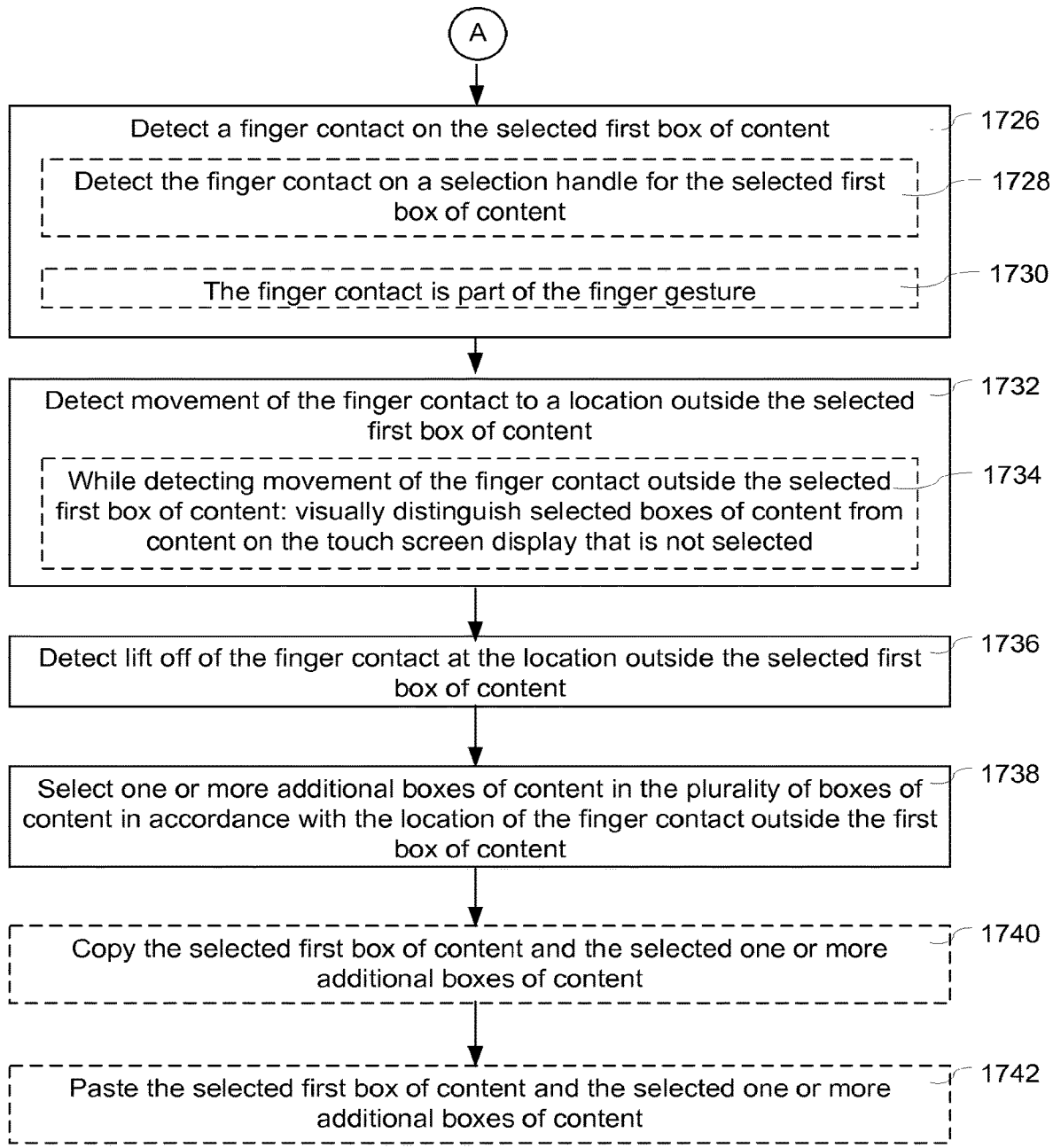

FIGS. 17A-17B are flow diagrams illustrating a method of selecting content in structured electronic documents in accordance with some embodiments. The method 1700 is performed at a multifunction device (e.g., 300, FIG. 3) with a touch screen display. In some embodiments, the method is performed at a portable multifunction device with a touch screen display (e.g., portable multifunction device 100). Some operations in method 1700 may be combined and/or the order of some operations may be changed.

As described below, the method 1700 provides an intuitive way to select blocks of content in structured electronic documents (e.g., web pages) at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The use of finger gestures to navigate in structured electronic documents is described in United States Patent Application 20080094368, which is incorporated by reference herein in its entirety. As described therein, in some embodiments, the device analyzes the render tree of a web page to determine the blocks (or boxes of content) in the web page. In some embodiments, a block corresponds to a render node that is: a replaced inline; a block; an inline block; or an inline table. In some embodiments, the plurality of boxes in a web page are defined by a style sheet in (or referenced by) the web page, such as a cascading style sheet. Finger gestures (e.g., like double-tap gesture 802, FIG. 8A) are used to enlarge and center boxes of content in the web page on the touch screen display (e.g., enlarging the box of content titled "Lost in Translation: A U.S. Gift to Russia" from being nearly unreadable in FIG. 8A to being easily readable in FIG. 8B).

The device displays (1702) at least a portion of a structured electronic document on the touch screen display. The structured electronic document comprises a plurality of boxes of content. In some embodiments, the structured electronic document is a web page (1704). In some embodiments, the structured electronic document is an HTML or XML document (1706).

The device detects (1708) a finger gesture on a first box of content in the plurality of boxes of content (e.g., gesture 804, FIG. 8B or gesture 814, FIG. 8F). In some embodiments, the finger gesture is a press and hold gesture (1710). In some embodiments, the finger gesture is a tap-and-a-half gesture (1712). In some embodiments, the structured electronic document has an associated render tree with a plurality of nodes and determining the first box at the location of the finger gesture comprises: traversing down the render tree to determine a first node in the plurality of nodes that corresponds to the detected location of the finger gesture; traversing up the render tree from the first node to a closest parent node that contains a logical grouping of content; and identifying content corresponding to the closest parent node as the first box of content. In some embodiments, the logical grouping of content comprises a paragraph, an image, a plugin object, or a table. In some embodiments, the closest parent node is a replaced inline, a block, an inline block, or an inline table.

In response to detecting the finger gesture on the first box of content in the plurality of boxes of content, the device selects the first box of content and visually distinguishes the selected first box of content 806 from content on the touch screen display that is not selected (1714) (e.g., as shown in FIGS. 8C and 8G). In some embodiments, the first box of content is selected for copying. In some embodiments, the first box of content is selected for use as input to another operation, such as cutting, mapping, searching, or one of the operations described above with respect to FIGS. 6A-6BB.

In some embodiments, visually distinguishing the selected first box of content comprises displaying (1716) the first box of content 806 with a different background shading from content on the touch screen display that is not selected (FIGS. 8C and 8G). In some embodiments, visually distinguishing the selected first box of content comprises displaying (1718) the first box of content with a different background color from content on the touch screen display that is not selected. In some embodiments, visually distinguishing the selected first box of content comprises displaying (1720) a border around the first box of content. In some embodiments, visually distinguishing the selected first box of content comprises displaying one or more selection handles for the first box of content (e.g., handles 808, FIGS. 8C and 8G)(1722).

In some embodiments, in response to detecting the finger gesture on the first box of content in the plurality of boxes of content, the device displays (1724) a command display area 530 for selected content (FIGS. 8C and 8G).

The device detects (1726) a finger contact (e.g., contact 810, FIG. 8C or contact 816, FIG. 8G) on the selected first box of content. In some embodiments, detecting the finger contact on the selected first box of content comprises detecting (1728) the finger contact on a selection handle 808 for the selected first box of content (FIGS. 8C and 8G). In some embodiments, the finger contact is part of the finger gesture (e.g., when the finger gesture is a "press and hold" gesture)(1730).

The device detects (1732) movement (e.g., movement 812, FIG. 8C or movement 818, FIG. 8G) of the finger contact 810 to a location outside the selected first box of content (FIG. 8D or FIG. 8H, respectively).

In some embodiments, while detecting movement of the finger contact outside the selected first box of content, the device visually distinguishes (1734) selected boxes of content (or boxes of content that will be selected if lift off of the finger contact is detected at the current location of the finger contact) from content on the touch screen display that is not selected.

The device detects (1736) lift off of the finger contact at the location outside the selected first box of content.

The device selects (1738) one or more additional boxes of content in the plurality of boxes of content in accordance with the location of the finger contact outside the first box of content (FIG. 8E or 8I, respectively). In some embodiments, the selection occurs after detecting lift off of the finger contact at the location outside the selected first box of content. In some embodiments, the selection occurs before detecting lift off of the finger contact at the location outside the selected first box of content, and is finalized by the lift off.

The selected boxes of content may be further expanded with additional finger gestures on the selection handles 808, as illustrated by finger contact 820 and movement 822 in FIGS. 8J and 8K.

In some embodiments, the device copies (1740) the selected first box of content and the selected one or more additional boxes of content (e.g., in response to detecting a finger gesture on a "copy" icon 534 in a command display area 530 adjacent to the selected content, FIG. 8E and FIG. 8I). Furthermore, in some embodiments, the copied content is posted to a "pasteboard" in memory, making the copied content available for pasting in (i.e., copied to) the current application as well as in other applications executed by the device. When the copied content includes more than one box of content, or content of more than one data type, the copied content may be posted to the pasteboard as multiple objects, one for each distinct box of content or data item. Different posted objects can have different data types (e.g., image, HTML, text, etc.).

In some embodiments, the device pastes (1742) the selected first box of content and the selected one or more additional boxes of content (e.g., pasting the selected content into an email, note, or word processing document in a corresponding application on the multifunction device).

In some embodiments, the formatting and other metadata in the copied selected content is lost during pasting and only text in the selected content is pasted (e.g., copying the box of content 806 from FIG. 8L into a note in FIG. 8M). In some embodiments, the formatting and other metadata in the copied selected content is maintained during pasting (e.g., copying the box of content 806 from FIG. 8L into an email, FIGS. 8N and 8O).

Figure 18:
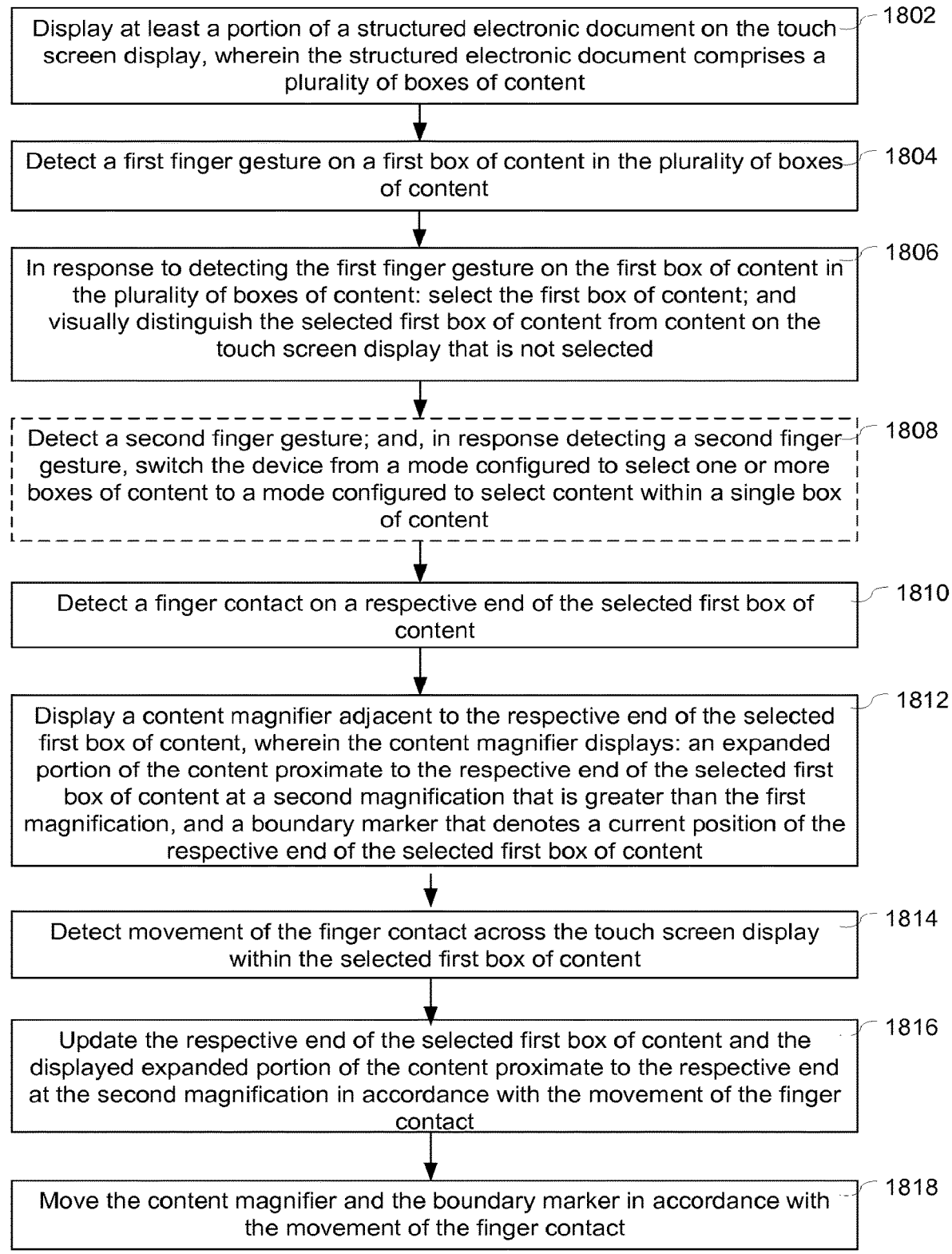
FIG. 18 is a flow diagram illustrating a method of selecting content in structured electronic documents in accordance with some embodiments.

FIG. 18 is a flow diagram illustrating a method of selecting content in structured electronic documents in accordance with some embodiments. The method 1800 is performed at a multifunction device (e.g., 300, FIG. 3) with a touch screen display. In some embodiments, the method is performed at a portable multifunction device with a touch screen display (e.g., portable multifunction device 100). Some operations in method 1800 may be combined and/or the order of some operations may be changed.

As described below, the method 1800 provides an intuitive way to select content within a single block of content in a structured electronic document (e.g., a web page) at a multifunction device with a touch screen display. The method reduces the cognitive burden on a user when selecting content, thereby creating a more efficient human-machine interface. For battery-operated devices, enabling a user to perform content selection faster and more efficiently conserves power and increases the time between battery charges.

The device displays (1802) at least a portion of a structured electronic document on the touch screen display at a first magnification. The structured electronic document comprises a plurality of boxes of content.

The device detects (1804) a first finger gesture on a first box of content in the plurality of boxes of content.

In response to detecting the first finger gesture on the first box of content in the plurality of boxes of content, the device selects the first box of content and visually distinguishes the selected first box of content from content on the touch screen display that is not selected (1806), as shown in FIG. 8P. In some embodiments, the first box of content is selected for copying. In some embodiments, the first box of content is selected for use as input to another operation, such as mapping, searching, or one of the operations described above with respect to FIGS. 6A-6BB.

In some embodiments, the device detects (1808) a second finger gesture prior to detecting a finger contact on the respective end of the selected first box of content (e.g., a finger gesture that moves a selection handle 808 within the selected first box of content 806, FIG. 8P). In response detecting a second finger gesture, the device switches from a mode configured to select one or more boxes of content (FIG. 8P) to a mode configured to select content within a single box of content (FIG. 8Q).

The device detects (1810) a finger contact on a respective end of the selected first box of content (which end may include a start-point object or end-point object or a hidden hit region of one of these objects). The respective end is either the beginning or the end of the selected content. For example, in FIG. 8Q, finger contact 824 is on the beginning of the selected content. For example, in FIG. 8S, finger contact 826 is on the end of the selected content.

The device displays (1812) a content magnifier 702 adjacent to the respective end of the selected first box of content (FIGS. 8R and 8S). The content magnifier 702 displays: an expanded portion 708 of the content proximate to the respective end of the selected first box of content at a second magnification that is greater than the first magnification, and a boundary marker 704 that denotes a current position of the respective end of the selected first box of content.

The device detects (1814) movement of the finger contact across the touch screen display within the selected first box of content 806.

The device updates (1816) the respective end of the selected first box of content and the displayed expanded portion of the content proximate to the respective end at the second magnification in accordance with the movement of the finger contact (FIGS. 8R and 8S).

The device moves (1818) the content magnifier and the boundary marker in accordance with the movement of the finger contact (FIGS. 8R and 8S).

Other aspects of content selection described above (e.g., with respect to FIGS. 7A-7E) may be used here as well. Once the content is selected, the device may, in response to user input, perform operations on the selected content such as those described above with respect to FIGS. 6A-6BB that are applicable to read-only content.

FIG. 19 is a flow diagram illustrating a method of selecting content in structured electronic documents based on document complexity criteria in accordance with some embodiments. The method 1900 is performed at a multifunction device (e.g., 300, FIG. 3) with a touch screen display. In some embodiments, the method is performed at a portable multifunction device with a touch screen display (e.g., portable multifunction device 100). Some operations in method 1900 may be combined and/or the order of some operations may be changed.

As described below, the method 1900 provides a way to tailor the method of content selection to the complexity of a structured electronic document, such as an HTML email, at a multifunction device with a touch screen display. The method selects entire boxes of content in complex documents while allowing more precise selections in documents with simple structures. The method reduces the cognitive burden on a user when selecting content, thereby creating a more efficient human-machine interface. For battery-operated devices, enabling a user to perform content selection faster and more efficiently conserves power and increases the time between battery charges.

The device displays (1902) at least a portion of a structured electronic document on the touch screen display (e.g., an HTML email received by the user and displayed in an email application). The structured electronic document comprises a plurality of boxes of content.

The device determines (1904) whether the structured electronic document meets one or more predefined document complexity criteria.

In some embodiments, the one or more predefined document complexity criteria comprise a requirement that the structured electronic document includes (1906) a plurality of columns that contain boxes of content.

In some embodiments, the one or more predefined document complexity criteria comprise a requirement that the structured electronic document includes (1908) at least one non-inline image.

In some embodiments, the one or more predefined document complexity criteria comprise a requirement that the structured electronic document includes (1910) at least a predefined number of levels of nested elements (e.g., for an HTML email document, at least 3 levels of nested elements).

In some embodiments, the one or more predefined document complexity criteria comprise a requirement that the structured electronic document uses (1912) cascading style sheets.

In some embodiments, the one or more predefined document complexity criteria comprise a requirement that the structured electronic document includes (1914) a floated object.

In some embodiments, the one or more predefined document complexity criteria comprise a requirement that the structured electronic document includes (1916) text floated around an object.

The device selects (1918) one or more entire boxes of content in response to one or more finger gestures when the structured electronic document meets at least one predefined document complexity criteria.

The device selects (1920) a gesture-specified portion of at least one box of content when the structured electronic document does not meet at least one predefined document complexity criteria. The gesture-specified portion may be a portion within one box of content. The gesture-specified portion may include a portion of a first box and a portion of an adjacent box. The gesture-specified portion may include a portion of a first box, a portion of a last box, and the entirety of boxes between the first box and the last box. In other words, for structured electronic documents (e.g., HTML emails) that do not meet any of the document complexity criteria, the respective ends of the selected content may be placed within box(es) of content such that only a portion of some box(es) is selected (e.g., using gestures such as those discussed above with respect to FIGS. 10A-10D and 13A-13G). In contrast, for structured electronic documents that meet at least one document complexity criteria, entire boxes of content are selected (e.g., using gestures such as those discussed above with respect to FIGS. 17A-17B).

Other aspects of content selection described above (e.g., with respect to FIGS. 7A-7E) may be used here as well. Once the content is selected, the device may, in response to user input, perform operations on the selected content such as those described above with respect to FIGS. 6A-6BB that are applicable to read-only content.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a touch screen display;
   one or more processors;
   memory; and
   one or more programs wherein the one or more programs are stored in the memory and configured to be executed by the one or more processors, the one or more programs including instructions for:
   displaying a user interface element that contains content, wherein the content includes content selected for editing;
   visually distinguishing the content selected for editing from displayed content that is not selected for editing;
   displaying an editing command display area element that includes a plurality of command icons;
   moving the content on the touch screen display, including moving the content selected for editing;
   ceasing to display the editing command display area element while moving the content;
   when the content stops moving, redisplaying the editing command display area element;
   detecting activation of a command icon of the plurality of command icons in the editing command display area,
   in response to detecting activation of the command icon of the plurality of command icons, performing a corresponding action with respect to the selected content.

2. The electronic device of claim 1, wherein the plurality of command icons of the editing command display area element are displayed in a row.

3. The electronic device of claim 1, wherein the one or more programs further include instructions for:
   detecting input by a user,
   in response to detecting input by the user:
   deselecting the selected content; and
   ceasing to display the editing command display area.

4. The electronic device of claim 1, wherein the one or more programs further include instructions for:
   detecting a typing input by a user,
   in response to detecting the typing input by the user:
   replacing the selected content with characters that correspond to the typing input; and
   ceasing to display the editing command display area element.

5. The electronic device of claim 1, wherein the plurality of command icons includes a command icon for copying the content selected for editing.

6. The electronic device of claim 1, wherein the plurality of command icons includes a command icon for cutting the content selected for editing.

7. The electronic device of claim 1, wherein the plurality of command icons includes a command icon for pasting previously cut or copied content.

8. The electronic device of claim 1, wherein the plurality of command icons includes a command icon for undoing a previous action.

9. The electronic device of claim 1, wherein the plurality of command icons includes a command icon for displaying additional command options.

10. The electronic device of claim 1, wherein the plurality of command icons includes a command icon for providing information about a location included in the content selected for editing.

11. The electronic device of claim 1, wherein the plurality of command icons includes a first command icon for calling a phone number using a phone number included in the content selected for editing or a second command icon for initiating an email message using an email address included in the content selected for editing.

12. The electronic device of claim 1, wherein the plurality of command icons includes at least one command icon that is context sensitive.

13. The electronic device of claim 1, wherein the one or more programs further include instructions for:
    in response to detecting activation of the command icon in the editing command display area, ceasing to display the editing command display area element.

14. The electronic device of claim 1, wherein the content selected for editing includes a start-point object and an end-point object, and wherein the one or more programs further include instructions for:
    detecting a gesture on the start-point object by a user,
    in response to detecting the gesture by the user:
    ceasing to display the editing command display area element; and
    displaying an insertion marker at the start of the selected content.

15. The electronic device of claim 1, wherein the content selected for editing includes a start-point object and an end-point object, and wherein the one or more programs further include instructions for:
    detecting a gesture on the end-point object by a user,
    in response to detecting the gesture by the user:
    ceasing to display the editing command display area element;
    displaying an insertion marker at the end of the selected content.

16. A non-transitory computer-readable storage medium storing one or more programs, the one or more programs comprising instructions, which when executed by a multifunction device with a touch screen display, cause the device to:
    display a user interface element that contains content, wherein the content includes content selected for editing;
    visually distinguishing the content selected for editing from displayed content that is not selected for editing;
    display an editing command display area element that includes a plurality of command icons;
    move the content on the touch screen display, including moving the content selected for editing;
    cease to display the editing command display area element while moving the content;
    when the content stops moving, redisplaying the editing command display area element;
    detect activation of a command icon of the plurality of command icons in the editing command display area,
    in response to detecting activation of the command icon of the plurality of command icons, performing a corresponding action with respect to the selected content.

17. The non-transitory computer-readable storage medium of claim 16, wherein the plurality of command icons of the editing command display area element are displayed in a row.

18. The non-transitory computer-readable storage medium of claim 16, wherein the one or more programs further include instructions, which when executed by the multifunction device with the touch screen display, cause the device to:
    detect input by a user,
    in response to detecting input by the user:
    deselect the selected content; and
    cease to display the editing command display area.

19. The non-transitory computer-readable storage medium of claim 16, wherein the one or more programs further include instructions, which when executed by the multifunction device with the touch screen display, cause the device to:
detect a typing input by a user,
in response to detecting the typing input by the user:
replace the selected content with characters that correspond to the typing input; and
cease to display the editing command display area element.

20. The non-transitory computer-readable storage medium of claim 16, wherein the plurality of command icons includes a command icon for copying the content selected for editing.

21. The non-transitory computer-readable storage medium of claim 16, wherein the plurality of command icons includes a command icon for cutting the content selected for editing.

22. The non-transitory computer-readable storage medium of claim 16, wherein the plurality of command icons includes a command icon for pasting previously cut or copied content.

23. The non-transitory computer-readable storage medium of claim 16, wherein the plurality of command icons includes a command icon for undoing a previous action.

24. The non-transitory computer-readable storage medium of claim 16, wherein the plurality of command icons includes a command icon for displaying additional command options.

25. The non-transitory computer-readable storage medium of claim 16, wherein the plurality of command icons includes a command icon for providing information about a location included in the content selected for editing.

26. The non-transitory computer-readable storage medium of claim 16, wherein the plurality of command icons includes a first command icon for calling a phone number using a phone number included in the content selected for editing and a second command icon for initiating an email message using an email address included in the content selected for editing.

27. The non-transitory computer-readable storage medium of claim 16, wherein the plurality of command icons includes at least one command icon that is context sensitive.

28. The non-transitory computer-readable storage medium of claim 16, wherein the one or more programs further include instructions, which when executed by the multifunction device with the touch screen display, cause the device to:
in response to detecting activation of the command icon in the editing command display area, ceasing to display the editing command display area element.

29. The non-transitory computer-readable storage medium of claim 16, wherein the content selected for editing includes a start-point object and an end-point object, and wherein the one or more programs further include instructions, which when executed by the multifunction device with the touch screen display, cause the device to:
detect a gesture on the start-point object by a user,
in response to detecting the gesture by the user:
cease to display the editing command display area element; and
display an insertion marker at the start of the selected content.

30. The non-transitory computer-readable storage medium of claim 16, wherein the content selected for editing includes a start-point object and an end-point object, and wherein the one or more programs further include instructions, which when executed by the multifunction device with the touch screen display, cause the device to:
detect a gesture on the end-point object by a user,
in response to detecting the gesture by the user:
cease to display the editing command display area element;
display an insertion marker at the end of the selected content.

31. A method, comprising:
at a multifunction device with a touch screen display:
displaying a user interface element that contains content, wherein the content includes content selected for editing;
visually distinguishing the content selected for editing from displayed content that is not selected for editing;
displaying an editing command display area element that includes a plurality of command icons;
moving the content on the touch screen display, including moving the content selected for editing;
ceasing to display the editing command display area element while moving the content;
when the content stops moving, redisplaying the editing command display area element;
detecting activation of a command icon of the plurality of command icons in the editing command display area,
in response to detecting activation of the command icon of the plurality of command icons, performing a corresponding action with respect to the selected content.

32. The method of claim 31, wherein the plurality of command icons of the editing command display area element are displayed in a row.

33. The method of claim 31, further comprising:
detecting input by a user,
in response to detecting input by the user:
deselecting the selected content; and
ceasing to display the editing command display area.

34. The method of claim 31, further comprising:
detecting a typing input by a user,
in response to detecting the typing input by the user:
replacing the selected content with characters that correspond to the typing input; and
ceasing to display the editing command display area element.

35. The method of claim 31, wherein the plurality of command icons includes a command icon for copying the content selected for editing.

36. The method of claim 31, wherein the plurality of command icons includes a command icon for cutting the content selected for editing.

37. The method of claim 31, wherein the plurality of command icons includes a command icon for pasting previously cut or copied content.

38. The method of claim 31, wherein the plurality of command icons includes a command icon for undoing a previous action.

39. The method of claim 31, wherein the plurality of command icons includes a command icon for displaying additional command options.

40. The method of claim 31, wherein the plurality of command icons includes a command icon for providing information about a location included in the content selected for editing.

41. The method of claim 31, wherein the plurality of command icons includes a first command icon for calling a phone number using a phone number included in the content selected for editing and a second command icon for initiating an email message using an email address included in the content selected for editing.

42. The method of claim 31, wherein the plurality of command icons includes at least one command icon that is context sensitive.

43. The method of claim 31, further comprising:
in response to detecting activation of the command icon in the editing command display area, ceasing to display the editing command display area element.

44. The method of claim 31, wherein the content selected for editing includes a start-point object and an end-point object, and wherein the method further comprises:
detecting a gesture on the start-point object by a user,
in response to detecting the gesture by the user:
ceasing to display the editing command display area element; and
displaying an insertion marker at the start of the selected content.

45. The method of claim 31, wherein the content selected for editing includes a start-point object and an end-point object, and wherein the method further comprises:
detecting a gesture on the end-point object by a user,
in response to detecting the gesture by the user:
ceasing to display the editing command display area element;
displaying an insertion marker at the end of the selected content.

* * * * *

UNITED STATES PATENT AND TRADEMARK OFFICE
CERTIFICATE OF CORRECTION

PATENT NO. : 10,761,716 B2  
APPLICATION NO. : 15/851320  
DATED : September 1, 2020  
INVENTOR(S) : Kenneth L. Kocienda et al.

Page 1 of 1

It is certified that error appears in the above-identified patent and that said Letters Patent is hereby corrected as shown below:

On the Title Page

Column 1, Line 1 (Assignee), Delete "Apple," and insert -- Apple --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*